(12) United States Patent
Jones et al.

(10) Patent No.: US 8,437,531 B2
(45) Date of Patent: May 7, 2013

(54) CHECK AND U.S. BANK NOTE PROCESSING DEVICE AND METHOD

(75) Inventors: John E. Jones, Winnetka, IL (US); Paul A. Jones, Glenview, IL (US); William J. Jones, Barrington, IL (US); Douglas U. Mennie, Barrington, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 13/240,106

(22) Filed: Sep. 22, 2011

(65) Prior Publication Data

US 2012/0013891 A1 Jan. 19, 2012

Related U.S. Application Data

(60) Continuation of application No. 11/048,296, filed on Feb. 1, 2005, now Pat. No. 8,125,624, which is a continuation of application No. 10/853,021, filed on May 25, 2004, now abandoned, which is a continuation of application No. 10/755,039, filed on Jan. 9, 2004, now Pat. No. 7,082,216, which is a division of application No. 10/042,086, filed on Jan. 8, 2002, now Pat. No. 6,731,786, which is a continuation of application No. 08/814,978, filed on Mar. 11, 1997, now Pat. No. 6,363,164, application No. 13/240,106, which is a continuation of application No. 10/084,856, filed on Feb. 27, 2002, which is a division of application No. 08/814,978, filed on Mar. 11, 1997, now Pat. No. 6,363,164.

(60) Provisional application No. 60/031,604, filed on Nov. 27, 1996.

(51) Int. Cl.
*G06K 9/00* (2006.01)

(52) U.S. Cl.
USPC .................................. 382/137; 356/71

(58) Field of Classification Search ............... 356/71; 387/137, 138, 140
See application file for complete search history.

(56) References Cited

U.S. PATENT DOCUMENTS

| 2,669,998 A | 2/1954 | Buchholz | 133/8 |
| 2,750,949 A | 6/1956 | Kulo et al. | 133/8 |

(Continued)

FOREIGN PATENT DOCUMENTS

| CA | 2 624 638 A1 | 12/2007 |
| CA | 2 684 159 A1 | 4/2010 |

(Continued)

OTHER PUBLICATIONS

Vector Tech.: Document Imaging Product Demonstration video on CD in .wmv format (Jun. 1996).

(Continued)

*Primary Examiner* — Roy M Punnoose
(74) *Attorney, Agent, or Firm* — Nixon Peabody LLP

(57) ABSTRACT

A check and U.S. bank note processing device configured to process both checks and U.S. bank notes. According to one embodiment, the device comprises an input receptacle configured to receive checks and U.S. bank notes and an output receptacle. The device further comprises a transport mechanism configured to transport the checks and U.S. bank notes from the input receptacle past an image scanner. The image scanner is configured to obtain an image of each check and U.S. bank note transported past the image scanner. The device is configured to determine the denominations of transported U.S. bank notes. The device is configured to capture information from checks transported past the image scanner. The device further comprises a memory configured to store the information captured from checks transported past the image scanner.

151 Claims, 85 Drawing Sheets

U.S. PATENT DOCUMENTS

| | | | | |
|---|---|---|---|---|
| 2,835,260 | A | 5/1958 | Buchholz | 133/8 |
| 2,936,684 | A | 5/1960 | Simjian | 95/1.1 |
| 3,104,314 | A | 9/1963 | Simjian | 235/61.9 |
| 3,148,932 | A | 9/1964 | Simjian | 346/22 |
| 3,150,912 | A | 9/1964 | Simjian | 346/22 |
| 3,246,295 | A | 4/1966 | DeClaris et al. | 340/146.3 |
| 3,280,974 | A | 10/1966 | Riddle et al. | 209/111.8 |
| 3,443,107 | A | 5/1969 | Modglin | 250/219 |
| 3,480,785 | A | 11/1969 | Aufderheide | 250/219 |
| 3,496,370 | A | 2/1970 | Haville et al. | 250/219 |
| 3,509,535 | A | 4/1970 | Berube | 340/149 |
| 3,612,835 | A | 10/1971 | Andrews et al. | 235/61.11 D |
| 3,618,765 | A | 11/1971 | Cooper et al. | 209/122 |
| 3,656,615 | A | 4/1972 | Ptacek | 209/73 |
| 3,679,314 | A | 7/1972 | Mustert | 356/71 |
| 3,715,031 | A | 2/1973 | Okkonen | 209/75 |
| 3,725,667 | A | 4/1973 | Schwartz | 250/219 |
| 3,764,899 | A | 10/1973 | Peterson | 324/61 |
| 3,778,628 | A | 12/1973 | Novak et al. | 250/556 |
| 3,782,543 | A | 1/1974 | Martelli et al. | 209/75 |
| 3,798,603 | A | 3/1974 | Wahlberg | 340/149 |
| 3,800,078 | A | 3/1974 | Cochran et al. | 178/7.1 |
| 3,806,710 | A | 4/1974 | Shigemori et al. | 235/92 |
| 3,815,021 | A | 6/1974 | Kerr | 324/61 R |
| 3,842,281 | A | 10/1974 | Goodrich | 250/461 |
| 3,870,629 | A | 3/1975 | Carter et al. | 209/111.8 |
| 3,906,449 | A | 9/1975 | Marchak | 340/149 |
| 3,930,582 | A | 1/1976 | Gartner et al. | 209/88 |
| 3,966,047 | A | 6/1976 | Steiner | 209/75 |
| 3,976,198 | A | 8/1976 | Carnes, Jr. et al. | 209/111.7 T |
| 4,023,011 | A | 5/1977 | Nakajima et al. | 235/61.11 R |
| 4,027,142 | A | 5/1977 | Paup et al. | 235/61.9 R |
| 4,040,010 | A | 8/1977 | Crane | 340/146.3 SY |
| 4,041,456 | A | 8/1977 | Ott et al. | 340/146.3 R |
| 4,096,991 | A | 6/1978 | Iguchi | 235/419 |
| 4,109,238 | A | 8/1978 | Creekmore | 340/149 A |
| 4,114,027 | A | 9/1978 | Slater | 235/419 |
| 4,114,804 | A | 9/1978 | Jones et al. | 235/476 |
| 4,147,430 | A | 4/1979 | Gorgone et al. | 356/51 |
| 4,166,945 | A | 9/1979 | Inoyama et al. | 235/379 |
| 4,179,685 | A | 12/1979 | O'Maley | 340/146.3 H |
| 4,180,798 | A | 12/1979 | Komori et al. | 340/146.3 H |
| 4,187,463 | A | 2/1980 | Kivenson | 324/228 |
| 4,187,498 | A | 2/1980 | Creekmore | 340/149 A |
| 4,197,986 | A | 4/1980 | Nagata | 235/379 |
| 4,201,978 | A * | 5/1980 | Nally | 382/140 |
| 4,205,780 | A | 6/1980 | Burns et al. | 235/454 |
| 4,231,014 | A | 10/1980 | Ponzio | 340/146.3 Y |
| 4,231,561 | A | 11/1980 | Kaneko et al. | 271/3.1 |
| 4,237,378 | A | 12/1980 | Jones | 250/223 R |
| 4,250,806 | A | 2/1981 | Boyson et al. | 101/2 |
| 4,255,651 | A | 3/1981 | Phillips | 235/92 SB |
| 4,264,808 | A | 4/1981 | Owens et al. | 235/379 |
| 4,275,874 | A | 6/1981 | DiBlasio | 271/4 |
| 4,277,774 | A | 7/1981 | Fujii et al. | 340/146.3 Q |
| 4,283,708 | A | 8/1981 | Lee | 340/146.3 Z |
| 4,288,781 | A | 9/1981 | Sellner et al. | 340/146.3 Q |
| 4,302,781 | A | 11/1981 | Ikeda et al. | 358/288 |
| 4,310,885 | A | 1/1982 | Azcua et al. | 364/405 |
| 4,311,914 | A | 1/1982 | Huber | 250/556 |
| 4,313,598 | A | 2/1982 | DiBlasio | 271/124 |
| 4,321,672 | A | 3/1982 | Braun et al. | 364/408 |
| 4,326,636 | A | 4/1982 | Kawakami | 209/534 |
| 4,334,619 | A | 6/1982 | Horino et al. | 209/551 |
| 4,337,864 | A | 7/1982 | McLean | 209/534 |
| 4,348,656 | A | 9/1982 | Gorgone et al. | 340/146.3 R |
| 4,349,111 | A | 9/1982 | Shah et al. | 209/534 |
| 4,352,988 | A | 10/1982 | Ishida | 250/559 |
| 4,355,300 | A | 10/1982 | Weber | 340/146.3 C |
| 4,355,369 | A | 10/1982 | Garvin | 364/900 |
| 4,356,473 | A | 10/1982 | Freudenthal | 340/146.3 H |
| 4,360,034 | A | 11/1982 | Davila et al. | 133/3 D |
| 4,381,447 | A | 4/1983 | Horvath et al. | 250/223 R |
| 4,383,540 | A | 5/1983 | De Meyer et al. | 133/3 H |
| 4,386,432 | A | 5/1983 | Nakamura et al. | 382/7 |
| 4,396,902 | A | 8/1983 | Warthan et al. | 382/64 |
| 4,416,299 | A | 11/1983 | Bergman | 133/1 R |
| 4,420,153 | A | 12/1983 | Winkler et al. | 271/304 |
| 4,435,834 | A | 3/1984 | Pauli et al. | 382/7 |
| 4,441,205 | A | 4/1984 | Berkin et al. | 382/8 |
| 4,442,541 | A | 4/1984 | Finkel et al. | 382/7 |
| 4,449,240 | A | 5/1984 | Yoshida | 382/15 |
| 4,461,028 | A | 7/1984 | Okubo | 382/15 |
| 4,464,786 | A | 8/1984 | Nishito et al. | 382/7 |
| 4,464,787 | A | 8/1984 | Fish et al. | 382/7 |
| RE31,692 | E | 10/1984 | Tyburski et al. | 382/7 |
| 4,479,049 | A | 10/1984 | Hirose | 235/379 |
| 4,480,177 | A | 10/1984 | Allen | 235/379 |
| 4,482,058 | A * | 11/1984 | Steiner | 209/534 |
| 4,487,306 | A | 12/1984 | Nao et al. | 194/4 C |
| 4,490,846 | A | 12/1984 | Ishida et al. | 382/7 |
| 4,513,439 | A | 4/1985 | Gorgone et al. | 382/7 |
| 4,521,008 | A | 6/1985 | Granzow et al. | 271/3 |
| 4,523,330 | A | 6/1985 | Cain | 382/7 |
| 4,530,067 | A | 7/1985 | Dorr | 364/900 |
| 4,538,719 | A | 9/1985 | Gray et al. | 194/100 A |
| 4,539,702 | A | 9/1985 | Oka | 382/7 |
| 4,542,829 | A | 9/1985 | Emery et al. | 209/534 |
| 4,543,969 | A | 10/1985 | Rasmussen | 133/3 A |
| 4,544,266 | A | 10/1985 | Antes | 356/71 |
| 4,547,896 | A | 10/1985 | Ohtombe et al. | 382/7 |
| 4,553,222 | A | 11/1985 | Kurland et al. | 364/900 |
| 4,553,846 | A | 11/1985 | Hilton et al. | 356/429 |
| 4,556,140 | A | 12/1985 | Okada | 194/4 C |
| 4,558,224 | A | 12/1985 | Gober | 250/461.1 |
| 4,559,451 | A | 12/1985 | Curl | 250/560 |
| 4,563,771 | A | 1/1986 | Gorgone et al. | 382/7 |
| 4,567,370 | A | 1/1986 | Falls | 250/461.1 |
| 4,569,421 | A | 2/1986 | Sandstedt | 186/39 |
| 4,582,172 | A | 4/1986 | Takeuchi et al. | 186/38 |
| 4,584,529 | A | 4/1986 | Aoyama | 324/261 |
| 4,587,412 | A | 5/1986 | Apisdorf | 235/449 |
| 4,587,434 | A | 5/1986 | Roes et al. | 250/556 |
| 4,590,606 | A | 5/1986 | Rohrer | 382/7 |
| 4,592,090 | A | 5/1986 | Curl et al. | 382/7 |
| 4,593,184 | A | 6/1986 | Bryce | 235/449 |
| 4,594,664 | A | 6/1986 | Hashimoto | 364/405 |
| 4,602,332 | A | 7/1986 | Hirose et al. | 364/408 |
| 4,605,926 | A | 8/1986 | Onishi et al. | 340/825.3 |
| 4,611,345 | A | 9/1986 | Ohnishi et al. | 382/7 |
| 4,617,457 | A | 10/1986 | Granzow et al. | 235/379 |
| 4,617,458 | A | 10/1986 | Bryce | 235/449 |
| 4,628,194 | A | 12/1986 | Dobbins et al. | 235/379 |
| 4,630,813 | A | 12/1986 | Watanabe et al. | 271/227 |
| 4,645,936 | A | 2/1987 | Gorgone | 250/556 |
| 4,653,647 | A | 3/1987 | Hashimoto | 209/534 |
| 4,658,289 | A | 4/1987 | Nagano et al. | 358/75 |
| 4,676,343 | A | 6/1987 | Humble et al. | 186/61 |
| 4,677,682 | A | 6/1987 | Miyagawa et al. | 382/7 |
| 4,678,072 | A | 7/1987 | Kobayashi et al. | 194/206 |
| 4,680,803 | A | 7/1987 | Delella | 382/9 |
| 4,685,141 | A | 8/1987 | Hoque et al. | 382/7 |
| 4,686,357 | A | 8/1987 | Douno et al. | 235/379 |
| 4,694,963 | A | 9/1987 | Takesako | 209/534 |
| 4,697,071 | A | 9/1987 | Hiraoka et al. | 235/379 |
| 4,700,368 | A | 10/1987 | Munn et al. | 377/8 |
| 4,716,456 | A | 12/1987 | Hosaka | 358/75 |
| 4,733,308 | E | 3/1988 | Nakamura et al. | 358/288 |
| 4,735,289 | A | 4/1988 | Kenyon | 186/37 |
| 4,743,743 | A | 5/1988 | Fukatsu | 235/379 |
| 4,743,974 | A | 5/1988 | Lockwood | 358/285 |
| 4,748,679 | A | 5/1988 | Gold et al. | 382/61 |
| 4,749,087 | A | 6/1988 | Buttifant | 209/534 |
| 4,753,625 | A | 6/1988 | Okada | 453/32 |
| 4,764,725 | A | 8/1988 | Bryce | 324/234 |
| 4,764,976 | A | 8/1988 | Kallin et al. | 382/65 |
| 4,768,100 | A | 8/1988 | Kunishima et al. | 358/285 |
| 4,774,663 | A | 9/1988 | Musmanno et al. | 364/408 |
| 4,782,328 | A | 11/1988 | Denlinger | 340/365 P |
| 4,784,274 | A | 11/1988 | Mori et al. | 209/534 |
| 4,803,347 | A | 2/1989 | Sugahara et al. | 235/379 |
| 4,806,709 | A | 2/1989 | Evans | 179/19 |
| 4,811,004 | A | 3/1989 | Person et al. | 340/712 |
| 4,817,176 | A | 3/1989 | Marshall et al. | 382/43 |
| 4,821,332 | A | 4/1989 | Durham | 382/7 |
| 4,823,393 | A | 4/1989 | Kawakami | 382/7 |
| 4,825,246 | A | 4/1989 | Fukuchi et al. | 355/4 |

| Patent No. | Date | Inventor | Class |
|---|---|---|---|
| 4,827,531 A | 5/1989 | Milford | 382/29 |
| 4,837,842 A | 6/1989 | Holt | 382/26 |
| 4,841,358 A | 6/1989 | Kammoto et al. | 358/75 |
| 4,843,219 A | 6/1989 | Franchi | 235/379 |
| 4,851,616 A | 7/1989 | Wales et al. | 178/18 |
| 4,877,230 A | 10/1989 | Winkler et al. | 271/3 |
| 4,880,096 A | 11/1989 | Kobayashi et al. | 194/206 |
| 4,881,268 A | 11/1989 | Uchida et al. | 382/7 |
| 4,883,181 A | 11/1989 | Yoshikawa | 209/534 |
| 4,888,812 A | 12/1989 | Dinan et al. | 382/7 |
| 4,903,953 A | 2/1990 | Winkler et al. | 271/4 |
| 4,905,839 A | 3/1990 | Yuge et al. | 209/534 |
| 4,905,840 A | 3/1990 | Yuge et al. | 209/534 |
| 4,908,516 A | 3/1990 | West | 250/556 |
| 4,922,109 A | 5/1990 | Bercovitz et al. | 250/556 |
| 4,928,094 A | 5/1990 | Smith | 340/712 |
| 4,931,782 A | 6/1990 | Jackson | 340/706 |
| 4,947,441 A | 8/1990 | Hara et al. | 382/7 |
| 4,948,174 A | 8/1990 | Thomson et al. | 283/58 |
| 4,954,697 A | 9/1990 | Kokubun et al. | 235/381 |
| 4,958,235 A | 9/1990 | Sims et al. | 358/402 |
| 4,960,981 A | 10/1990 | Benton et al. | 235/379 |
| 4,970,655 A | 11/1990 | Winn et al. | 364/479 |
| 4,973,851 A | 11/1990 | Lee | 250/556 |
| 4,980,543 A | 12/1990 | Hara et al. | 235/379 |
| 4,984,280 A | 1/1991 | Abe | 382/7 |
| 4,992,860 A | 2/1991 | Hamaguchi et al. | 358/75 |
| 4,996,604 A | 2/1991 | Ogawa et al. | 358/474 |
| 5,001,766 A | 3/1991 | Baird | 382/290 |
| 5,010,238 A | 4/1991 | Kadono et al. | 235/379 |
| 5,023,782 A | 6/1991 | Lutz et al. | 364/405 |
| 5,025,483 A | 6/1991 | Dinan et al. | 382/58 |
| 5,027,415 A | 6/1991 | Hara et al. | 382/7 |
| 5,040,226 A | 8/1991 | Elischer et al. | 382/7 |
| 5,047,871 A | 9/1991 | Meyer et al. | 358/486 |
| 5,053,607 A | 10/1991 | Carlson et al. | 705/18 |
| 5,054,621 A | 10/1991 | Murphy et al. | 209/534 |
| 5,055,834 A | 10/1991 | Chiba | 340/825.34 |
| 5,063,599 A | 11/1991 | Concannon et al. | 382/7 |
| 5,064,999 A | 11/1991 | Okamoto et al. | 235/379 |
| 5,068,519 A | 11/1991 | Bryce | 235/449 |
| 5,076,441 A | 12/1991 | Gerlier | 209/534 |
| 5,091,961 A | 2/1992 | Baus, Jr. | 382/7 |
| 5,097,517 A | 3/1992 | Holt | 382/7 |
| 5,105,364 A | 4/1992 | Kawamura et al. | 364/478 |
| 5,105,601 A | 4/1992 | Horiguchi et al. | 53/465 |
| 5,114,381 A | 5/1992 | Ueda et al. | 453/57 |
| 5,119,433 A | 6/1992 | Will | 382/7 |
| 5,120,944 A | 6/1992 | Kern et al. | 235/379 |
| 5,122,754 A | 6/1992 | Gotaas | 324/676 |
| 5,134,663 A | 7/1992 | Kozlowski | 382/7 |
| 5,135,115 A | 8/1992 | Miller et al. | 209/564 |
| 5,144,115 A | 9/1992 | Yoshida | 235/379 |
| 5,146,067 A | 9/1992 | Sloan et al. | 235/381 |
| 5,146,512 A | 9/1992 | Weideman et al. | 382/30 |
| 5,151,607 A | 9/1992 | Crane et al. | 250/556 |
| 5,154,272 A | 10/1992 | Nishiumi et al. | 194/318 |
| 5,159,548 A | 10/1992 | Caslavka | 364/408 |
| 5,163,672 A | 11/1992 | Mennie | 271/187 |
| 5,163,868 A | 11/1992 | Adams et al. | 453/11 |
| 5,167,313 A | 12/1992 | Dobbins et al. | 194/317 |
| 5,179,517 A | 1/1993 | Sarbin et al. | 364/410 |
| 5,183,142 A | 2/1993 | Latchinian et al. | 194/206 |
| 5,184,115 A | 2/1993 | Black et al. | 340/708 |
| 5,184,709 A | 2/1993 | Nishiumi et al. | 194/318 |
| 5,186,334 A | 2/1993 | Fukudome et al. | 209/534 |
| 5,187,750 A | 2/1993 | Behera | 382/7 |
| 5,191,525 A | 3/1993 | LeBrun et al. | 364/419 |
| 5,193,121 A | 3/1993 | Elischer et al. | 382/7 |
| 5,198,976 A | 3/1993 | Form et al. | 364/410 |
| 5,199,543 A | 4/1993 | Kamagami et al. | 194/207 |
| 5,201,395 A | 4/1993 | Takizawa et al. | 194/206 |
| 5,204,811 A * | 4/1993 | Bednar et al. | 705/45 |
| 5,206,915 A | 4/1993 | Kern et al. | 382/7 |
| 5,207,788 A | 5/1993 | Geib | 271/122 |
| 5,220,501 A | 6/1993 | Lawlor et al. | 364/408 |
| 5,231,381 A | 7/1993 | Duwaer | 340/712 |
| 5,237,158 A | 8/1993 | Kern et al. | 235/379 |
| 5,237,159 A | 8/1993 | Stephens et al. | 235/379 |
| 5,239,593 A | 8/1993 | Wittner et al. | 382/14 |
| 5,251,273 A | 10/1993 | Betts et al. | 382/311 |
| 5,251,738 A | 10/1993 | Dabrowski | 194/206 |
| 5,252,811 A | 10/1993 | Henochowicz et al. | 235/379 |
| 5,261,518 A | 11/1993 | Bryce | 194/206 |
| 5,265,008 A | 11/1993 | Benton et al. | 364/408 |
| 5,272,641 A | 12/1993 | Ford et al. | 364/468 |
| 5,274,641 A | 12/1993 | Shobalake et al. | 370/94.1 |
| 5,279,403 A | 1/1994 | Harbaugh et al. | 194/207 |
| 5,286,954 A | 2/1994 | Sato et al. | 235/379 |
| 5,295,196 A | 3/1994 | Raterman et al. | 382/135 |
| 5,297,030 A | 3/1994 | Vassigh et al. | 364/405 |
| 5,304,813 A | 4/1994 | De Man | 250/556 |
| 5,308,992 A | 5/1994 | Crane et al. | 250/556 |
| 5,309,515 A | 5/1994 | Troung et al. | 382/7 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,341,408 A | 8/1994 | Melcher et al. | 377/8 |
| 5,342,165 A | 8/1994 | Graef et al. | 414/788.9 |
| 5,363,949 A | 11/1994 | Matsubayashi | 194/206 |
| 5,367,577 A | 11/1994 | Gotaas | 382/7 |
| 5,368,147 A | 11/1994 | Menke et al. | 194/206 |
| 5,371,345 A | 12/1994 | LeStrange et al. | 235/380 |
| 5,371,798 A | 12/1994 | McWhortor | 380/51 |
| 5,373,550 A * | 12/1994 | Campbell et al. | 379/100.11 |
| 5,379,344 A | 1/1995 | Larsson et al. | 380/23 |
| 5,381,019 A | 1/1995 | Sato | 250/556 |
| 5,383,754 A * | 1/1995 | Sumida et al. | 412/11 |
| 5,394,969 A | 3/1995 | Harbaugh | 194/206 |
| 5,399,874 A | 3/1995 | Gonsalves et al. | 250/556 |
| 5,402,895 A | 4/1995 | Mikkelsen et al. | 209/534 |
| 5,416,307 A | 5/1995 | Danek et al. | 235/449 |
| 5,417,316 A | 5/1995 | Harbaugh | 194/206 |
| 5,418,458 A | 5/1995 | Jeffers | 324/235 |
| 5,419,424 A | 5/1995 | Harbaugh | 194/206 |
| 5,421,443 A | 6/1995 | Hatamachi et al. | 194/206 |
| 5,422,467 A | 6/1995 | Graef et al. | 235/379 |
| 5,430,664 A | 7/1995 | Cargill et al. | 364/550 |
| 5,434,427 A | 7/1995 | Crane et al. | 250/556 |
| 5,437,357 A | 8/1995 | Ota et al. | 194/206 |
| 5,438,184 A | 8/1995 | Roberts et al. | 235/380 |
| 5,442,162 A | 8/1995 | Armel | 235/381 |
| 5,444,793 A | 8/1995 | Kelland | 382/138 |
| 5,444,794 A | 8/1995 | Uhland, Sr. | 382/137 |
| 5,453,601 A | 9/1995 | Rosen | 235/379 |
| 5,459,304 A | 10/1995 | Eisenmann | 235/380 |
| 5,465,301 A | 11/1995 | Jotcham et al. | 380/54 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,468,941 A | 11/1995 | Sasaki | 235/379 |
| 5,468,971 A | 11/1995 | Ebstein et al. | 250/556 |
| 5,469,241 A | 11/1995 | Takahashi et al. | 355/64 |
| 5,476,169 A | 12/1995 | Takarada et al. | 194/207 |
| 5,481,377 A | 1/1996 | Udagawa et al. | 358/501 |
| 5,488,671 A | 1/1996 | Kern | 382/138 |
| 5,491,325 A | 2/1996 | Huang et al. | 235/379 |
| 5,504,822 A | 4/1996 | Holt | 382/218 |
| 5,506,691 A | 4/1996 | Bednar et al. | 358/402 |
| 5,509,692 A | 4/1996 | Oz | 283/70 |
| D369,984 S | 5/1996 | Larsen | D10/97 |
| 5,523,575 A | 6/1996 | Machida et al. | 250/208.1 |
| 5,530,772 A | 6/1996 | Storey | 382/135 |
| 5,530,773 A | 6/1996 | Thompson | 382/138 |
| 5,537,486 A | 7/1996 | Stratigos et al. | 382/137 |
| 5,544,043 A | 8/1996 | Miki et al. | 364/406 |
| 5,544,086 A | 8/1996 | Davis et al. | 364/408 |
| 5,545,885 A | 8/1996 | Jagielinski | 235/449 |
| 5,564,546 A | 10/1996 | Molbak et al. | 194/216 |
| 5,586,036 A | 12/1996 | Pintsov | 364/464.02 |
| 5,590,196 A | 12/1996 | Moreau | 380/18 |
| 5,592,377 A | 1/1997 | Lipkin | 395/242 |
| 5,592,561 A | 1/1997 | Moore | 382/103 |
| 5,594,225 A | 1/1997 | Botvin | 235/379 |
| 5,600,704 A | 2/1997 | Ahlberg et al. | 379/58 |
| 5,600,732 A | 2/1997 | Ott et al. | 382/112 |
| 5,602,933 A | 2/1997 | Blackwell et al. | 382/116 |
| 5,602,936 A | 2/1997 | Green et al. | 382/140 |

| Patent No. | | Date | Inventor | Class |
|---|---|---|---|---|
| 5,607,040 | A | 3/1997 | Mathurin, Sr. | 194/207 |
| 5,615,280 | A * | 3/1997 | Izawa et al. | 382/135 |
| 5,616,902 | A | 4/1997 | Cooley | 235/380 |
| 5,620,079 | A | 4/1997 | Molbak | 194/217 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,657,846 | A | 8/1997 | Schwartz | 194/206 |
| 5,671,282 | A | 9/1997 | Wolff et al. | 380/25 |
| 5,678,046 | A | 10/1997 | Cahill et al. | 395/616 |
| 5,680,472 | A * | 10/1997 | Conant | 382/135 |
| 5,687,963 | A | 11/1997 | Mennie | 271/119 |
| 5,692,067 | A | 11/1997 | Raterman et al. | 382/135 |
| 5,703,344 | A | 12/1997 | Bezy et al. | 235/379 |
| 5,704,491 | A | 1/1998 | Graves | 209/534 |
| 5,708,810 | A | 1/1998 | Kern et al. | 395/712 |
| 5,719,948 | A | 2/1998 | Liang | 382/112 |
| 5,724,438 | A | 3/1998 | Graves | 382/135 |
| 5,727,667 | A | 3/1998 | Nye | 194/207 |
| 5,729,623 | A | 3/1998 | Omatu et al. | 382/155 |
| 5,751,840 | A | 5/1998 | Raterman et al. | 382/135 |
| 5,751,842 | A | 5/1998 | Riach et al. | 382/137 |
| 5,754,673 | A | 5/1998 | Brooks et al. | 382/112 |
| 5,761,089 | A | 6/1998 | McInerny | 364/550 |
| 5,781,654 | A | 7/1998 | Carney | 382/137 |
| 5,790,693 | A | 8/1998 | Graves et al. | 382/135 |
| 5,790,697 | A | 8/1998 | Munro et al. | 382/135 |
| 5,799,767 | A | 9/1998 | Molbak | 194/217 |
| 5,806,650 | A | 9/1998 | Mennie et al. | 194/206 |
| 5,813,510 | A | 9/1998 | Rademacher | 194/206 |
| 5,815,592 | A | 9/1998 | Mennie et al. | 382/135 |
| 5,822,448 | A | 10/1998 | Graves et al. | 382/135 |
| 5,830,054 | A | 11/1998 | Petri | 453/5 |
| 5,832,104 | A | 11/1998 | Graves et al. | 382/135 |
| 5,832,463 | A | 11/1998 | Funk | 705/35 |
| 5,842,188 | A | 11/1998 | Ramsey et al. | 705/416 |
| 5,852,811 | A | 12/1998 | Atkins | 705/36 |
| 5,867,589 | A | 2/1999 | Graves et al. | 382/135 |
| 5,870,487 | A | 2/1999 | Graves et al. | 382/135 |
| 5,870,725 | A | 2/1999 | Bellinger et al. | 705/45 |
| 5,874,717 | A | 2/1999 | Kern et al. | 235/379 |
| 5,875,259 | A | 2/1999 | Mennie et al. | 382/135 |
| 5,892,211 | A | 4/1999 | Davis et al. | 235/380 |
| 5,894,937 | A | 4/1999 | Schmidt | 209/534 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,917,930 | A | 6/1999 | Kayani et al. | 382/135 |
| 5,918,748 | A | 7/1999 | Clark et al. | 209/534 |
| 5,923,413 | A | 7/1999 | Laskowski | 356/71 |
| 5,926,392 | A * | 7/1999 | York et al. | 700/223 |
| 5,926,550 | A | 7/1999 | Davis | 380/25 |
| 5,930,778 | A | 7/1999 | Geer | 705/45 |
| 5,936,219 | A | 8/1999 | Yoshida et al. | 235/379 |
| 5,938,044 | A | 8/1999 | Weggesser | 209/534 |
| 5,940,623 | A | 8/1999 | Watts et al. | 395/712 |
| 5,940,844 | A | 8/1999 | Cahill et al. | 707/526 |
| 5,943,655 | A | 8/1999 | Jacobsen | 705/30 |
| 5,947,255 | A | 9/1999 | Shimada et al. | 194/207 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,023,684 | A | 2/2000 | Pearson | 705/35 |
| 6,026,175 | A | 2/2000 | Munro et al. | 382/135 |
| 6,028,951 | A | 2/2000 | Raterman et al. | 382/135 |
| 6,036,344 | A | 3/2000 | Goldenberg | 364/408 |
| 6,038,553 | A | 3/2000 | Hyde, Jr. | 705/45 |
| 6,045,039 | A | 4/2000 | Stinson et al. | 235/379 |
| 6,065,672 | A | 5/2000 | Haycock | 235/379 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,076,826 | A | 6/2000 | Gerlier et al. | 271/274 |
| 6,078,683 | A | 6/2000 | Denison et al. | 382/135 |
| D427,623 | S | 7/2000 | Kuwanda | D18/3 |
| 6,097,834 | A | 8/2000 | Krouse et al. | 382/137 |
| 6,101,266 | A | 8/2000 | Laskowski et al. | 382/135 |
| 6,105,007 | A | 8/2000 | Norris | 705/38 |
| 6,119,946 | A | 9/2000 | Teicher | 235/492 |
| 6,128,402 | A | 10/2000 | Jones et al. | 382/135 |
| 6,131,718 | A | 10/2000 | Witschorik | 194/206 |
| 6,141,438 | A | 10/2000 | Blanchester | 382/140 |
| 6,144,459 | A | 11/2000 | Satou | 358/1.15 |
| 6,145,738 | A | 11/2000 | Stinson et al. | 235/379 |
| 6,181,837 | B1 | 1/2001 | Cahill et al. | 382/305 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,282,523 | B1 | 8/2001 | Tedesco et al. | 705/45 |
| 6,283,366 | B1 | 9/2001 | Hills et al. | 235/379 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,351,552 | B1 | 2/2002 | Weaver et al. | 382/135 |
| 6,354,491 | B2 | 3/2002 | Nichols et al. | 235/379 |
| 6,363,164 | B1 | 3/2002 | Jones et al. | 382/135 |
| 6,363,362 | B1 | 3/2002 | Burfield | 705/40 |
| 6,371,303 | B1 | 4/2002 | Klein et al. | 209/534 |
| 6,373,965 | B1 | 4/2002 | Liang | 382/112 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,415,983 | B1 | 7/2002 | Ulvr et al. | 235/487 |
| 6,430,320 | B1 | 8/2002 | Jia et al. | 382/289 |
| 6,459,806 | B1 | 10/2002 | Raterman et al. | 382/135 |
| 6,460,705 | B1 | 10/2002 | Hallowell | 209/534 |
| 6,473,519 | B1 | 10/2002 | Pidhirny et al. | 382/140 |
| 6,493,461 | B1 | 12/2002 | Mennie et al. | 382/135 |
| 6,516,078 | B1 | 2/2003 | Yang et al. | 382/100 |
| 6,539,104 | B1 | 3/2003 | Raterman et al. | 382/135 |
| 6,540,090 | B1 | 4/2003 | Sakai et al. | 209/534 |
| 6,546,351 | B1 | 4/2003 | Haycock et al. | 702/127 |
| 6,550,671 | B1 | 4/2003 | Brown et al. | 235/379 |
| 6,560,355 | B2 | 5/2003 | Graves et al. | 382/135 |
| 6,573,983 | B1 | 6/2003 | Laskowski | 356/71 |
| 6,574,377 | B1 | 6/2003 | Cahill et al. | 382/305 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,611,351 | B1 | 8/2003 | Simonoff | 358/1.18 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,637,576 | B1 | 10/2003 | Jones et al. | 194/216 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 * | 12/2003 | Jones et al. | 382/135 |
| 6,665,431 | B2 | 12/2003 | Jones et al. | 382/140 |
| 6,678,401 | B2 | 1/2004 | Jones et al. | 382/135 |
| 6,678,402 | B2 | 1/2004 | Jones et al. | 382/135 |
| 6,697,511 | B1 | 2/2004 | Haycock | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/135 |
| 6,785,405 | B2 | 8/2004 | Tuttle et al. | 382/112 |
| 6,786,398 | B1 | 9/2004 | Stinson et al. | 235/379 |
| 6,798,899 | B2 | 9/2004 | Mennie et al. | 382/135 |
| 6,810,137 | B2 * | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,863,214 | B2 | 3/2005 | Garner et al. | 235/379 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,883,707 | B2 | 4/2005 | Nagasaka et al. | 235/379 |

| Patent No. | Date | Inventor | Class |
|---|---|---|---|
| 6,913,130 B1 | 7/2005 | Mazur et al. | 194/207 |
| 6,913,260 B2 | 7/2005 | Maier et al. | 271/265.04 |
| 6,915,893 B2 | 7/2005 | Mennie | 194/207 |
| 6,929,109 B1 | 8/2005 | Klein et al. | 194/206 |
| 6,955,253 B1 | 10/2005 | Mazur et al. | 194/207 |
| 6,957,733 B2 | 10/2005 | Mazur et al. | 194/215 |
| 6,959,800 B1 | 11/2005 | Mazur et al. | 194/207 |
| 6,962,247 B2 | 11/2005 | Maier et al. | 194/207 |
| 6,980,684 B1 | 12/2005 | Munro et al. | 382/135 |
| 6,994,200 B2 | 2/2006 | Jenrick et al. | 194/206 |
| 6,996,263 B2 * | 2/2006 | Jones et al. | 382/135 |
| 7,000,828 B2 | 2/2006 | Jones | 235/379 |
| 7,006,664 B2 | 2/2006 | Paraskevakos | 382/100 |
| 7,016,767 B2 | 3/2006 | Jones et al. | 700/224 |
| 7,034,324 B2 | 4/2006 | Voser | 250/556 |
| 7,036,651 B2 | 5/2006 | Tam et al. | 194/217 |
| 7,082,216 B2 | 7/2006 | Jones et al. | 382/137 |
| 7,092,560 B2 | 8/2006 | Jones et al. | 382/135 |
| 7,103,206 B2 | 9/2006 | Graves et al. | 382/135 |
| 7,103,438 B2 | 9/2006 | Hallowell et al. | 700/116 |
| 7,113,615 B2 | 9/2006 | Rhoads et al. | 382/100 |
| 7,113,925 B2 | 9/2006 | Waserstein et al. | 705/50 |
| 7,124,113 B1 | 10/2006 | Fairclough | 705/50 |
| 7,146,245 B2 | 12/2006 | Jones et al. | 700/224 |
| 7,149,336 B2 | 12/2006 | Jones et al. | 382/135 |
| 7,158,662 B2 | 1/2007 | Chiles | 382/135 |
| 7,171,032 B2 | 1/2007 | Jones et al. | 382/135 |
| 7,187,795 B2 * | 3/2007 | Jones et al. | 382/135 |
| 7,191,657 B2 | 3/2007 | Maier et al. | 73/587 |
| 7,197,173 B2 | 3/2007 | Jones et al. | 382/135 |
| 7,200,255 B2 * | 4/2007 | Jones et al. | 382/135 |
| 7,201,320 B2 | 4/2007 | Csulits et al. | 235/462.01 |
| 7,201,340 B2 | 4/2007 | Dietrich et al. | 241/101.2 |
| 7,216,106 B1 | 5/2007 | Buchanan et al. | 705/45 |
| 7,232,024 B2 | 6/2007 | Mazur et al. | 194/207 |
| 7,243,773 B2 | 7/2007 | Bochonok et al. | 194/350 |
| 7,248,730 B2 | 7/2007 | Matsui et al. | 382/135 |
| 7,248,731 B2 | 7/2007 | Raterman et al. | 382/135 |
| 7,256,874 B2 | 8/2007 | Csulits et al. | 356/71 |
| 7,269,279 B2 | 9/2007 | Chiles | 382/135 |
| 7,312,902 B2 | 12/2007 | Mastie et al. | 358/3.28 |
| 7,349,566 B2 | 3/2008 | Jones et al. | 382/139 |
| 7,362,891 B2 | 4/2008 | Jones et al. | 382/135 |
| 7,366,338 B2 * | 4/2008 | Jones et al. | 382/135 |
| 7,391,897 B2 | 6/2008 | Jones et al. | 382/135 |
| 7,494,052 B1 * | 2/2009 | Carpenter et al. | 235/379 |
| 7,505,831 B2 | 3/2009 | Jones et al. | 700/224 |
| 7,536,046 B2 | 5/2009 | Raterman et al. | 382/135 |
| 7,542,598 B2 | 6/2009 | Jones et al. | 382/135 |
| 7,551,764 B2 | 6/2009 | Chiles et al. | 382/135 |
| 7,567,698 B2 | 7/2009 | Paraskevakos | 382/135 |
| 7,574,377 B2 | 8/2009 | Carapelli | 705/26 |
| 7,590,274 B2 | 9/2009 | Raterman et al. | 382/135 |
| 7,591,428 B2 | 9/2009 | Freeman et al. | 235/449 |
| 7,599,543 B2 * | 10/2009 | Jones et al. | 382/137 |
| 7,600,626 B2 | 10/2009 | Hallowell et al. | 194/206 |
| 7,602,956 B2 * | 10/2009 | Jones et al. | 382/135 |
| 5,909,503 C1 | 11/2009 | Graves et al. | 382/135 |
| 7,619,721 B2 * | 11/2009 | Jones et al. | 356/71 |
| 7,620,231 B2 * | 11/2009 | Jones et al. | 382/137 |
| 5,966,456 C1 | 12/2009 | Jones et al. | 382/135 |
| 6,381,354 C1 | 12/2009 | Mennie et al. | 382/135 |
| 7,628,326 B2 | 12/2009 | Freeman et al. | 235/450 |
| 7,635,082 B2 | 12/2009 | Jones | 235/379 |
| 7,647,275 B2 | 1/2010 | Jones | 705/40 |
| 7,650,980 B2 | 1/2010 | Jenrick et al. | 194/206 |
| 7,672,499 B2 | 3/2010 | Raterman et al. | 382/135 |
| 7,686,151 B2 | 3/2010 | Renz et al. | 194/206 |
| 7,724,938 B2 | 5/2010 | Paraskevakos | 382/135 |
| 7,726,457 B2 | 6/2010 | Maier et al. | 194/206 |
| 7,735,621 B2 | 6/2010 | Hallowell et al. | 194/206 |
| 7,753,189 B2 | 7/2010 | Maier et al. | 194/206 |
| 7,762,380 B2 | 7/2010 | Freeman et al. | 194/210 |
| 7,778,456 B2 | 8/2010 | Jones et al. | 382/135 |
| 7,779,982 B2 | 8/2010 | Fitzgerald et al. | 194/206 |
| 7,817,842 B2 | 10/2010 | Mennie | 382/137 |
| 7,849,994 B2 | 12/2010 | Klein et al. | 194/206 |
| 7,873,576 B2 | 1/2011 | Jones et al. | 705/43 |
| 7,881,519 B2 * | 2/2011 | Jones et al. | 382/135 |
| 7,882,000 B2 | 2/2011 | Jones | 705/35 |
| 7,885,880 B1 | 2/2011 | Prasad et al. | 705/35 |
| 7,900,829 B1 | 3/2011 | Folk et al. | 235/380 |
| 7,903,863 B2 | 3/2011 | Jones et al. | 382/135 |
| 7,929,749 B1 | 4/2011 | Jones et al. | 382/135 |
| 7,938,245 B2 | 5/2011 | Jenrick et al. | 194/206 |
| 7,949,582 B2 | 5/2011 | Mennie et al. | 705/35 |
| 7,962,411 B1 | 6/2011 | Prasad et al. | 705/45 |
| 7,974,899 B1 | 7/2011 | Prasad et al. | 705/35 |
| 8,011,581 B1 | 9/2011 | Folk et al. | 235/385 |
| 8,023,715 B2 | 9/2011 | Jones et al. | 382/135 |
| 8,041,098 B2 * | 10/2011 | Jones et al. | 382/137 |
| 8,103,084 B2 * | 1/2012 | Jones et al. | 382/140 |
| 8,125,624 B2 * | 2/2012 | Jones et al. | 356/71 |
| 8,141,772 B1 | 3/2012 | Folk et al. | 235/379 |
| 8,162,125 B1 * | 4/2012 | Csulits et al. | 194/206 |
| 2001/0006557 A1 | 7/2001 | Mennie et al. | 382/135 |
| 2001/0015311 A1 | 8/2001 | Mennie | 194/207 |
| 2001/0018739 A1 | 8/2001 | Anderson et al. | 713/176 |
| 2001/0019624 A1 | 9/2001 | Raterman et al. | 382/135 |
| 2001/0035603 A1 | 11/2001 | Graves et al. | 271/265.01 |
| 2001/0053241 A1 | 12/2001 | Haycock | 382/135 |
| 2002/0001393 A1 | 1/2002 | Jones et al. | 382/100 |
| 2002/0020603 A1 | 2/2002 | Jones et al. | 194/346 |
| 2002/0037097 A1 | 3/2002 | Hoyos et al. | 382/137 |
| 2002/0056605 A1 | 5/2002 | Mazur et al. | 194/207 |
| 2002/0082993 A1 | 6/2002 | Hoyos et al. | 705/43 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/35 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2002/0186876 A1 | 12/2002 | Jones et al. | 382/135 |
| 2003/0005303 A1 | 1/2003 | Auslander et al. | 713/176 |
| 2003/0006277 A1 | 1/2003 | Maskatiya et al. | 235/379 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0023557 A1 | 1/2003 | Moore | 705/50 |
| 2003/0059098 A1 | 3/2003 | Jones et al. | 382/135 |
| 2003/0062242 A1 | 4/2003 | Hallowell et al. | 194/302 |
| 2003/0080032 A1 | 5/2003 | Heidi et al. | 209/534 |
| 2003/0081824 A1 | 5/2003 | Mennie et al. | 382/135 |
| 2003/0099379 A1 | 5/2003 | Monk et al. | 382/115 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0128240 A1 | 7/2003 | Martinez et al. | 345/764 |
| 2003/0132281 A1 | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0198373 A1 | 10/2003 | Raterman et al. | 382/135 |
| 2003/0202690 A1 | 10/2003 | Jones et al. | 382/139 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/379 |
| 2004/0028266 A1 | 2/2004 | Jones et al. | 382/135 |
| 2004/0083149 A1 | 4/2004 | Jones | 705/35 |
| 2004/0131230 A1 | 7/2004 | Paraskevakos | 382/100 |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1 | 8/2004 | Jones | 209/534 |
| 2004/0173432 A1 | 9/2004 | Jones | 194/216 |
| 2004/0182675 A1 | 9/2004 | Long et al. | 194/206 |

| | | | |
|---|---|---|---|
| 2004/0238619 A1 | 12/2004 | Nagasaka et al. | 235/379 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |
| 2005/0045448 A1 | 3/2005 | Sugano et al. | 194/207 |
| 2005/0047642 A1 | 3/2005 | Jones et al. | 382/137 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones et al. | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie | 382/135 |
| 2005/0241909 A1 | 11/2005 | Mazur et al. | 194/207 |
| 2005/0249394 A1 | 11/2005 | Jones et al. | 382/135 |
| 2005/0265591 A1 | 12/2005 | Jones et al. | 382/135 |
| 2005/0276458 A1 | 12/2005 | Jones et al. | 382/135 |
| 2005/0278239 A1 | 12/2005 | Jones et al. | 705/35 |
| 2005/0281450 A1 | 12/2005 | Richardson | 382/139 |
| 2006/0010071 A1 | 1/2006 | Jones et al. | 705/42 |
| 2006/0054454 A1 | 3/2006 | Oh | 194/207 |
| 2006/0078186 A1 | 4/2006 | Freeman et al. | 382/135 |
| 2006/0124724 A1 | 6/2006 | Kotovich et al. | 235/379 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0274929 A1 | 12/2006 | Jones et al. | 382/135 |
| 2007/0064991 A1 | 3/2007 | Douglas et al. | 382/137 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0112674 A1 | 5/2007 | Jones et al. | 705/45 |
| 2007/0122023 A1 | 5/2007 | Jenrick et al. | 382/135 |
| 2007/0172106 A1 | 7/2007 | Paraskevakos | 382/135 |
| 2007/0172107 A1 | 7/2007 | Jones et al. | 382/137 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2007/0288382 A1 | 12/2007 | Narayanan et al. | 705/45 |
| 2008/0006505 A1 | 1/2008 | Renz et al. | 194/206 |
| 2008/0033829 A1 | 2/2008 | Mennie et al. | 705/16 |
| 2008/0037856 A1 | 2/2008 | Paraskevakos | 382/140 |
| 2008/0044077 A1 | 2/2008 | Mennie et al. | 382/135 |
| 2008/0052189 A1 | 2/2008 | Walker et al. | 705/26 |
| 2008/0060906 A1 | 3/2008 | Fitzgerald et al. | 194/207 |
| 2008/0123932 A1 | 5/2008 | Jones et al. | 382/135 |
| 2008/0133411 A1 | 6/2008 | Jones et al. | 705/42 |
| 2008/0177420 A1 | 7/2008 | Klein et al. | 700/224 |
| 2008/0219543 A1 | 9/2008 | Csulits et al. | 382/135 |
| 2008/0285838 A1 | 11/2008 | Jones et al. | 382/135 |
| 2009/0001661 A1 | 1/2009 | Klein et al. | 271/258.01 |
| 2009/0013653 A1 | 1/2009 | Sekiguchi | 53/531 |
| 2009/0022390 A1 | 1/2009 | Yacoubian et al. | 382/135 |
| 2009/0087076 A1 | 4/2009 | Jenrick | 382/135 |
| 2009/0090779 A1 | 4/2009 | Freeman | 235/450 |
| 2009/0148027 A1 | 6/2009 | Paraskevakos | 382/135 |
| 2009/0183967 A1 | 7/2009 | Hamasaki | 194/320 |
| 2009/0310188 A1 | 12/2009 | Jones et al. | 358/448 |
| 2009/0313159 A1 | 12/2009 | Jones et al. | 705/35 |
| 2010/0034454 A1 | 2/2010 | Jones et al. | 382/137 |
| 2010/0051687 A1 | 3/2010 | Jones et al. | 235/379 |
| 2010/0057617 A1 | 3/2010 | Jones et al. | 705/44 |
| 2010/0063916 A1 | 3/2010 | Jones et al. | 705/35 |
| 2010/0092065 A1 | 4/2010 | Jones et al. | 382/135 |
| 2010/0108463 A1 | 5/2010 | Renz et al. | 194/206 |
| 2010/0116619 A1 | 5/2010 | Jones | 194/217 |
| 2010/0163366 A1 | 7/2010 | Jenrick et al. | 194/206 |
| 2010/0236892 A1 | 9/2010 | Jones et al. | 194/206 |
| 2010/0263984 A1 | 10/2010 | Freeman et al. | 194/206 |
| 2010/0276485 A1 | 11/2010 | Jones et al. | 235/379 |
| 2010/0303111 A1 | 12/2010 | Kupershmidt | 372/32 |
| 2011/0035316 A2 | 2/2011 | Morgan et al. | 705/39 |
| 2011/0042178 A1 | 2/2011 | Luecking | 194/302 |
| 2011/0087599 A1 | 4/2011 | Jones | 705/45 |
| 2011/0099105 A1 | 4/2011 | Mennie et al. | 705/41 |
| 2011/0206267 A1 | 8/2011 | Jones et al. | 382/139 |
| 2011/0215034 A1 | 9/2011 | Mennie et al. | 209/534 |
| 2011/0220717 A1 | 9/2011 | Jones et al. | 235/380 |

FOREIGN PATENT DOCUMENTS

| | | |
|---|---|---|
| DE | 28 24 849 A1 | 12/1979 |
| EP | 0 030 413 A1 | 6/1981 |
| EP | 0 071 421 A2 | 2/1983 |
| EP | 0 077 464 A2 | 4/1983 |
| EP | 0 083 062 A2 | 7/1983 |
| EP | 0 101 115 A1 | 2/1984 |
| EP | 0 109 743 A2 | 5/1984 |
| EP | 0 185 200 A2 | 6/1986 |
| EP | 0 253 935 A2 | 1/1988 |
| EP | 0 314 312 A2 | 5/1989 |
| EP | 0 325 364 A2 | 7/1989 |
| EP | 0 338 123 A2 | 10/1989 |
| EP | 0 342 647 A2 | 11/1989 |
| EP | 0 402 627 A1 | 12/1990 |
| EP | 0 416 916 A2 | 3/1991 |
| EP | 0 416 960 AI | 3/1991 |
| EP | 0 473 106 A2 | 3/1992 |
| EP | 0 548 142 A1 | 6/1993 |
| EP | 0 578 875 A1 | 1/1994 |
| EP | 0 583 526 A1 | 2/1994 |
| EP | 0 583 723 A1 | 2/1994 |
| EP | 0 593 209 A2 | 4/1994 |
| EP | 0 612 042 A2 | 8/1994 |
| EP | 0 613 107 A1 | 8/1994 |
| EP | 0 616 296 A2 | 9/1994 |
| EP | 0 686 292 A1 | 9/1994 |
| EP | 0 632 415 A1 | 1/1995 |
| EP | 0 633 533 A2 | 1/1995 |
| EP | 0 633 552 A2 | 1/1995 |
| EP | 0 633 553 A2 | 1/1995 |
| EP | 0 661 654 A2 | 7/1995 |
| EP | 0 671 696 A1 | 9/1995 |
| EP | 0 708 419 A1 | 4/1996 |
| EP | 0 718 809 A2 | 6/1996 |
| EP | 0 760 987 A1 | 9/1996 |
| EP | 0 824 736 A1 | 11/1996 |
| EP | 1 004 089 A1 | 6/1998 |
| EP | 0 984 410 A1 | 3/2000 |
| EP | 1 028 359 A1 | 8/2000 |
| EP | 1 041 523 A2 | 10/2000 |
| EP | 1 134 704 A1 | 9/2001 |
| EP | 1 160 737 A1 | 12/2001 |
| EP | 1 437 692 A1 | 7/2004 |
| EP | 1 019 869 A1 | 10/2006 |
| EP | 1 480 177 B1 | 11/2007 |
| EP | 1 008 096 A2 | 1/2008 |
| FR | 2 539 898 A1 | 7/1984 |
| FR | 2 722 316 A1 | 1/1996 |
| GB | 2 038 063 A | 7/1980 |
| GB | 2 190 996 A | 12/1987 |
| GB | 2 204 166 A | 11/1988 |
| GB | 2 272 762 A | 5/1994 |
| GB | 2 355 522 A | 4/2001 |
| GB | 2 464 826 A | 5/2010 |
| JP | 62-220843 A | 9/1987 |
| JP | 63-073497 A | 4/1988 |
| JP | 02-012492 A | 1/1990 |
| JP | 04-131986 A | 5/1992 |
| JP | 04-243497 A | 8/1992 |
| JP | 06-203248 A | 7/1994 |
| JP | 07-168857 A | 7/1995 |
| WO | WO 85/02148 A1 | 5/1985 |
| WO | WO 87/06041 A1 | 10/1987 |

| | | | |
|---|---|---|---|
| WO | WO 90/07165 A1 | 6/1990 |
| WO | WO 91/11778 A1 | 8/1991 |
| WO | WO 92/04692 A1 | 3/1992 |
| WO | WO 92/14221 A1 | 8/1992 |
| WO | WO 92/16931 A2 | 10/1992 |
| WO | WO 92/17394 A1 | 10/1992 |
| WO | WO 93/23824 A1 | 11/1993 |
| WO | WO 94/06102 A1 | 3/1994 |
| WO | WO 94/16412 A1 | 7/1994 |
| WO | WO 94/19773 A1 | 9/1994 |
| WO | WO 95/10088 A1 | 4/1995 |
| WO | WO 95/19019 A2 | 7/1995 |
| WO | WO 95/24691 A1 | 9/1995 |
| WO | WO 96/03719 A1 | 2/1996 |
| WO | WO 96/10800 A1 | 4/1996 |
| WO | WO 96/29683 A1 | 9/1996 |
| WO | WO 96/36021 A1 | 11/1996 |
| WO | WO 96/36933 A1 | 11/1996 |
| WO | WO 97/05583 A1 | 2/1997 |
| WO | WO 97/29459 A1 | 8/1997 |
| WO | WO 97/30422 A1 | 8/1997 |
| WO | WO 97/43734 A1 | 11/1997 |
| WO | WO 97/45810 A1 | 12/1997 |
| WO | WO 98/12662 A1 | 3/1998 |
| WO | WO 98/13785 A1 | 4/1998 |
| WO | WO 98/24041 A1 | 6/1998 |
| WO | WO 98/24052 A1 | 6/1998 |
| WO | WO 98/24067 A1 | 6/1998 |
| WO | WO 98/26364 A1 | 6/1998 |
| WO | WO 98/35323 A2 | 8/1998 |
| WO | WO 98/40839 A2 | 9/1998 |
| WO | WO 98/47100 A1 | 10/1998 |
| WO | WO 98/50892 A1 | 11/1998 |
| WO | WO 98/51082 A1 | 11/1998 |
| WO | WO 99/00776 A1 | 1/1999 |
| WO | WO 99/09511 A1 | 2/1999 |
| WO | WO 99/14668 A1 | 3/1999 |
| WO | WO 99/23601 A1 | 5/1999 |
| WO | WO 99/41695 A1 | 8/1999 |
| WO | WO 99/48040 A1 | 9/1999 |
| WO | WO 99/48042 A1 | 9/1999 |
| WO | WO 99/50795 A1 | 10/1999 |
| WO | WO 99/50796 A1 | 10/1999 |
| WO | WO 00/24572 A1 | 5/2000 |
| WO | WO 00/58876 A1 | 10/2000 |
| WO | WO 00/65546 A1 | 11/2000 |
| WO | WO 01/08108 A2 | 2/2001 |
| WO | WO 01/59685 A2 | 8/2001 |
| WO | WO 01/59723 A1 | 8/2001 |
| WO | WO 02/29735 A2 | 4/2002 |
| WO | WO 02/054360 A2 | 7/2002 |
| WO | WO 03/005312 A1 | 1/2003 |
| WO | WO 03/028361 A2 | 4/2003 |
| WO | WO 03/029913 A2 | 4/2003 |
| WO | WO 03/030113 A1 | 4/2003 |
| WO | WO 03/067532 A1 | 8/2003 |
| WO | WO 03/107282 A2 | 12/2003 |
| WO | WO 2004/010367 A1 | 1/2004 |
| WO | WO 2004/027717 A2 | 4/2004 |
| WO | WO 2004/036508 A2 | 4/2004 |
| WO | WO 2004/038631 A2 | 5/2004 |
| WO | WO 2004/068422 A1 | 8/2004 |
| WO | WO 2005/013209 A2 | 2/2005 |
| WO | WO 2005/017842 A1 | 2/2005 |
| WO | WO 2005/028348 A2 | 3/2005 |
| WO | WO 2005/029240 A2 | 3/2005 |
| WO | WO 2005/036445 A1 | 4/2005 |
| WO | WO 2005/041134 A2 | 5/2005 |
| WO | WO 2005/076229 A1 | 8/2005 |
| WO | WO 2006/039439 A2 | 4/2006 |
| WO | WO 2006/076289 A2 | 7/2006 |
| WO | WO 2006/076634 A2 | 7/2006 |
| WO | WO 2007/044570 A2 | 4/2007 |
| WO | WO 2007/120825 A2 | 10/2007 |
| WO | WO 2007/143128 A2 | 12/2007 |
| WO | WO 2008/030356 A1 | 3/2008 |
| WO | WO 2008/112132 A1 | 9/2008 |
| WO | WO 2009/081085 A1 | 7/2009 |
| WO | WO 2011/109569 A1 | 9/2011 |

OTHER PUBLICATIONS

BARS: 5000 Currency Sorter, 6 pages (estimated prior to Aug. 13, 2003).

BARS: 5600 Currency Sorter, 6 pages (estimated prior to Aug. 12, 2003).

BARS: 6000 Single Note Inspection System, 6 pages (estimated prior to Aug. 12, 2003).

De La Rue: 2700 Currency Counting Machine—User Guide, Revision 1, 53 pages (Aug. 26, 1999).

Document Solutions Inc.: Image Solution, DialogWeb, "Bank Gets Big Response to Image Statements", Electronic Imaging Report, vol. 2, No. 9, 3 pages (May 6, 1992 ).

Glory: GFF-8CF and GFF-8 Desktop Currency and Check Counter, 4 pages (date estimated Jan. 1994).

Hayosh, Thomas D, "The History of the Check and Standardization Efforts," 5 pages, dated Sep. 26, 1995, available at http://home.comcast.net/~hayosh/HISTMICR.pdf (visited Sep. 22, 2011).

Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re MAVIS, 9 pages (Jan. 1990) [GL 010713-21].

NCR: NCR 5685 ATM Deposit Processing Module, DialogWeb, "NCR's ATM Captures Images at the Point of Deposit. (NCR Corp.'s New Automated Teller Machine)", Financial Services Report, vol. 10, No. 2, p. 8(1), 2 pages (Jan. 20, 1993).

NCR: Intelligent Deposit ATM's, "Mixes of cash, checks no problem with Regions Bank ATMs," article, 2 pages (Jun. 10, 2009).

Vector: Miscellaneous meeting notes and communications between Cummins Allison Corp. and Vector Co. Ltd regarding Vector imager, 65 pages (Apr. 1, 1996 to Jun. 15, 1997).

EP 1 004 089, which claims the benefit of PCT/US1997/021548, which claims priority to U.S. Appl. No. 60/031,604, filed Nov. 27, 1996; Communication of a Notice of Opposition; Giesecke & Devrient; mailed Aug. 5, 2008; partial English translation dated Aug. 12, 2008; 87 pages.

EP 1 004 089, which claims the benefit of PCT/US1997/021548, which claims priority to U.S. Appl. No. 60/031,604, filed Nov. 27, 1996; Communication of Notice of Opposition; De La Rue; mailed Jul. 28, 2008; 21 pages.

EP 1 008 096, which claims the benefit of PCT/US1998/004664, which claims priority to U.S. Appl. No. 08/814,978, filed Mar. 11, 1997; Communication of a Notice of Opposition; Talaris; mailed Oct. 9, 2008; 17 pages.

EP 1 008 096, which claims the benefit of PCT/US1998/004664, which claims priority to U.S. Appl. No. 08/814,978, filed Mar. 11, 1997; Communication of a Notice of Opposition; De La Rue; mailed Oct. 9, 2008; 10 pages.

EP 1 019 869, which claims the benefit of PCT/US1998/007443, which claims priority to U.S. Appl. No. 60/043,516, filed Apr. 14, 1997; Communication of a Notice of Opposition; De La Rue; mailed Jul. 19, 2007; 12 pages.

EP 1 019 869, which claims the benefit of PCT/US1998/007443, which claims priority to U.S. Appl. No. 60/043,516, filed Apr. 14, 1997; Preliminary Opinion of the Opposition Division; mailed Nov. 18, 2008; 15 pages.

EP 1 480 177, which is a divisional of EP application No. 98915542.9, now EP 1 019 869, which claims priority to U.S. Appl. No. 60/043,516, filed Apr. 14, 1997; Communication of a Notice of Opposition; Giesecke & Devrient; mailed Aug. 12, 2008; partial English translation dated Aug. 12, 2008; 23 pages.

Andy Pargh, "Vending Machines Dispense New Tricks It's a Breeze. Just Drop in Your Money and Create a Card, Buy a Ticket or Even Pose for a Photo on the Moon.; [3 Star Editiion]." Orlando Sentinel, Orlando, Fla., Nov. 1, 1993, p. D2, ProQuest Oct. 19, 2010, 2 pages.

Applied Communications Inc.: BASE24 software, "Applied Communications Announces Joint Venture," Business Wire, 4 pages (Jan. 6, 1989).

AFB: AFB Currency Recognition System, 1 page (1982).

ASCOM: Cashflow Emerald, 2 pages, (date unknown, prior to Jan. 15, 2001).

ATM Cardpay Corp: "ATM Cardpay Introduces New Bill Payment Idea," Retail Delivery Systems News, vol. 3, Iss. 1, p. 1; 2 pages (Jan. 16, 1998).

ATM Cardpay Corp: "'The Next Generation of ATM Network Survival.' ATM Cardpay Shows Switches How to Win Bill Presentment/Payments Market," EFT Report, vol. 20, Iss. 17, p. 1; 3 pages (Aug. 27, 1997).

AUI: Coinverter—"No More Lines . . . Self-Serve Cash-Out," by Cassius Elston, 1995 World Games Congress/Exposition Converter, 1 page (dated prior to 1995).

Barton, Louis L., "Check Processing Operations"—A Hands-On Guide to Developing and Managing a State-of-the-Art Check Processing Operation, Chp. 8 and App. 2, 31 pages (1994).

Brandt: Mach 7 High-Speed Coin Sorter/Counter, 2 pages (1992).

Brandt: Model 8904 Upfeed—"High Speed 4-Denomination Currency Dispenser," 2 pages (1989).

Cummins: JetScanTM Model 4060, Currency Scanner/Counter, Operator's Manual, 43 pages (Aug. 1991).

Cummins: JetScanTM Model 4060, Sale of JetScan Currency Scanner/Counter, 1 page (Aug. 1991).

Cummins: JetScanTM Model 4061, Currency Scanner/Counter—Operating Instructions, 47 pages (Apr. 20, 1993).

Cummins: JetScanTM Model 4061, Sale of JetScan Currency Scanner/Counter, 1 page (Apr. 20, 1993).

Cummins: JetScanTM Model 4062, Currency Scanner/Counter—Operating Instructions (022-7120-00), 53 pages (Nov. 28, 1994).

Cummins: JetScanTM Model 4062, Sale of JetScan Currency Scanner/Counter, Model 4062, 1 page (Nov. 28, 1994).

Cummins: JetSort® High Speed Sorter/Counter Kits I & J—Operating Instructions (Form 022-7123-00) 12 pages (1994).

Currency Systems International: Mr. W. Kranister in Conversation with Richard Haycock, 5 pages (estimated 1994).

Currency Systems International: CPS 300 Currency Processing System, 4 pages ( © 1992).

Currency Systems International: CPS 600/900, Medium Speed Currency Sorting Family, CPS 600 and CPS 900, 4 pages ( © 1994).

Currency Systems International: CPS 600/900, Description of CSI CPS 600 and CPS 900 devices, 1 page (date: estimated 1994).

De La Rue: CDS 5700 and CDS 5800 Cash Deponier System (German) and translation, 7 pages (date unknown, prior to Aug. 13, 1996).

EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).

Elcom International Inc: PECOS Internet Procurement Manager, "Elcom.com and Visa Announce Systems Link to Offer B2B Ecommerce Solutions," PRNewsire, 4 pages (Nov. 29, 1999).

Glory: CRS-8000 Cash Redemption System, 2 pages (1996).

Glory: GFB-200/210/220/230 DeskTop Bank Note Counter brochure, 2 pages (estimated before Aug. 9, 1994).

Glory: GSA-500 Sortmaster brochure, 2 pages (estimated Jan. 14, 1994).

Glory: System 8000 Recycle Currency Processing Teller System, p. 5 of General Catalogue of Glory Products, 2 pages (1995).

Glory: UF-1D brochure and translation, 2 pages (estimated before Aug. 9, 1994).

ISH Electronic: ISH 12005/500 Coin Counter (with translation), 4 pages (date unknown, prior to Aug. 1996).

ISH Electronic: ISH 12005/501 Self-Service Unit (with translation), 4 pages (date unknown, prior to Aug. 1996).

J&B Software Inc.: TMS Image, "J&B Software Announces New Successes for TMS Image™ Remittance," PRNewswire, 2 pages (Mar. 23, 1998).

NGZ Geldzahlmaschinengesellschaft: NGZ 2100 Automated Coin Depository, 4 pages (date unknown, prior to Sep. 1996).

Perconta: Cassomat A.C.S. Automated Cash System Types I and II, 6 pages (1998).

Perconta: Contomat Coin Settlement Machine for Customer Self Service, 2 pages (date unknown, prior to Apr. 2003).

Prema GmbH: Prema 405 (RE) Self Service Coin Deposit Facility, 2 pages (date unknown, prior to Apr. 2003).

Reis Eurosystems: CRS 6501/CRS 6510 Cash Receipt Systems for Self-Service Area, 3 pages (date unknown, prior to Apr. 2003).

Scan Coin: CDS 600 Cash Deposit System, 2 pages (1994).

Scan Coin: CDS 640 Cash Deposit System, "With Scan Coin's customer operated coin deposit system . . . ," 2 pages (date unknown, prior to Apr. 2003).

ShieldSpec LLC: Currency Manager for Law Enforcement, 1 page (downloaded from www.shieldspec.com/product.html on Aug. 18, 2010).

ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.

Toshiba/(Mosler): CF-400 Series Fitness Sorter, 6 pages (estimated 1989 or earlier).

(Toshiba)/Mosler: CF-420 Cash Management System—Operator's Manual, 137 pages ( © 1989).

Toshiba/Mosler: CF-420—Description of Toshiba/Mosler CF-420 Device, 1 page (date estimated 1989).

Toshiba/Mosler: CF-420—Revised drawings of portions of Mosler CF-420 Cash Management System (Figs. A-C) and description of the same, 4 pages (1989).

* cited by examiner

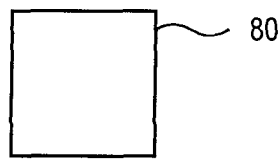
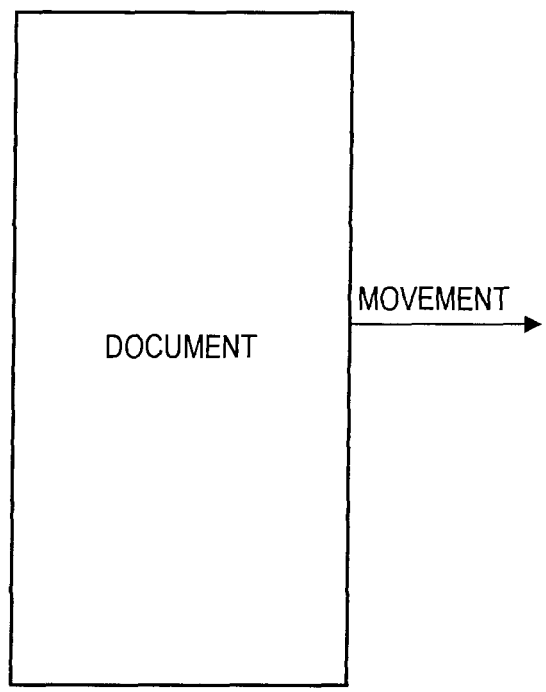
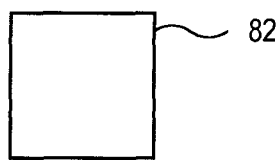
*FIG. 1m*

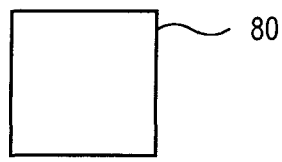
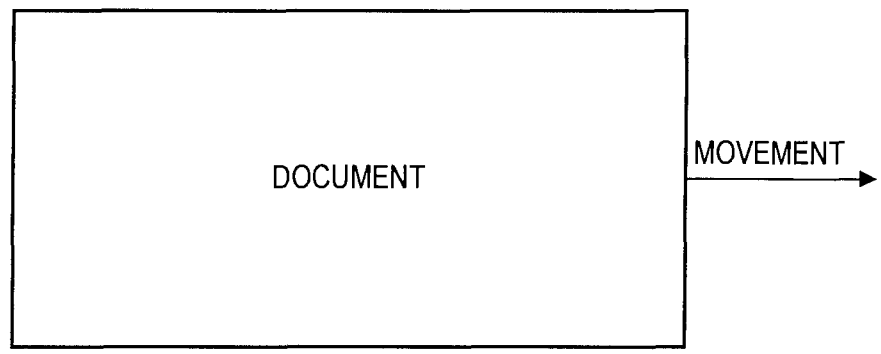
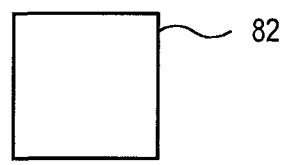
FIG. 1n

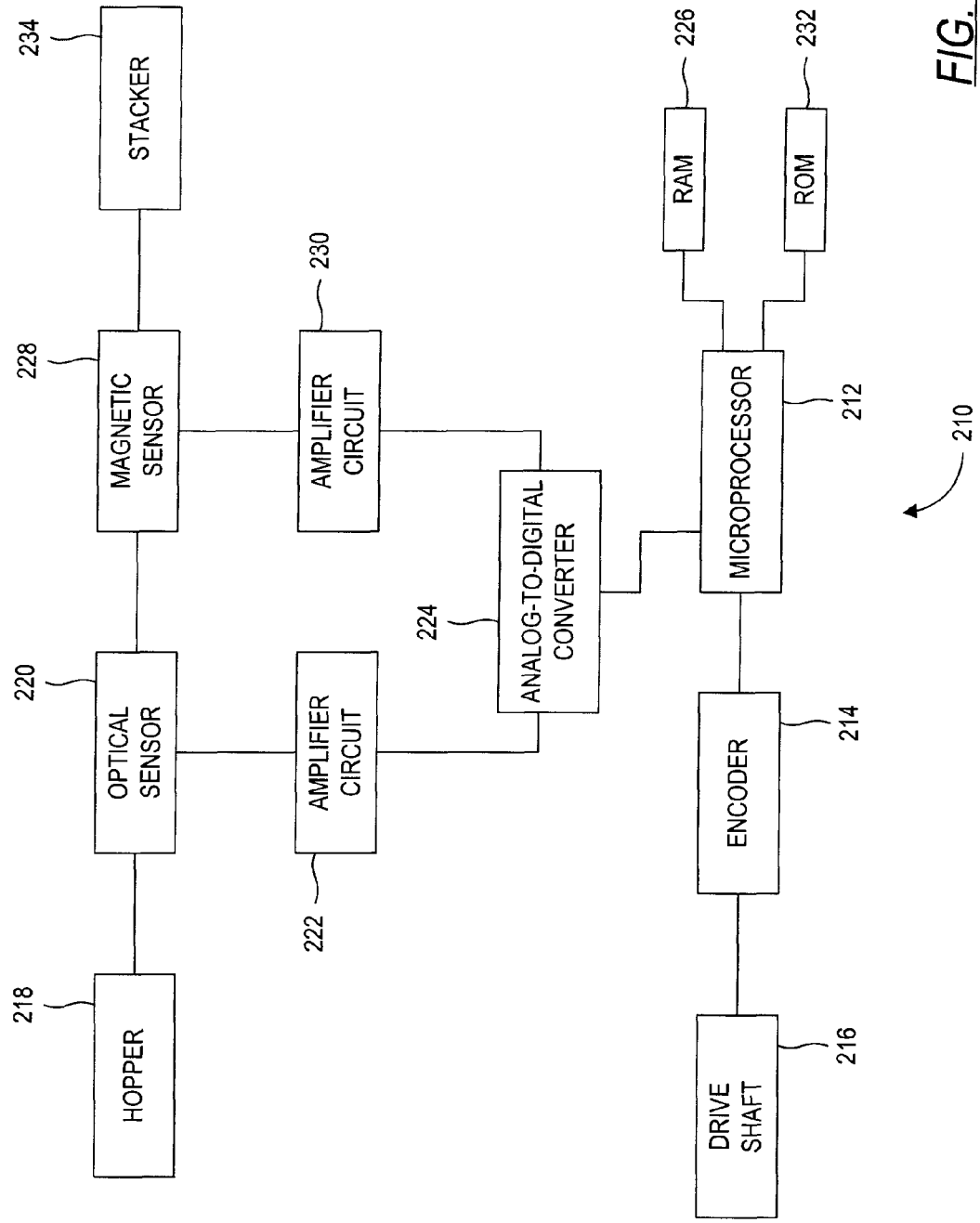

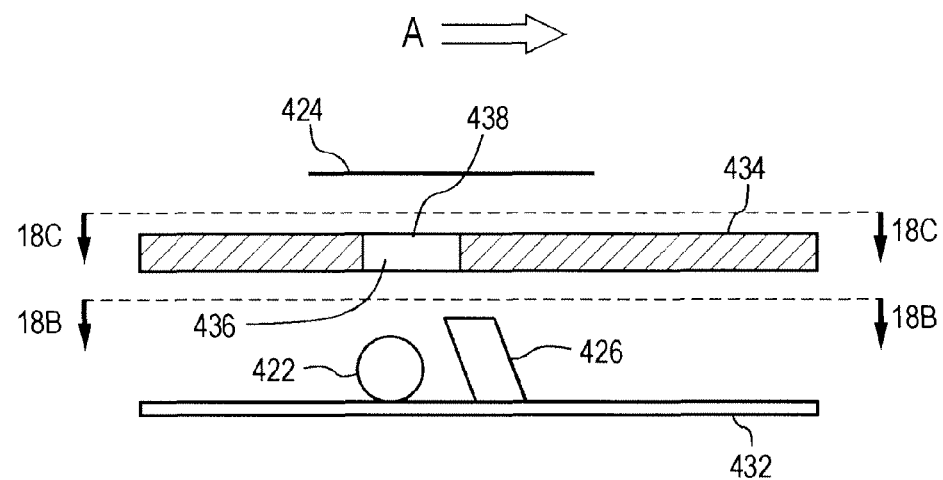
FIG. 18a
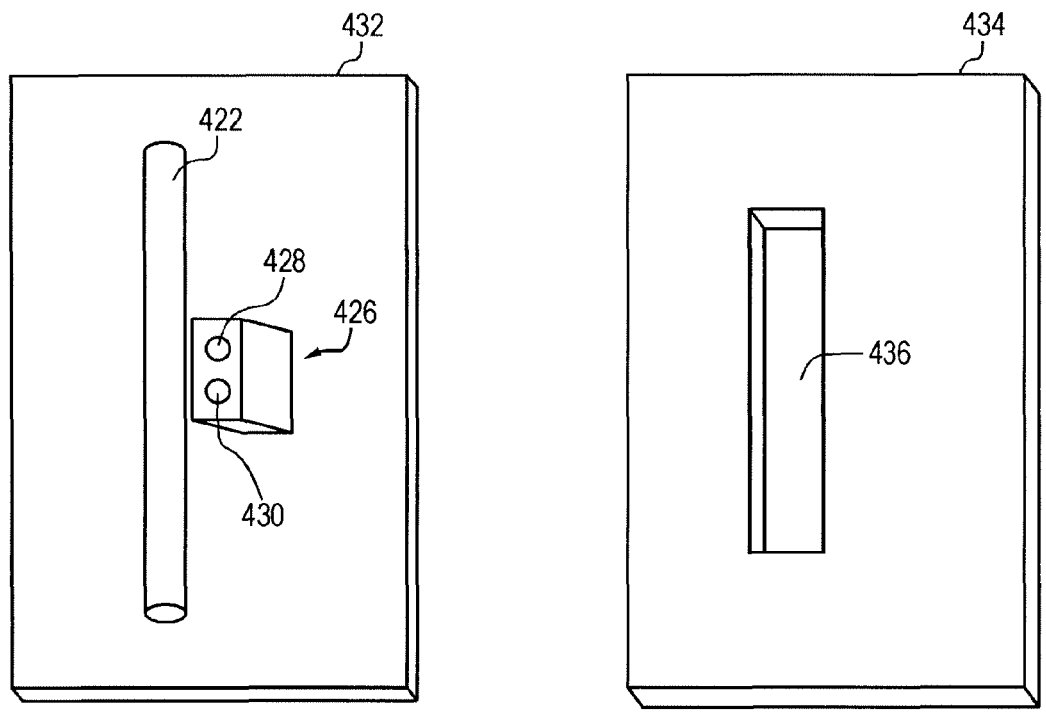
FIG. 18b
FIG. 18c

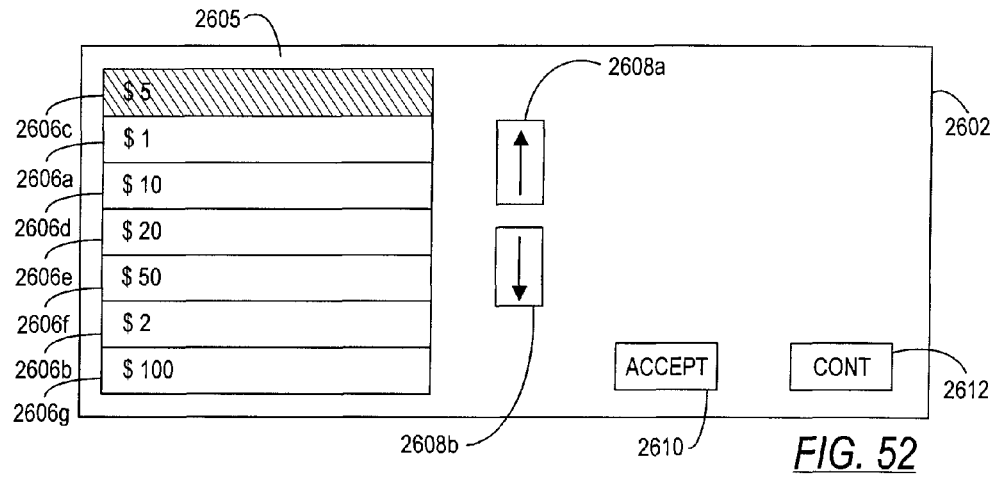
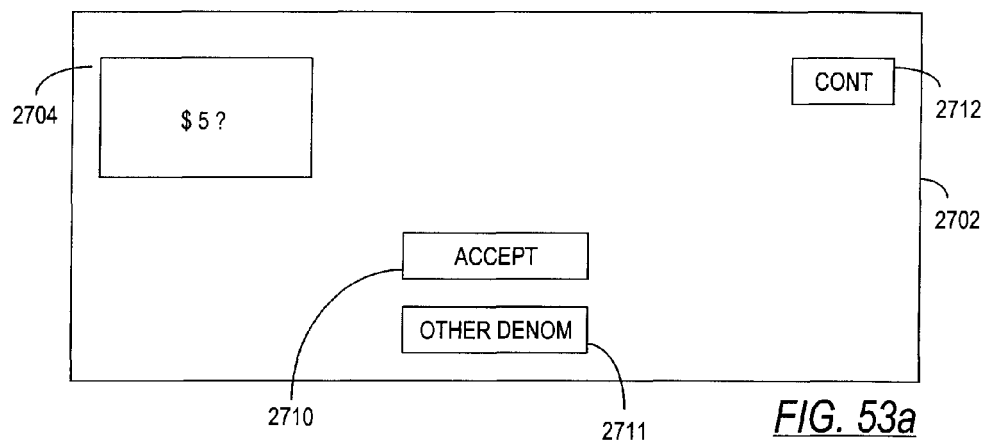
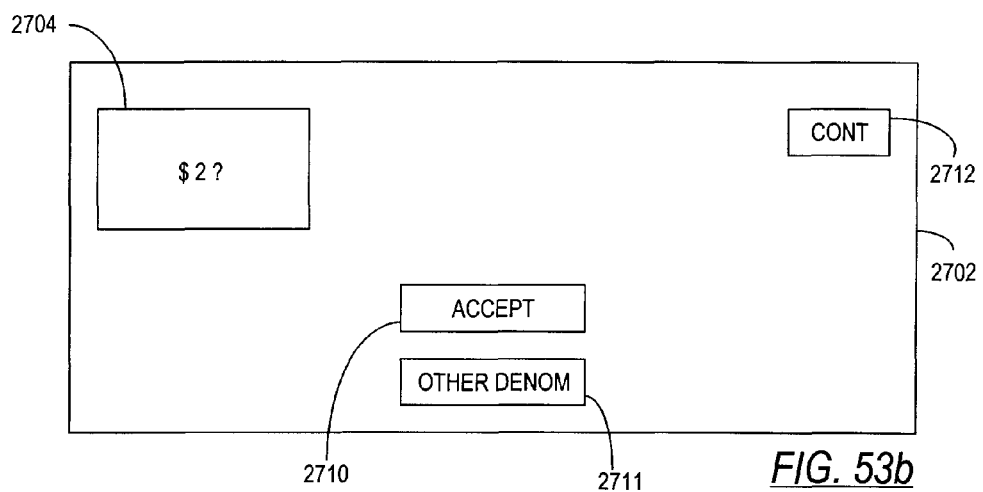

ized by providing a document processing system comprising an input receptacle for receiving documents; a transport mechanism receiving said documents from said input receptacle and transporting said documents past a full image scanner and a discrimination unit; an output receptacle for receiving said documents from said transport mechanism after being transported past said full image scanner and discrimination unit; said full image scanner including means for obtaining a full video image of said documents, means for obtaining a image of a selected area of said documents, and means for obtaining information contained in said selected area of said document; said discrimination unit including means for determining the authenticity of said document; and a system controller for directing the flows of documents on said transport mechanism.

CHECK AND U.S. BANK NOTE PROCESSING DEVICE AND METHOD

CROSS-REFERENCE TO RELATED APPLICATIONS

This application is a continuation of U.S. application Ser. No. 11/048,296, filed on Feb. 1, 2005, now issued as U.S. Pat. No. 8,125,624, which is a continuation of U.S. application Ser. No. 10/853,021, filed May 25, 2004, now abandoned, which is a continuation of U.S. application Ser. No. 10/755,039, filed Jan. 9, 2004, now issued as U.S. Pat. No. 7,082,216, which is a divisional of U.S. application Ser. No. 10/042,086, filed Jan. 8, 2002, now issued as U.S. Pat. No. 6,731,786, which is a continuation of U.S. application Ser. No. 08/814,978, filed Mar. 11, 1997, now issued as U.S. Pat. No. 6,363,164, which is a complete application claiming the benefit of U.S. application Ser. No. 60/031,604, filed Nov. 27, 1996; and this application is a continuation of pending U.S. application Ser. No. 10/084,856, filed Feb. 27, 2002, which is a divisional of U.S. application Ser. No. 08/814,978, filed Mar. 11, 1997, now issued as U.S. Pat. No. 6,363,164, which is a complete application claiming the benefit of U.S. application Ser. No. 60/031,604, filed Nov. 27, 1996; each of the above applications being incorporated herein by reference in its entirety.

FIELD OF INVENTION

The present invention relates to document processing systems such as automatic teller machines and currency redemption machines.

SUMMARY OF THE INVENTION

The primary object of the invention is to provide a document and currency processing system capable of processing documents utilizing full image scanning and a currency discriminator.

It is a further object of the invention is to provide a document processing system capable of processing documents utilizing full image scanning.

It is another object of the invention is to provide a currency processing system capable of processing currency utilizing a currency discriminator.

It is another object of the invention to provide a document processing system capable of processing all types of documents and interfacing with all types of outside accounting systems.

It is still another object of the invention to provide a document processing system which obtains information by performing full image scanning of documents and utilizes this information to determine additional information such as the value of the document;

It is yet another object of the invention to provide a document processing system which is coupled to an outside accounting system such that deposits and withdrawals from the outside accounting system are processed substantially immediately;

It is yet another object of the invention to provide a system where deposits are processed substantially immediately.

It is a further object of the invention to provide a document processing system whereby the full image of the scanned document can be communicated to a central office.

It is yet another object of the invention to provide a currency and document processing system which provides all the benefits of an automated teller machine.

Other aspects and advantages of the present invention will become apparent upon reading the following detailed description and in reference to the drawings.

In accordance with the present invention, the foregoing objectives are realized by providing a document processing system comprising an input receptacle for receiving documents; a transport mechanism receiving said documents from said input receptacle and transporting said documents past a full image scanner and a discrimination unit; an output receptacle for receiving said documents from said transport mechanism after being transported past said full image scanner and discrimination unit; said full image scanner including means for obtaining a full video image of said documents, means for obtaining a image of a selected area of said documents, and means for obtaining information contained in said selected area of said document; said discrimination unit including means for determining the authenticity of said document; and a system controller for directing the flows of documents on said transport mechanism.

BRIEF DESCRIPTION OF THE DRAWINGS

FIG. 1l is a cut-away view of the document processing systems showing six output bins;

FIG. 1m is a view of a document being scanned by the full image scanner in the wide dimension;

FIG. 1n is a view of a document being scanned by the full image scanner in the narrow dimension;

FIG. 12 shows a block diagram of a counterfeit detector according to principles of the present invention;

FIGS. 18a-18c show one embodiment of the document authenticating system in the discrimination unit according to principles of the present invention;

FIGS. 49a, 49b, 50a, 50b, 51a, 51b, and 52-53 illustrate alternate means for entering the value of no-call documents according to principles of the present invention;

FIG. 65b is a waveform diagram of the input signals supplied to the circuit of FIG. 65a;

DETAILED DESCRIPTION OF THE PREFERRED EMBODIMENT

Figure 1A:
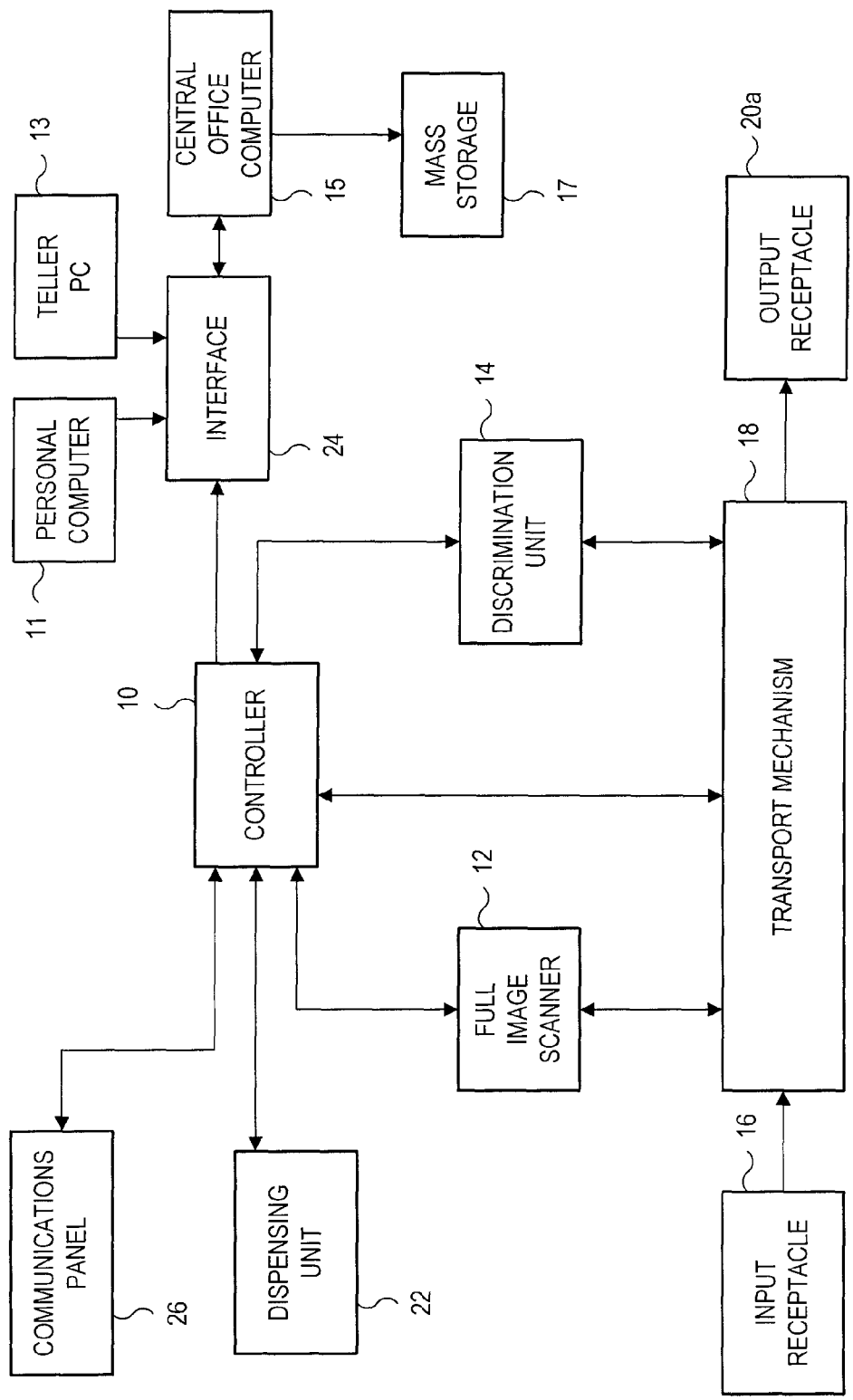
FIG. 1a shows a block diagram of the components of a document and currency processing system with a single output bin according to principles of the present invention.
Figure 1B:
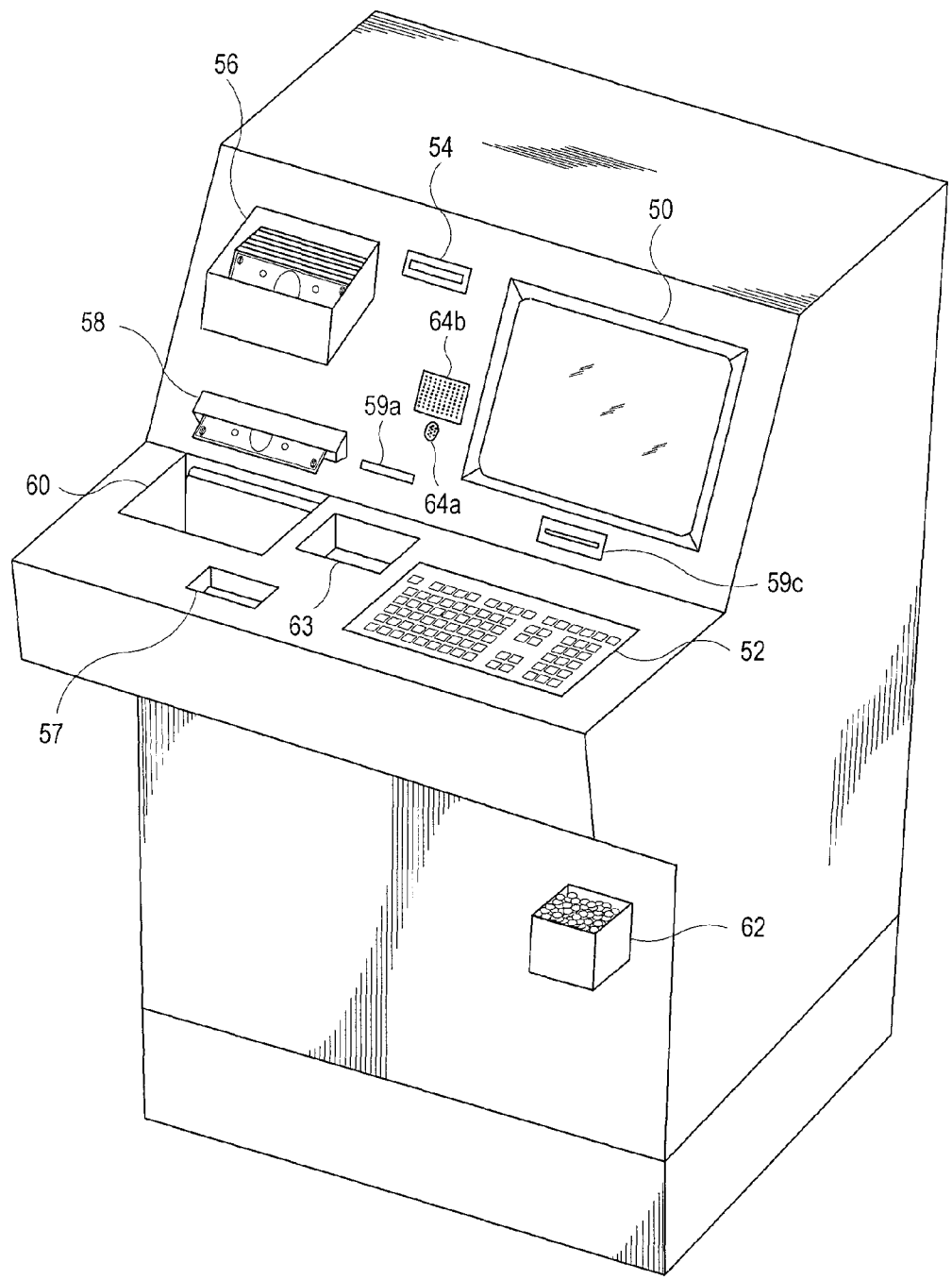
FIG. 1b is a perspective view of one embodiment of the processing system with a video screen and keyboard according to principles of the present invention.

As illustrated in FIGS. 1a and 1b, a user deposits bills or documents into an input receptacle 16. By "currency", "documents", or "bills" it is meant to include not only conventional U.S. or foreign bills, such as $1 bills, but also to include checks, deposit slips, coupon and loan payment documents, food stamps, cash tickets, savings withdrawal tickets, check deposit slips, savings deposit slips, and all other documents utilized as a proof of deposit at financial institutions. It is also meant by the term "documents" to include loan applications, credit card applications, student loan applications, accounting invoices, debit forms, account transfer forms, and all other types of forms with predetermined fields. By "financial institution documents" it is meant to include all of the above documents with the exception of currency. A transport mechanism 18 transports the documents from the input receptacle 16 past a full image scanner 12, as the documents are illuminated by a light (not shown). The full image scanner 12, described in greater detail below, scans the full image of the document, recognizes certain fields within the document, and processes information contained within these fields in the document. For example, the full image scanner 12 may search for the serial number field when processing U.S. currency, determine the serial number once the field is located, and store the serial number for later use by the system. The system may also be used to capture any document image for electronic document display, electronic document storage, electronic document transfer, electronic document recognition (such as denomination recognition or check amount recognition) or any other processing function that can be performed using an electronic image.

Next, the transport mechanism 18 transports the document past a discrimination and authentication unit 14 which is also described in greater detail below. The discrimination and authentication unit 14 authenticates the document and, in the case of a bill, determines the denomination of the bill. On other documents, such as checks, the system may capture information such as the check amount, account number, bank number, or check number. The discrimination and authentication unit 14 also directs the transport unit 18 to place the document in the output receptacle 20 as described below.

A dispensing unit 22 dispenses funds to a user. For example, when the user is depositing currency in an account, the system has the capability to return all or part of a deposit back to the user in the form of bills, coins, or other media via the dispensing unit 22. The amount of payback to the user may be supplemented by funds from other accounts, as well, as described below. The dispensing unit 22 is capable of accepting a variety of media including money orders, smart cards, and checks and may include separate units directed to accepting a particular type of media.

A controller 10 manages the operation of the system. The controller 10 directs the flow of documents from the input receptacle 16 through the transport mechanism 18, past the full image scanner 12 and the discrimination and authentication unit 14, and into the output receptacle 20. The transport mechanism directs the documents through the system such that the documents are scanned either along their wide dimension as shown in FIG. 1m. Alternatively, the documents are passed through the system such that they are scanned along their narrow dimension as shown in FIG. 1n. The controller 10 also directs the dispensing unit 22 to dispense funds to the user and routes information from the full image scanner 12 and the discrimination and authentication unit 14 to an interface 24 which communicates with an outside accounting system or central office. The controller is also capable of directing information from the outside office through the interface and to a communications panel 26. Finally, the controller 10 selectively processes information from the full image scanner 12 and the discrimination and authentication unit 14 for use by the system.

By "outside accounting system," it is meant to include the hardware and software associated with accessing, maintaining, tracking, and updating savings accounts, checking accounts, credit card accounts, business and commercial loans, consumer payments, and all other similar accounts at locations remotely located from the full image scanners. The term includes three broad types of systems: systems where deposits are made; systems where withdrawals are made; and systems where both deposits and withdrawals are made. Although the outside accounting system described herein is described as being employed at a financial institution such as a bank, it will be understood that any business, public or private institution, or individual can employ an outside accounting system to process transactions. By "financial institution" it is meant to include savings and loans, investment houses, and all other types of financial institutions whether private, public, or government. The following description is in terms of banks but it also includes all financial institutions as well.

Various types of payments are made between customers of a financial institution using a full image scanner and the accounting system at a selected financial institution. First, payments are made from one financial institution to another financial institution to settle accounts. Second, payments are made from a retail customer to a given financial institution or from the financial institution to the given retail customer. Third, financial institutions can issue payments to and receive payments from the Federal Reserve Banks within each region. Fourth, consumers can make payments or withdraw payments from financial institutions. Fifth, businesses of many kinds can make payments to or withdraw payments from financial institutions. The outside accounting system at the financial institution receives information which has been processed at the full image scanner of the present invention. The outside accounting system performs different operations based upon the type of media used in the transaction and the type of accounts accessed.

When checks are utilized in a transaction, the check is tagged with the customer checking account number, the bank number, and the Federal Reserve Region. If multiple banks are involved in the payment, each bank's number is tagged to the payment through an endorsement on the back of the check. Alternatively, the system could tag the checks electronically. In other words, the customer checking account number, bank number, and Federal Reserve region are electronically tagged to the check's image. Tagging also occurs on current electronic payments such as wire transfers.

The outside accounting system processes information associated with checking accounts which can be held by individual consumers, businesses, trade associations, trusts, non-profit organizations, or any other organization. Documents utilized in the check account function include checks, check account deposit slips, debit or credit slips which may be issued by the bank against the checking account, new account application forms, and forms for customers to reorder check and deposit slips. The full image scanner of the present invent processes all of these documents. The documents could be received at a full image scanner located at the teller line, a drive-up window, an ATM, or, alternatively, the documents may be received by mail. If received by mail, the bank employee immediately runs the documents through a full image scanner without having to forward the documents to a central location for processing. The outside accounting system maintains a record of all transactions regarding the checking account, balances, and tracks information associated with a particular check.

Savings accounts are another type of account for which the outside accounting system processes information. Savings accounts typically receive some rate of interest payment on the balances held. Individuals may maintain interest bearing savings accounts at a bank. Depending upon the terms, a savings account could vary in duration for withdrawal from immediate demand for withdrawal to as long as five years. When a consumer agrees to leave the funds for a longer period of time, this usually provides the account with a higher earning interest rate. Documents used in a savings account transaction include deposit slips, withdrawal slips, new account application slips and debit or credit slips which can be applied against the account by the given banking institution. The full image scanner of the present invention processes all of these documents. Again, the documents could be received at the teller line, drive-up window, ATM, or by mail, and immediately be scanned at point of entry without transporting the document to a central location. This information is sent to an outside accounting system where it can be stored, monitored, and analyzed. The accounting system compiles statistics on customers and their accounts and maintains current balances, interest earnings, available funds, available advances, and records all information concerning deposits and withdrawals.

Credit card accounts are another type of account that are handled by the outside accounting system. When a credit card is used in a transaction, the bank typically receives a commission. The full image scanner of the present invention reads credit cards which are being used for electronic payment. The outside accounting system maintains a record of the customer's credit limit, available credit, current balance, and payment. Preferably, the outside accounting system does not settle the credit card balance until the end of the month when the customer pays the balance due on the account.

The debit card is similar to a credit card but is a newer type of media. With the debit card, the customer's account is immediately debited when the transaction takes place. The full image processing system of the present invention accepts debit cards and performs the same functions described above with respect to credit cards.

Smart cards are a new evolving method of payment. Banks, phone companies, and transit authorities issue smart cards for use by customers. The smart cards have a pre-stored value in place which a customer draws against. Consumers might deposit cash or write a check or submit a savings withdrawal document through the full image scanner to purchase a smart card.

Various other types of documents are maintained by a bank. For example, a bank may maintain a trust for an individual such as a retirement trust account. An outside accounting system can maintain all types of information regarding these types of accounts such as account balances, interest earnings, and maturity dates.

The outside accounting system also maintains records and manages information concerning mortgages, consumer loans, and student loans. The outside accounting system maintains records such as the loan balance, last payment, interest rate, and amount paid.

The outside accounting system also distributes funds between the various accounts described above. For example, an individual, with checking and savings accounts at a bank, may also hold a mortgage with the bank. The outside accounting system can make monthly withdrawals from the checking account or savings account to pay the monthly mortgage amount due the bank. To accomplish this, the customer may issue a check for payment and submit this against a coupon provided to the customer by the bank with the required monthly mortgage payment. The coupon and the check (or savings withdrawal and coupon) are run through the full image scanner (at the teller line or automated teller). The information is read by the full image scanner and transmitted to the outside accounting system which conducts the required transfers.

A customer could use the outside accounting system to electronically remove any funds from an account without issuing a check as payment towards their mortgage. Alternately, a bank customer could mail the check payment and loan coupon to the bank. Upon receipt, the bank employee immediately runs the check and coupon through the full image scanner at any bank location—branch, central offices, payment center, etc. The document would not have to be forwarded to a centralized proof department for handling.

In a like manner, businesses can borrow funds from banks for mortgages on commercial property. Again, monthly payments are required, and the corporation must withdraw funds from their checking account to make these monthly payments. Again, an outside accounting system could be utilized to make an electronic payment without the use of checks by using wire transfer or other methods, or the check for payment and the coupon may be scanned by the full image scanner. Alternatively, a bank customer could mail the check payment and loan coupon to the bank. Upon receipt, the bank employee immediately runs the check and coupon though the scanner at any bank location—branch, central offices, payment center, etc. Thus, the document would not have to be forwarded to a centralized proof department for handling.

Consumer loan transactions, for example, involving auto loans, home improvement loans, and educational loans, is another type of transaction processed by the outside accounting system. Payments are typically made using the monthly repayment schedule by the issuing of the check payable to the bank for the monthly balance. Full image scanning of the check and loan coupon could be utilized for this transaction. The payment can be processed as described above. Alternatively, the customer could mail payment and the bank could process through its full image scanners.

Various types of business loan transactions are also processed by the outside accounting system including a "bank line of credit" or "revolving loan." This type of loan is typically one year in maturity. A given business draws up to an authorized amount in a given year. For example, a business may have a line of credit with a bank for up to $2 million, and, on a daily basis, draw on this line of credit. The typical collateral provided for this loan would include accounts receivables, inventory, etc. As long as the business has receivables to support the loan, it can draw up to as much as the authorized amount. Then, when the financial position of the business improves, the business pays down this revolving loan either by issuing a check payable to the bank or through wire electronic transfer from the business's cash account to the loan payment. The full image scanner could be used to accept such check payments and the outside accounting system at the bank processes these payments as described above.

Other types of loans, such as term loans which might have a five-year maturity with a scheduled principle repayment and interest payment required on a monthly or quarterly basis, are processed and tracked by the outside accounting system. Longer term loans, with collateral such as buildings, are also available that might have a 10 to 15 year life.

Banks sometimes underwrite bonds or other issues of securities by corporations. For example, a business may hold an industrial revenue bond issued by a city in the amount of $1.5 million. However, in support of the business's credit, the bank guarantees payment if the business could not perform. The business pays a small interest rate (for example, ¼ or 1% per year) for the bank's guarantee. Checks are one method used by banks for such payments. Therefore, the full image scanner and outside accounting system may be utilized to process this type of transaction, as described above.

Another important service provided by the outside accounting system for business accounts is cash management. This can be provided by lock box services or sweep accounts. For example, a business needs a minimum operating cash balance in their checking account each day to meet requirements for payment to vendors or employees, for example. Each day, hundreds of payments from various customers of the business are received, typically by check. The checks are deposited into the general account of the business. When the business's account balances exceeds its operating requirements, the outside accounting system at the bank automatically "sweeps" extra funds from the non-interest bearing account to an interest bearing account such as commercial paper.

In a similar manner, many companies have customer payments directed to a bank "lock box." This lock box address is at a bank location and all customer payments to the company are diverted to this lock box address. This insures that the payments are deposited as quickly as possible so that the bank's commercial customers have immediate use of the funds at the bank. The next day the outside accounting system at the bank advises the business which payments were received into the account and the business adjusts its accounts receivables balance one day later, creating a timing problem due to the delay.

The full image scanner of the present invention enables a business to scan the documents through the scanner at the business's location (thus, eliminating the need to first send payments to a bank lock box location) and receive immediate credit electronically through the outside accounting system located at the bank. The check images and other images would immediately be available via the outside accounting system at the bank for settlement purposes. Therefore, lock box services by banks are handled on a de-centralized basis at bank customer locations.

Another service the outside accounting system provides is payment of payroll accounts. The business instructs the accounting system at the bank of the amounts to withdraw from the business's general account on the day of payroll and credit the employee payroll accounts. The outside accounting system can also provide direct deposits to employee accounts without actually issuing a check. Therefore, the employees have immediate use of their funds.

Businesses often maintain cash balances invested in bank commercial paper. The bank, via the accounting system, pays interest daily on the cash balances. Deposits and withdrawals are typically handled by a pre-authorized officer of the company such as the controller. Movement of funds typically require written authorization including a signature of the company officer. The full image scanner and outside accounting system of the present invention are utilized for withdrawals from commercial paper to a checking account or for purchase of commercial paper. This could be initiated by inserting a pre-designed form with an area to add the amount filed and authorized signature. The full image scanner captures the amount and seeks a match for the signature.

The system, via the link with a central office computer 15, processes transactions substantially immediately. That is, deposits are processed in real time rather than waiting for the end of the day. Also, full images of all documents can be stored on mass storage devices 17 at the central office. The images could also be stored at the unit itself, or at another remote system. The images could also be temporarily stored and forwarded at a later time.

A personal computer 11 also be connected to the system. The personal computer can also process data from the scanning modules. Processing of scanned data can occur at the personal computer 11, within the full image scanning module 12 or the discrimination unit 14, or at the central office computer 15. The system also is connected to teller station 13 (which includes a video display).

Figure 1C:
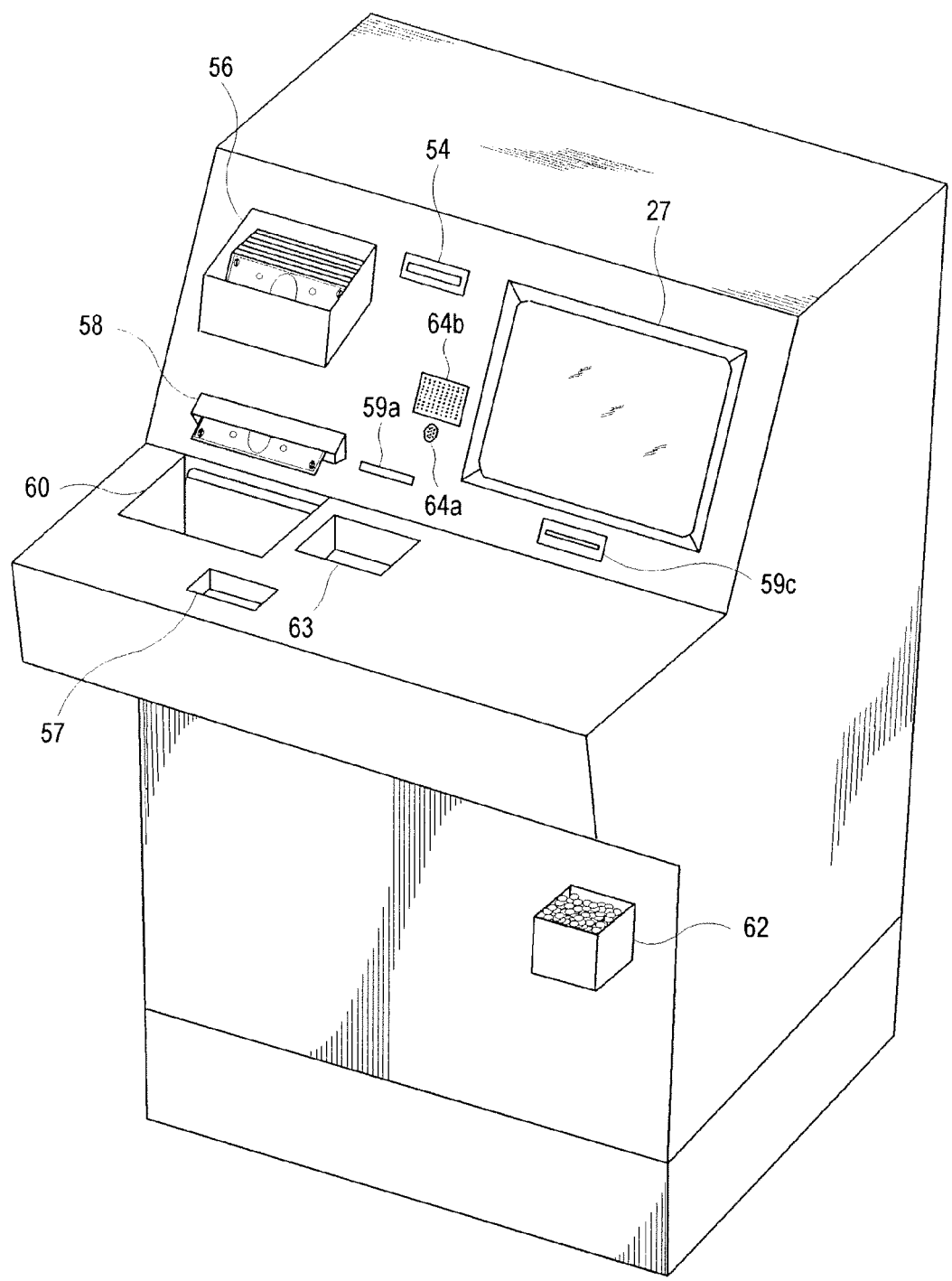
FIG. 1c is a diagram of the document processing system with touch screen according to principles of the present invention.
Figure 1D:
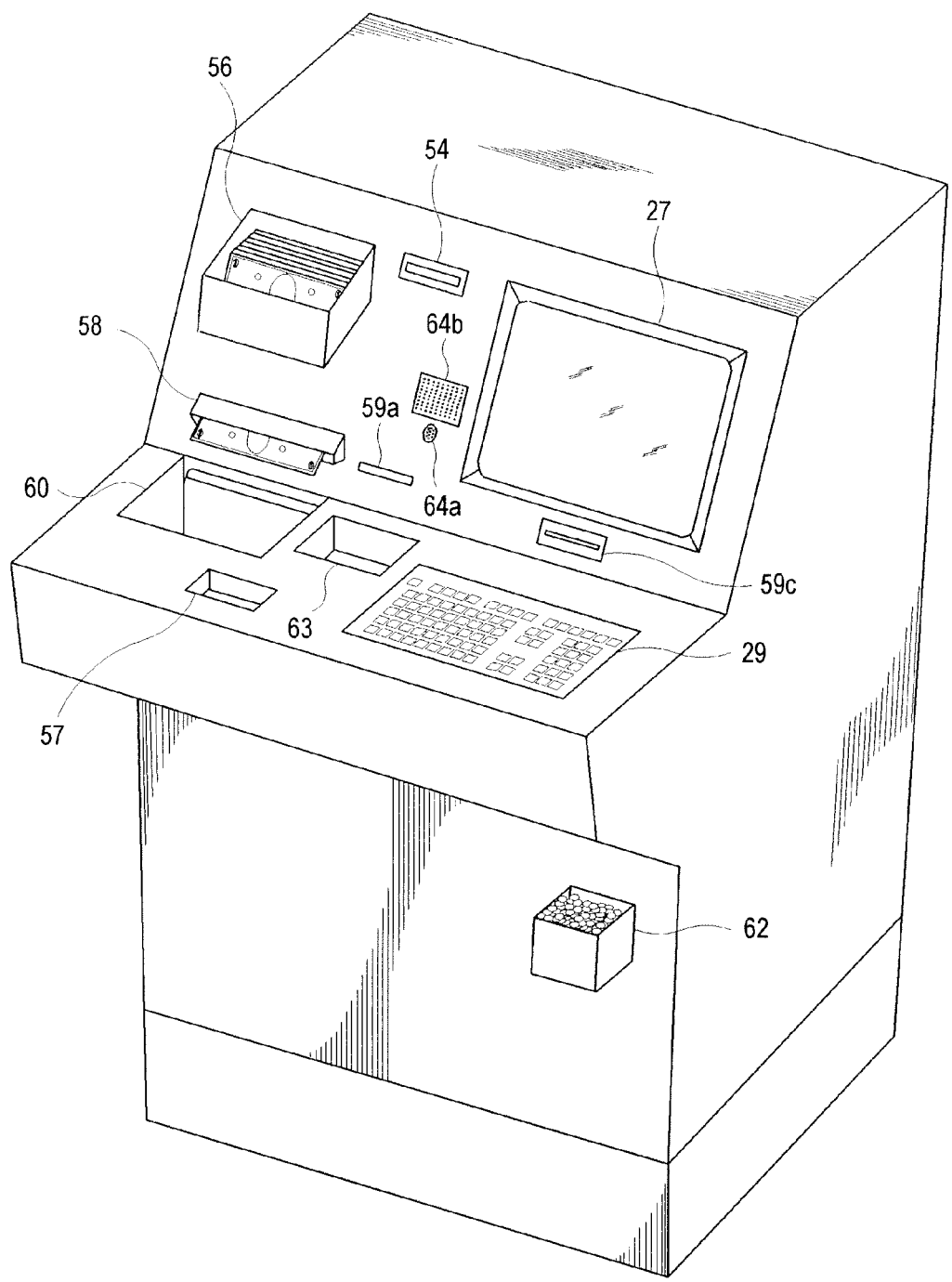
FIG. 1d is a block diagram of the document processing system with touch screen and keyboard according to principles of the present invention.
Figure 1E:
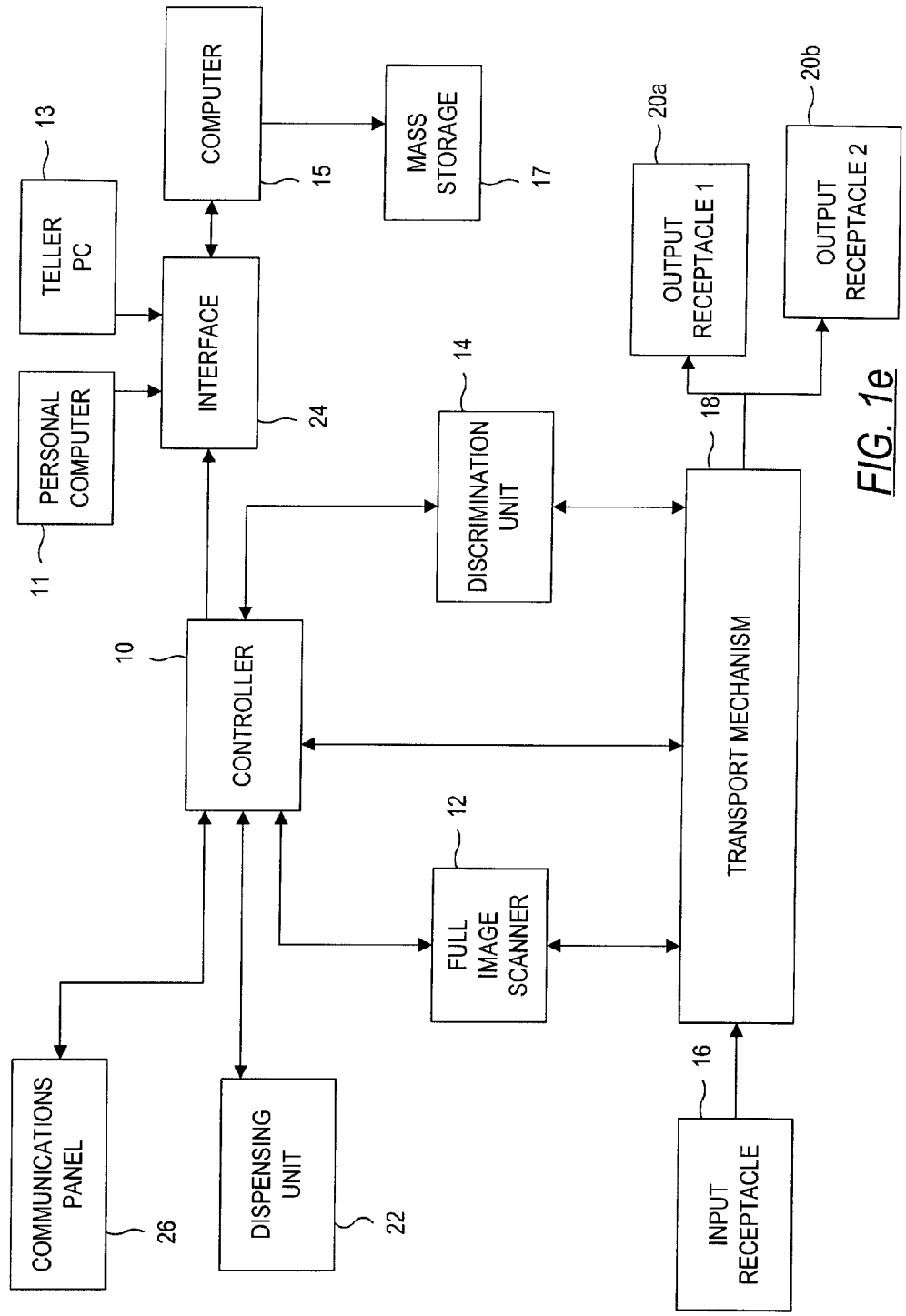
FIG. 1e is a block diagram of the document processing system with dual output bins according to principles of the present invention.
Figure 1F:
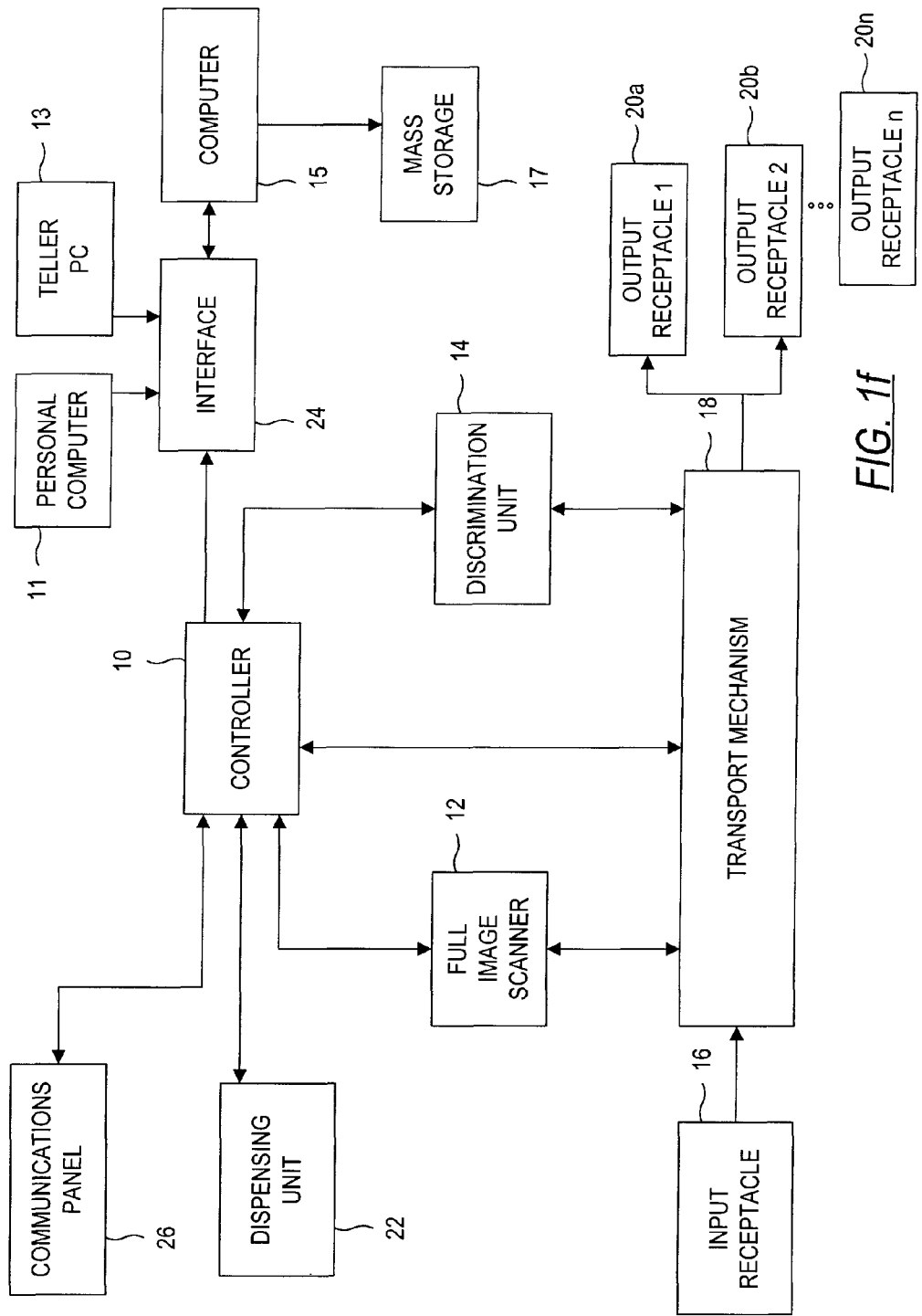
FIG. 1f is a block diagram of the document processing system with a plurality of output bins according to principles of the present invention.
Figure 1G:
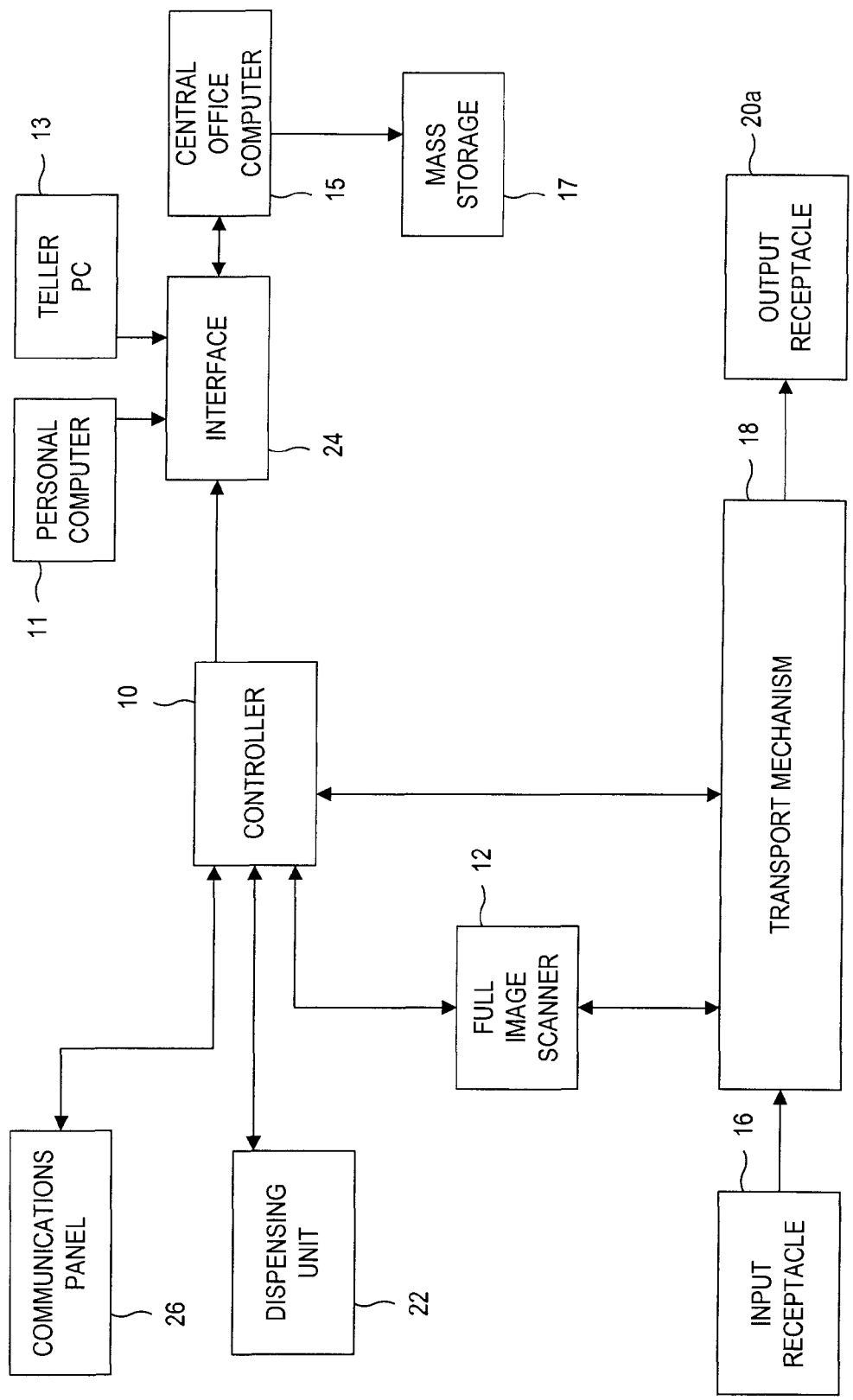
FIG. 1g is a block diagram of the document processing system without a discrimination unit and having a single output receptacle according to principles of the present invention.
Figure 1H:
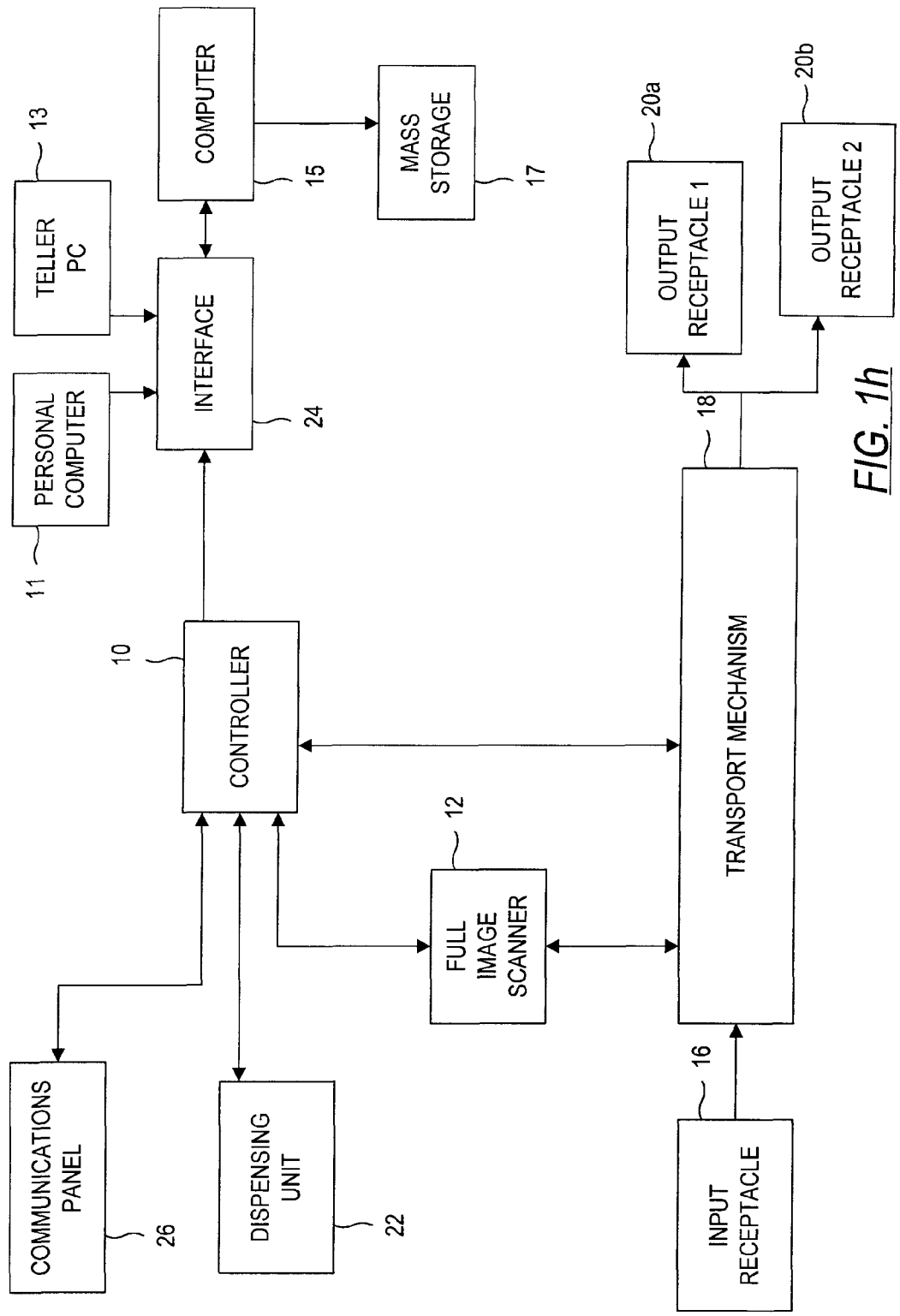
FIG. 1h is a block diagram of the document processing system without a discrimination unit and having dual output receptacles according to principles of the present invention.
Figure 1I:
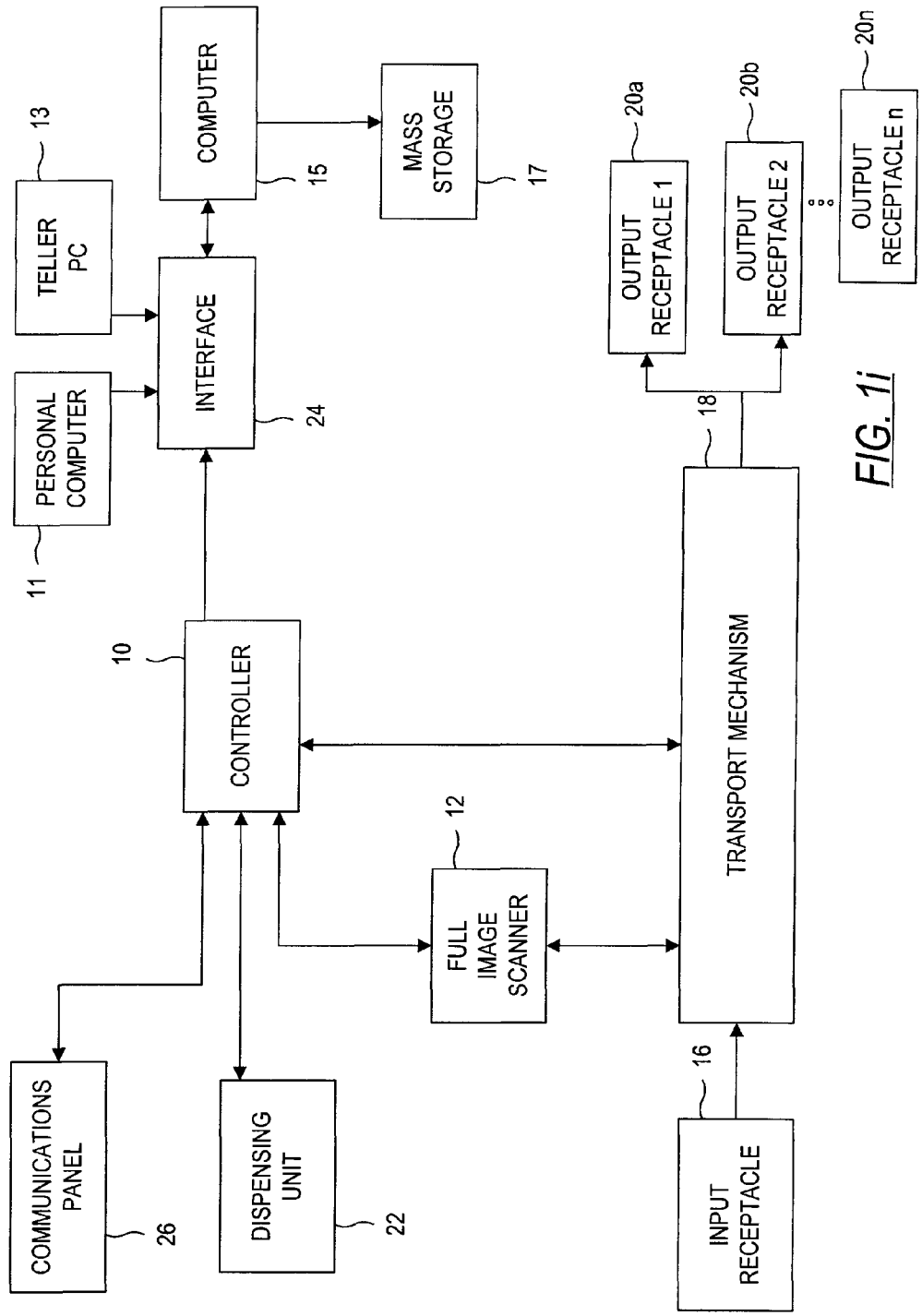
FIG. 1i is a block diagram of the document processing system without a discrimination unit and having a plurality of output receptacles according to principles of the present invention.
Figure 1J:
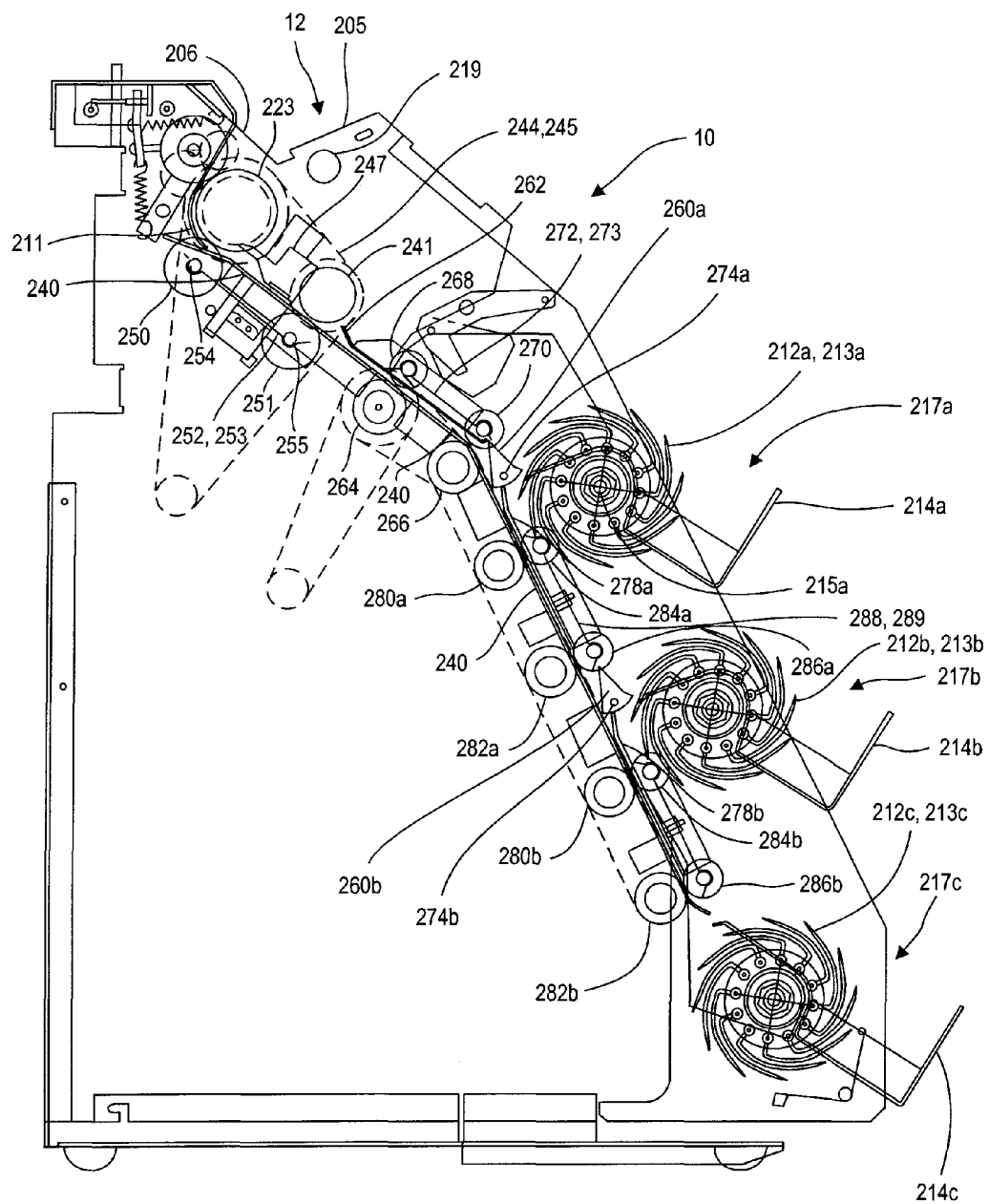
FIG. 1j is a cut-away view of the document processing systems showing three output bins.
Figure 1K:
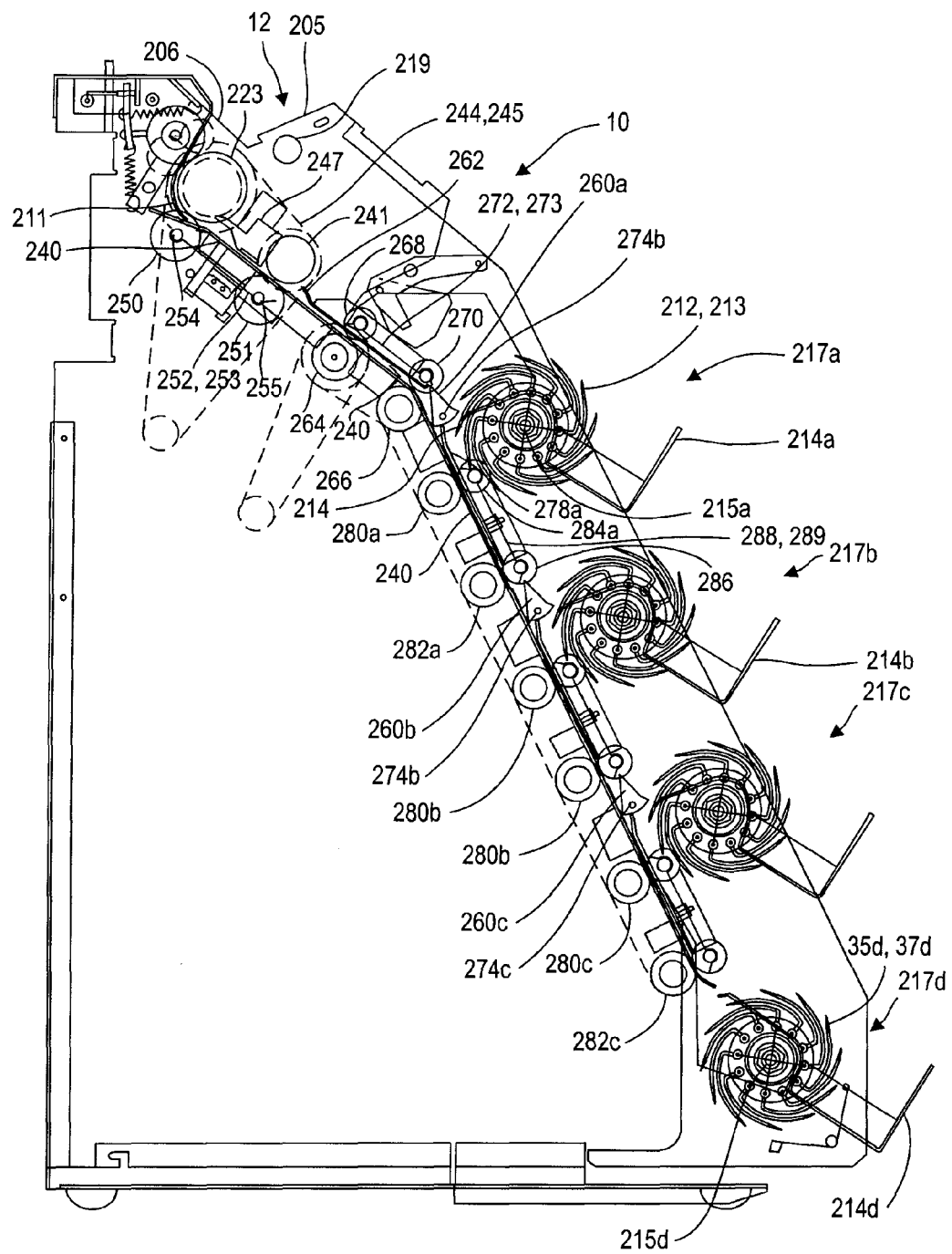
FIG. 1k is a cut-away view of the document processing systems showing four output bins.
Figure 1I:
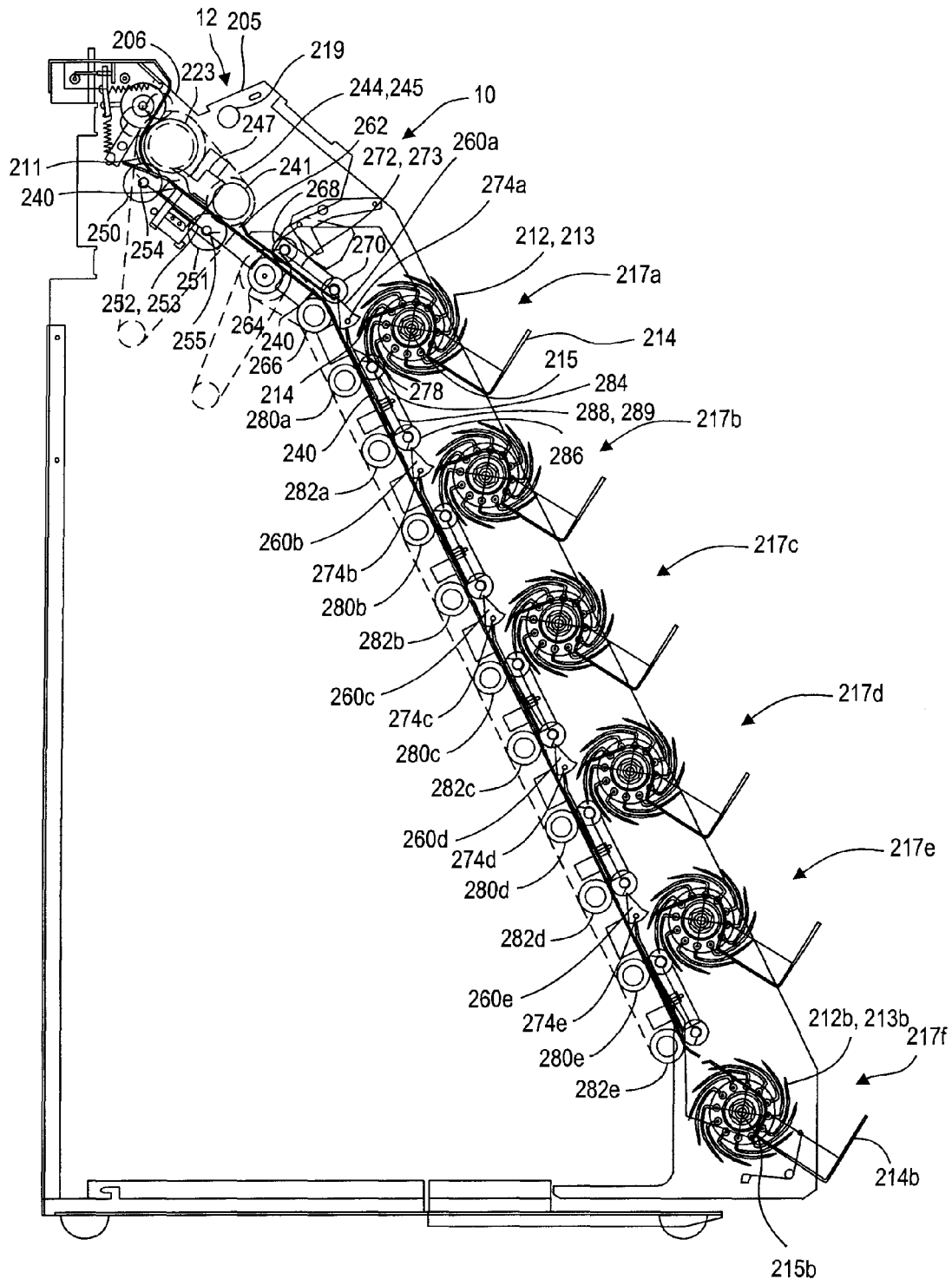
Figure 1O:
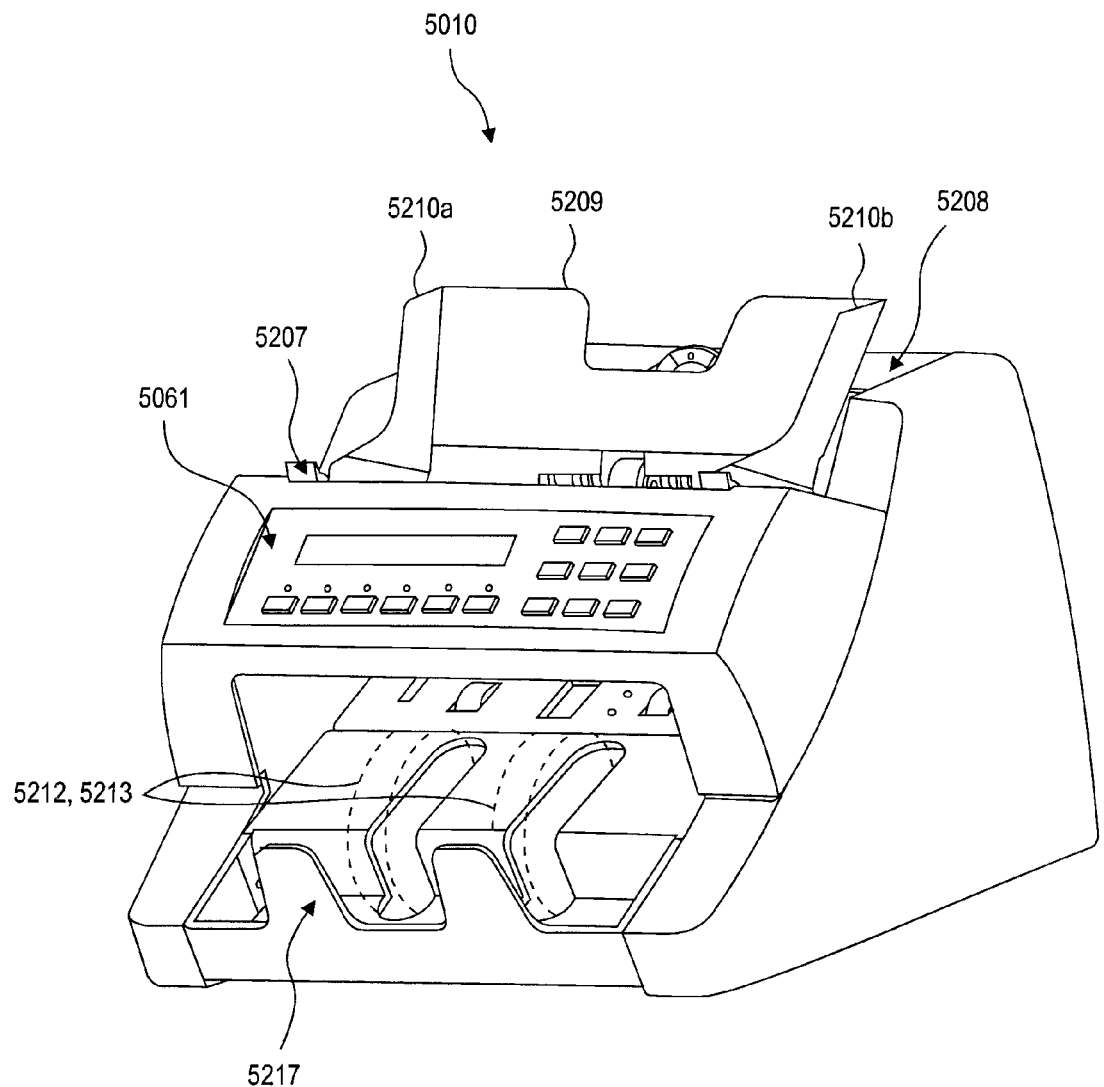
FIG. 1o is a view of a compact document processing system according to principles of the present invention.
Figure 1P:
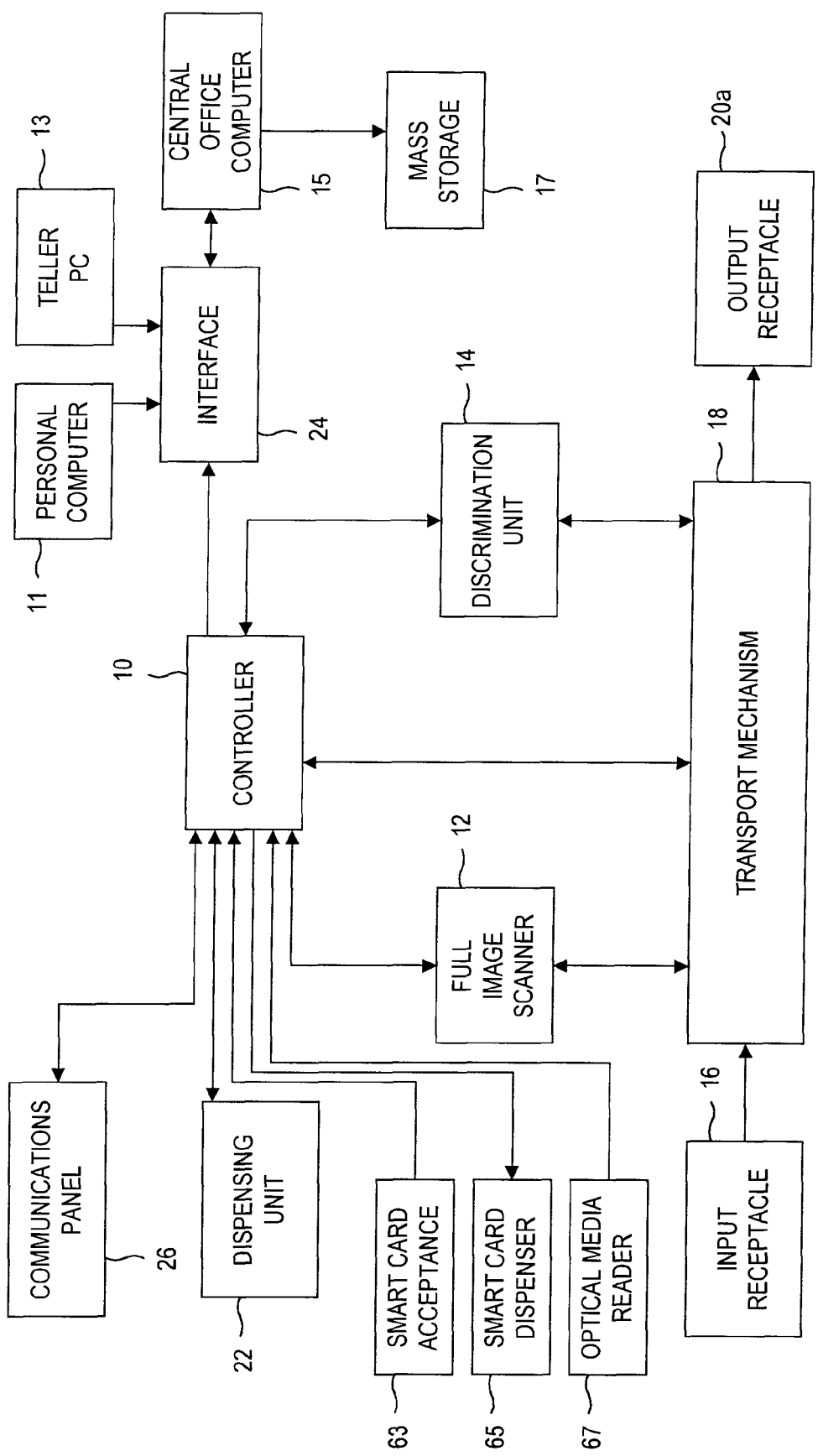
FIG. 1p is a block diagram of the document processing system with modules to insert smart cards, dispense smart cards, and insert optical media according to principles of the present invention.
Figure 1Q:
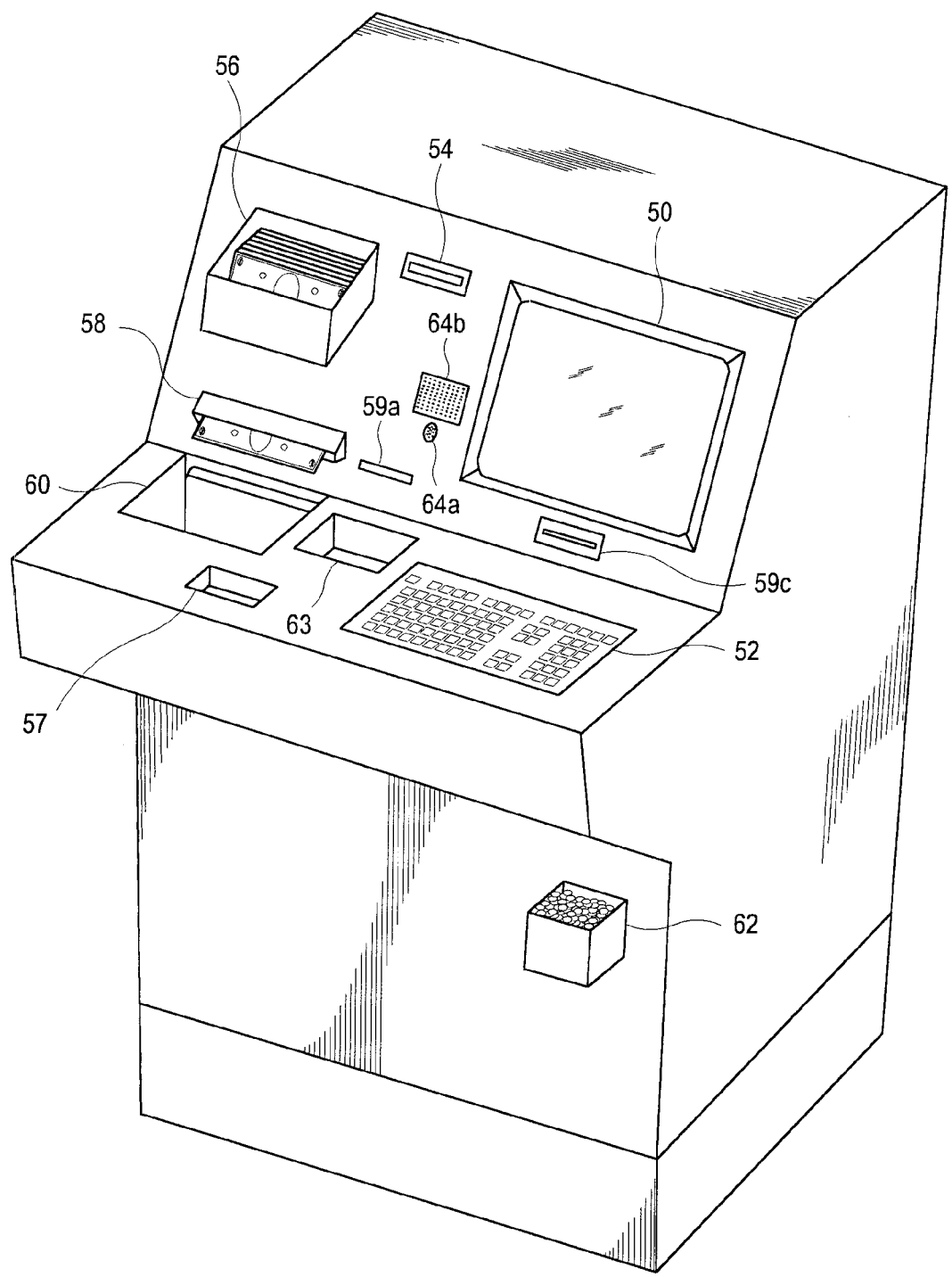
FIG. 1q illustrates the document processing system according to principles of the present invention.
Figure 1R:
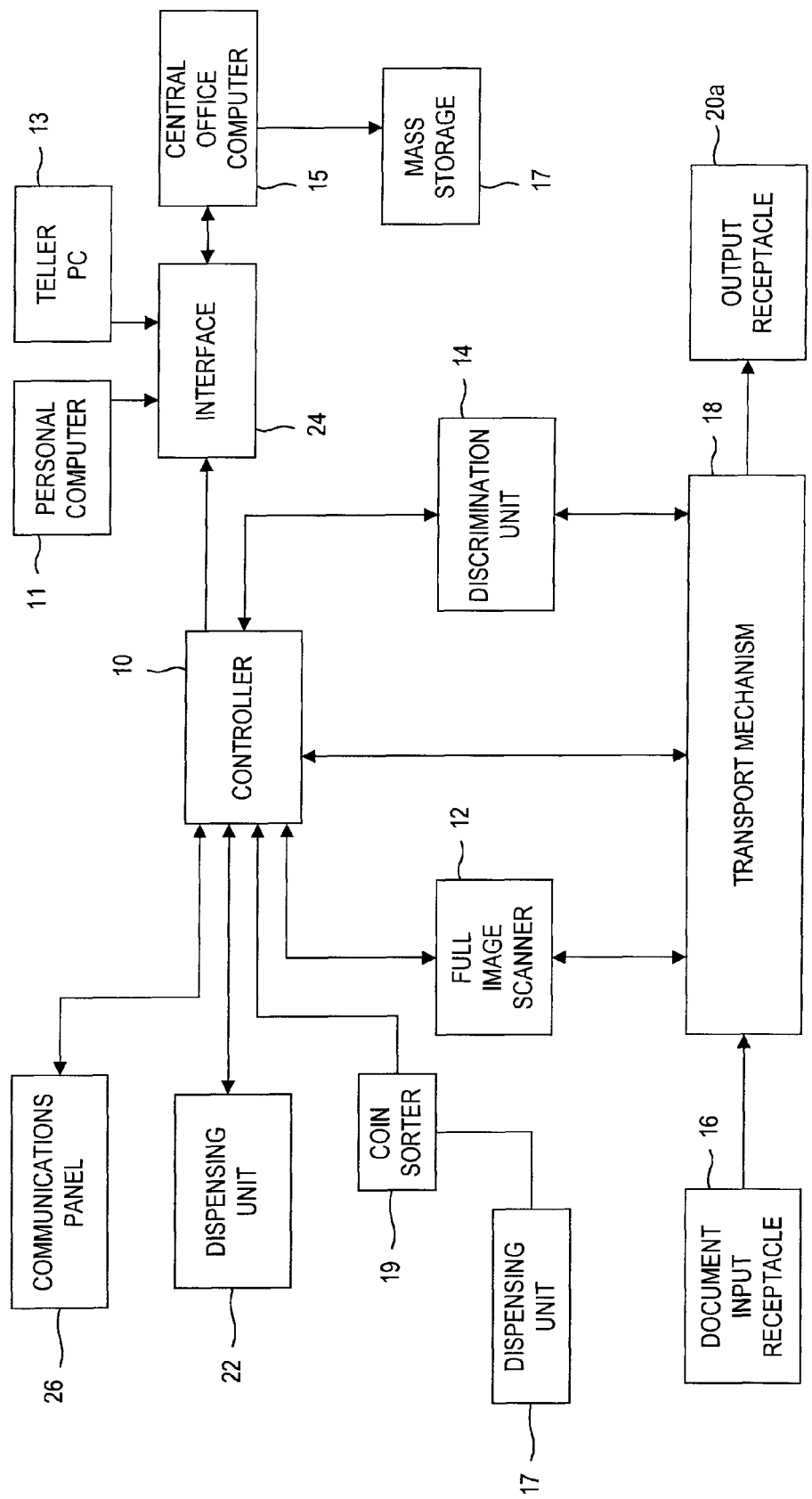
FIG. 1r is a block diagram of the document processing system with coin sorter according to principles of the present invention.
Figure 1S:
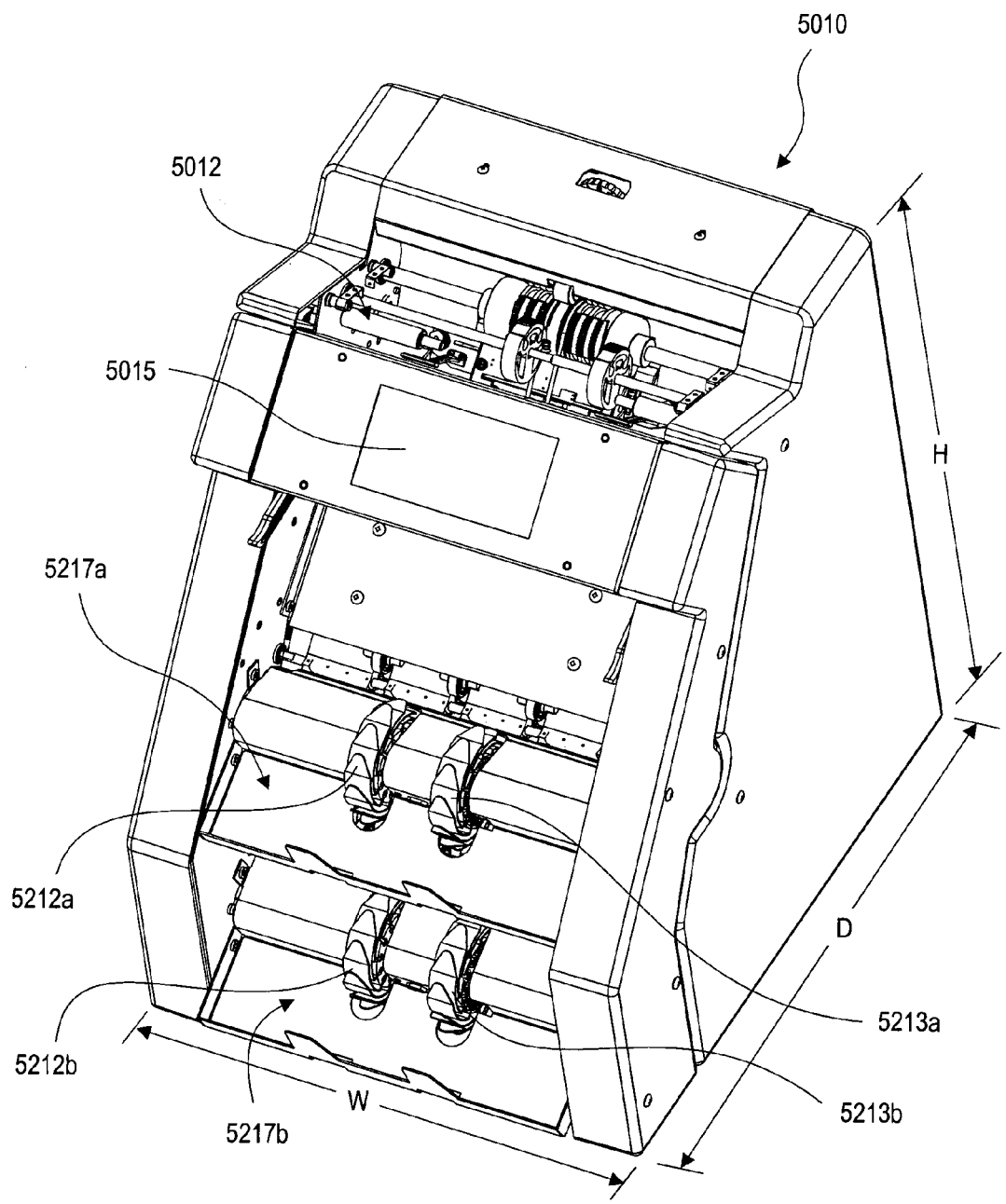
FIG. 1s a perspective view of a document processor system having two output bins.
Figure 1T:
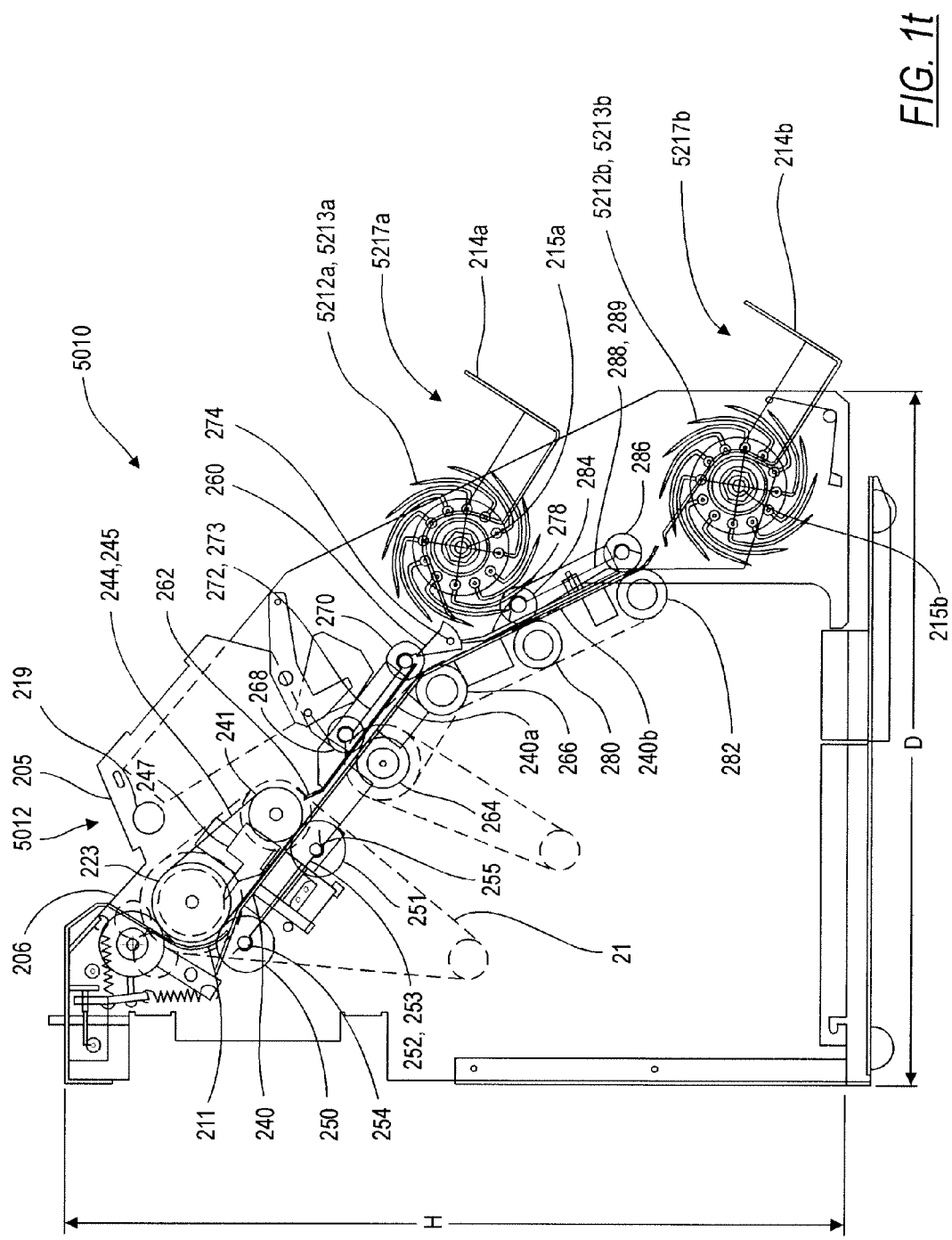
FIG. 1t is a side view of an evaluation device depicting various transport rolls in side elevation according to one embodiment of the present invention.

Several full image scanners can be interconnected to form a local area network (LAN). The individual image scanners may be located at teller stations, in bank vaults, or at businesses, for example. In such a network, some or all image processing is accomplished at the image scanner and not at some centralized location. In other words, the processing functionality is "distributed" in such an arrangement. The individual LANs may have a different physical layouts or topologies. Referring now to FIG. 1w, full image scanners 6054, 6056, 6058, and 6060 are connected to common bus 6062. Bus 6062 is coupled to an interface 6052. The interface communicates with an outside accounting system which functions as described above. The bus-based network topology is inexpensive, reliable, and requires the least amount of cable for any LAN topology.

Figure 1U:
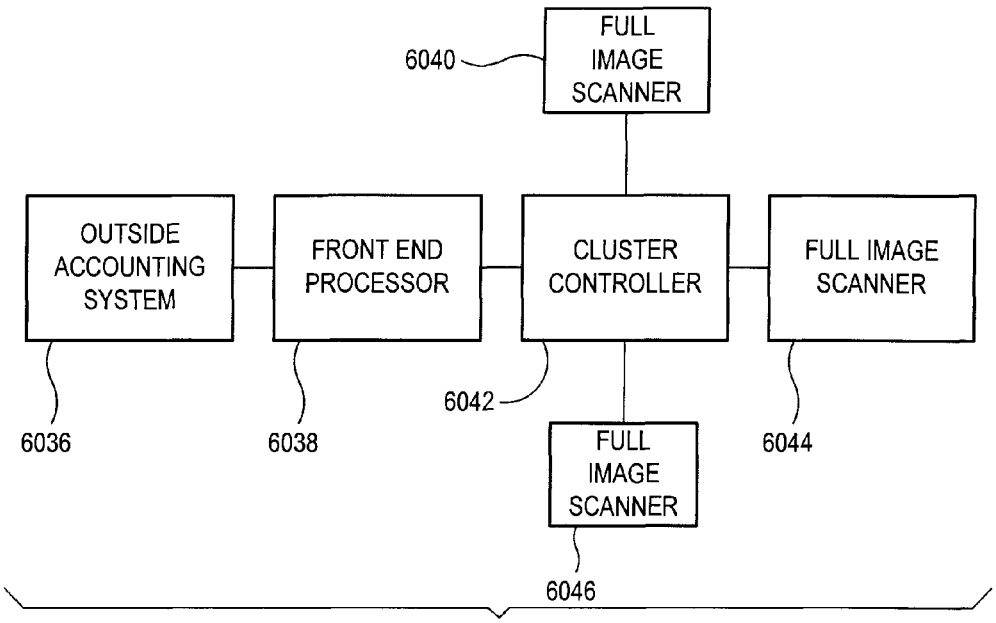
FIGS. 1u-v are a diagrams of networks of full image scanners according to principles of the present invention.
Figure 1V:
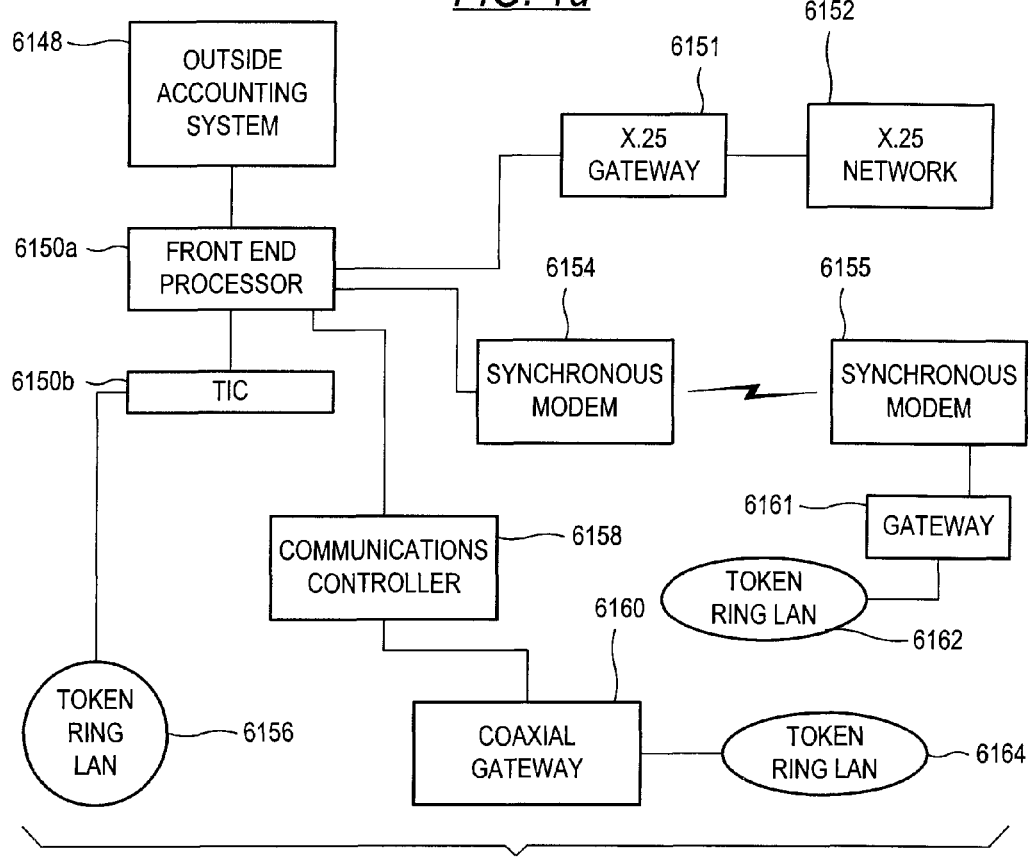
Figure 1W:
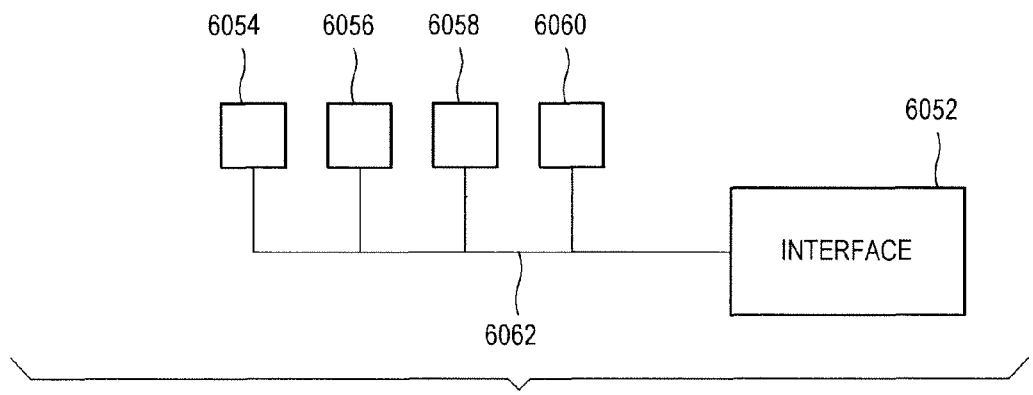
FIGS. 1w-y are topological diagrams of networks of full image scanners according to principles of the present invention.
Figure 1X:
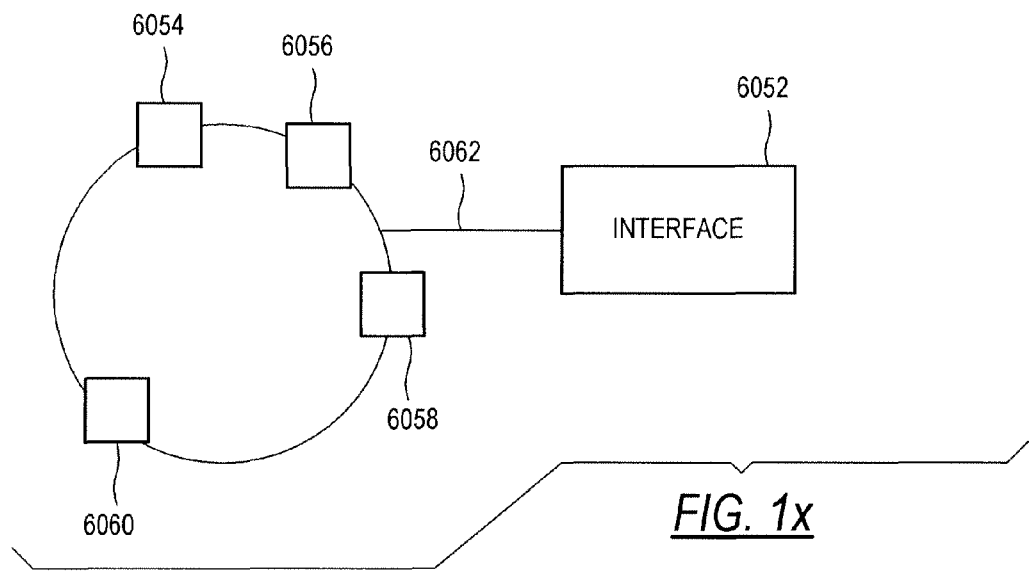

A LAN using a ring topology is illustrated in FIG. 1x. Full image scanners 6054, 6056, 6058, and 6060 retransmit information to adjacent scanners using point-to-point links. The scanners communicate with other networks through an interface 6052. Although more expensive than the bus topology, the ring topology lends itself to being able to transmit information over greater distances.

Figure 1Y:
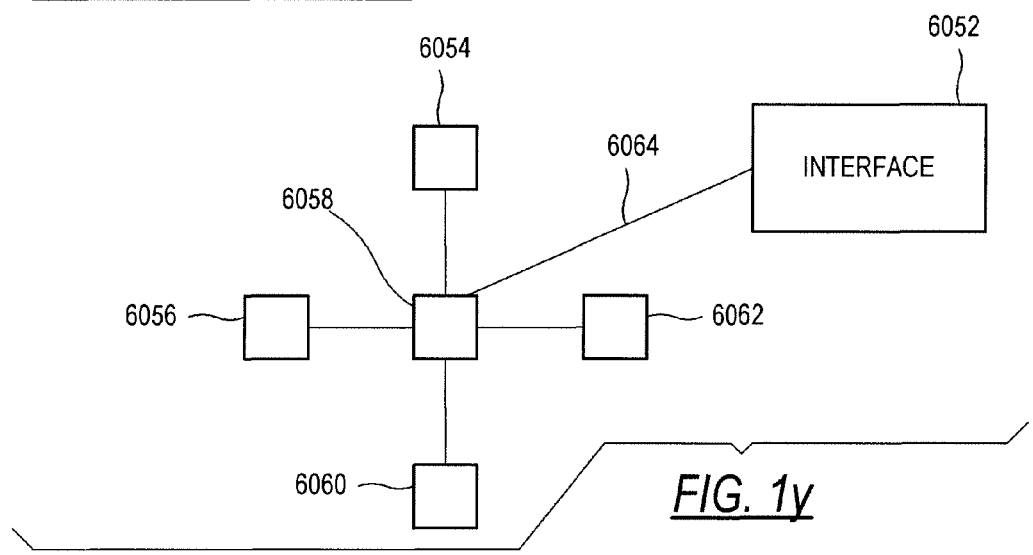

A LAN using a star topology is illustrated in FIG. 1y where a central full image scanner 6058 is connected to full image scanners 6054, 6056, 6060, and 6062. The central full image scanner communicates to other networks through an interface 6052. An advantage to the star topology is enhanced network management. Because all traffic passes the central full image scanner 6058, traffic monitoring is simple and detailed network reports are easy to produce. Enhanced security is inherently a part of this type of topology since the central unit can keep tables of user access rights as well as acceptable passwords. Also, the network can easily control who logs onto any remote device present on the network.

Referring now to FIG. 1u, there is illustrated another image processing network according to the present invention. An outside accounting system 6036 communicates with front end processor (FEP) 6038. The FEP 6038 is a software programmable controller that relieves the outside accounting system 6036 of many networking and data communications tasks. The FEP polls devices, performs error checking and recovery, character code translation, and dynamic buffer control. The FEP also serves as a data concentrator concentrating several low speed transmissions into a steady, high-speed flow of data. Full image scanners 6040, 6044, and 6046 communicate with the FEP 6038 (and the outside accounting system 6036) via cluster controller 6042. Cluster controller 6042 serves as an interface between the outside accounting system 6036 and the scanners 6040, 6044, and 6046. The image processing device 6036 has a master/slave relationship with the scanners 6040, 6044, and 6046 and polls, via FEP 6038, the devices and determines if they wish to communicate.

Another image processing network is described in connection with FIG. 1v. In this network, gateways are used to connect networks which have different network architectures. Gateways use all seven layers of the OSI model and perform protocol conversion functions at the Application layer. An outside accounting system 6148 is coupled to FEP 6150a which is connected to a token-ring interface coupler (TIC) gateway 6150b. TIC gateway 6150b provides connections to token ring networks 6156, 6162, and 6164 which include other full image scanners.

The highest performance LAN gateway is the link between a token-ring network 6156 and the image processing device's FEP 6150a via the TIC gateway 6150b. The TIC 6150b permits a 4 mbps or 16 mbps connection depending upon the hardware used. The TIC 6150b is viewed by the host as a cluster controller; the outside accounting system polls the TIC 6150b which in turn polls any units on the token-ring network 6156.

The network also contains a remote LAN gateway which functions as a gateway to another token ring LAN 6162. For example, the gateway 6161 functions as a cluster controller and communicates with the FEP using IBM's SDLC protocol via synchronous modems 6154 and 6155 at both sites. The synchronous modems 6154 and 6155 can dial up the FEP at speeds up to 64 kbps.

Remote X.25 LANs (which use the X.25 packet switching protocol and contain full image scanners) can also communicate with the host via X.25 gateways. A gateway 6151 with an adapter card functions as a cluster controller and runs special gateway 6151 software that runs over a given protocol and communicates with the X.25 network. A local coaxial gateway 6160 is also provided which allows a workstation on the LAN to emulate a distributed function terminal (DFT) mode of processing.

It should be realized that the units connected to particular gateways are in no way limited to use with a particular gateway. In fact, the gateways and units can be interchanged and other types of equipment can be used to structure the network as is known to those skilled in the art.

The communication panel 26 displays information to the user and accepts user commands. The panel 26 consists of a video screen 50 onto which information to the user is displayed by the system and a keyboard 52 for accepting commands from a user. As shown in FIG. 1c, the communications panel 26 can consist of a touch screen 27 or as shown in FIG. 1d, a combination of a touch screen 27 and keyboard 29. A slot 54 is used for receiving a user's identification card. The user inserts the card into the slot 54 to access the machine. The user deposits documents into bin 56. Loose currency is dispensed from slot 58, strapped currency from receptacle 60, and loose or rolled coin at receptacle 62.

As shown in FIG. 1p, other modules can be added to the system. A smart card acceptance module 63 is provided for accepting smart card. A smart card dispensing module 65 is provided for dispensing smart cards. An optical reader module 67 is also provided for accepting and dispensing optical media.

An audio microphone 64a and speaker 64b allow two-way communication between the user and a central office, for example, with a teller at a bank's central office. Thus, during the operating hours of a financial institution, bank personnel are connected to the system by the audio microphone 64a and speaker 64b. The central office computer 15 (which includes a video terminal) also receives and displays full video images of the documents from the system. If the documents are not recognizable, the image is forwarded to the bank employee for observation on the terminal. The bank employee could then discuss the document with the customer. In this case, the bank employee could decide to accept the document immediately for credit after reviewing the image on the terminal. With a full image scan, enough information may have been scanned on an unrecognizable document that review by the bank employee on the terminal will enable the bank employee to accurately call the value of the document. Additionally, the image of a document may be presented on a teller's monitor. By reviewing the data, the teller may be able to enter missing data via their keyboard, if the image is recognizable. If the teller is near the machine and an image on the monitor is unclear, the teller may remove the document from the scanner, inspect the document, and enter the missing data. The value could also be entered by the denomination keys and other information by a alphanumeric keypad, as described below, or with a mouse and applications software. Additionally, the value could be entered by a touch screen device or by any combination of the input means described above. The document would then be placed in back of the output receptacle 20 and processing would continue. In some situations, the customer might enter the value or other information concerning the unidentified documents. This entry would be via the keyboard and credit would be given to the customer's account only after the document is verified by bank personal. In other situations, the customer may merely hold onto the document.

As mentioned previously, the system has a slot for the insertion of a customer identification card. Alternatively, the customer might enter a PIN identification number through the keyboard. After identification of the customer is determined, then the customer submits a document (such as a check or savings account withdrawal slip) and immediate payment to the customer is made.

The output receptacle 20 can be a single bin as shown in FIG. 1a into which all documents transported by the transport mechanism 18 are stored. Alternatively, the output receptacle 20 can consist of dual bins as shown in FIG. 1e. In the case of dual bins, identifiable documents are placed into the first bin and unidentifiable documents are placed into the second bin. Additionally, as shown in FIG. 1f, any number of output bins can be used to store the documents. For example, currency of particular denominations can be stored in separate bins. For example, one bin each can be used to store $1, $5, $10, $20, $50, and $100 bills.

As shown in FIG. 1g, the full image scanner can be used without the discrimination unit with a single output receptacle. Alternatively, as shown in FIG. 1h, a full image scanner can be used in a system without a discrimination unit with two output bins or receptacles. Finally, as shown in FIG. 1i, the full image scanner can be used in a system without a discrimination unit in a system containing any number of output bins.

FIG. 1s depicts an exterior perspective view and FIG. 1t is a side view of a multi-pocket document processing system 5010 according to one embodiment of the present invention. According to one embodiment the document processing system 5010 is compact having a height (H) of about 17½ inches, width (W) of about 13½ inches, and a depth (D) of about 15 inches. The evaluation device 5010 may be rested upon a tabletop.

In FIGS. 1s and 1t, documents are fed, one by one, from a stack of documents placed in an input receptacle 5012 into a transport mechanism. The transport mechanism includes a transport plate or guide plate 240 for guiding documents to one of a plurality of output receptacles 5217a and 5217b. Before reaching the output receptacles 5217a, 5217b a document can be, for example, evaluated, analyzed, authenticated, discriminated, counted and/or otherwise processed by a full image scanning module. The results of the above process or processes may be used to determine to which output receptacle 5217a, 5217b a document is directed. In one embodiment, documents such as currency bills are transported, scanned, and identified at a rate in excess of 800 bills or documents per minute. In another embodiment, documents such as currency bills are transported, scanned, and identified at a rate in excess of 1000 bills or documents per minute. In the case of currency bills, the identification includes the determination of the denomination of each bill.

The input receptacle 5012 for receiving a stack of documents to be processed is formed by downwardly sloping and converging walls 205 and 206 (see FIG. 1t) formed by a pair of removable covers (not shown) which snap onto a frame. The converging wall 206 supports a removable hopper (not shown) that includes vertically disposed side walls (not shown). One embodiment of an input receptacle is described and illustrated in more detail in U.S. patent application Ser. No. 08/450,505, filed May 26, 1995, entitled "Method and Apparatus for Discriminating and Counting Documents", now issued as U.S. Pat. No. 5,687,963, which is incorporated by reference in its entirety. The document processing system 5010 in FIG. 1s has a touch panel display 5015 in one embodiment of the present invention which displays appropriate "functional" keys when appropriate. The touch panel display 5015 simplifies the operation of the multi-pocket document processing system 5010. Alternatively or additionally physical keys or buttons may be employed.

From the input receptacle 5012, the documents are moved in seriatim from a bottom of the stack along a curved guideway 211 (shown in FIG. 1t) which receives documents moving downwardly and rearwardly and changes the direction of travel to a forward direction. Although shown as being fed from the bottom, the documents can be fed from the top, front, or back of the stack. The type of feeding used could be friction feed, a vacuum feed, or any other method of feeding known to those skilled in the art. A stripping wheel mounted on a stripping wheel shaft 219 aids in feeding the documents to the curved guideway 211. The curvature of the guideway 211 corresponds substantially to the curved periphery of a drive roll 223 so as to form a narrow passageway for the bills along the rear side of the drive roll 233. An exit end of the curved guideway 211 directs the documents onto the transport plate 240 which carries the documents through an evaluation section and to one of the output receptacles 5217a, 5217b.

Stacking of the documents in one embodiment is accomplished by a pair of driven stacking wheels 5212a and 5213a for the first or upper output receptacle 5217a and by a pair of stacking wheels 5212b and 5213b for the second or bottom output receptacle 5217b. The stacker wheels 5212a,b and 5213a,b are supported for rotational movement about respective shafts 215a,b journalled on a rigid frame and driven by a motor (not shown). Flexible blades of the stacker wheels 5212a and 5213a deliver the documents onto a forward end of a stacker plate 214a. Similarly, the flexible blades of the stacker wheels 5212b and 5213b deliver the bills onto a forward end of a stacker plate 214b.

A diverter 260 directs the documents to either the first or second output receptacle 5217a, 5217b. When the diverter is in a lower position, documents are directed to the first output receptacle 5217a. When the diverter 260 is in an upper position, documents proceed in the direction of the second output receptacle 5217b.

FIGS. 1j-l depict multi-pocket document processing system 10, such as a currency discriminators, according to embodiments of the present invention. FIG. 1j depicts a three-pocket document processing system 10. FIG. 1k depicts a four-pocket document processing system 10. FIG. 1l depicts a six-pocket document processing system 10.

The multi-pocket document processing systems 10 in FIG. 1j-l have a transport mechanism which includes a transport plate or guide plate 240 for guiding currency documents to one of a plurality of output receptacles 217. The transport plate 240 according to one embodiment is substantially flat and linear without any protruding features. Before reaching the output receptacles 217, a document can be, for example, evaluated, analyzed, authenticated, discriminated, counted and/or otherwise processed.

The multi-pocket document processing systems 10 move the documents in seriatim from a bottom of the stack along the curved guideway 211 which receives documents moving downwardly and rearwardly and changes the direction of travel to a forward direction. Although shown as being fed from the bottom, the documents can be fed from the top, front, or back of the stack. An exit end of the curved guideway 211 directs the documents onto the transport plate 240 which carries the documents through an evaluation section and to one of the output receptacles 217. A plurality of diverters 260 direct the documents to the output receptacles 217. When the diverter 260 is in a lower position, documents are directed to the corresponding output receptacle 217. When the diverter 260 is in an upper position, documents proceed in the direction of the remaining output receptacles.

The multi-pocket document processing systems 10 of FIG. 1*j-l* according to one embodiment includes passive rolls 260, 251 which are mounted on an underside of the transport plate 240 and are biased into counter-rotating contact with their corresponding driven upper rolls 223 and 241. Other embodiments include a plurality of follower plates which are substantially free from surface features and are substantially smooth like the transport plate 240. The follower plates 262 and 278 are positioned in spaced relation to transport plate 240 so as to define a currency pathway therebetween. In one embodiment, follower plates 262 and 278 have apertures only where necessary for accommodation of passive rolls 268, 270, 284, and 286.

The follower plate, such as follower plate 262, works in conjunction with the upper portion of the transport plate 240 to guide a bill from the passive roll 251 to a driven roll 264 and then to a driven roll 266. The passive rolls 268, 270 are biased by H-springs into counter-rotating contact with the corresponding driven rolls 264 and 266.

Figure 2:
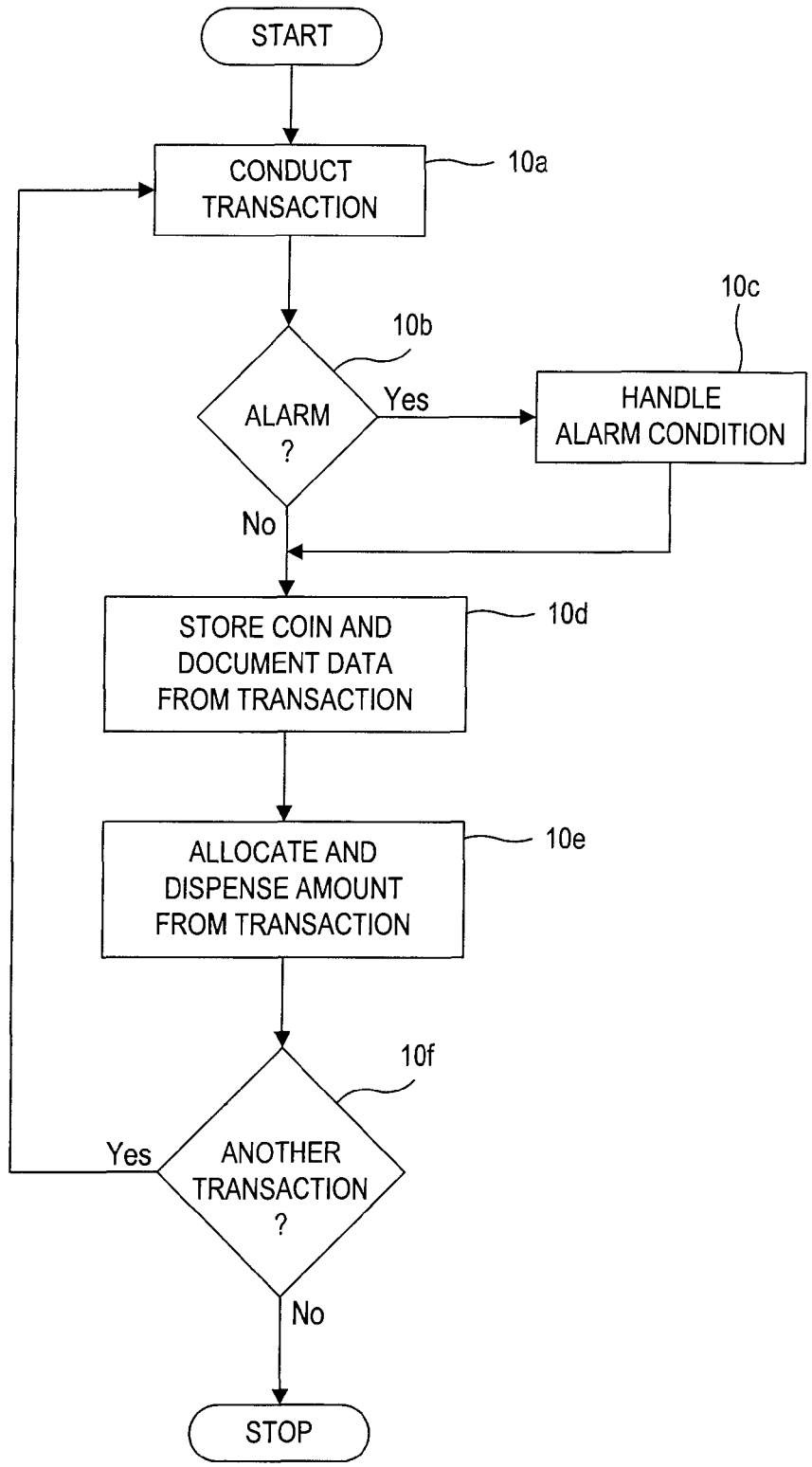
FIG. 2 shows a flowchart describing the operation of the document processing system according to principles of the present invention.

The general operation of the automated document processing system is illustrated in FIG. 2. The user conducts a transaction at step 10*a*. During the transaction step 10*a*, the user places documents into the input receptacle 16, the full image scanner 12 scans a full image of the documents, selected parts of the image are processed by the image scanner 12, the discrimination and authentication unit 14 authenticates the document, and the document is placed in the output receptacle 20. During the transaction step 10*a*, any interaction with personnel at a central office, for example, with a bank teller, occurs. As previously described, the system may also include a smart card processing module, modules which accept and read all forms of magnetic and optical media, and modules which dispense smart cards and all forms of optical and magnetic media.

An alarm condition may be generated during a transaction. At step 10*b*, the system determines whether an alarm condition is present. If the answer is affirmative, then at step 10*c* the system responds to the alarm condition. The response may be automatic or may require manual action by the user. If the response is automatic, the system preferably flashes a warning light, for example a 24 VAC external light driven by a relay. If the response required is manual, the user is required to perform some manual action and instructions of how to proceed may be displayed to the user on a user display screen, as described below. Alarm conditions occur when the user presses a help key; when a currency dispenser becomes empty; when more than a programmable predetermined amount of foreign currency is detected; upon a system error condition; and when a bin is full. If the answer to step 10*b* is negative or upon completion of step 10*c*, operation continues at step 10*d*.

After the alarm condition is tested or handled, the amount deposited in the transaction is stored at step 10*d* for later use. The values are preferably stored in a computer memory. Next, at step 10*e*, the user or machine distributes the deposited amount stored in step 10*d*. Step 10*e* is also described in greater detail below and can, for example, consist of receiving the deposited amount in the form of bills, allocating it to a savings account, or receiving part of the deposit back in bills and crediting the remainder to a bank savings account. At step 10*f*, the user is given the choice of conducting a new transaction. If the answer is affirmative, the system returns to step 10*a* which is described above. If the user answers in the negative, then the machine stops.

Figure 3:
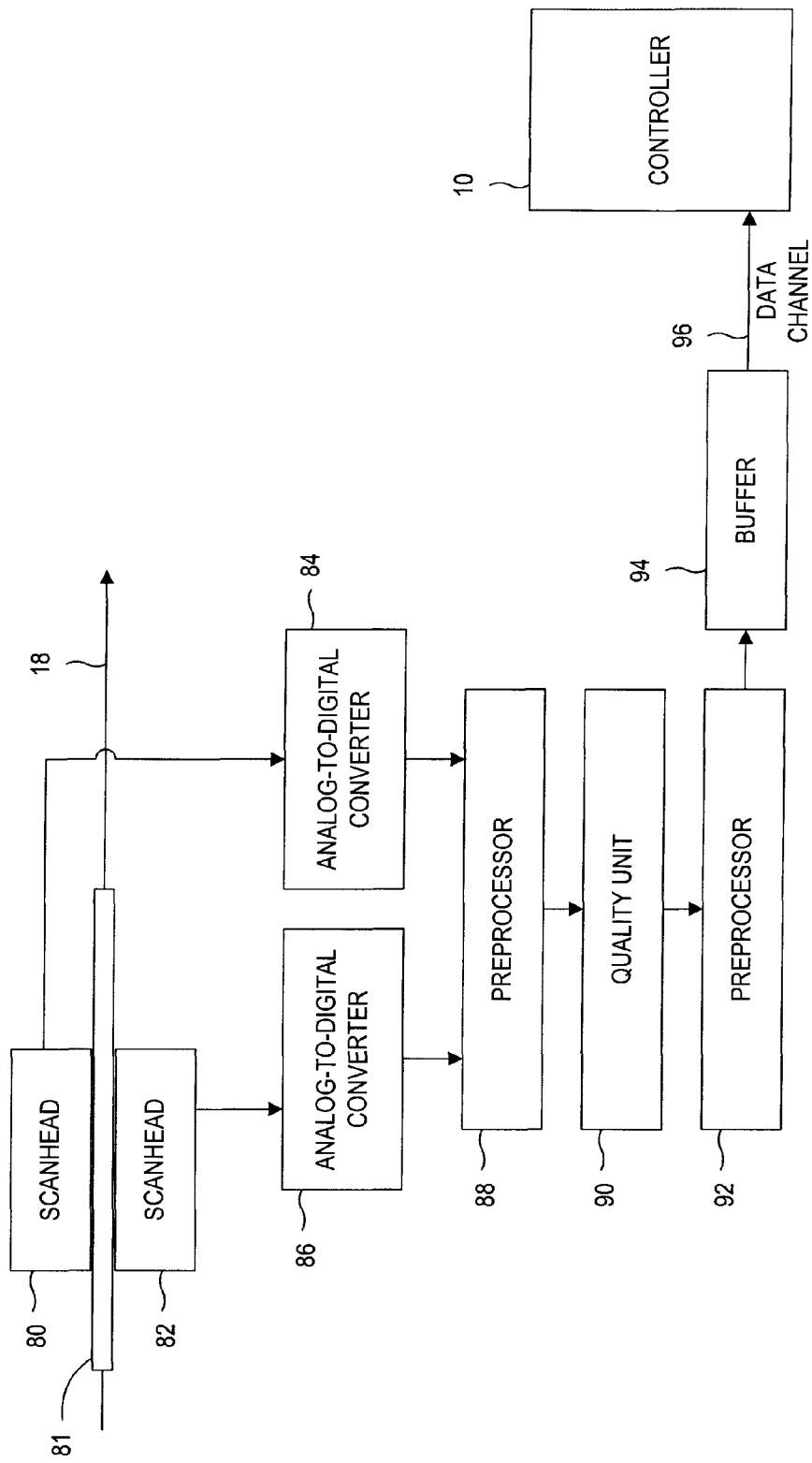
FIG. 3 is a block diagram of the full image scanner according to principles of the present invention.

The full image scanner 12 is now described in detail. In accordance with the present invention, the image scanner may be of the type disclosed in U.S. Pat. No. 4,888,812 which is herein incorporated by reference in its entirety. As shown in FIG. 3, the front and back surfaces of the documents are scanned by scan heads 80 and 82 and the images processed into video image data by electronic circuitry. The scan heads 80 and 82 are preferably charge coupled scanner arrays and generate a sequence of analog signals representing light and dark images defining the image on the document. The scan heads 80 and 82 are arranged for simultaneously scanning both the front and back of the documents and are connected respectively to analog-to-digital converters 84 and 86 which convert the analog values into discrete binary gray scale values of, for example, 256 gray scale levels. The scan heads are capable of obtaining images of varying resolutions. The particular resolution chosen, which can be varied by the user, is selected based upon the type of document being scanned, as is known in the art.

The high resolution gray scale image data from the analog-to-digital converters 84 and 86 is directed to an image data preprocessor 88 in which the data may be enhanced and smoothed and which serves to locate the edges of successive documents and discard irrelevant data between documents. If the documents are slightly skewed, the image preprocessor 88 can also perform rotation on the image data to facilitate subsequent processing.

The image data is monitored for unacceptable image quality by image quality unit 90. For example, the image quality unit 90 and monitors the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition is generated.

The image data is transmitted from the quality unit 90 to the image processor 92. As is known in the art, the optical scanners can additionally scan specified fields on the faces of the document. For example, when processing checks, the scan head may search for the "$" symbol as a coordinate to the left of the numeric check amount field box. As is known in the art, a straight coordinate system or dimension system is used where known dimensions of the box are used to locate the field. Also, when scanning currency, the system searches for the serial numbers printed at defined locations which the image processor 92 can locate. The processor 92 can be programmed to locate fields for various types of currency and perform processing as follows. Based on scanning certain areas on the currency or document, the processor 92 first identifies the type of currency, for example, U.S. bank notes. Then, based on the outcome of the previous step, certain fields of interest are located, and the information stored for use by the system. The processor 92 may also compresses the image data, as is known in the art, in preparation for transmission to an outside location.

The amount of image data per document may vary depending upon the size and nature of the document and the efficiency of the data compression and reduction for that particular document. To insure that no data is lost in the event that the volume of image data may temporally exceed the transfer capacity of the high speed data channel, a prechannel buffer 94 interposed prior to the data channel, which is connected to the controller 10. The capacity of the pre-channel buffer 94 is continually monitored by the controller 10 so that appropriate action may be taken if the buffer becomes overloaded. The compressed video image data is received by the controller 10 over a high-speed data channel 96 and is initially routed to temporary storage. The image buffer is preferably of a size capable of storing the image data from at least several batches or runs of checks or similar documents. The controller 10 in the full image scanner performs the functions of analyzing the data. Alternatively, as discussed above, analysis of the data can occur at the central office computer 15 or at a personal computer 11 attached to the system.

The personal computer or alternate means may be used to create images of documents that are electronic images only, without scanning documents. For example, the EDGE system by Cummins-Allison corporation could be used. In such a system, computer software electronically creates an image of a document such as a check. A special printer (not shown) is connected to the system to print documents with special fields such as magnetic ink fields.

A plurality of document processing systems may be connected in a "hub and spokes" network architecture as is known in the art. In order to prevent congestion, the image buffer on each document processing system stores data until polled by the central office computer or outside accounting system. When polled, the data is uploaded to the central office computer or accounting system.

Other scanning modules and methods can be used in place or in addition to the particular one described above. These include CCD array systems, multi-cell arrays and other well-known scanning techniques. Examples of these techniques and devices are described in U.S. Pat. Nos. 5,023,782; 5,237,158; 5,187,750; and U.S. Pat. No. 4,205,780 all of which are incorporated by reference in their entirety. The scanning module can also be a color image scanner such as the type described in U.S. Pat. No. 5,335,292 which is incorporated by reference in its entirety.

The discrimination and authentication unit may contain a single or multiple head scanner. Before explaining such a multiple head scanner, the operation of a scanner having a single scanhead is first described. In particular, a currency discrimination system adapted to U.S. currency is described in connection with FIGS. 4a-4d. Subsequently, modifications to such a discrimination and authentication unit will be described in obtaining a currency discrimination and authentication unit in accordance with the present invention. Furthermore, while the embodiments of the discrimination and authentication unit described below entail the scanning of currency bills, the discrimination and authentication unit of the present invention is applicable to other documents as well. For example, the system of the present invention may be employed in conjunction with stock certificates, checks, bonds, and postage and food stamps, and all other financial institution documents.

Figure 4A:
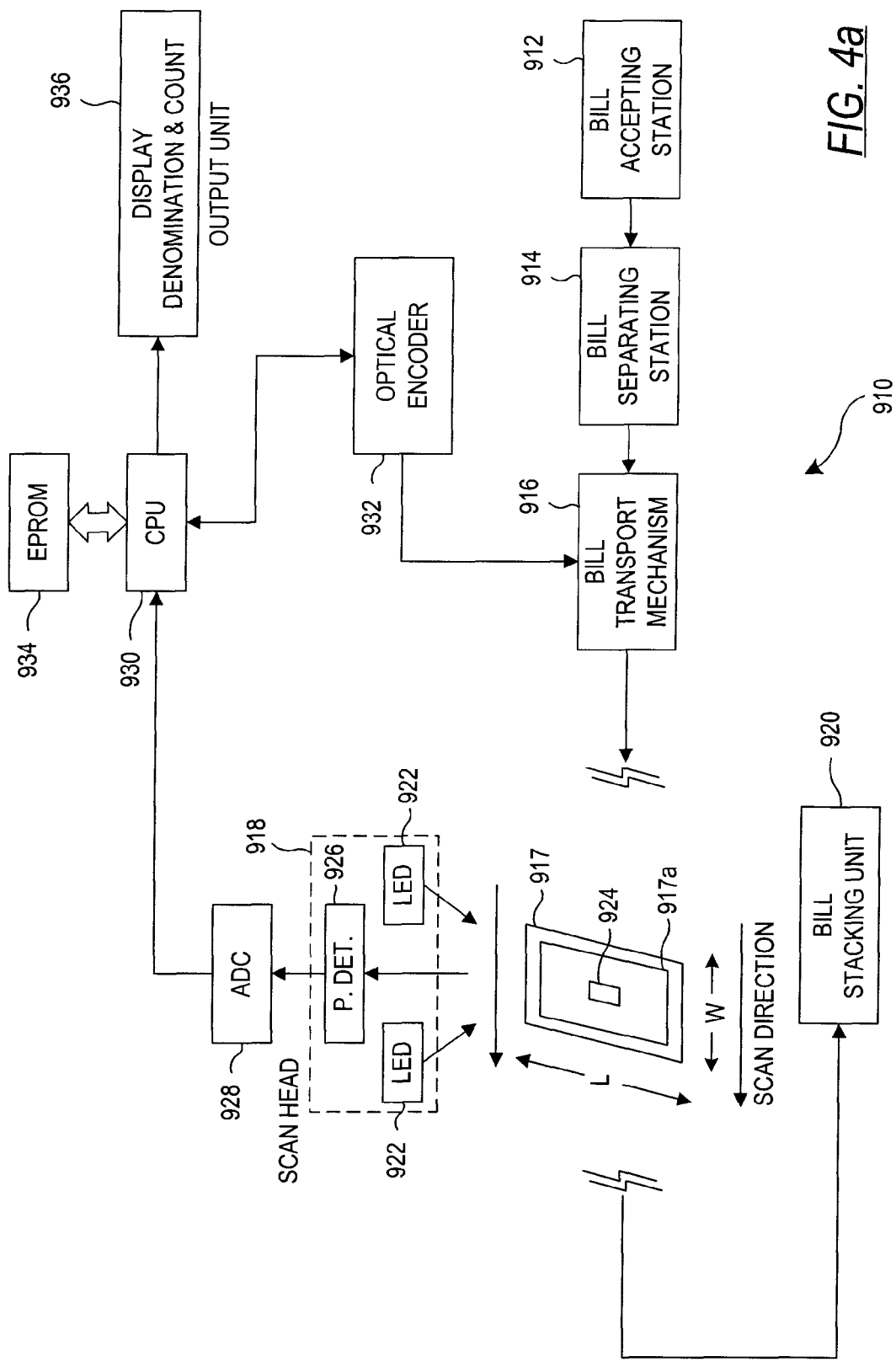
FIG. 4a is a block diagram of the discrimination unit according to principles of the present invention.

Referring now to FIG. 4a, there is shown a functional block diagram illustrating a currency discriminating unit having a single scanhead. The unit 910 includes a bill accepting station 912 where stacks of currency bills that need to be identified and counted are positioned by the transport mechanism. Accepted bills are acted upon by a bill separating station 914 which functions to pick out or separate one bill at a time for being sequentially relayed by a bill transport mechanism 916, according to a precisely predetermined transport path, across scanhead 918 where the currency denomination of the bill is scanned and identified. Scanhead 918 is an optical scanhead that scans for characteristic information from a scanned bill 917 which is used to identify the denomination of the bill. The scanned bill 917 is then transported to a bill stacking station 920 where bills so processed are stacked for subsequent removal.

The optical scanhead 918 of FIG. 4a comprises at least one light source 922 directing a beam of coherent light downwardly onto the bill transport path so as to illuminate a substantially rectangular light strip 924 upon a currency bill 917 positioned on the transport path below the scanhead 918. Light reflected off the illuminated strip 924 is sensed by a photodetector 926 positioned directly above the strip. The analog output of photodetector 926 is converted into a digital signal by means of an analog-to-digital (ADC) converter unit 928 whose output is fed as a digital input to a central processing unit (CPU) 930.

While scanhead 918 of FIG. 4a is an optical scanhead, it should be understood that it may be designed to detect a variety of characteristic information from currency bills. Additionally, the scanhead may employ a variety of detection means such as magnetic, optical, electrical conductivity, and capacitive sensors. Use of such sensors is discussed in more detail below, for example, in connection with FIG. 15.

Referring again to FIG. 4a, the bill transport path is defined in such a way that the transport mechanism 916 moves currency bills with the narrow dimension of the bills being parallel to the transport path and the scan direction. Alternatively, the system 910 may be designed to scan bills along their long dimension or along a skewed dimension. As a bill 917 moves on the transport path on the scanhead 918, the coherent light strip 924 effectively scans the bill across the narrow dimension of the bill. As depicted, the transport path is so arranged that a currency bill 917 is scanned by scanhead 918 approximately about the central section of the bill along its narrow dimension, as shown in FIG. 4a. The scanhead 918 functions to detect light reflected from the bill as it moves across the illuminated light strip 924 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the discrimination unit of this invention is programmed to handle.

A series of such detected reflectance signals are obtained across the narrow dimension of the bill, or across a selected segment thereof, and the resulting analog signals are digitized under control of the CPU 930 to yield a fixed number of digital reflectance data samples. The data samples are then subjected to a digitizing process which includes a normalizing routine for processing the sampled data for improved correlation and for smoothing out variations due to contrast fluctuations in the printed pattern existing on the bill surface. The normalized reflectance data so digitized represents a characteristic pattern that is fairly unique for a given bill denomination and provides sufficient distinguishing features among characteristic patterns for different currency denominations. This process is more fully explained in U.S. patent application Ser. No. 07/885,648, filed on May 19, 1992, now issued as U.S. Pat. No. 5,295,196 for a "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 930 by means of an optical encoder 932 which is linked to the bill transport mechanism 916 and precisely tracks the physical movement of the bill 917 across the scanhead 918. More specifically, the optical encoder 932 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanhead 918. Under these conditions, the optical encoder 932 is capable of precisely tracking the movement of the bill 917 relative to the light strip 924 generated by the scanhead 918 by monitoring the rotary motion of the drive motor.

The output of photodetector 926 is monitored by the CPU 930 to initially detect the presence of the bill underneath the scanhead 918 and, subsequently, to detect the starting point of the printed pattern on the bill, as represented by the thin borderline 917A which typically encloses the printed indicia on currency bills. Once the borderline 917A has been detected, the optical encoder 932 is used to control the timing and number of reflectance samples that are obtained from the output of the photodetector 926 as the bill 917 moves across the scanhead 918 and is scanned along its narrow dimension.

The use of the optical encoder 932 for controlling the sampling process relative to the physical movement of a bill 917 across the scanhead 918 is also advantageous in that the encoder 932 can be used to provide a predetermined delay following detection of the borderline prior to initiation of samples. The encoder delay can be adjusted in such a way that the bill 917 is scanned only across those segments along its narrow dimension which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed since the borderline 917A has been detected, thereby restricting the scanning to the desired central portion of the narrow dimension of the bill.

Figure 4B:
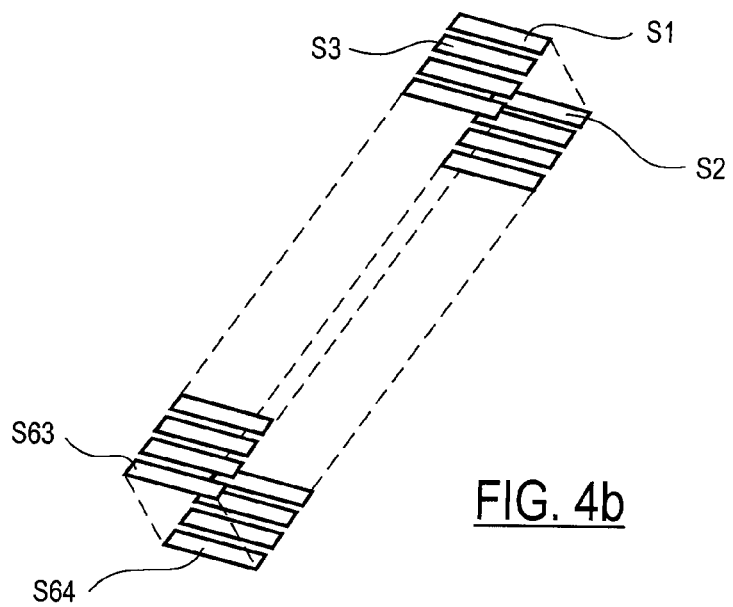
FIGS. 4b-4d illustrate the scanning process of the discrimination unit according to principles of the present invention.
Figure 4C:
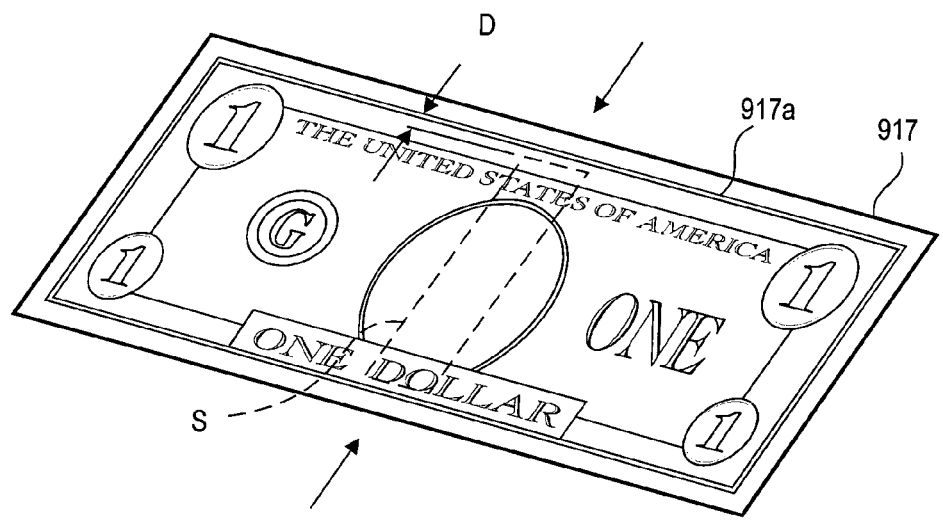
Figure 4D:
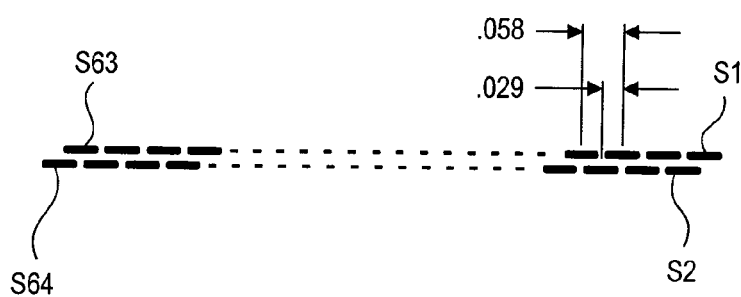

FIGS. 4b-4d illustrate the scanning process of scanhead 920 in more detail. Referring to FIG. 4b, as a bill 917 is advanced in a direction parallel to the narrow edges of the bill, scanning via a wide slit in the scanhead 918 is effected along a segment S of the central portion of the bill 917. This segment S begins a fixed distance D inboard of the borderline 917A. As the bill 917 traverses the scanhead 918, a strip s of the segment S is always illuminated, and the photodetector 926 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead 918.

As illustrated in FIGS. 4b and 4d, it is preferred that the sampling intervals be selected so that the strips s that are illuminated for successive samples overlap one another. The odd-numbered and even-numbered sample strips have been separated in FIGS. 4b and 4d to more clearly illustrate this overlap. For example, the first and second strips s1 and s2 overlap each other, the second and third strips s2 and s3 overlap each other, and so on. Each adjacent pair of strips overlap each other. For U.S. currency, this is accomplished by sampling strips that are 0.050 inch (0.127 cm) wide at 0.029 inch (0.074 cm) intervals, along a segment S that is 1.83 inch (4.65 cm) long (64 samples).

The optical sensing and correlation technique is based upon using the above process to generate a series of stored intensity signal patterns using genuine bills for each denomination of currency that is to be detected. According to one embodiment, two or four sets of master intensity signal samples are generated and stored within system memory, preferably in the form of an EPROM 934 (see FIG. 4a), for each detectable currency denomination. The sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of bills from other countries. Additionally, the optical scanning may be performed on both sides of a bill, for example, by placing a scanhead on each side of the bill transport path as described in more detail in U.S. patent application Ser. No. 08/207,592 filed Mar. 8, 1994, for a "Method and Apparatus for Currency Discrimination," now issued as U.S. Pat. No. 5,467,406, and incorporated herein by reference.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2 and the $10 bill in U.S. currency, it is preferred to store two patterns for each of the "forward" and "reverse" directions, each pair of patterns for the same direction represent two scan areas that are slightly displaced from each other along the long dimension of the bill. Accordingly, a set of a number of different master characteristic patterns is stored within the system memory for subsequent correlation purposes. Once the master patterns have been stored, the pattern generated by scanning a bill under test is compared by the CPU 930 with each of the master patterns of stored intensity signal samples to generate, for each comparison, a correlation number representing the extent of correlation, i.e., similarity between corresponding ones of the plurality of data samples, for the sets of data being compared. In the case of checks, the system compares the image signature to a stored master signature or to an account number.

The CPU 930 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such a method is disclosed in U.S. Pat. No. 5,295,196 referred to above. If a "positive" call can not be made for a scanned bill, an error signal is generated.

Using the above sensing and correlation approach, the CPU 930 is programmed to count the number of bills belonging to a particular currency denomination as part of a given set of bills that have been scanned for a given scan batch, and to determine the aggregate total of the currency amount represented by the bills scanned during a scan batch. The CPU 930 is also linked to an output unit 936 (FIG. 4a) which is adapted to provide a display of the number of bills counted, the breakdown of the bills in terms of currency denomination, and the aggregate total of the currency value represented by counted bills. The output unit 936 can also be adapted to provide a print-out of the displayed information in a desired format.

A procedure for scanning bills and generating characteristic patterns is described in U.S. Pat. No. 5,295,196 referred to above and incorporated by reference in its entirety and U.S. patent application Ser. No. 08/243,807, filed on May 16, 1994 and entitled "Method and Apparatus for Currency Discrimination", now issued as U.S. Pat. No. 5,633,949.

The optical sensing and correlation technique described in U.S. Pat. No. 5,295,196 permits identification of pre-programmed currency denominations with a high degree of accuracy and is based upon a relatively short processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

Now that a single scanhead currency scanner has been described in connection with scanning U.S. currency, a currency discrimination unit according to an embodiment of the present invention will be described. In particular, a discrimination unit that can accommodate bills, checks, or any financial institution document of non-uniform size and/or color will be described.

Figure 4E:
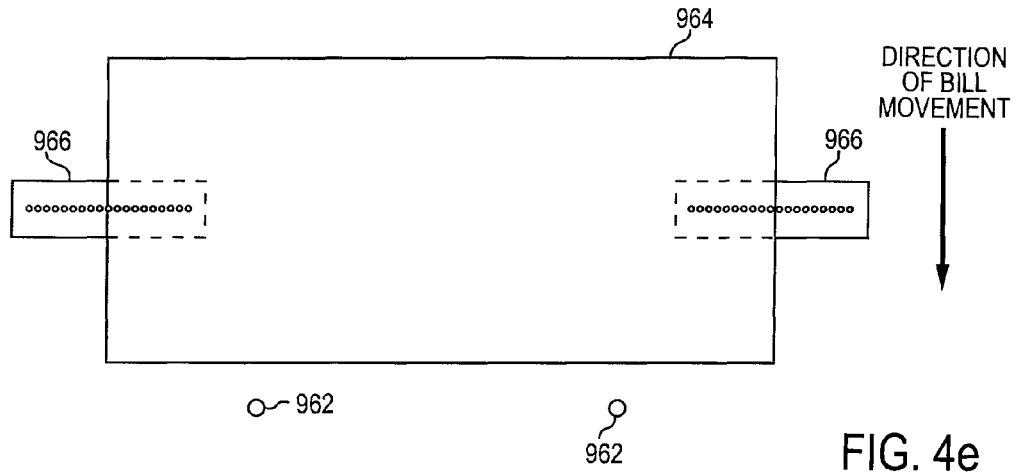
FIG. 4e illustrates one embodiment of size determining sensors.

First of all, because currencies come in a variety of sizes, sensors are added to determine the size of a bill to be scanned. These sensors are placed upstream of the scanheads to be described below. One embodiment of size determining sensors is illustrated in FIG. 4e. Two leading/trailing edge sensors 962 detect the leading and trailing edges of a bill 964 as it passing along the transport path. These sensors in conjunction with the encoder 932 (FIG. 4a) may be used to determine the dimension of the bill along a direction parallel to the scan direction which in FIG. 4e is the narrow dimension (or width) of the bill 964. Additionally, two side edge sensors 966 are used to detect the dimension of a bill 964 transverse to the scan direction which in FIG. 4e is the wide dimension (or length) of the bill 964. While the sensors 962 and 966 of FIG. 4e are optical sensors, any means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 4F:
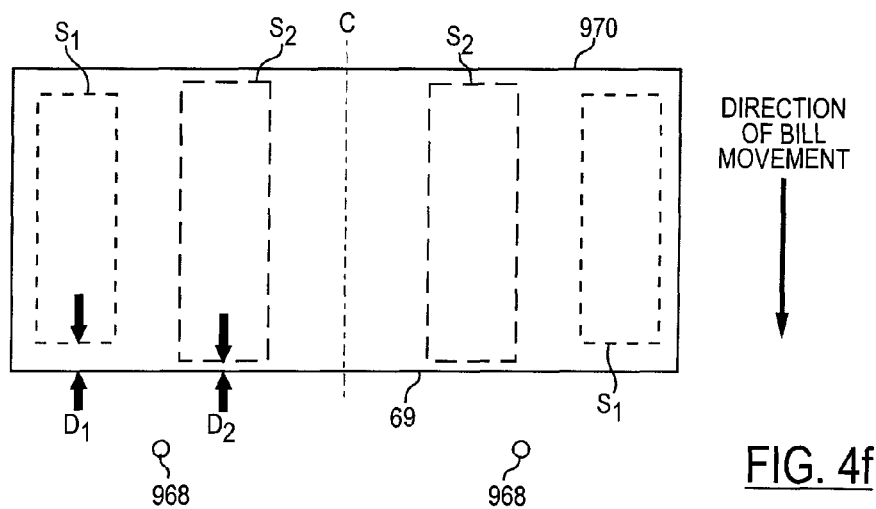
FIG. 4f illustrates the operation of the scanning process in the discrimination unit according to principles of the present invention.

Secondly, while the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 4f, two leading edge detectors 968 are shown. The detection of the leading edge 69 of a bill 970 by leading edge sensors 968 triggers scanning in an area a given distance away from the leading edge of the bill 970, e.g., $D_1$ or $D_2$, which may vary depending upon the preliminary indication of the identity of a bill based on the dimensions of a bill. Alternatively, the leading edge 69 of a bill may be detected by one or more of the scanheads (to be described below). Alternatively, the beginning of scanning may be triggered by positional information provided by the encoder 932 of FIG. 4a, for example, in conjunction with the signals provided by sensors 962 of FIG. 4e, thus eliminating the need for leading edge sensors 968.

Figure 5A:
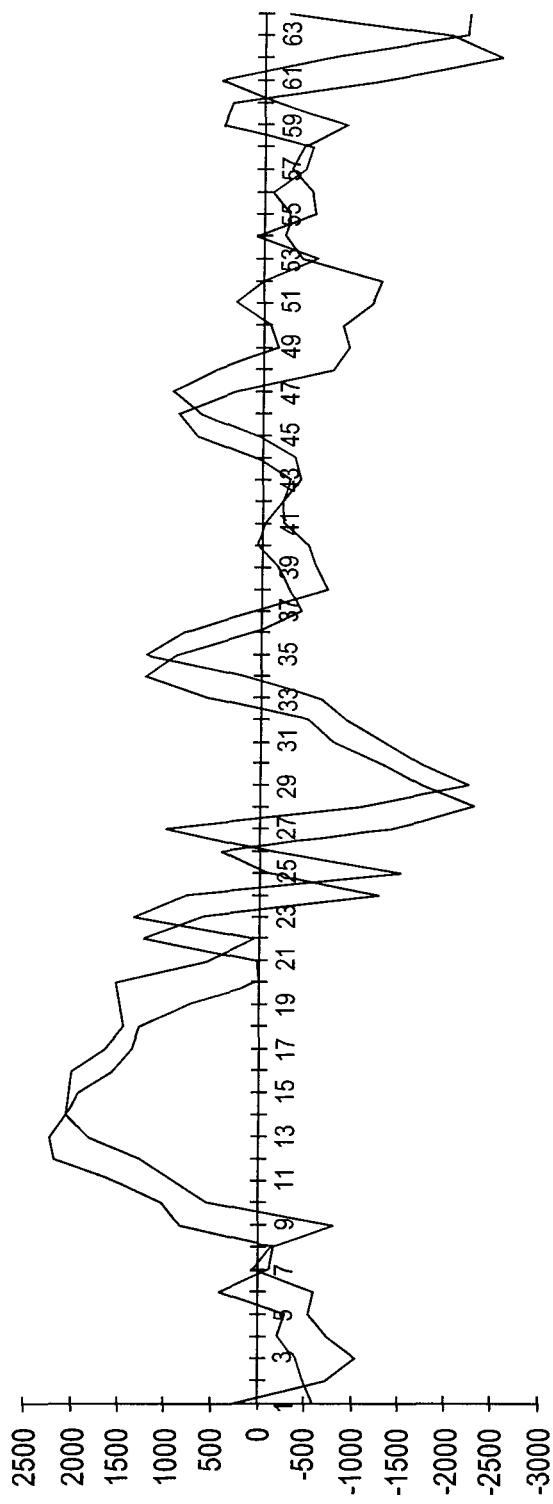
FIGS. 5a and 5b are graphs illustrating the correlation of scanned and master patterns according to principles of the present invention.
Figure 5B:
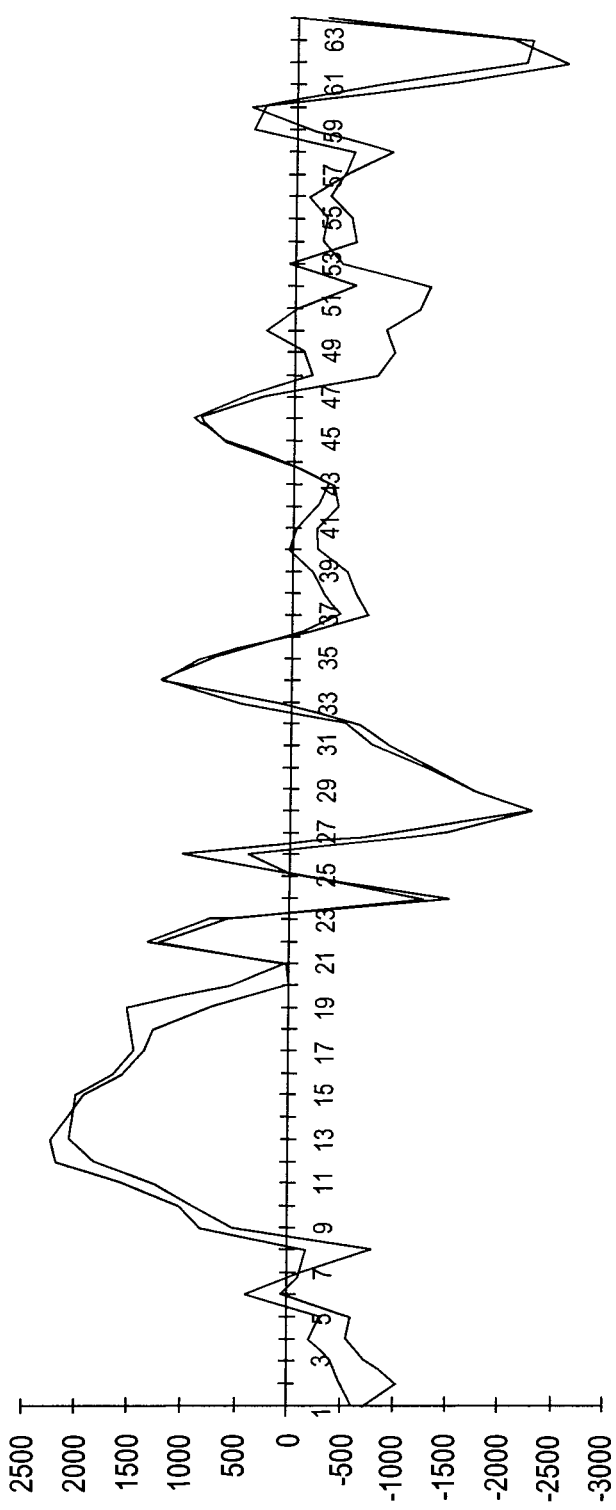

However, when the initiation of scanning is triggered by the detection of the leading edge of a bill, the chance that a scanned pattern will be offset relative to a corresponding master pattern increases. Offsets can result from the existence of manufacturing tolerances which permit the location of printed indicia of a document to vary relative to the edges of the document. For example, the printed indicia on U.S. bills may vary relative to the leading edge of a bill by as much as 50 mils which is 0.05 inches (1.27 mm). Thus when scanning is triggered relative to the edge of a bill (rather than the detection of a certain part of the printed indicia itself, such as the printed borderline of U.S. bills), a scanned pattern can be offset from a corresponding master pattern by one or more samples. Such offsets can lead to erroneous rejections of genuine bills due to poor correlation between scanned and master patterns. To compensate, overall scanned patterns and master patterns can be shifted relative to each other as illustrated in FIGS. 5a and 5b. More particularly, FIG. 5a illustrates a scanned pattern which is offset from a corresponding master pattern. FIG. 5b illustrates the same patterns after the scanned pattern is shifted relative to the master pattern, thereby increasing the correlation between the two patterns. Alternatively, instead of shifting either scanned patterns or master patterns, master patterns may be stored in memory corresponding to different offset amounts.

Thirdly, while it has been determined that the scanning of the central area on the green side of a U.S. bill (see segment S of FIG. 4c) provides sufficiently distinct patterns to enable discrimination among the plurality of U.S. denominations, the central area may not be suitable for bills originating in other countries. For example, for bills originating from Country 1, it may be determined that segment $S_1$ (FIG. 4f) provides a more preferable area to be scanned, while segment $S_2$ (FIG. 4f) is more preferable for bills originating from Country 2. Alternatively, in order to sufficiently discriminate among a given set of bills, it may be necessary to scan bills which are potentially from such set along more than one segment, e.g., scanning a single bill along both $S_1$ and $S_2$.

Figure 6:
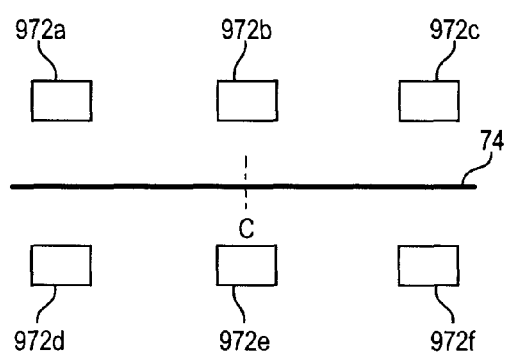
FIG. 6 illustrates a multiple scanhead according to principles of the present invention.

To accommodate scanning in areas other than the central portion of a bill, multiple scanheads may be positioned next to each other. One embodiment of such a multiple scanhead system is depicted in FIG. 6. Multiple scanheads 972a-c and 972d-f are positioned next to each other along a direction lateral to the direction of bill movement. Such a system permits a bill 74 to be scanned along different segments. Multiple scanheads 972a-f are arranged on each side of the transport path, thus permitting both sides of a bill 74 to be scanned.

Two-sided scanning may be used to permit bills to be fed into a currency discrimination unit according to the present invention with either side face up. An example of a two-sided scanhead arrangement is disclosed in U.S. patent application Ser. No. 08/207,592 filed on Mar. 8, 1994 and issued as U.S. Pat. No. 5,467,406 and incorporated herein by reference. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is disclosed in U.S. Pat. No. 5,467,406. The implementation of color sensing is discussed in more detailed below.

According to the embodiment of FIG. 6, the bill transport mechanism operates in such a fashion that the central area C of a bill 74 is transported between central scanheads 972$b$ and 972$e$. Scanheads 972$a$ and 972$c$ and likewise scanheads 972$d$ and 972$f$ are displaced the same distance from central scanheads 972$b$ and 972$e$, respectively. By symmetrically arranging the scanheads about the central region of a bill, a bill may be scanned in either direction, e.g., top edge first (forward direction) or bottom edge first (reverse direction). As described above with respect to FIG. 4$a$, master patterns are stored from the scanning of genuine bills in both the forward and reverse directions. While a symmetrical arrangement is preferred, it is not essential provided appropriate master patterns are stored for a non-symmetrical system.

Figure 7:
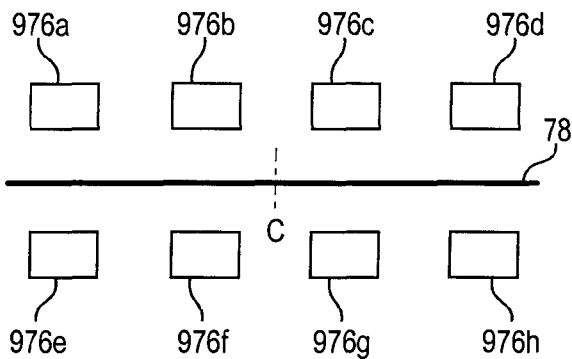
FIG. 7 illustrates another embodiment of the multiple scanheads according to principles of the present invention.

While FIG. 6 illustrates a system having three scanheads per side, any number of scanheads per side may be utilized. Likewise, it is not necessary that there be a scanhead positioned over the central region of a bill. For example, FIG. 7 illustrates another embodiment of the present invention capable of scanning the segments $S_1$ and $S_2$ of FIG. 4$f$. Scanheads 976$a$, 976$d$, 976$e$, and 976$h$ scan a bill 78 along segment $S_1$ while scanheads 976$b$, 976$c$, 976$f$, and 976$g$ scan segment $S_2$.

Figure 8:
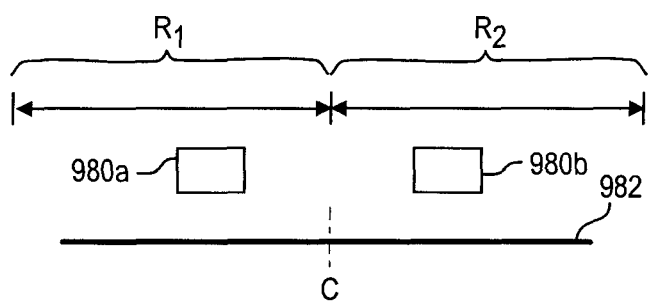
FIG. 8 depicts another embodiment of the scanning system according to principles of the present invention.

FIG. 8 depicts another embodiment of a scanning system according to the present invention having laterally moveable scanheads 980$a$-$b$. Similar scanheads may be positioned on the opposite side of the transport path. Moveable scanheads 980$a$-$b$ may provide more flexibility that may be desirable in certain scanning situations. Upon the determination of the dimensions of a bill as described in connection with FIG. 4$e$, a preliminary determination of the identity of a bill may be made. Based on this preliminary determination, the moveable scanheads 980$a$-$b$ may be positioned over the area of the bill which is most appropriate for retrieving discrimination information. For example, if based on the size of a scanned bill, it is preliminarily determined that the bill is a Japanese 5000 Yen bill-type, and if it has been determined that a suitable characteristic pattern for a 5000 Yen bill-type is obtained by scanning a segment 2.0 cm to the left of center of the bill fed in the forward direction, scanheads 980$a$ and 980$b$ may be appropriately positioned for scanning such a segment, e.g., scanhead 980$a$ positioned 2.0 cm left of center and scanhead 980$b$ positioned 2.0 cm right of center. Such positioning permits proper discrimination regardless of the whether the scanned bill is being fed in the forward or reverse direction. Likewise scanheads on the opposite side of the transport path (not shown) could be appropriately positioned. Alternatively, a single moveable scanhead may be used on one or both sides of the transport path. In such a system, size and color information (to be described in more detail below) may be used to properly position a single laterally moveable scanhead, especially where the orientation of a bill may be determined before scanning.

FIG. 8, depicts a unit in which the transport mechanism is designed to deliver a bill 982 to be scanned centered within the area in which scanheads 980$a$-$b$ are located. Accordingly, scanheads 980$a$-$b$ are designed to move relative to the center of the transport path with scanhead 980$a$ being moveable within the range $R_1$ and scanhead 980$b$ being moveable within range $R_2$.

Figure 9:
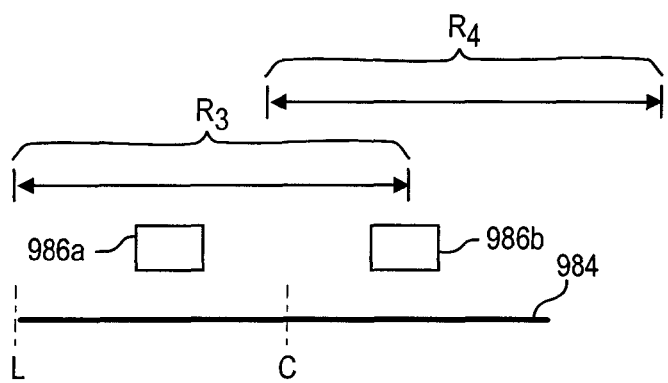
FIG. 9 depicts another embodiment of the scanning system according to principles of the present invention.

FIG. 9 depicts another embodiment of a scanning system according to the present invention wherein bills to be scanned are transported in a left justified manner along the transport path, that is wherein the left edge L of a bill 984 is positioned in the same lateral location relative to the transport path. Based on the dimensions of the bill, the position of the center of the bill may be determined and the scanheads 986$a$-$b$ may in turn be positioned accordingly. As depicted in FIG. 9, scanhead 986$a$ has a range of motion $R_3$ and scanhead 986$b$ has a range of motion $R_4$. The ranges of motion of scanheads 986$a$-$b$ may be influenced by the range of dimensions of bills which the discrimination unit is designed to accommodate. Similar scanheads may be positioned on the opposite side of the transport path.

Alternatively, the transport mechanism may be designed such that scanned bills are not necessarily centered or justified along the lateral dimension of the transport path. Rather the design of the transport mechanism may permit the position of bills to vary left and right within the lateral dimension of the transport path. In such a case, the edge sensors 966 of FIG. 4$e$ may be used to locate the edges and center of a bill, and thus provide positional information in a moveable scanhead system and selection criteria in a stationary scanhead system.

Figure 10:
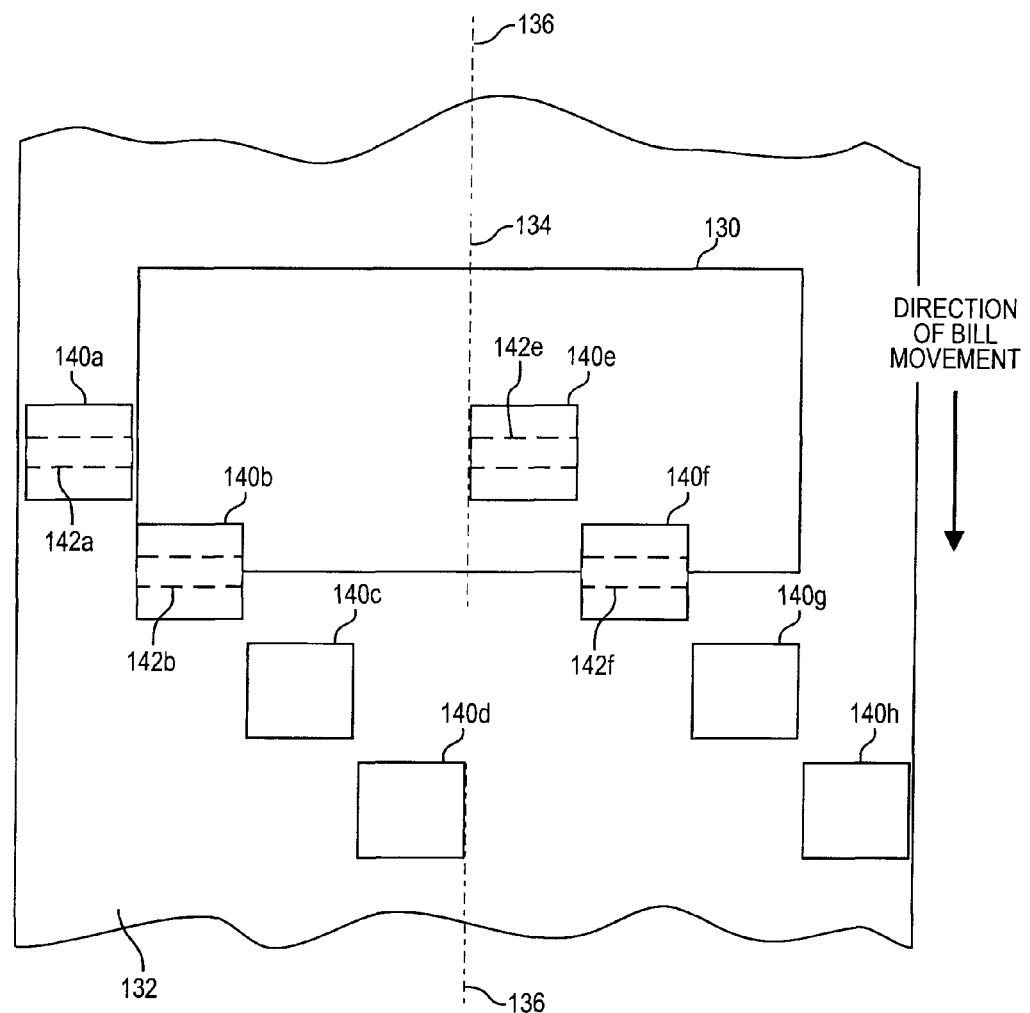
FIG. 10 is a top view of a staggered scanhead arrangement according to principles of the present invention.

In addition to the stationary scanhead and moveable scanhead systems described above, a hybrid system having both stationary and moveable scanheads may be used. Likewise, it should be noted that the laterally displaced scanheads described above need not lie along the same lateral axis. That is, the scanheads may be, for example, staggered upstream and downstream from each other. FIG. 10 is a top view of a staggered scanhead arrangement according to one embodiment of the present invention. As illustrated in FIG. 10, a bill 130 is transported in a centered manner along the transport path 132 so that the center 134 of the bill 130 is aligned with the center 136 of the transport path 132. Scanheads 140$a$-$h$ are arranged in a staggered manner so as to permit scanning of the entire width of the transport path 132. The areas illuminated by each scanhead are illustrated by strips 142$a$, 142$b$, 142$e$, and 142$f$ for scanheads 140$a$, 140$b$, 140$e$, and 140$f$, respectively. Based on size determination sensors, scanheads 140$a$ and 140$h$ may either not be activated or their output ignored.

In general, if prior to scanning a document, preliminary information about a document can be obtained, such as its size or color, appropriately positioned stationary scanheads may be activated or laterally moveable scanheads may be appropriately positioned provided the preliminary information provides some indication as to the potential identity of the document. Alternatively, especially in systems having scanheads positioned over a significant portion of the transport path, many or all of the scanheads of a system may be activated to scan a document. Then subsequently, after some preliminary determination as to a document's identity has been made, only the output or derivations thereof of appropriately located scanheads may be used to generate scanned patterns. Derivations of output signals include, for example, data samples stored in memory generated by sampling output signals. Under such an alternative embodiment, information enabling a preliminary determination as to a document's identity may be obtained by analyzing information either from sensors separate from the scanheads or from one or more of the scanheads themselves. An advantage of such preliminary determinations is that the number of scanned patterns which have to be generated or compared to a set of master patterns is reduced. Likewise the number of master patterns to which scanned patterns must be compared may also be reduced.

While the scanheads 140a-h of FIG. 10 are arranged in a non-overlapping manner, they may alternatively be arranged in an overlapping manner. By providing additional lateral positions, an overlapping scanhead arrangement may provide greater selectivity in the segments to be scanned. This increase in scanable segments may be beneficial in compensating for currency manufacturing tolerances which result in positional variances of the printed indicia on bills relative to their edges. Additionally, in one embodiment, scanheads positioned above the transport path are positioned upstream relative to their corresponding scanheads positioned below the transport path.

In addition to size and scanned characteristic patterns, color may also be used to discriminate bills. For example, while all U.S. bills are printed in the same colors, e.g., a green side and a black side, bills from other countries often vary in color with the denomination of the bill. For example, a German 50 deutsche mark bill-type is brown in color while a German 100 deutsche mark bill-type is blue in color. Alternatively, color detection may be used to determine the face orientation of a bill, such as where the color of each side of a bill varies. For example, color detection may be used to determine the face orientation of U.S. bills by detecting whether or not the "green" side of a U.S. bill is facing upwards. Separate color sensors may be added upstream of the scanheads described above. According to such an embodiment, color information may be used in addition to size information to preliminarily identify a bill. Likewise, color information may be used to determine the face orientation of a bill which determination may be used to select upper or lower scanheads for scanning a bill accordingly or compare scanned patterns retrieved from upper scanheads with a set of master patterns generated by scanning a corresponding face while the scanned patterns retrieved from the lower scanheads are compared with a set of master patterns generated by scanning an opposing face. Alternatively, color sensing may be incorporated into the scanheads described above. Such color sensing may be achieved by, for example, incorporating color filters, colored light sources, and/or dichroic beamsplitters into the currency discrimination unit of the present invention. Various color information acquisition techniques are described in U.S. Pat. Nos. 4,841,358; 4,658,289; 4,716,456; 4,825,246; and 4,992,860.

Figure 11A:
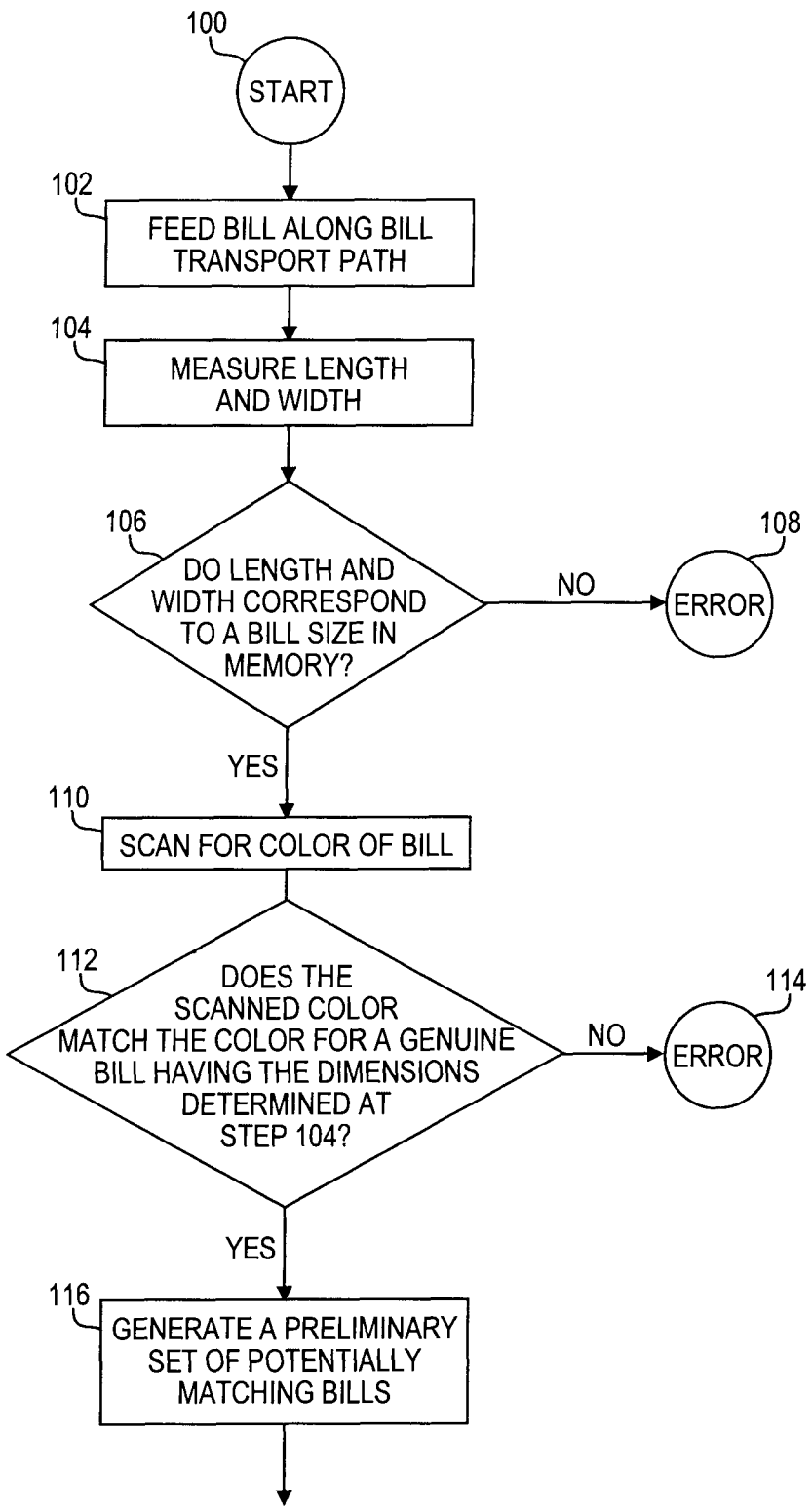
FIGS. 11a and 11b are flowcharts illustrating the operation of the discrimination unit according to principles of the present invention.
Figure 11B:
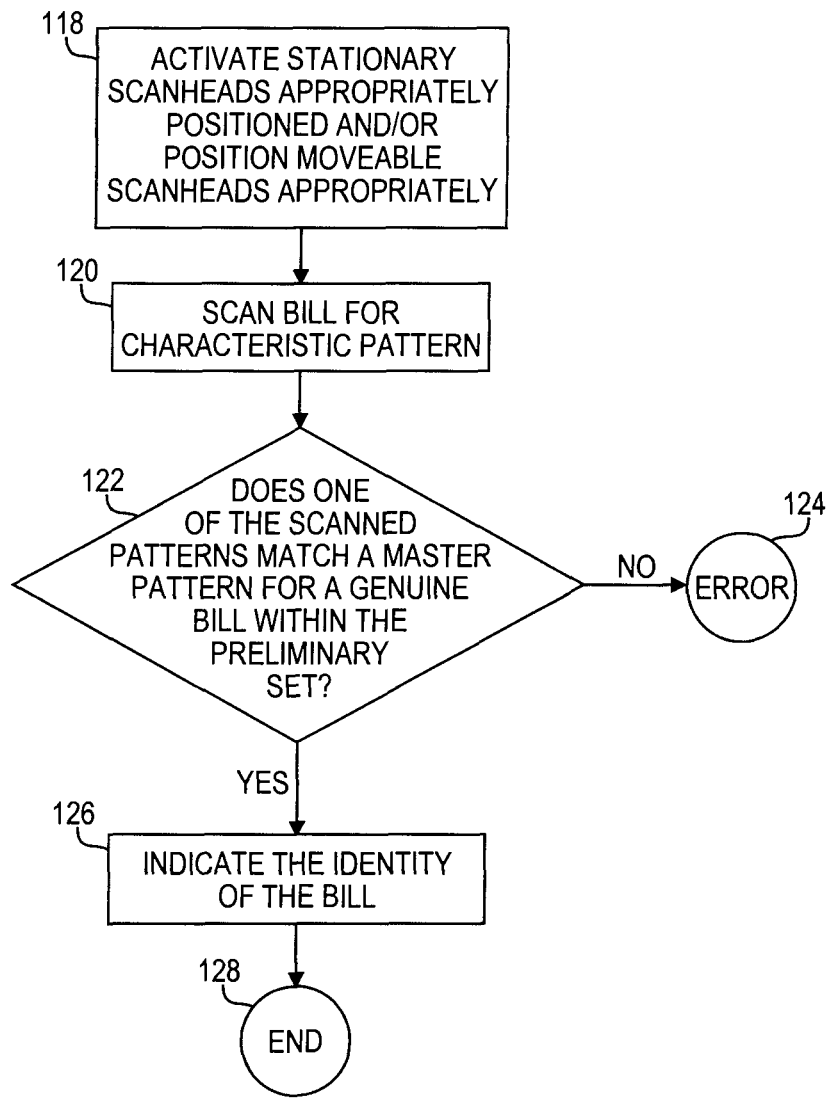

The operation of the currency discrimination unit according to one embodiment of the present invention may be further understood by referring to the flowchart of FIGS. 11a and 11b. In the process beginning at step 100, a bill is fed along a transport path (step 102) past sensors which measure the length and width of the bill (step 104). These size determining sensors may be, for example, those illustrated in FIG. 4e. Next at step 106, it is determined whether the measured dimensions of the bill match the dimensions of at least one bill stored in memory, such as EPROM 960 of FIG. 4e. If no match is found, an appropriate error is generated at step 108. If a match is found, the color of the bill is scanned for at step 110. At step 112, it is determined whether the color of the bill matches a color associated with a genuine bill having the dimensions measured at step 104. An error is generated at step 114 if no such match is found. However, if a match is found, a preliminary set of potentially matching bills is generated at step 116. Often, only one possible identity will exist for a bill having a given color and dimensions. However, the preliminary set of step 116 is not limited to the identification of a single bill-type, that is, a specific denomination of a specific currency system; but rather, the preliminary set may comprise a number of potential bill-types. For example, all U.S. bills have the same size and color. Therefore, the preliminary set generated by scanning a U.S. $5 bill would include U.S. bills of all denominations.

Based on the preliminary set (step 116), selected scanheads in a stationary scanhead system may be activated (step 118). For example, if the preliminary identification indicates that a bill being scanned has the color and dimensions of a German 100 deutsche mark, the scanheads over regions associated with the scanning of an appropriate segment for a German 100 deutsche mark may be activated. Then upon detection of the leading edge of the bill by sensors 968 of FIG. 4f, the appropriate segment may be scanned. Alternatively, all scanheads may be active with only the scanning information from selected scanheads being processed. Alternatively, based on the preliminary identification of a bill (step 116), moveable scanheads may be appropriately positioned (step 118).

Subsequently, the bill is scanned for a characteristic pattern (step 120). At step 122, the scanned patterns produced by the scanheads are compared with the stored master patterns associated with genuine bills as dictated by the preliminary set. By only making comparisons with master patterns of bills within the preliminary set, processing time may be reduced. Thus for example, if the preliminary set indicated that the scanned bill could only possibly be a German 100 deutsche mark, then only the master pattern or patterns associated with a German 100 deutsche mark need be compared to the scanned patterns. If no match is found, an appropriate error is generated (step 124). If a scanned pattern does match an appropriate master pattern, the identity of the bill is accordingly indicated (step 126) and the process is ended (step 128).

While some of the embodiments discussed above entailed a unit capable of identifying a plurality of bill-types, the system may be adapted to identify a bill under test as either belonging to a specific bill-type or not. For example, the unit may be adapted to store master information associated with only a single bill-type such as a United Kingdom 5 £ bill. Such a system would identify bills under test which were United Kingdom 5 £ bills and would reject all other bill-types.

The scanheads of the present invention may be incorporated into the unit and used to identify a variety of documents including currency and financial institution documents such as checks, deposit slips, coupons and food stamps. For example, the unit may be designed to accommodate a number of currencies from different countries. Such a unit may be designed to permit operation in a number of modes. For example, the unit may be designed to permit an operator to select one or more of a plurality of bill-types which the system is designed to accommodate. Such a selection may be used to limit the number of master patterns with which scanned patterns are to be compared. Likewise, the operator may be permitted to select the manner in which bills will be fed, such as all bills face up, all bills top edge first, random face orientation, and/or random top edge orientation. Additionally, the unit may be designed to permit output information to be displayed in a variety of formats to a variety of peripherals, such as a monitor, LCD display, or printer. For example, the unit may be designed to count the number of each specific bill-types identified and to tabulate the total amount of currency counted for each of a plurality of currency systems. For example, a stack of bills could be placed in the bill accepting station 912 of FIG. 4*a*, and the output unit 936 of FIG. 4*a* may indicate that a total of 370 British pounds and 650 German marks were counted. Alternatively, the output from scanning the same batch of bills may provide more detailed information about the specific denominations counted, for example one 100 £ bill, five 50 £ bills, and one 20 £ bill and thirteen 50 deutsche mark bills.

FIG. 12 shows a block diagram of a counterfeit detector 210. A microprocessor 212 controls the overall operation of the counterfeit detector 210. It should be noted that the detailed construction of a mechanism to convey documents through the counterfeit detector 210 is not related to the practice of the present invention. Many configurations are well-known in the prior art. An exemplary configuration includes an arrangement of pulleys and rubber belts driven by a single motor. An encoder 214 may be used to provide input to the microprocessor 212 based on the position of a drive shaft 216, which operates the bill-conveying mechanism. The input from the encoder 214 allows the microprocessor to calculate the position of a document as it travels and to determine the timing of the operations of the counterfeit detector 210.

A stack of documents (not shown) may be deposited in a hopper 218 which holds the documents securely and allows the documents in the stack to be conveyed one at a time through the counterfeit detector 210. After the documents are conveyed to the interior of the counterfeit detector 210, a portion of the document is optically scanned by an optical sensor 220 of the type commonly known in the art. The optical sensor generates signals that correspond to the amount of light reflected by a small portion of the document. Signals from the optical sensor 220 are sent to an amplifier circuit 222, which, in turn, sends an output to an analog-to-digital converter 224. The output of the ADC is read by the microprocessor 212. The microprocessor 212 stores each element of data from the optical sensor 220 in a range of memory locations in a random access memory ("RAM") 226, forming a set of image data that corresponds to the object scanned.

As the document continues its travel through the counterfeit detector 210, it is passed adjacent to a magnetic sensor 228, which detects the presence of magnetic ink. The magnetic sensor 228 desirably makes a plurality of measurements along a path parallel to one edge of the document being examined. For example, the path sensed by the magnetic sensor 228 may be parallel to the shorter edges of the document and substantially through the document's center. The output signal from the magnetic sensor 228 is amplified by an amplifier circuit 230 and digitized by the ADC 224. The digital value of each data point measured by the magnetic sensor 228 is read by the microprocessor 212, whereupon it is stored in a range of memory in the RAM 226. The magnetic sensor 228 is capable of reading and identifying all types of magnetic ink. For instance, the sensor 228 can read "low dispersion" magnetic inks on checks. "Low dispersion" magnetic ink is magnetic ink mixed with color ink and used to print the background of checks as well as the name and address information on the check.

The digitized magnetic data may be mathematically manipulated to simplify its use. For example, the value of all data points may be summed to yield a checksum, which may be used for subsequent comparison to expected values computed from samples of genuine documents. As will be apparent, calculation of a checksum for later comparison eliminates the need to account for the orientation of the document with respect to the magnetic sensor 228. This is true because the checksum represents the concentration of magnetic ink across the entire path scanned by the magnetic sensor 228, regardless of variations caused by higher concentrations in certain regions of the document.

The image data stored in the RAM 226 is compared by the microprocessor 212 to standard image data stored in a read only memory ("ROM") 232. The stored image data corresponds to optical data generated from genuine documents such as currency of a plurality of denominations. The ROM image data may represent various orientations of genuine currency to account for the possibility of a document in the stack being in a reversed orientation compared to other documents in the stack. If the image data generated by the document being evaluated does not fall within an acceptable limit of any of the images stored in ROM, the document is determined to be of an unknown denomination. The machine stops to allow removal of the document from the stack of currency.

If the image data from the document being evaluated corresponds to one of the images stored in the ROM 232, the microprocessor 212 compares the checksum of the magnetic data to one of a plurality of expected checksum values stored in the ROM 232. An expected checksum value is stored for each denomination that is being counted. The value of each expected checksum is determined, for example, by averaging the magnetic data from a number of genuine samples of each denomination of interest. If the value of the measured checksum is within a predetermined range of the expected checksum, the document is considered to be genuine. If the checksum is not within the acceptable range, the operator is signaled that the document is suspect and the operation of the counterfeit detector 210 is stopped to allow its retrieval.

If the document passes both the optical evaluation and the magnetic evaluation, it exits the counterfeit detector 210 to a stacker 234. Furthermore, the counterfeit detector 210 may desirably include the capability to maintain a running total of genuine documents, for example, currency of each denomination.

It should be noted that the magnetic checksum is only compared to the expected checksum for a single denomination (i.e. the denomination that the optical data comparison has indicated). For instance, the only way in which a bill can be classified as genuine is if its magnetic checksum is within an acceptable range for its specific denomination. For a counterfeit bill to be considered genuine by the counterfeit detector of the present invention, it would have to be within an acceptable range in the denomination-discriminating optical comparison and have a distribution of magnetic ink within an acceptable range for its specific denomination.

To summarize the operation of the unit, a stack of documents, for example, bills or checks, is fed by the transport mechanism (element 18 in FIG. 1*a*) into the hopper 218. Each document is transported adjacent to the optical sensor 220, which generates image data corresponding to one side of the document. The document is also scanned by a magnetic sensor 228 and a plurality of data points corresponding to the presence of magnetic ink are recorded by the microprocessor 212. A checksum is generated by adding the total of all magnetic data points. The image data generated by the optical sensor 220 is compared to stored images, for example, images that correspond to a plurality of denominations of currency. When predetermined information such as the denomination of the bill being evaluated has been determined, the checksum is compared to a stored checksum corresponding to a genuine bill of that denomination. The microprocessor 212 generates a signal indicating that the document is genuine or counterfeit depending on whether said data is within a predetermined range of the expected value. Documents exit the counterfeit detector 210 and are accumulated in the stacker 234.

Figure 13:
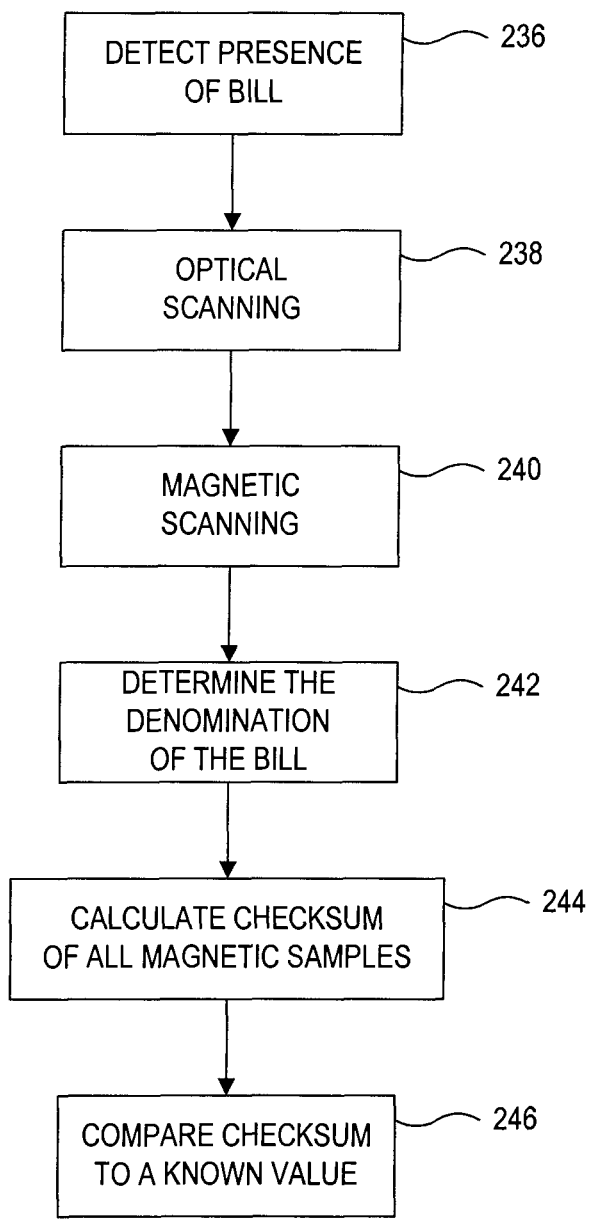
FIG. 13 is a flow diagram of the discrimination unit according to principles of the present invention.

FIG. 13 is a flow diagram of an exemplary discrimination unit according to an embodiment of the present invention. At step 236, the presence of a bill approaching the optical sensor 220 is detected by the microprocessor 212, which initiates an optical scanning operation 238. Image data generated by the optical scanning operation are stored in RAM 226. The number of optical samples taken is not critical to the operation of the present invention, but the probability of accurate classification of the denomination of a bill increases as the number of samples increases.

At step 240, the microprocessor 212 initiates the magnetic scanning operation. The data points obtained by the magnetic scanning operation may be stored in the RAM 226 and added together later to yield a checksum, as shown in step 244. Alternatively, the checksum may be calculated by keeping a running total of the magnetic data values by adding each newly acquired value to the previous total. As with the optical scanning operation, the number of data points measured is not essential, but the chances of accurately identifying a counterfeit bill based on the concentration of magnetic ink improve as the number of samples increases. At step 242, the microprocessor determines the denomination of the bill by comparing the image data to a plurality of known images, each of which corresponds to a specific denomination of currency. The bill is identified as belonging to the denomination corresponding to one of the known scan patterns if the correlation between the two is within an acceptable range. At step 246, the checksum resulting from the summation of the magnetic data points is compared to an expected value for a genuine bill of the denomination identified by the comparison of the image data to the stored data.

The expected value may be determined in a variety of ways. One method is to empirically measure the concentration of magnetic ink on a sample of genuine bills and average the measured concentrations. Another method is to program the microprocessor to periodically update the expected value based on magnetic data measurements of bills evaluated by the counterfeit detector over a period of time.

If the checksum of the bill being evaluated is within a predetermined range of the expected value, the bill is considered to be genuine. Otherwise, the bill is considered to be counterfeit. As will be apparent, the choice of an acceptable variation from the expected checksum determines the sensitivity of the counterfeit detector. If the range chosen is too narrow, the possibility that a genuine bill will be classified as counterfeit is increased. On the other hand, the possibility that a counterfeit bill will be classified as genuine increases if the acceptable range is too broad.

Figure 14:
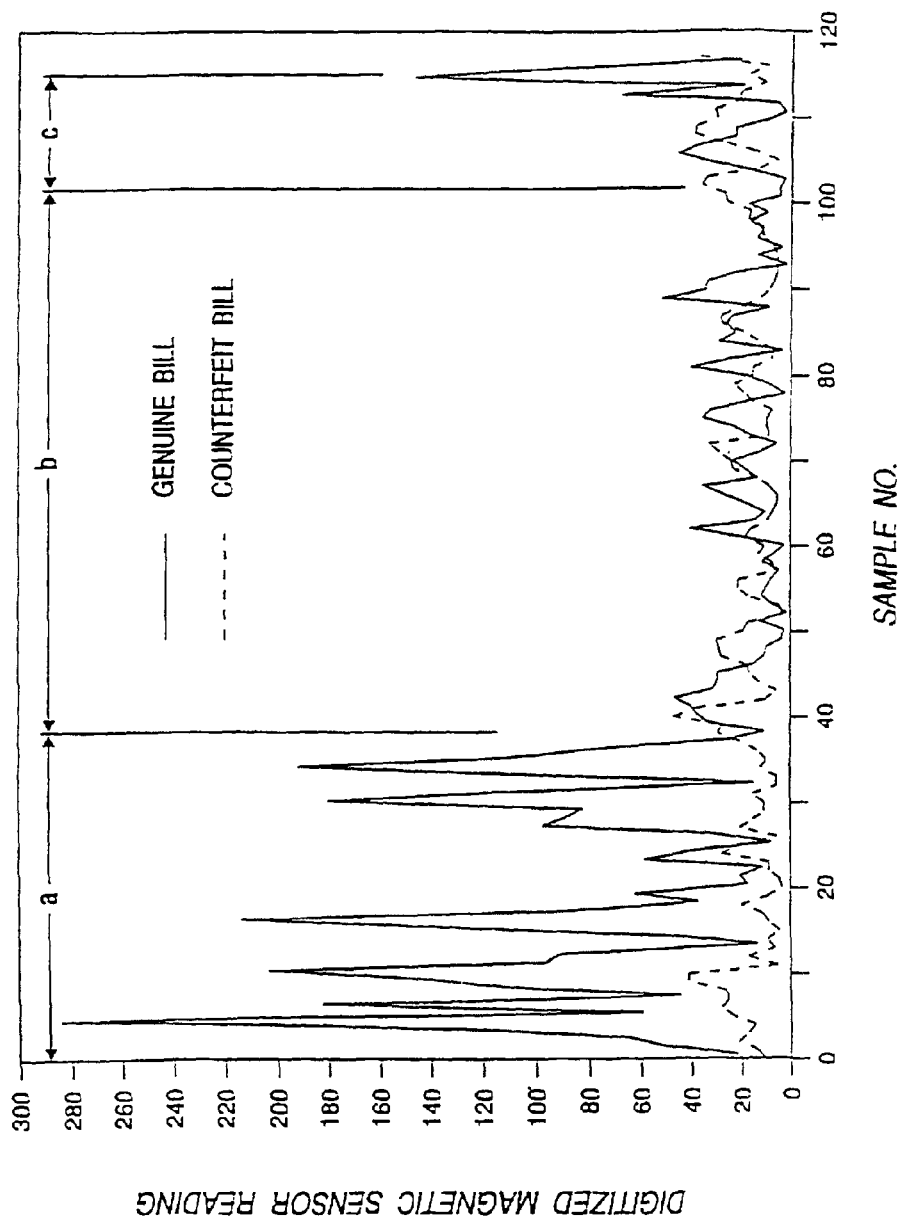
FIG. 14 is a graphical representation of the magnetic data points generated by two types of currency according to principles of the present invention.

FIG. 14 is a graphical representation of the magnetic data points generated by both a genuine pre-1996 series one hundred dollar bill (solid line) and a counterfeit one hundred dollar bill (broken line). As previously noted, bills are desirably scanned along a path that is parallel to one of their short edges. The graph shown in FIG. 14 shows magnetic data obtained by scanning a path passing approximately through the center of the bill. The measurements in the region designated "a" correspond to the area at the top of the bill. The area designated "b" corresponds to the central region of the bill and the region designated "c" corresponds to the bottom of the bill. The magnetic measurements for the genuine bill are relatively high in region a because of the high concentration of magnetic ink near the top of the bill. The concentration of magnetic ink in region b is relatively small and the concentration in region c is generally between the concentrations in regions a and c.

It should be noted that the concentration of magnetic ink in a typical counterfeit bill is uniformly low. Thus, the sum of the all data points for a counterfeit bill is generally significantly lower than for a genuine bill. Nonetheless, as counterfeiting techniques become more sophisticated, the correlation between genuine bills and counterfeits has improved.

The unit described above increases the chances of identifying a counterfeit bill because the denomination of a bill being evaluated is determined prior to the evaluation of the bill for genuineness. The checksum of the bill being evaluated is only compared to the expected checksum for a bill of that denomination. The process of identifying the denomination of the bill prior to evaluating it for genuineness minimizes the chance that a "good" counterfeit will generate a checksum indicative of a genuine bill of any denomination.

Figure 15:
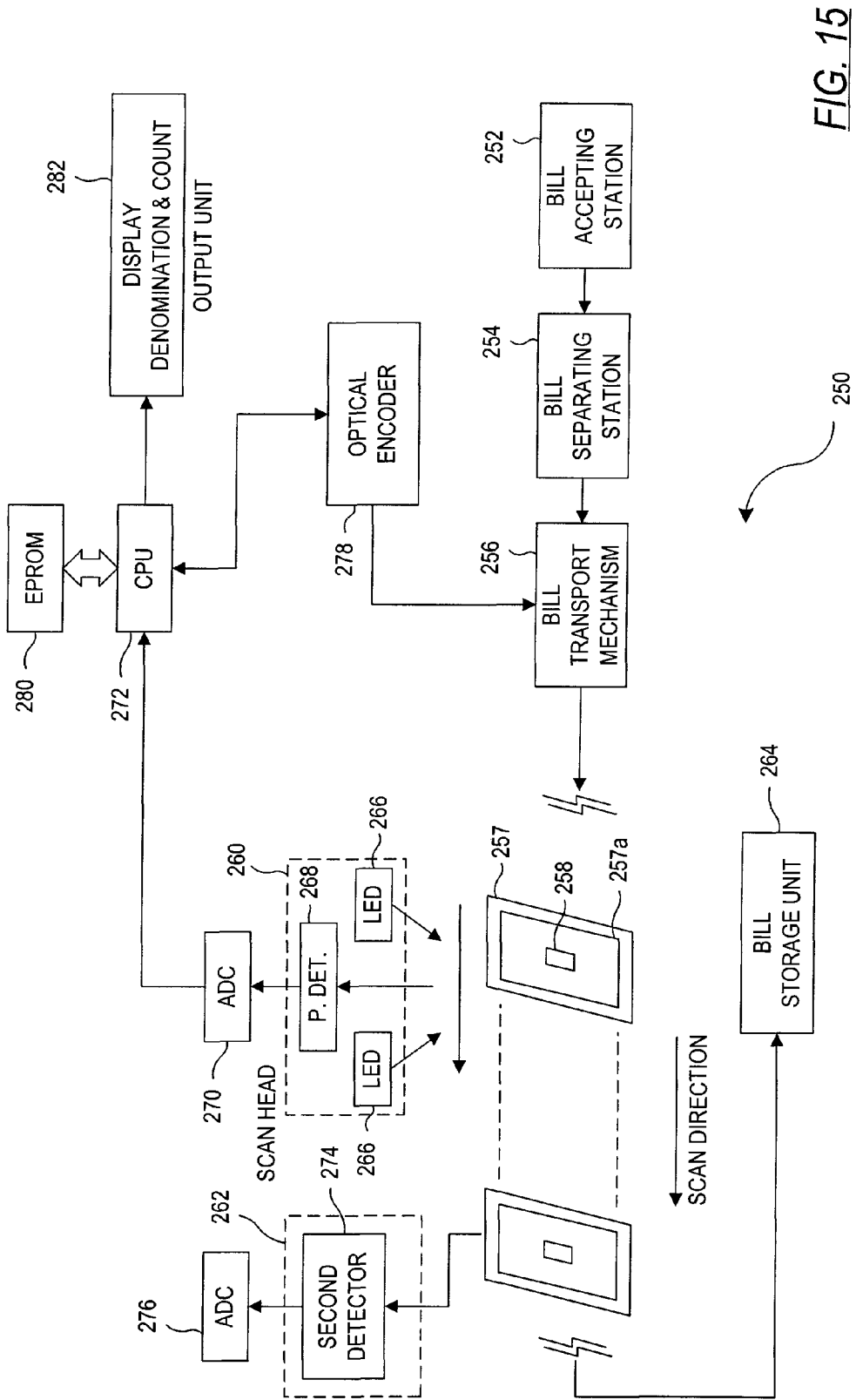
FIG. 15 shows a functional block diagram illustrating one embodiment of the currency discrimination unit according to principles of the present invention.

Referring next to FIG. 15, there is shown a functional block diagram illustrating one embodiment of a discrimination and authentication unit similar to that depicted in FIG. 4a but illustrating the presence of a second detector. The discrimination and authentication unit 250 includes a bill accepting station 252 where stacks of currency bills that need to be identified, authenticated, and counted are positioned. Accepted bills are acted upon by a bill separating station 254 which functions to pick out or separate one bill at a time for being sequentially relayed by a bill transport mechanism 256, according to a precisely predetermined transport path, across two scanheads 260 and 262 where the currency denomination of the bill is identified and the genuineness of the bill is authenticated. In the embodiment depicted, the scanhead 260 is an optical scanhead that scans for a first type of characteristic information from a scanned bill 257 which is used to identify the bill's denomination. The second scanhead 262 scans for a second type of characteristic information from the scanned bill 257. While in the illustrated embodiment scanheads 260 and 262 are separate and distinct, it is understood that these may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992,860 incorporated herein by reference). The scanned bill is then transported to a bill stacking station 264 where bills so processed are stacked for subsequent removal.

The optical scanhead 260 of the embodiment depicted in FIG. 15 comprises at least one light source 266 directing a beam of coherent light downwardly onto the bill transport path so as to illuminate a substantially rectangular light strip 258 upon a currency bill 257 positioned on the transport path below the scanhead 260. Light reflected off the illuminated strip 258 is sensed by a photodetector 268 positioned directly above the strip. The analog output of the photodetector 268 is converted into a digital signal by means of an analog-to-digital (ADC) converter unit 270 whose output is fed as a digital input to a central processing unit (CPU) 272.

The second scanhead 262 comprises at least one detector 274 for sensing a second type of characteristic information from a bill. The analog output of the detector 274 is converted into a digital signal by means of a second analog to digital converter 276 whose output is also fed as a digital input to the central processing unit (CPU) 272.

While scanhead 260 in the embodiment of FIG. 15 is an optical scanhead, it should be understood that the first and second scanheads 260 and 262 may be designed to detect a variety of characteristic information from currency bills. Additionally these scanheads may employ a variety of detection means such as magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as detection of density (U.S. Pat. No. 4,381,447), color (U.S. Pat. Nos. 4,490,846; 3,496, 370; 3,480,785), length and thickness (U.S. Pat. No. 4,255, 651), the presence of a security thread (U.S. Pat. No. 5,151, 607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). An optical sensing system using ultraviolet light is described in the assignee's U.S. patent application Ser. No. 08/317,349, filed Oct. 4, 1994, now issued as U.S. Pat. No. 5,640,463, and incorporated herein by reference, and described below.

In addition to magnetic and optical sensing, other techniques of detecting characteristic information of currency include electrical conductivity sensing, capacitive sensing (U.S. Pat. Nos. 5,122,754 [watermark, security thread]; 3,764,899 [thickness]; 3,815,021 [dielectric properties]; 5,151,607 [security thread]), and mechanical sensing (U.S. Pat. Nos. 4,381,447 [limpness]; 4,255,651 [thickness]).

Referring again to FIG. 15, the bill transport path is defined in such a way that the transport mechanism 256 moves currency bills with the narrow dimension of the bills parallel to the transport path and the scan direction. Alternatively, the system 250 may be designed to scan bills along their long dimension or along a skewed dimension. As a bill 257 moves on the transport path on the scanhead 260, the coherent light strip 258 effectively scans the bill across the narrow dimension of the bill. In the embodiment depicted, the transport path is so arranged that a currency bill 257 is scanned by scanhead 260 approximately about the central section of the bill along its narrow dimension, as best shown in FIG. 15. The scanhead 260 functions to detect light reflected from the bill as it moves across the illuminated light strip 258 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the discrimination and authentication unit of this invention is programmed to handle.

A series of such detected reflectance signals are obtained across the narrow dimension of the bill, or across a selected segment thereof, and the resulting analog signals are digitized under control of the CPU 272 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations. This process is more fully explained in U.S. patent application Ser. No. 07/885,648, filed on May 19, 1992, now issued as U.S. Pat. No. 5,295,196 for "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 272 by means of an optical encoder 278 which is linked to the bill transport mechanism 256 and precisely tracks the physical movement of the bill 257 across the scanheads 260 and 262. More specifically, the optical encoder 278 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanheads 260 and 262. Under these conditions, the optical encoder 278 is capable of precisely tracking the movement of the bill 257 relative to the light strip 258 generated by the scanhead 260 by monitoring the rotary motion of the drive motor.

The output of photodetector 268 is monitored by the CPU 272 to initially detect the presence of the bill underneath the scanhead 260 and, subsequently, to detect the starting point of the printed pattern on the bill, as represented by the thin borderline 257*a* which typically encloses the printed indicia on currency bills. Once the borderline 257*a* has been detected, the optical encoder 278 is used to control the timing and number of reflectance samples that are obtained from the output of the photodetector 268 as the bill 257 moves across the scanhead 260 and is scanned along its narrow dimension.

The detection of the borderline 257*a* serves as an absolute reference point for initiation of sampling. If the edge of a bill were to be used as a reference point, relative displacement of sampling points can occur because of the random manner in which the distance from the edge to the borderline 257*a* varies from bill to bill due to the relatively large range of tolerances permitted during printing and cutting of currency bills. As a result, it becomes difficult to establish direct correspondence between sample points in successive bill scans and the discrimination efficiency is adversely affected. Embodiments triggering off the edge of the bill are discussed above, for example, in connection with FIGS. 5*a* and 5*b*.

The use of the optical encoder 278 for controlling the sampling process relative to the physical movement of a bill 257 across the scanhead 260 is also advantageous in that the encoder 278 can be used to provide a predetermined delay following detection of the borderline prior to initiation of samples. The encoder delay can be adjusted in such a way that the bill 257 is scanned only across those segments along its narrow dimension which contain the most distinguishable printed indicia relative to the different currency denominations.

The optical sensing and correlation technique are similar to that described in connection with FIG. 4a and the description made in connection with FIG. 4a is applicable to FIG. 15.

As a result of the first comparison described above based on the reflected light intensity information retrieved by scanhead 260, the CPU 272 will have either determined the denomination of the scanned bill 257 or determined that the first scanned signal samples fail to sufficiently correlate with any of the sets of stored intensity signal samples in which case an error is generated. Provided that an error has not been generated as a result of this first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 262. The scanning and processing by scanhead 262 may be controlled in a manner similar to that described above with regard to scanhead 260.

In addition to the sets of stored first characteristic information, in this example stored intensity signal samples, the EPROM 280 stores sets of stored second characteristic information for genuine bills of the different denominations which the system 250 is capable of handling. Based on the denomination indicated by the first comparison, the CPU 272 retrieves the set or sets of stored second characteristic data for a genuine bill of the denomination so indicated and compares the retrieved information with the scanned second characteristic information. If sufficient correlation exists between the retrieved information and the scanned information, the CPU 272 verifies the genuineness of the scanned bill 257. Otherwise, the CPU generates an error. While the embodiment illustrated in FIG. 15 depicts a single CPU 272 for making comparisons of first and second characteristic information and a single EPROM 280 for storing first and second characteristic information, it is understood that two or more CPUs and/or EPROMs could be used, including one CPU for making first characteristic information comparisons and a second CPU for making second characteristic information comparisons.

Using the above sensing and correlation approach, the CPU 272 is programmed to count the number of bills belonging to a particular currency denomination whose genuineness has been verified as part of a given set of bills that have been scanned for a given scan batch, and to determine the aggregate total of the currency amount represented by the bills scanned during a scan batch. The CPU 272 is also linked to an output unit 282 which is adapted to provide a display of the number of genuine bills counted, the breakdown of the bills in terms of currency denomination, and the aggregate total of the currency value represented by counted bills. The output unit 282 can also be adapted to provide a print-out of the displayed information in a desired format.

Figure 16A:
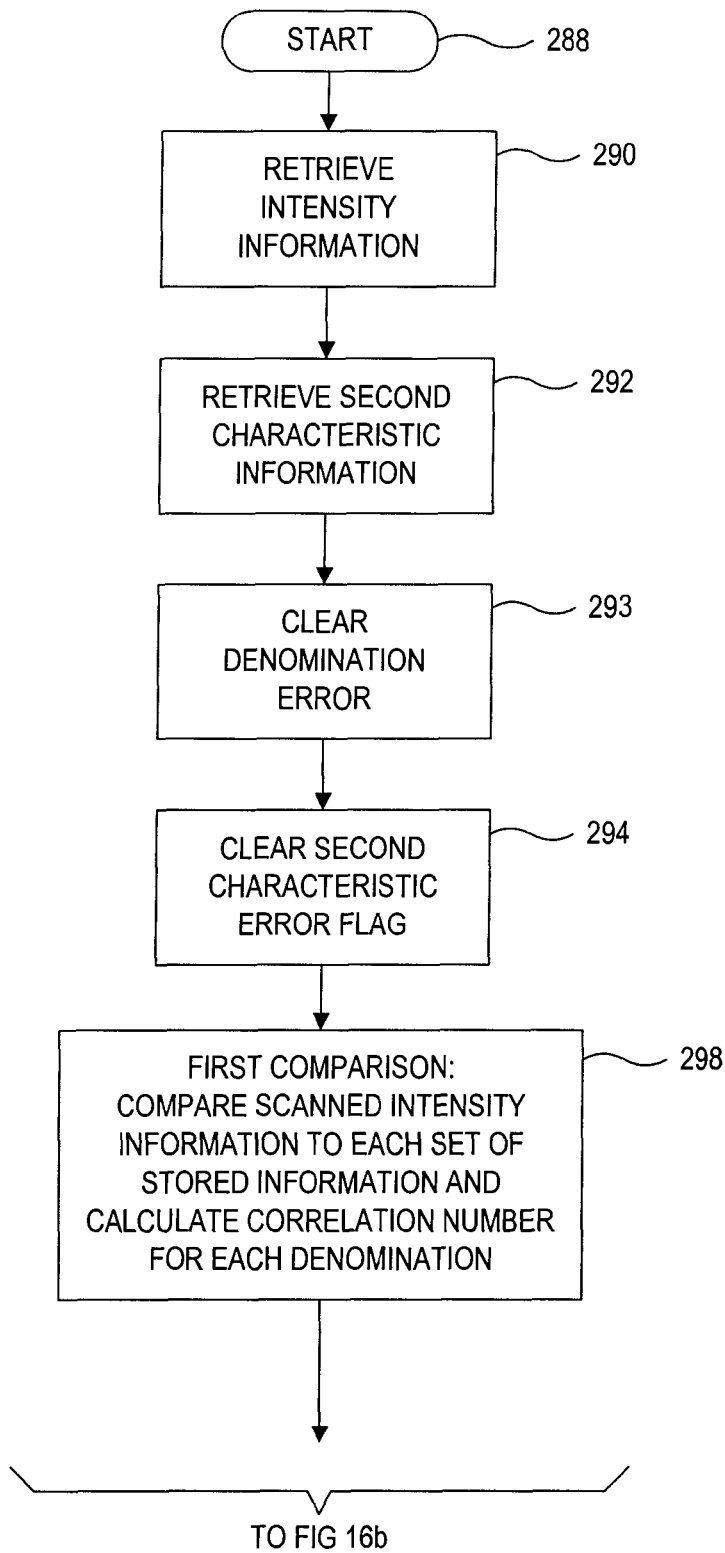
FIGS. 16a and 16b show a flowchart illustrating the steps in implementing the discrimination unit according to principles of the present invention.
Figure 16B:
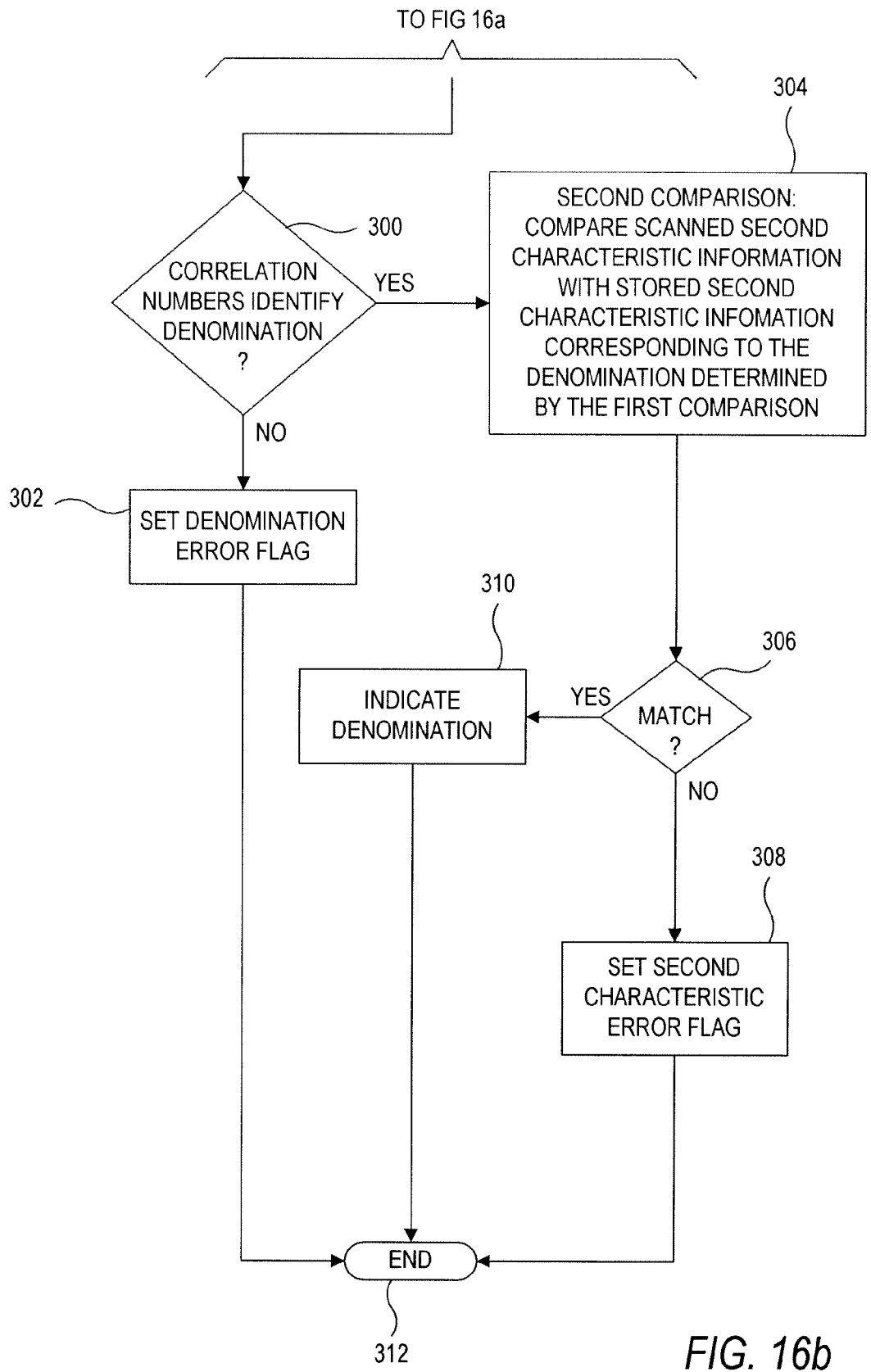

The interrelation between the use of the first and second type of characteristic information can be seen by considering FIGS. 16a and 16b which comprise a flowchart illustrating the sequence of operations involved in implementing a discrimination and authentication unit according to one embodiment of the present invention. Upon the initiation of the sequence of operations (step 288), reflected light intensity information is retrieved from a bill being scanned (step 290). Similarly, second characteristic information is also retrieved from the bill being scanned (step 292). Denomination error and second characteristic error flags are cleared (steps 293 and 294).

Next the scanned intensity information is compared to each set of stored intensity information corresponding to genuine bills of all denominations the system is programmed to accommodate (step 298). For each denomination, a correlation number is calculated. The system then, based on the correlation numbers calculated, determines either the denomination of the scanned bill or generates a denomination error by setting the denomination error flag (steps 300 and 302). In the case where the denomination error flag is set (step 302), the process is ended (step 312). Alternatively, if based on this first comparison, the system is able to determine the denomination of the scanned bill, the system proceeds to compare the scanned second characteristic information with the stored second characteristic information corresponding to the denomination determined by the first comparison (step 304).

For example, if as a result of the first comparison the scanned bill is determined to be a $20 bill, the scanned second characteristic information is compared to the stored second characteristic information corresponding to a genuine $20 bill. In this manner, the system need not make comparisons with stored second characteristic information for the other denominations the system is programmed to accommodate. If based on this second comparison (step 304) it is determined that the scanned second characteristic information does not sufficiently match that of the stored second characteristic information (step 306), then a second characteristic error is generated by setting the second characteristic error flag (step 308) and the process is ended (step 312). If the second comparison results in a sufficient match between the scanned and stored second characteristic information (step 306), then the denomination of the scanned bill is indicated (step 310) and the process is ended (step 312).

TABLE 1

| Denomination | Sensitivity | | | | |
| --- | --- | --- | --- | --- | --- |
|  | 1 | 2 | 3 | 4 | 5 |
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

An example of an interrelationship between authentication based on a first and second characteristic can be seen by considering Table 1. Table 1 depicts relative total magnetic content thresholds for various denominations of genuine bills. Columns 1-5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

According to another feature of the present invention, the doubling or overlapping of bills in the transport system is detected by the provision of a pair of optical sensors which are co-linearly disposed opposite to each other within the scan head area along a line that is perpendicular to the direction of bill flow, i.e., parallel to the edge of test bills along their wide dimensions as the bills are transported across the optical scan head. The pair of optical sensors S1 and S2 (not shown) are co-linearly disposed within the scan head area in close parallelism with the wide dimension edges of incoming test bills. In effect, the optical sensors S1 and S2 (having corresponding light sources and photodetectors—not shown) are disposed opposite each other along a line within the scan head area which is perpendicular to the direction of bill flow. These sensors S1 and S2 serve as second detectors for detecting second characteristic information, namely density.

Although not illustrated in the drawings, it should be noted that corresponding photodetectors (not shown) are provided within the scanhead area in immediate opposition to the corresponding light sources and underneath the flat section of the transport path. These detectors detect the beam of coherent light directed downwardly onto the bill transport path from the light sources corresponding to the sensors S1 and S2 and generate an analog output which corresponds to the sensed light. Each such output is converted into a digital signal by a conventional ADC converter unit (not shown) whose output is fed as a digital input to and processed by the system CPU (not shown), in a manner similar to that indicated in the arrangement of FIG. 15.

The presence of a bill which passes under the sensors S1 and S2 causes a change in the intensity of the detected light, and the corresponding change in the analog output of the detectors serves as a convenient means for density-based measurements for detecting the presence of "doubles" (two or more overlaid or overlapped bills) during the currency recognition and counting process. For instance, the sensors may be used to collect a predefined number of density measurements on a test bill, and the average density value for a bill may be compared to predetermined density thresholds (based, for instance, on standardized density readings for master bills) to determine the presence of overlaid bills or doubles. The above sensors and doubles detection technique is described in more detail in U.S. Pat. No. 5,295,196 which is incorporated herein by reference.

Figure 17:
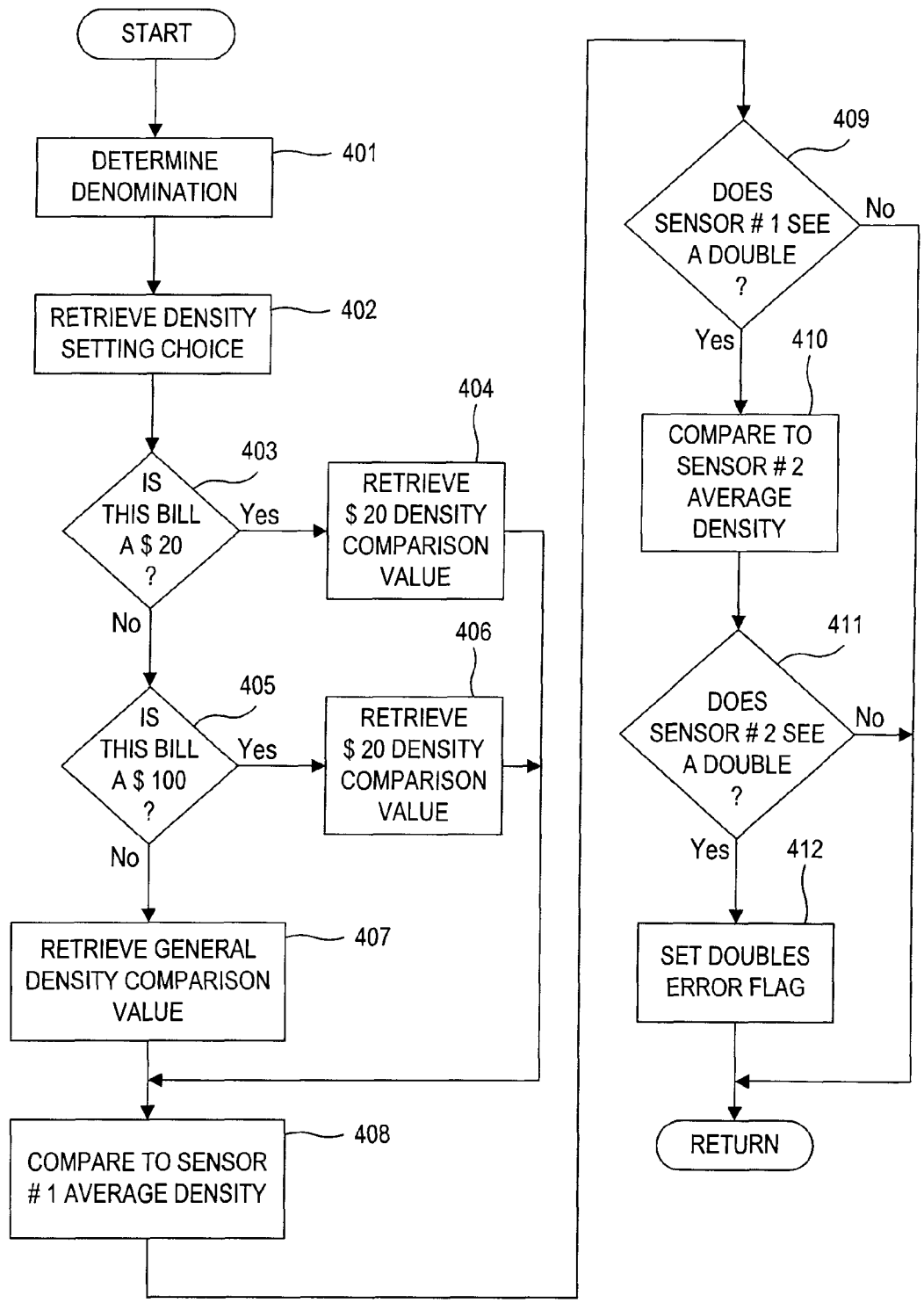
FIG. 17 illustrate a routine for detecting the overlapping of bills according to principles of the present invention.

A routine for using the outputs of the two sensors S1 and S2 to detect any doubling or overlapping of bills is illustrated in FIG. 17. This routine uses a determination of the denomination of a bill based on first characteristic information to streamline doubles detection wherein second characteristic information corresponds to the density of scanned bills. This routine starts when the denomination of a scanned bill has been determined via comparing first characteristic information at step 401, as described previously. To permit variations in the sensitivity of the density measurement, a "density setting choice" is retrieved from memory at step 402. The operator makes this choice manually, according to whether the bills being scanned are new bills, requiring a higher degree of sensitivity, or used bills, requiring a lower level of sensitivity. After the "density setting choice" has been retrieved, the system then proceeds through a series of steps which establish a density comparison value according to the denomination of the bill. Thus, step 403 determines whether the bill has been identified as a $20-bill, and if the answer is affirmative, the $20-bill density comparison value is retrieved from memory at step 404. A negative answer at step 443 advances the system to step 405 to determine whether the bill has been identified as a $100-bill, and if the answer is affirmative, the $100-bill density comparison value is retrieved from memory at step 406. A negative answer at step 405 advances the system to step 407 where a general density comparison value, for all remaining bill denominations, is retrieved from memory.

At step 408, the density comparison value retrieved at step 404, 406 or 407 is compared to the average density represented by the output of sensor S1. The result of this comparison is evaluated at step 409 to determine whether the output of sensor S1 identifies a doubling of bills for the particular denomination of bill determined at step 401. If the answer is negative, the system returns to the main program. If the answer is affirmative, step 410 then compares the retrieved density comparison value to the average density represented by the output of the second sensor S2. The result of this comparison is evaluated at step 411 to determine whether the output of sensor S2 identifies a doubling of bills. Affirmative answers at both step 409 and step 411 results in the setting of a "doubles error" flag at step 412, and the system then returns to the main program. The above doubles detection routine is described in more detail in U.S. Pat. No. 5,295,196 which is incorporated herein by reference. While the routine described above uses second characteristic information (density) to detect doubles, the above routine may be modified to authenticate bills based on their density, for example in a manner similar to that described in connection with Table 1.

Referring now to FIGS. 18a-18c, there is shown a side view of one embodiment of a discrimination and authentication unit according to the present invention, a top view of the embodiment of FIG. 18a along the direction 18B, and a top view of the embodiment of FIG. 18a along the direction 18C, respectively. An ultraviolet ("UV") light source 422 illuminates a document 424. Depending upon the characteristics of the document, ultraviolet light may be reflected off the document and/or fluorescent light may be emitted from the document. A detection system 426 is positioned so as to receive any light reflected or emitted toward it but not to receive any UV light directly from the light source 422. The detection system 426 comprises a UV sensor 428, a fluorescence sensor 430, filters, and a plastic housing. The light source 422 and the detection system 426 are both mounted to a printed circuit board 432. The document 424 is transported in the direction indicated by arrow A by a transport system (not shown). The document is transported over a transport plate 434 which has a rectangular opening 436 in it to permit passage of light to and from the document. In one embodiment of the present invention, the rectangular opening 436 is 1.375 inches (3.493 cm) by 0.375 inches (0.953 cm). To minimize dust accumulation onto the light source 422 and the detection system 426 and to prevent document jams, the opening 436 is covered with a transparent UV transmitting acrylic window 438. To further reduce dust accumulation, the UV light source 422 and the detection system 426 are completely enclosed within a housing (not shown) comprising the transport plate 434.

Figure 19:
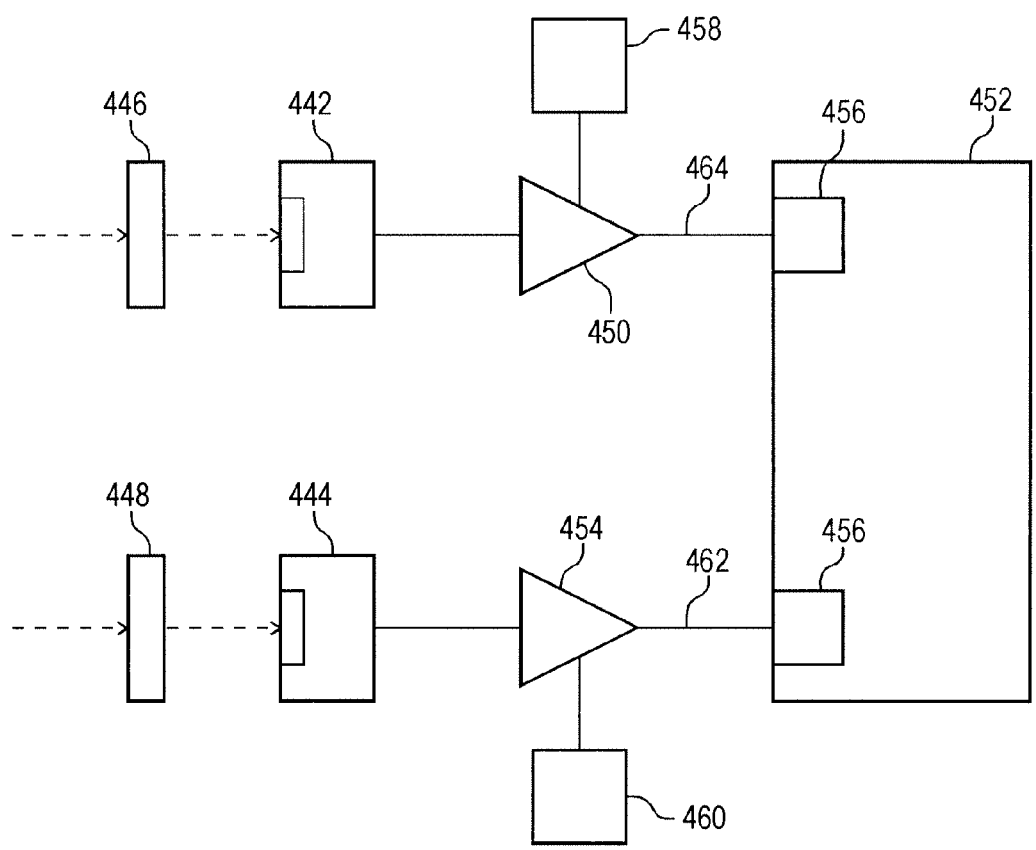
FIG. 19 shows a functional block diagram illustrating one embodiment of the document authenticating system according to principles of the present invention.

Referring now to FIG. 19, there is shown a functional block diagram illustrating one embodiment of a discrimination and authentication unit according to the present invention. FIG. 19 shows an UV sensor 442, a fluorescence sensor 444, and filters 446, 448 of a detection system such as the detection system 426 of FIG. 18a. Light from the document passes through the filters 446, 448 before striking the sensors 442, 444, respectively. An ultraviolet filter 446 filters out visible light and permits UV light to be transmitted and hence to strike UV sensor 442. Similarly, a visible light filter 448 filters out UV light and permits visible light to be transmitted and hence to strike fluorescence sensor 444. Accordingly, UV light, which has a wavelength below 400 nm, is prevented from striking the fluorescence sensor 444 and visible light, which has a wavelength greater than 400 nm, is prevented from striking the UV sensor 442. In one embodiment the UV filter 446 transmits light having a wavelength between about 260 nm and about 380 nm and has a peak transmittance at 360 nm. In one embodiment, the visible light filter 448 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In one embodiment the filters are about 8 mm in diameter and about 1.5 mm thick.

The UV sensor 442 outputs an analog signal proportional to the amount of light incident thereon and this signal is amplified by amplifier 450 and fed to a microcontroller 452. Similarly, the fluorescence sensor 444 outputs an analog signal proportional to the amount of light incident thereon and this signal is amplified by amplifier 454 and fed to a microcontroller 452. Analog-to-digital converters 456 within the microcontroller 452 convert the signals from the amplifiers 450, 454 to digital and these digital signals are processed by the software of the microcontroller 452. The UV sensor 442 may be, for example, an ultraviolet enhanced photodiode sensitive to light having a wavelength of about 360 nm and the fluorescence sensor 444 may be a blue enhanced photodiode sensitive to light having a wavelength of about 450 nm. Such photodiodes are available from, for example, Advanced Photonix, Inc., Massachusetts. The microcontroller 452 may be, for example, a Motorola 68HC16.

The exact characteristics of the sensors 442, 444 and the filters 446, 448 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 458, 460 permit the gains of amplifiers 450, 454 to be adjusted to appropriate levels. Calibration may be performed by positioning a piece of white fluorescent paper on the transport plate 434 so that it completely covers the rectangular opening 436 of FIG. 4a. The potentiometers 458, 460 may then be adjusted so that the output of the amplifiers 450, 454 is 5 volts. Alternatively, calibration may be performed using genuine currency such as a piece of genuine U.S. currency. Potentiometers 458 and 460 may be replaced with electronic potentiometers located, for example, within the microcontroller 452. Such electronic potentiometers may permit automatic calibration based on the processing of a single genuine document or a plurality of documents as will be described below.

The implementation of one embodiment of a discrimination and authentication unit according to the present invention as illustrated in FIG. 19 with respect to the authentication of U.S. currency will now be described. As discussed above, it has been determined that genuine United States currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresce;
3) Reflects a high level of ultraviolet light and fluoresces;
4) Reflects a high level of ultraviolet light and does not fluoresce.

Counterfeit bills in categories (1) and (2) may be detected by a currency authenticator employing an ultraviolet light reflection test according to one embodiment of the present invention. Counterfeit bills in category (3) may be detected by a currency authenticator employing both an ultraviolet reflection test and a fluorescence test according to another embodiment of the present invention. Only counterfeits in category (4) are not detected by the authenticating methods of the present invention.

According to one embodiment of the present invention, fluorescence is determined by any signal that is above the noise floor. Thus, the amplified fluorescent sensor signal 462 will be approximately 0 volts for genuine U.S. currency and will vary between approximately 0 and 5 volts for counterfeit bills depending upon their fluorescent characteristics. Accordingly, an authenticating system according to one embodiment of the present invention will reject bills when signal 462 exceeds approximately 0 volts.

According to one embodiment of the discrimination unit, a high level of reflected UV light ("high UV") is indicated when the amplified UV sensor signal 464 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to one embodiment of the present invention tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 436 of the transport plate 434. It is noted that a certain amount of UV light is always reflected off the acrylic window 438. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 464 will initially vary between 1.0 and 5.0 volts depending upon the UV reflectance characteristics of the document being scanned and will slowly drift downward as the light source degrades. In an alternative embodiment to one embodiment wherein the threshold level is adjusted as the light source degrades, the sampling of the UV sensor output may be used to adjust the gain of the amplifier 450 thereby maintaining the output of the amplifier 450 at its initial levels.

It has been found that the voltage ratio between counterfeit and genuine U.S. bills varies from a discernible 2-to-1 ratio to a non-discernible ratio. According to one embodiment of the present invention a 2-to-1 ratio is used to discriminate between genuine and counterfeit bills. For example, if a genuine U.S. bill generates an amplified UV output sensor signal 464 of 4.0 volts, documents generating an amplified UV output sensor signal 464 of 2.0 volts or less will be rejected as counterfeit. As described above, this threshold of 2.0 volts may either be lowered as the light source degrades or the gain of the amplifier 450 may be adjusted so that 2.0 volts remains an appropriate threshold value.

The determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification," now issued as U.S. Pat. No. 5,652,802, incorporated herein by reference in its entirety.

The presence of fluorescence may be performed by sampling the output of the fluorescence sensor at a number of intervals. However, in one embodiment, a bill is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

The present invention may include means, such as a display, to indicate to the operator the reasons why a document has been rejected, e.g., messages such as "UV FAILURE" or "FLUORESCENCE FAILURE." The present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

The UV and fluorescence authentication test may be incorporated into various document handlers such as currency counters and/or currency denomination discriminators such as that disclosed in connection with FIG. 15 and U.S. Pat. No. 5,295,196 incorporated herein by reference in its entirety. Likewise, the magnetic authentication tests described above may likewise be incorporated in such counters and/or discriminators. In such systems, calibration may be performed by processing a stack of genuine documents. An example of a method of calibrating such a device will now be discussed.

As mentioned above, the acrylic window 438 reflects a certain amount of UV light even when no bill is present. The amount of UV light reflected in the absence of bills is measured. A stack of genuine bills may then be processed with the potentiometer 458 set to some arbitrary value and the resulting UV readings averaged. The difference between the average reading and the reading made in the absence of bills may then be calculated. The potentiometer 458 may then be adjusted so that the average reading would be at least 0.7 volts greater then the no bill reading. It is also desirable to adjust the potentiometer 458 so that the amplifier 450 operates around the middle of its operating range. For example, if a reading of 1.0 volt results when no bills are present and an average reading of 3.0 volts results when a stack of genuine bills are processed, the resulting difference is 2.0 volts which is greater than 0.7 volts. However, it is desirable for the amplifier to be operating in the range of about 2.0 to 2.5 volts and preferably at about 2.0 volts. Thus in the above example, the potentiometer 458 may be used to adjust the gain of the amplifier 450 so that an average reading of 2.0 volts would result. Where potentiometer 458 is an electronic potentiometer, the gain of the amplifier 450 may be automatically adjusted by the microcontroller 452. In general, when the average reading is too high the potentiometer is adjusted to lower the resulting values to the center of the operating range of the amplifier and vice versa when the average reading is too low.

According to another embodiment of the present invention, the operator of a document processing system is provided with the ability to adjust the sensitivity of a UV reflection test, a fluorescence test, and a magnetic test. For example, a note counter embodying one embodiment of the present invention may provide the operator the ability to set the authentication tests to a high or a low sensitivity. For example, the note counter may be provided with a set up mode which enables the operator to adjust the sensitivities for each of the above tests for both the high and the low modes. This may be achieved through appropriate messages being displayed on, for example, display 282 of FIG. 15 and the input of selection choices via an input device such as a keyboard or buttons. In one embodiment, the device permits the operator to adjust the UV test, the fluorescent test, and the magnetic test in a range of sensitivities 1-7, with 7 being the most sensitive, or to turn each test off. The device permits setting the sensitivity as described above for the three authentication tests for both a low sensitivity (low denomination) mode and a high sensitivity (high denomination) mode. The above setting options are summarized in Table 2.

TABLE 2

| Mode | UV Test Sensitivity | Fluorescent Test Sensitivity | Magnetic Test Sensitivity |
|---|---|---|---|
| High | off, 1-7 | off, 1-7 | off, 1-7 |
| Low | off, 1-7 | off, 1-7 | off, 1-7 |

According to an alternate embodiment, the above high/low modes are replaced with denomination modes, for example, one for each of several denominations of currency (e.g., $1, $2, $5, $10, $20, $50 and $100). For each denomination, the sensitivity of the three tests may be adjusted between 1-7 or off. According to one embodiment for operator manually selects either the high or low mode or the appropriate denomination mode based on the values of the notes to be processed. This manual mode selection system may be employed in, for example, either a note counter or a currency denomination discriminator. According to another embodiment the document processing system automatically selects either the high or low mode or the appropriate denomination mode based on the values of the notes being processed. This automatic mode selection system may be employed in systems capable of identifying the different values or kinds of documents, for example, a currency denomination discriminator.

Accordingly, in the low mode or for low denomination modes (e.g., $1, $2) the three tests may be set to relatively low sensitivities (e.g., UV test set at 2, fluorescent test set at 5, and magnetic test set at 3). Conversely, in the high mode or for high denomination modes (e.g., $50, $100) the three tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreased when processing low value notes where the potential harm or risk in not detecting a counterfeit is lesser and the annoyance of wrongly rejecting genuine notes is greater. Also the UV, fluorescent, and/or magnetic characteristics of genuine notes can vary due to number of factors such wear and tear or whether the note has been washed (e.g., detergents). As a result, the fluorescent detection of genuine U.S. currency, for example, may yield readings of about 0.05 or 0.06 volts.

The UV and fluorescent thresholds associated with each of the seven sensitivity levels may be set, for example, as shown in Table 3.

TABLE 3

| Sensitivity Level | UV Test (Volts) | Fluorescent Test (Volts) |
|---|---|---|
| 1 | 0.2 | 0.7 |
| 2 | 0.3 | 0.6 |
| 3 | 0.4 | 0.5 |
| 4 | 0.5 | 0.3 |
| 5 | 0.55 | 0.2 |
| 6 | 0.6 | 0.15 |
| 7 | 0.7 | 0.1 |

In performing the UV test according to one embodiment, the no bill reflectance value is subtracted from resulting UV reflectance voltages associated with the scanning of a particular bill, and this difference is compared against the appropriate threshold value such as those in Table 3 in determining whether to reject a bill.

According to one embodiment, the potentiometer 460 associated with the fluorescence detector 204 is calibrated by processing a genuine note or stack of notes, as described above in connection with the calibration of the UV detector, and adjusted so that a reading of near 0 volts (e.g., about 0.1 volt) results. Magnetic calibration may be performed, for example, manually in conjunction with the processing of a genuine bill of known magnetic characteristics and adjusting the magnetic sensor to near the center of its range.

Upon a bill failing one or more of the above tests, an appropriate error message may be displayed such as "Suspect Document U—" for failure of the UV reflection test, "Suspect Document—F—" for failure of the fluorescent test, "Suspect Document—M" for failure of the magnetic test, or some combination thereof when more than one test is failed (e.g., "Suspect Document UF—" for failure of both the UV reflection test and the fluorescent test).

New security features are being added to U.S. currency beginning with the 1996 series $100 bills. Subsequently, similar features will be added to other U.S. denominations such as the $50 bill, $20 bill, etc. Some of the new security features include the incorporation into the bills of security threads that fluoresce under ultraviolet light. For example, the security threads in the 1996 series $100 bills emit a red glow when illuminated by ultraviolet. The color of light illuminated from security threads under ultraviolet light will vary by denomination, for example, with the $100 notes emitting red light and the $50 notes emitting, for example, blue light or purple light.

Additionally, the location of the thread within the bill can be used as a security feature. For example, the security threads in all $100 bills are located in the same position. Furthermore, the location of the security threads in other denominations will be the same by denomination and will vary among several denominations. For example, the location of security threads in $10s, $20s, $50, and $100 may all be distinct. Alternatively, the location may be the same in the $20s and the $100s but different from the location of the security threads in the $50s.

Figure 20:
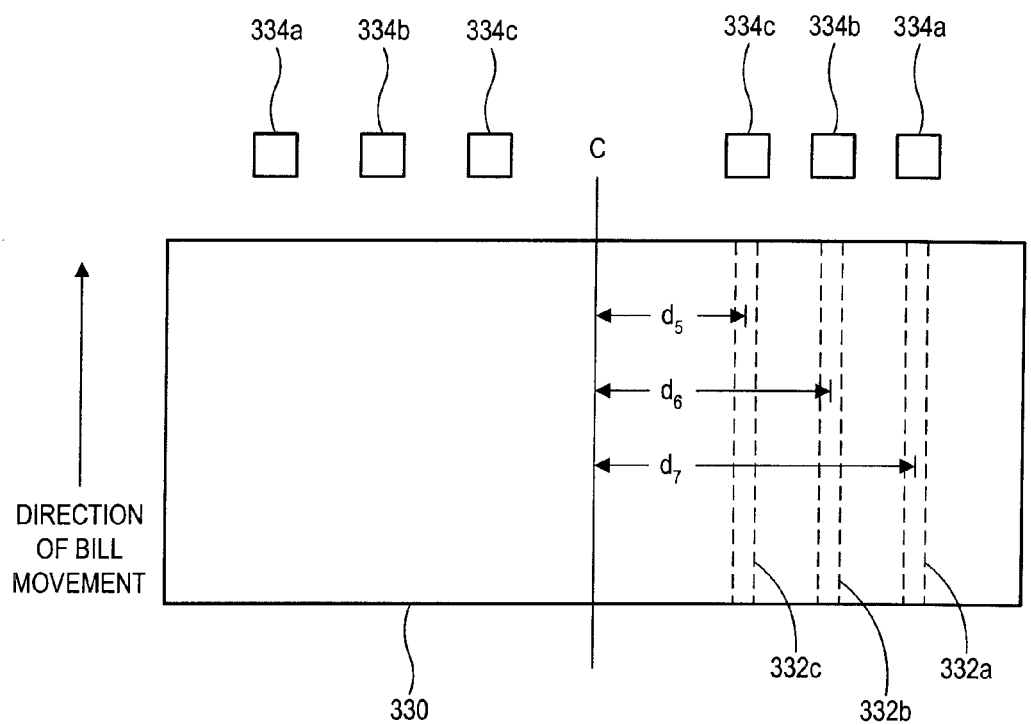
FIG. 20 shows a modified version of the document authenticating system according to principles of the present invention.

The ultraviolet system described above in connection with FIGS. 18 and 19 may be modified to take advantage of this feature. Referring to FIG. 20, a bill 330 is shown indicating three possible locations 332a-332c for security threads in genuine bills depending on the denomination of the bill. Fluorescent light detectors 334a-334c are positioned over the possible acceptable locations of fluorescing security threads. In systems designed to accept bills fed in either the forward or the reverse direction, identical detectors are positioned over the same locations on each half of the bill. For example, sensors 334c are positioned a distance $d_5$ to the left and right of the center of the bill 330. Likewise, sensors 334b are positioned a distance $d_6$ to the left and right of the center of the bill 330 while sensors 334a are positioned a distance $d_7$ to the left and right of the center of the bill 330. Additional sensors may be added to cover additional possible thread locations.

These sensors may be designed to detect a particular color of light depending on their location. For example, say location 332b corresponds to the location of security threads in genuine $100 bills and location 332c corresponds to the location of security threads in genuine $50 bills. Furthermore, if the security threads in $100 bills emit red light under ultraviolet light excitation and the security threads in $50 bills emit blue light under ultraviolet light excitation, then sensor 334b may be particularly designed to detect red light and sensor 334c may be designed to detect blue light. Such sensors may employ filters which pass red and blue light, respectfully, while screening out light of other frequencies. Accordingly, for example, sensor 334b will respond to a security thread located at location 332b that emits red light under ultraviolet light excitation but not to a security thread at location 332b that emits blue light.

Sensors 334a-334c may include separate sources of ultraviolet light or one or more separate ultraviolet light sources may be provided to illuminate the bill or portions of the bill, either on the same side of the bill as the sensors or on the opposite side of the bill. These sensors may be arranged along the same axis or, alternatively, may be staggered upstream and downstream relative to each other. These sensors may be arranged all on the same side of the bill or some on one side of the bill and some on the other. Alternatively, for one or more locations 332a-332c sensors may be placed on both sides of the bill. This dual sided embodiment would be beneficial in detecting counterfeits made by applying an appropriate fluorescing material on the surface of a bill. Alternatively, a combination of normal lighting and ultraviolet lighting may be employed but at different times to detect for the presence of a colored line applied to the surface of a bill visible in normal lighting. According to such an embodiment, no colored thread should be detected under normal lighting and an appropriate colored thread in an appropriate position must be detected under ultraviolet lighting.

Additionally, the authentication technique described above in connection with FIGS. 18 and 19 may be employed in areas where no fluorescing security threads might be located, for example, near the center of the bill, such that the detection of fluorescent light would indicate a counterfeit bill as would the absence of a high level of reflected ultraviolet light.

Alternatively or additionally, sensors may be employed to detect bills or security threads printed or coated with thermochromic materials (materials that change color with a change in temperature. Examples of threads incorporating thermochromic materials are described in U.S. Pat. No. 5,465,301 incorporated herein by reference. For example, a security thread may appear in one color at ambient temperatures under transmitted light and may appear in a second color or appear colorless at or above an activation temperature or vice versa. Alternatively, bills may be printed and/or coated with such thermochromic materials. Such bills may or may not include security threads and any included security threads may or may not also be printed or coated with thermochromatic materials. To detect for the proper characteristics of bills containing such thermochromatic materials and/or containing threads employing such thermochromic materials, the above described embodiments may be altered to scan a bill at different temperatures. For example, a bill could first be scanned at ambient temperatures, and then be transported downstream where the temperature of the bill is raised to or above an activation temperature and scanned again at the higher temperature. For example, FIG. 20 could be modified to employ two sets of pairs of sensors 334a-c, one set downstream of the other with the downstream sensors be located in a region where the temperature is evaluated relative to the temperature of the region where the first set of sensors are located. A bill adjacent to the first and second sets of sensors 334a-c may be illuminated either with visible light or ultraviolet light (if the thermochromic material contains materials whose fluorescent characteristics alter with changes in temperature). Accordingly, the presence of the appropriate color or absence of color may be detected for the different temperatures and the detected information may be used to authenticate and/or denominate the bill.

Figure 21:
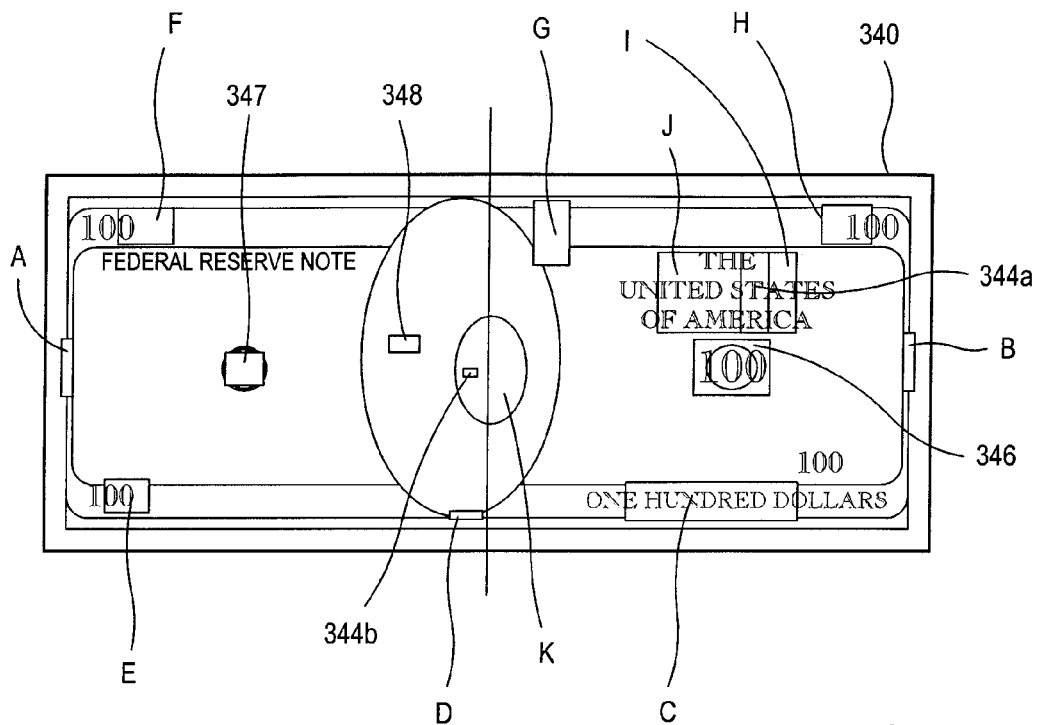
FIG. 21 shows the magnetic characteristics of bills.

The magnetic characteristics of 1996 series $100 bills also incorporate additional security features. Referring to FIG. 21, several areas of the bill 340 are printed using magnetic ink, such as areas A-K. Additionally, in some areas the strength of the magnetic field is stronger than it is in areas A-K. These strong areas of magnetics are indicated, for example, at 344a and 334b. Some areas, such as area 346 contain magnetic ink that is more easily detected by scanning the bill along one dimension of the bill than the other. For example, a strong magnetic field is detected by scanning over area 346 in the long or wide dimension of the bill 340 and a weak field is detected by scanning area 346 in the narrow dimension of the bill 340. The remaining areas of the bill are printed with non-magnetic ink.

Some of these magnetic characteristics vary by denomination. For example, in a new series $50 note, areas A', B', C', E', F', G' and K' may be printed with magnetic ink and areas 354a and 354b may exhibit even stronger magnetic characteristics. Accordingly, the non-magnetic areas also vary relative to the $100 bill.

The use of magnetic ink in some areas of bills of one denomination and in other areas of bills of other denominations is referred to as magnetic zone printing. Additionally, magnetics are employ as a security feature by using ink exhibiting magnetic properties in some areas and ink that does not exhibit magnetic properties in adjacent areas wherein both the ink exhibiting and the ink not exhibiting magnetic properties appear visually the same. For example, the upper left-hand numerical 100 appears visually to be printed with the same ink. Nonetheless, the "10" are printed with ink not exhibiting magnetic properties while the last "0" is printed with ink that does exhibit magnetic properties. For example, see area F of FIG. 21.

Figure 23:
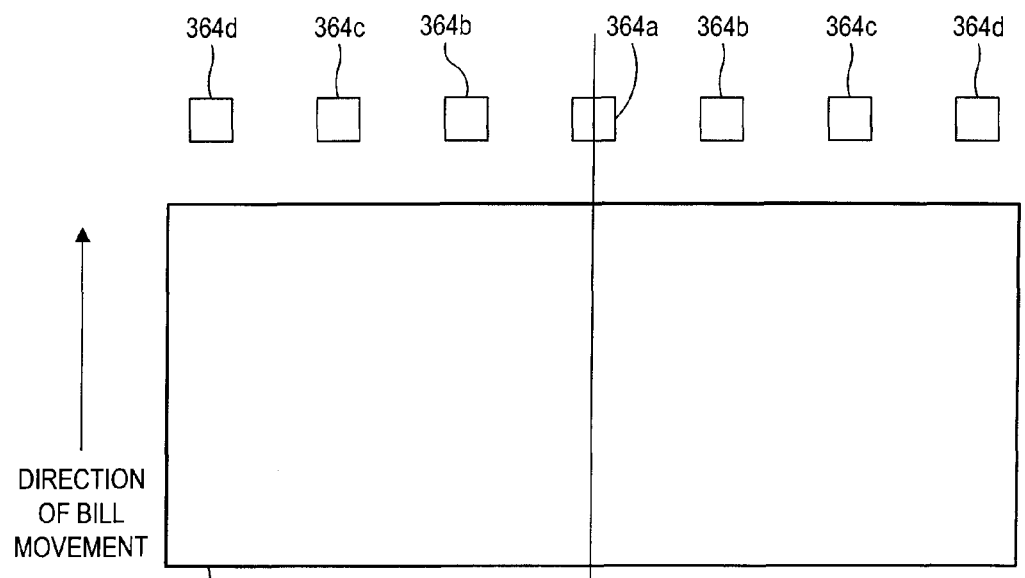
FIGS. 23 and 24 illustrate bills being transported across sensors according to principles of the present invention.
Figure 24:
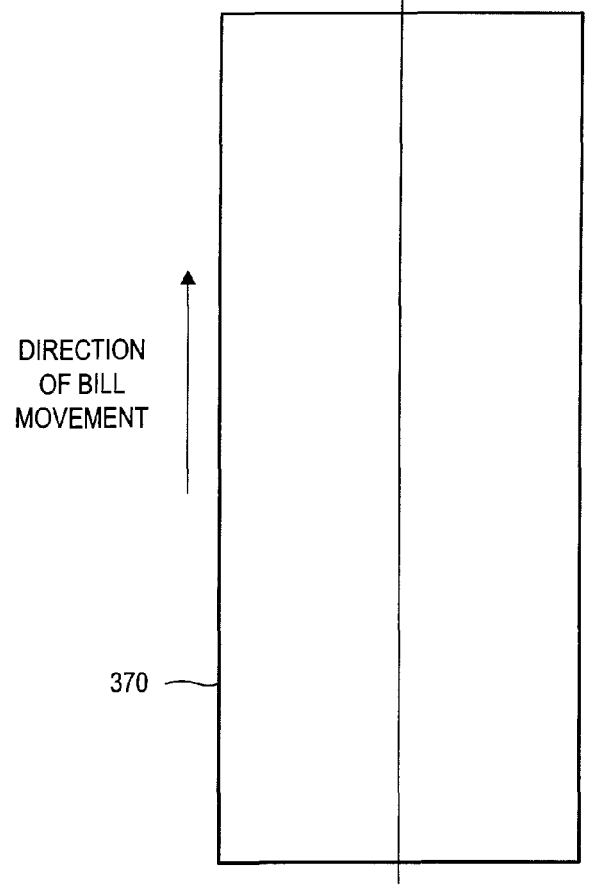

Examples of arrangements of magnetic sensors that may be used to detect the above described magnetic characteristics are illustrated in FIGS. 23 and 24. Additionally, the arrangements described above may also be employed such as those depicted in FIGS. 4f, 6-10, 12, and 15. FIG. 23 illustrates bill 360 being transported past magnetic sensors 364a-d in the narrow dimension of the bill. FIG. 24 illustrates bill 370 being transported past magnetic sensors 374a-c in the long dimension of the bill. Magnetic scanning using these sensors may be performed in a manner similar to that described above in connection with optical scanning. For example, each sensor may be used to generate a magnetically scanned pattern such as that depicted in FIG. 14. Such patterns may be compared to stored master magnetic patterns. The scanning may be performed in conjunction with timing signals provided by an encoder such as described above in connection with optical scanning.

Alternatively, instead of generating scanned magnetic patterns, the presence or absence of magnetic ink in various areas may be detected and compared the stored master information coinciding with several areas where magnetic ink is expected and not expected on genuine bills of various denominations. For example, the detection of magnetic ink at area F is be expected for a $100 bill but might not be for a $50 bill and vice versa for area F'. See FIGS. 21 and 22. Accordingly, the detected magnetic information may be used to determine the denomination of a bill and/or to authenticate that a bill which has been determined to have a given denomination using a different test, such as via a comparison of an optically scanned pattern with master optical patterns, has the magnetic properties expected for that given denomination. Timing signals provided by an encoder such as described above in connection with optical scanning may be employed in detecting magnetic characteristics of specific areas of bills.

Figure 22:
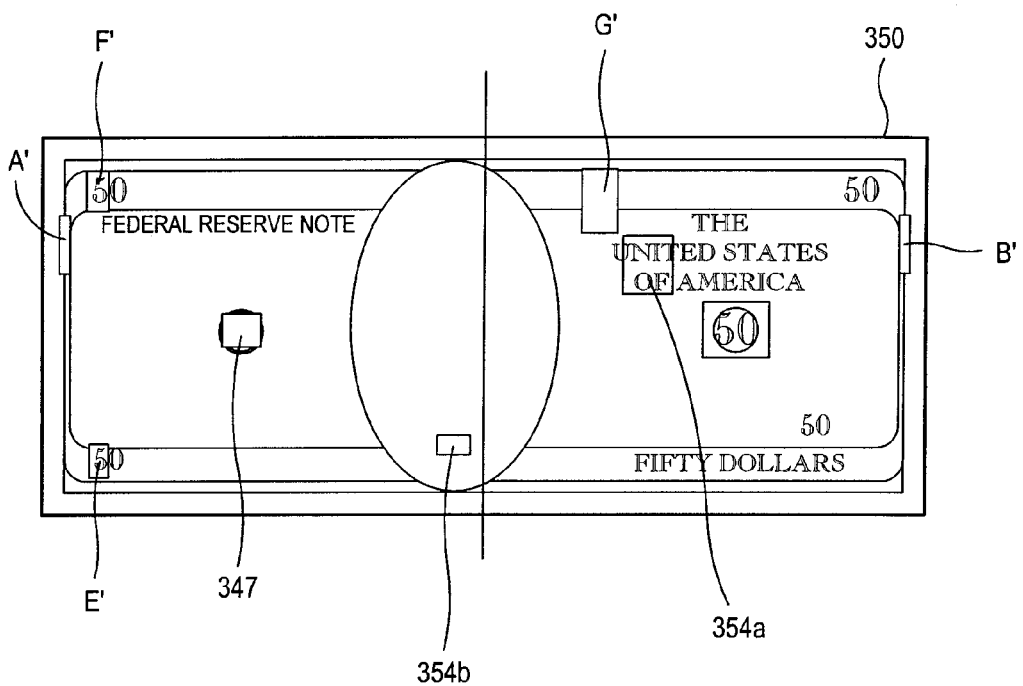
FIG. 22 shows other magnetic characteristics of bills.

Additionally, for magnetic properties that are the same for all bills, such as the presence or absence of magnetic ink in a given location, such as the absence of magnetic ink in area 347 in FIGS. 21 and 22, may be used as a general test to authenticate whether a given bill has the magnetic properties associated with genuine U.S. currency.

Alternatively, magnetic sensors 364a-d, 366a-g, and 374a-c may detect the magnitude of magnetic fields at various locations of a bill and perform bill authentication or denomination based thereon. For example, the strength of magnetic fields may be detected at areas J, 344a, and 348. See FIG. 21. In a genuine $100 bill, no magnetic ink is present at area 348. One test to call a bill to be a $100 bill or authenticate that a bill is a $100 bill would be to compare the relative levels of magnetic field strength detected at these areas. For example, a bill may be determined genuine if a greater signal is generated by scanning area 344a than area J which in turn is greater than for area 348. Alternatively, generated signals may be compared against expected ratios, for example, that the signal for area 344a is greater than 1.5 times the signal for area J. Alternatively, the signals generated by scanning various locations may be compared to reference signals associated with genuine bills for those locations.

Another denominating or authenticating technique may be understood with reference to area 346 of FIG. 21. It will be recalled that for this area of a $100 bill a strong magnetic signal is generated when this area is scanned in the long dimension of the bill and a weak signal is generated when this area is scanned in the narrow dimension. Accordingly, the signals generated by sensors 364 and 374 for this area can be compared to each other and/or to different threshold levels to determine whether a particular bill being scanned has these properties. This information may be then used to assist in calling the denomination of the bill or authenticating a bill whose denomination has previously been determined.

FIGS. 25-47 are flowcharts illustrating several methods for using optical, magnetic, and security thread information to denominate and authenticate bills. These methods may be employed with the various characteristic information detection techniques described above including, for example, those employing visible and ultraviolet light and magnetics including, for example, those for detecting various characteristics of security threads.

Figure 25:
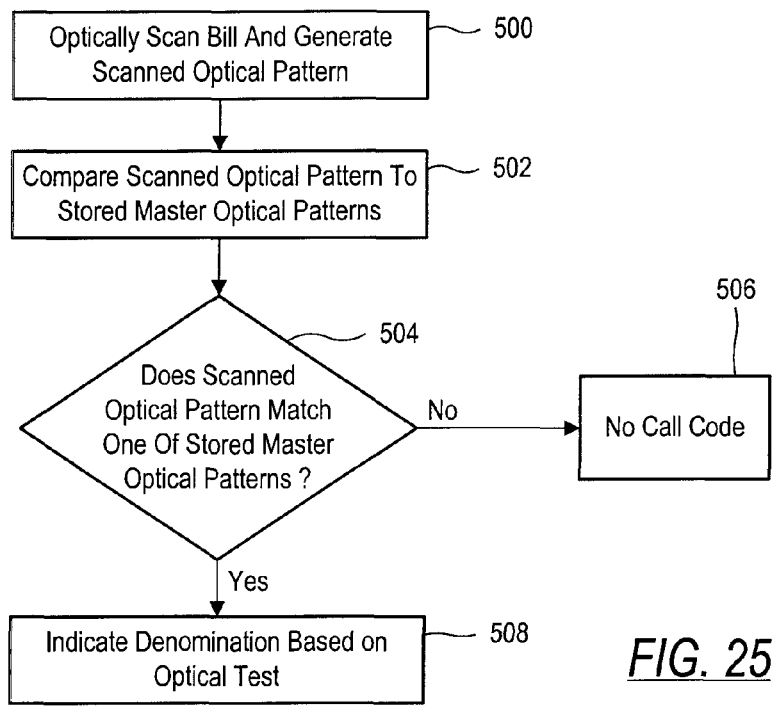
FIG. 25 is a flowchart illustrating the steps performed in optically determining the denomination of a bill according to principles of the present invention.

FIG. 25 is a flowchart illustrating the steps performed in optically determining the denomination of a bill. At step 500, a bill is optically scanned and an optical pattern is generated. At step 502 the scanned optical pattern is compared to one or more stored master optical patterns. One or more master optical patterns are stored for each denomination that a system employing the method of FIG. 25 is designed to discriminate. At step 504 it is determined whether as a result of the comparison of step 502 the scanned optical pattern sufficiently matches one of the stored master optical patterns. For example, the comparison of patterns may yield a correlation number for each of the stored master patterns. To sufficiently match a master pattern, it may be required that the highest correlation number be greater than a threshold value. An example of such a pattern comparison method is described in more detail in U.S. Pat. No. 5,295,196 incorporated herein by reference. If the scanned pattern does not sufficiently match one of the stored master patterns, a no call code is generated at step 506. Otherwise, if the scanned pattern does sufficiently match one of the stored master patterns, the denomination associated with the matching master optical pattern is indicated as the denomination of the scanned bill at step 508.

Figure 26:
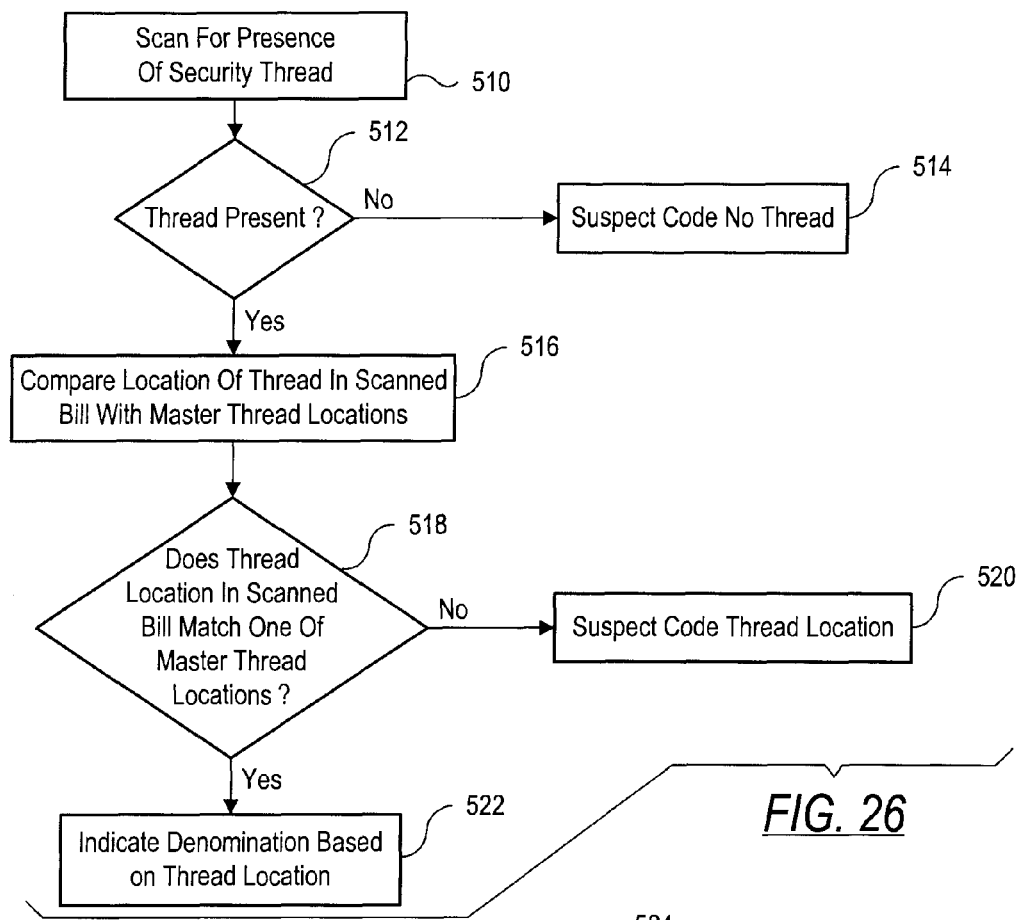
FIG. 26 is a flowchart illustrating the steps performed in optically determining the denomination of a bill based on the presence of a security thread according to principles of the present invention.

FIG. 26 is a flowchart illustrating the steps performed in determining the denomination of a bill based on the location of a security thread. At step 510, a bill is scanned for the presence of a security thread. The presence of a security thread may be detected using a number of types of sensors such as optical sensors using transmitted and/or reflected light, magnetic sensors, and/or capacitive sensors. See, for example, U.S. Pat. Nos. 5,151,607 and 5,122,754. If a thread is not present as determined at step 512, a suspect code may be issued at step 514. This suspect code may indicate that no thread was detected if this level of detail is desirable. The lack of the presence of a thread resulting in a suspect code is particularly useful when all bills to be processed are expected to have a security thread therein. In other situations, the absence of a security thread may indicate that a scanned bill belongs to one or more denominations but not others. For example, assuming security threads are present in all genuine U.S. bills between $2 and $100 dollars, but not in genuine $1 bills, the absence of a security thread may be used to indicate that a scanned bill is a $1 bill. According to one embodiment, where it is determined that no security thread is present, a bill is preliminary indicated to be a $1 bill. Preferably, some additional test is performed to confirm the denomination of the bill such as the performance of the optical denominating methods described above in FIG. 25. The optical denominating steps may be performed before or after the thread locating test.

If at step 512 it is determined that a security thread is present, the location of the detected security thread is then compared with master thread locations associated with genuine bills at step 516. At step 518 it is determined whether as a result of the comparison at step 516 the detected thread location matches one of the stored master thread locations. If the detected thread location does not sufficiently match one of the stored master thread locations, an appropriate suspect code is generated at step 520. This suspect code may indicate that detected thread was not in an acceptable location if such information is desirable. Otherwise, if the detected thread location does sufficiently match one of the stored master thread locations, the denomination associated with the matching master thread location is indicated as the denomination of the scanned bill at step 522.

Figure 27:
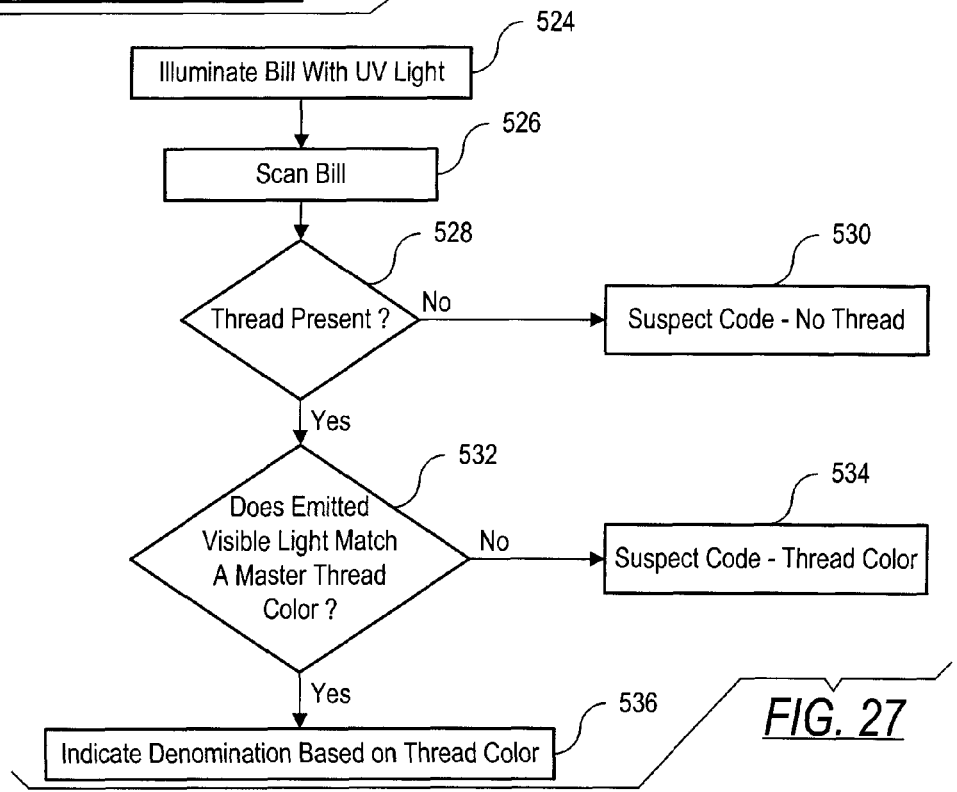
FIG. 27 is a flowchart illustrating the steps performed in optically determining the denomination of a bill based on the color of the security thread according to principles of the present invention.

FIG. 27 is a flowchart illustrating the steps performed in determining the denomination of a bill based on the fluorescent color of a security thread. For example, as described above 1996 series $100 bills contain security threads which emit red light when illuminated with ultraviolet light. At step 524, a bill is illuminated with ultraviolet light. At step 526, the bill is scanned for the presence of a security thread and color of any fluorescent light emitted by a security thread that is present. The presence of a security thread may be detected as described above in connection with FIG. 26. Alternatively, the presence of a security thread may be detected before the bill is illuminated with ultraviolet light and scanned for fluorescent light. If a thread is not present as determined at step 528, an appropriate suspect code may be issued at step 530. The considerations discussed above in connection with FIG. 26 concerning genuine bills which do not contain security threads are applicable here as well. If at step 528 it is determined that a security thread is present, the color of any fluorescent light emitted by the detected security thread is then compared with master thread fluorescent colors associated with genuine bills at step 532. If at step 532, the detected thread fluorescent light does not match one of the stored master thread fluorescent colors, an appropriate suspect code is generated at step 534. Otherwise, if the detected thread fluorescent color does sufficiently match one of the stored master thread fluorescent colors, the denomination associated with the matching master thread color is indicated as the denomination of the scanned bill at step 536. The sensors used to detect fluorescent light may be designed only to respond to light corresponding to an appropriate master color. This may be accomplished, for example, by employing light filters that permit only light having a frequency of a genuine color to reach a given sensor. Sensors such as those discussed in connection with FIGS. 18-20 may be employed to detect appropriate fluorescent thread colors.

Figure 28:
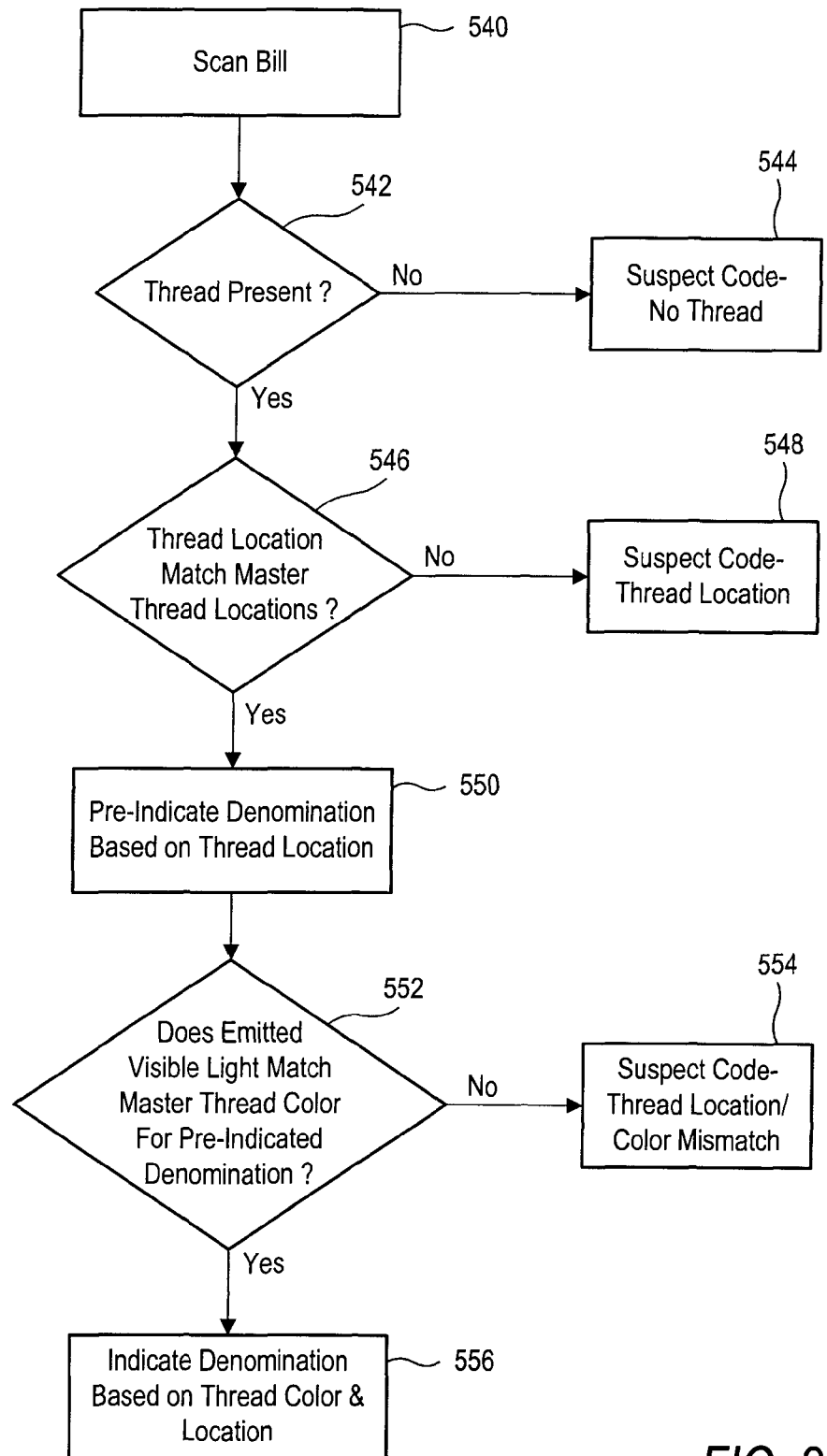
FIG. 28 is a flowchart illustrating the steps performed in optically determining the denomination of a bill based on the location and color of the security thread according to principles of the present invention.

FIG. 28 is a flowchart illustrating the steps performed in determining the denomination of a bill based on the location and fluorescent color of a security thread. FIG. 28 essentially combines the steps of FIGS. 26 and 27. At step 540, the bill is scanned for the presence, location, and fluorescent color of a security thread. The presence of a security thread may be detected as described above in connection with FIG. 26. If a thread is not present as determined at step 542, an appropriate suspect code may be issued at step 544. The considerations discussed above in connection with FIG. 26 concerning genuine bills which do not contain security threads are applicable here as well. If at step 542 it is determined that a security thread is present, the detected thread location is compared with master thread locations at step 546. If the location of the detected thread does not match a master thread location, an appropriate suspect code may be issued at step 548. If the location of the detected thread does match a master thread location, the scanned bill can be preliminary indicated to have the denomination associated with the matching thread location at step 550. Next at step 552 it is determined whether the color of any fluorescent light emitted by the detected security thread matches the master thread fluorescent color associated with a genuine bill of the denomination indicated at step 550. If at step 552, the detected thread fluorescent light does not match the corresponding stored master thread fluorescent color for the preliminary indicated denomination, an appropriate suspect code is generated at step 554. Otherwise, if the detected thread fluorescent color does sufficiently match the stored master thread fluorescent color for the preliminary indicated denomination, at step 556 the scanned bill is indicated to be of the denomination indicated at step 550.

Figure 29:
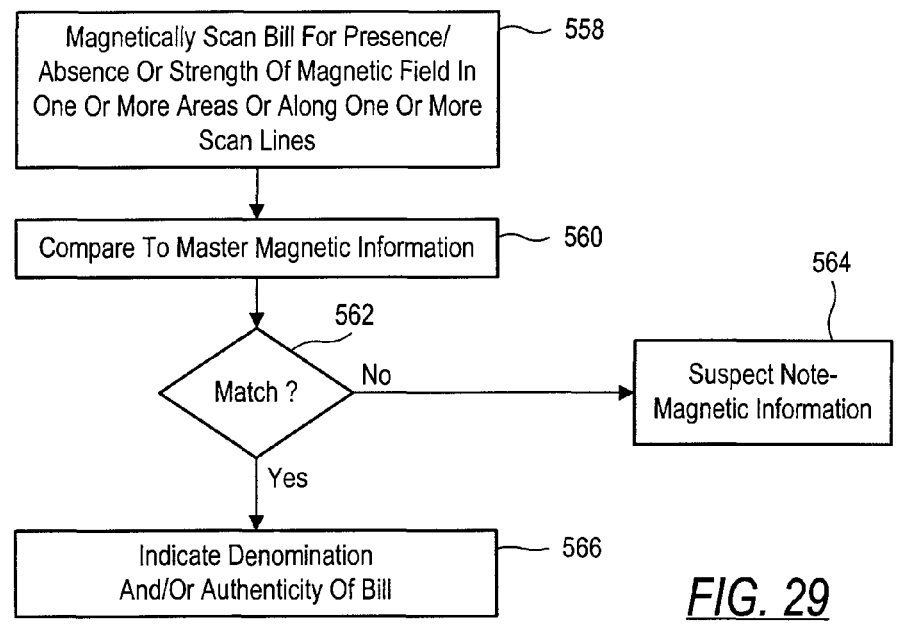
FIG. 29 is a flowchart illustrating the steps performed in magnetically determining the denomination of a bill according to principles of the present invention.

FIG. 29 is a flowchart illustrating the steps performed in magnetically determining the denomination of a bill. At step 558, a bill is magnetically scanned and one or more magnetic patterns are generated. Alternatively, instead of generating magnetically scanned patterns, a bill is magnetically scanned for the presence or absence of magnetic ink at one or more specific locations on the bill. Alternatively, instead of simply detecting whether magnetic ink is present at certain locations, the strength of magnetic fields may be measured at one or more locations on the bill. At step 560 the scanned magnetic information is compared to master magnetic information. One or more sets of master magnetic information are stored for each denomination that a system employing the methods of FIG. 29 is designed to discriminate. For example, where one or more scanned magnetic patterns are generated, such patterns are compared to stored master magnetic patterns. Where, the presence or absence of magnetic ink is detected at various locations on a bill, this information is compared to the stored master magnetic information associated with the expected presence and absence of magnetic ink characteristics at these various locations for one or more denominations of genuine bills. Alternatively, measured field strength information can be compared to master field strength information. At step 562 it is determined whether as a result of the comparison of step 560 the scanned magnetic information sufficiently matches one of sets of stored master magnetic information. For example, the comparison of patterns may yield a correlation number for each of the stored master patterns. To sufficiently match a master pattern, it may be required that the highest correlation number be greater than a threshold value. An example of such a method as applied to optically generated patterns is described in more detail in U.S. Pat. No. 5,295,196 incorporated herein by reference. If the scanned magnetic information does not sufficiently match the stored master magnetic information, an appropriate suspect code is generated at step 564. Otherwise, if the scanned magnetic information does sufficiently match one of the sets of stored master magnetic information, the denomination associated with the matching set of master magnetic information is indicated as the denomination of the scanned bill at step 566.

Figure 30:
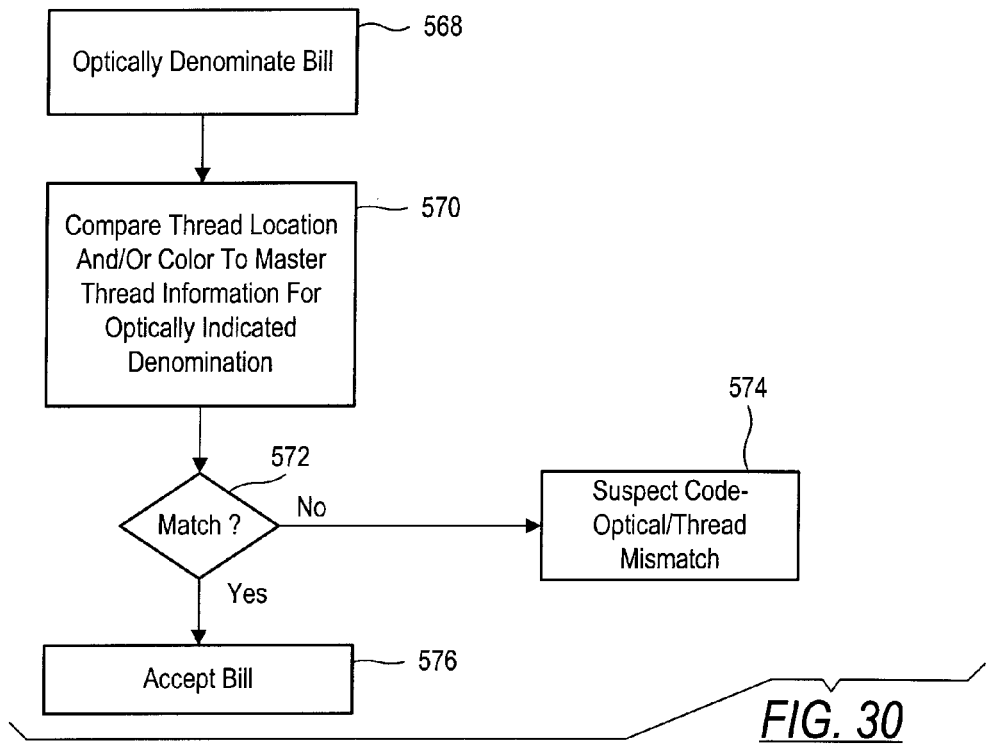
FIG. 30 is a flowchart illustrating the steps performed in optically denominating a bill and authenticating the bill based on thread location and/or color information.

FIG. 30 is a flowchart illustrating the steps performed in optically denominating a bill and authenticating the bill based on thread location and/or color information. At step 568, a bill is optically denominated, for example, according to the methods described above in connection with FIG. 25. Provided the denomination of the bill is optically determined at step 568, the bill is then authenticated based on the location and/or color of the security thread in the bill at step 570. The authentication step 570 may be performed, for example, according to the methods described in connection with FIGS. 26-28. At step 570, however, the detected thread location and/or color are only compared to master thread location and/or color information associated with the denomination determined in step 568. If the master thread location and/or color for the denomination indicated in step 568 match (step 572) the detected thread location and/or color for the bill under test, the bill is accepted (at step 576) as being a bill having the denomination determined in step 568. Otherwise, an appropriate suspect code is issued at step 574.

Figure 31:
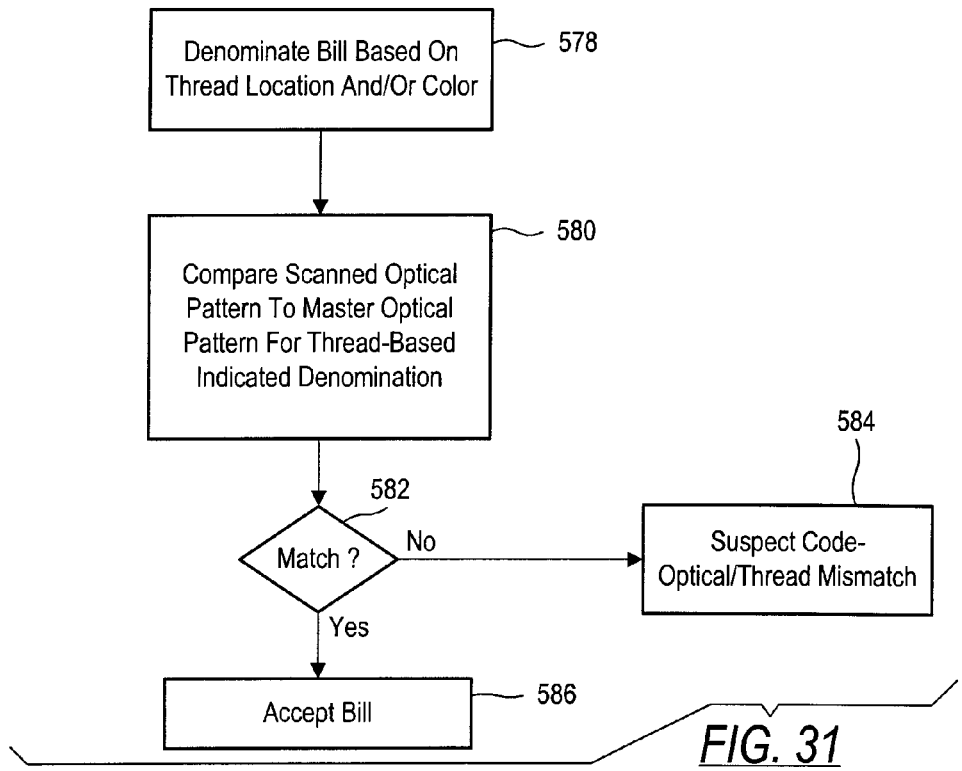
FIG. 31 is a flowchart illustrating the steps performed in denominating a bill based on thread location and/or color information and optically authenticating the bill.

FIG. 31 is a flowchart illustrating the steps performed in denominating a bill based on thread location and/or color information and optically authenticating the bill. At step 578, a bill is denominated based on thread location and/or color information, for example, according to the methods described above in connection with FIGS. 26-28. Provided the denomination of the bill is determined at step 578, the bill is then optically authenticated at step 580. The optical authentication step 580 may be performed, for example, according to the methods described in connection with FIG. 25. At step 580, however, the scanned optical pattern or information is only compared to master optical pattern or patterns or information associated with the denomination determined in step 578. If the master optical pattern or patterns or information for the denomination indicated in step 578 match (step 582) the scanned optical pattern or information for the bill under test, the bill is accepted (at step 586) as being a bill having the denomination determined in step 578. Otherwise, an appropriate suspect code is issued at step 584.

Figure 32:
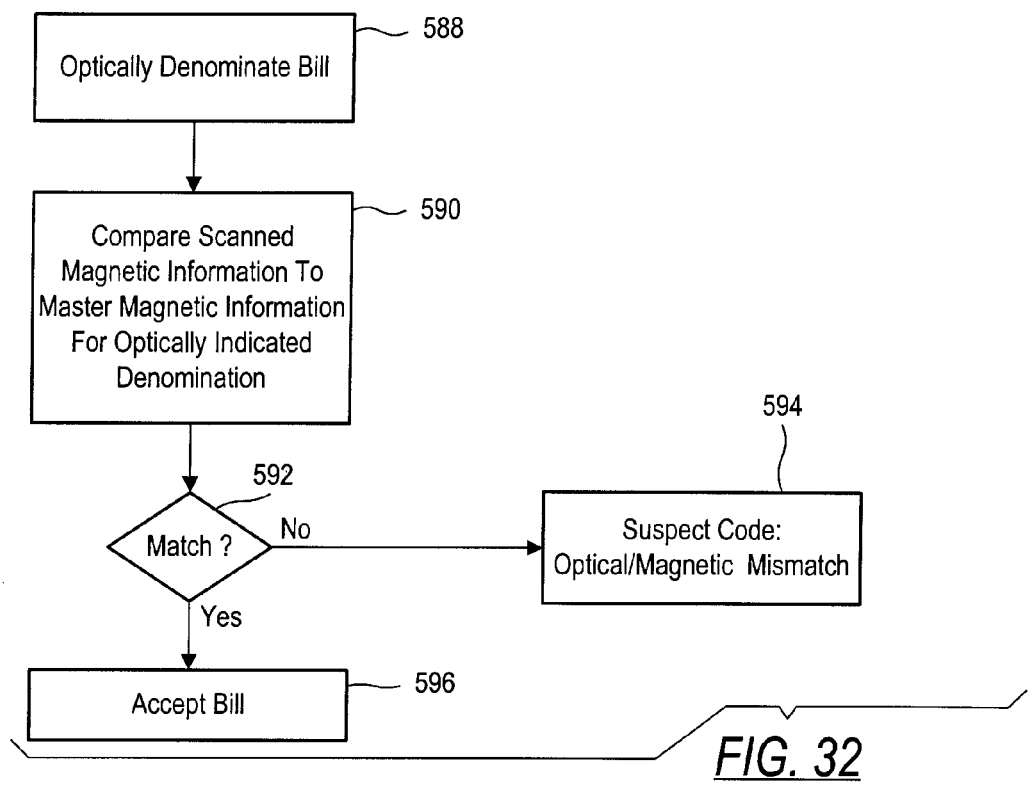
FIG. 32 is a flowchart illustrating the steps performed in optically determining the denomination of a bill and magnetically authenticating the bill according to principles of the present invention.

FIG. 32 is a flowchart illustrating the steps performed in optically denominating a bill and magnetically authenticating the bill. At step 588, a bill is optically denominated, for example, according to the methods described above in connection with FIG. 25. Provided the denomination of the bill is optically determined at step 588, the bill is then magnetically authenticated at step 590. The magnetic authentication step 590 may be performed, for example, according to the methods described in connection with in FIG. 29. At step 590, however, the detected magnetic information is only compared to master magnetic information associated with the denomination determined in step 588. If the master magnetic information for the denomination indicated in step 588 matches (step 592) the detected magnetic information for the bill under test, the bill is accepted (at step 596) as being a bill having the denomination determined in step 588. Otherwise, an appropriate suspect code is issued at step 594.

Figure 33:
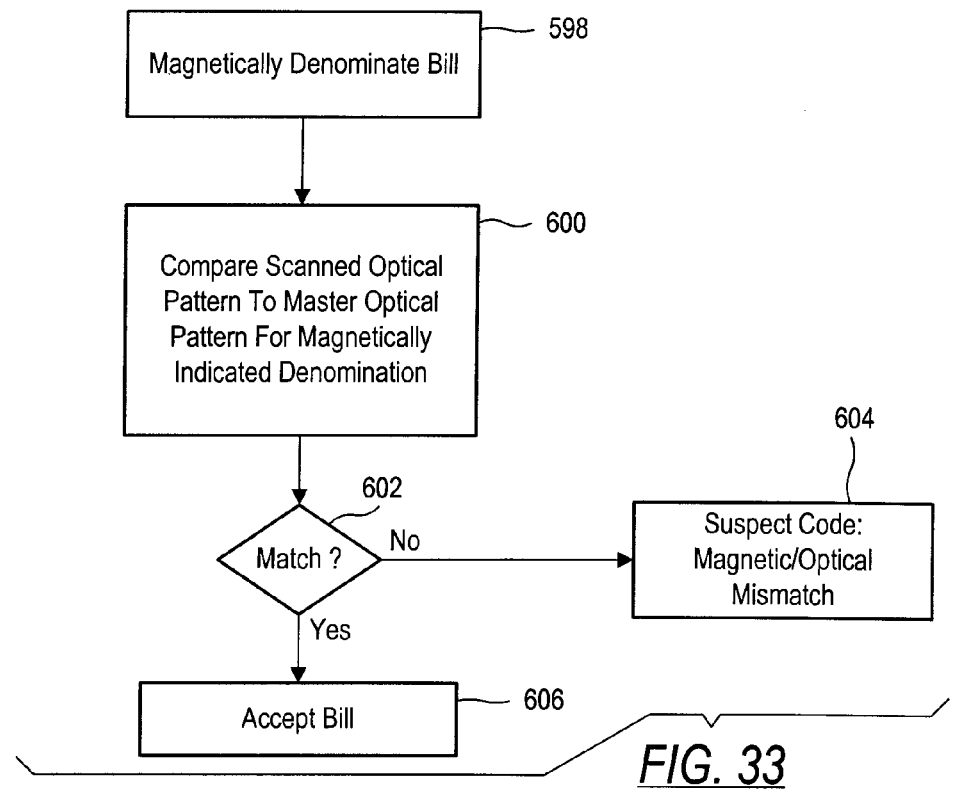
FIG. 33 is a flowchart illustrating the steps performed in magnetically determining the denomination of a bill and optically authenticating the bill according to principles of the present invention.

FIG. 33 is a flowchart illustrating the steps performed in magnetically denominating a bill and optically authenticating the bill. At step 598, a bill is magnetically denominated, for example, according to the methods described above in connection with FIG. 29. Provided the denomination of the bill is magnetically determined at step 598, the bill is then optically authenticated at step 600. The optical authentication step 600 may be performed, for example, according to the methods described in connection with in FIG. 25. At step 600, however, the detected optical information (or pattern) is only compared to master optical information (or pattern or patterns) associated with the denomination determined in step 598. If the master optical information for the denomination indicated in step 598 matches (step 602) the detected optical information for the bill under test, the bill is accepted (at step 606) as being a bill having the denomination determined in step 598. Otherwise, an appropriate suspect code is issued at step 604.

Figure 34:
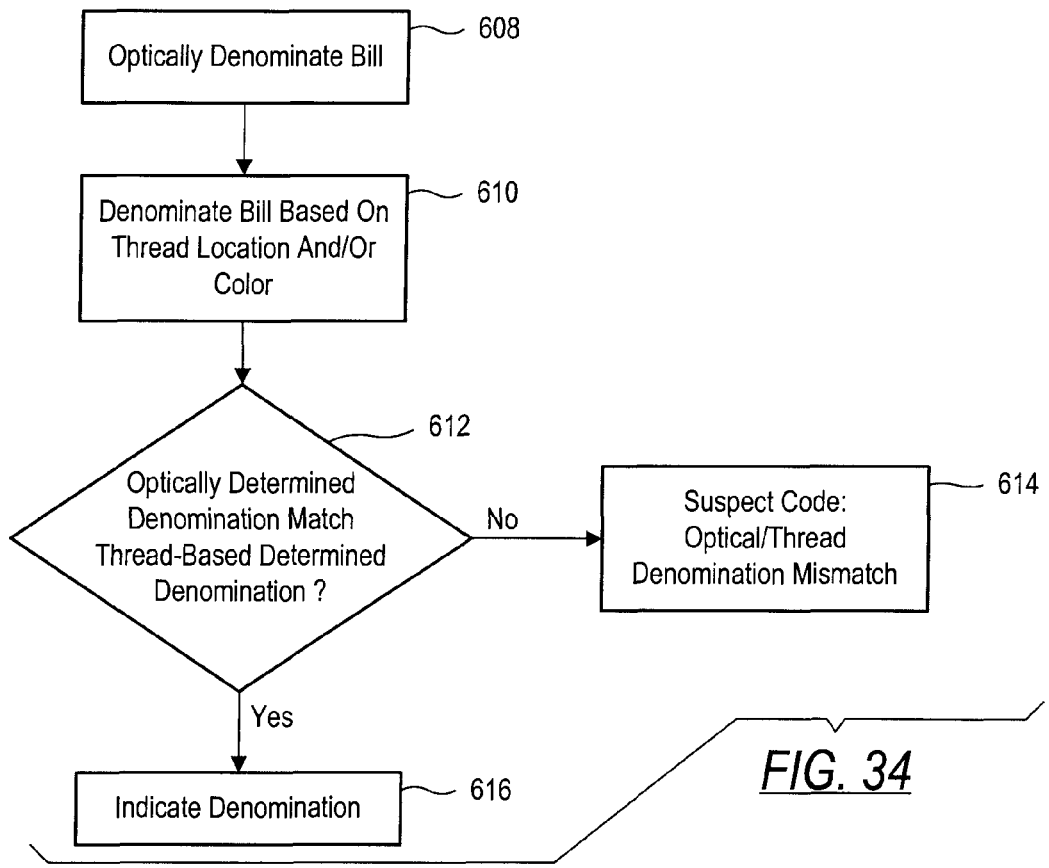
FIG. 34 is a flowchart illustrating the steps in denominating the bill according to principles of the present invention.

FIG. 34 is a flowchart illustrating the steps performed in denominating a bill both optically and based on thread location and/or color information. At step 608, a bill is optically denominated, for example, according to the methods described above in connection with FIG. 25. Provided the denomination of the bill is optically determined at step 608, the bill is then denominated based on the location and/or color of the security thread in the bill at step 610. The denominating step 610 may be performed, for example, according to the methods described in connection with FIGS. 26-28. At step 610, the denominating based on detected thread location and/or color is performed independently of the results of the optical denominating step 608. At step 612, the denomination as determined optically is compared with the denomination as determined based on thread location and/or color. If both optical and thread based denominating steps indicate the same denomination, the bill is accepted (at step 616) as being a bill having the denomination determined in steps 608 and 610. Otherwise, an appropriate suspect code is issued at step 614. Alternatively, the order of steps 608 and 610 may be reversed such that the bill is first denominated based on thread location and/or color and then optically denominated.

Figure 35:
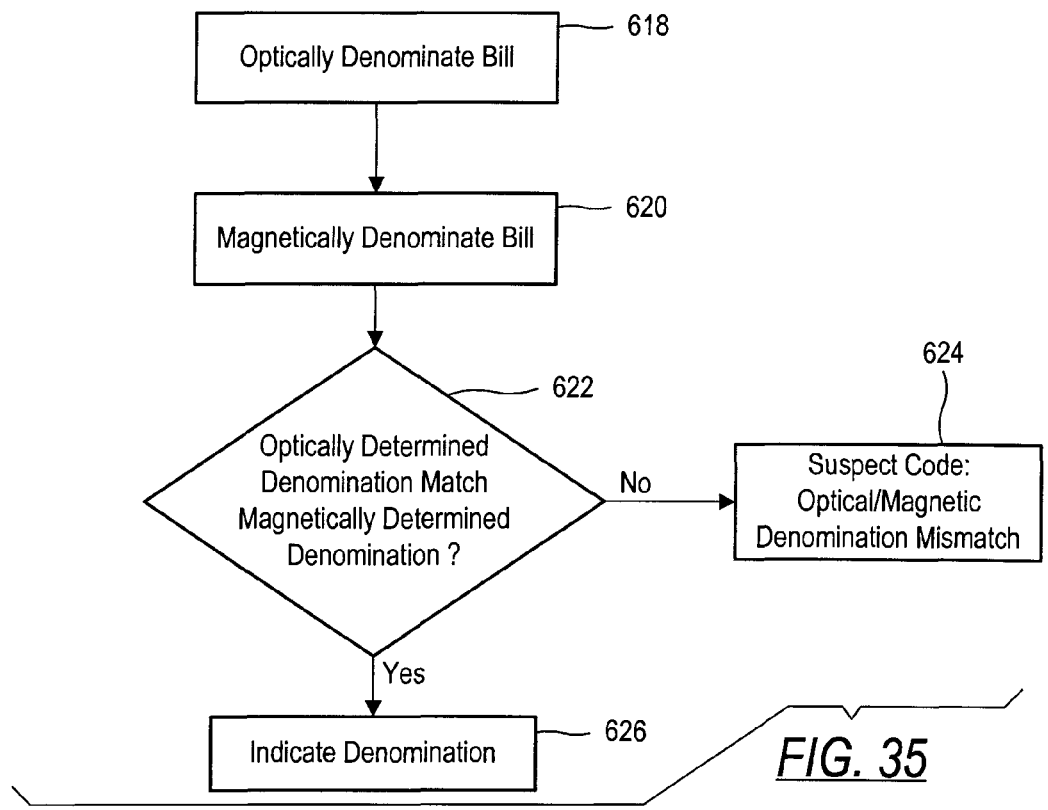
FIG. 35 is a flowchart illustrating the steps performed in denominating the bill both optically and magnetically according to principles of the present invention.

FIG. 35 is a flowchart illustrating the steps performed in denominating a bill both optically and magnetically. At step 618, a bill is optically denominated, for example, according to the methods described above in connection with FIG. 25. Provided the denomination of the bill is optically determined at step 618, the bill is then denominated magnetically at step 620, for example, according to the methods described in connection with FIG. 29. At step 620, the magnetic denominating is performed independently of the results of the optical denominating step 618. At step 622, the denomination as determined optically is compared with the denomination as determined magnetically. If both optical and magnetic denominating steps indicate the same denomination, the bill is accepted (at step 626) as being a bill having the denomination determined in steps 618 and 620. Otherwise, an appropriate suspect code is issued at step 624. Alternatively, the order of steps 618 and 620 may be reversed such that the bill is first magnetically denominated and then optically denominated.

Figure 36:
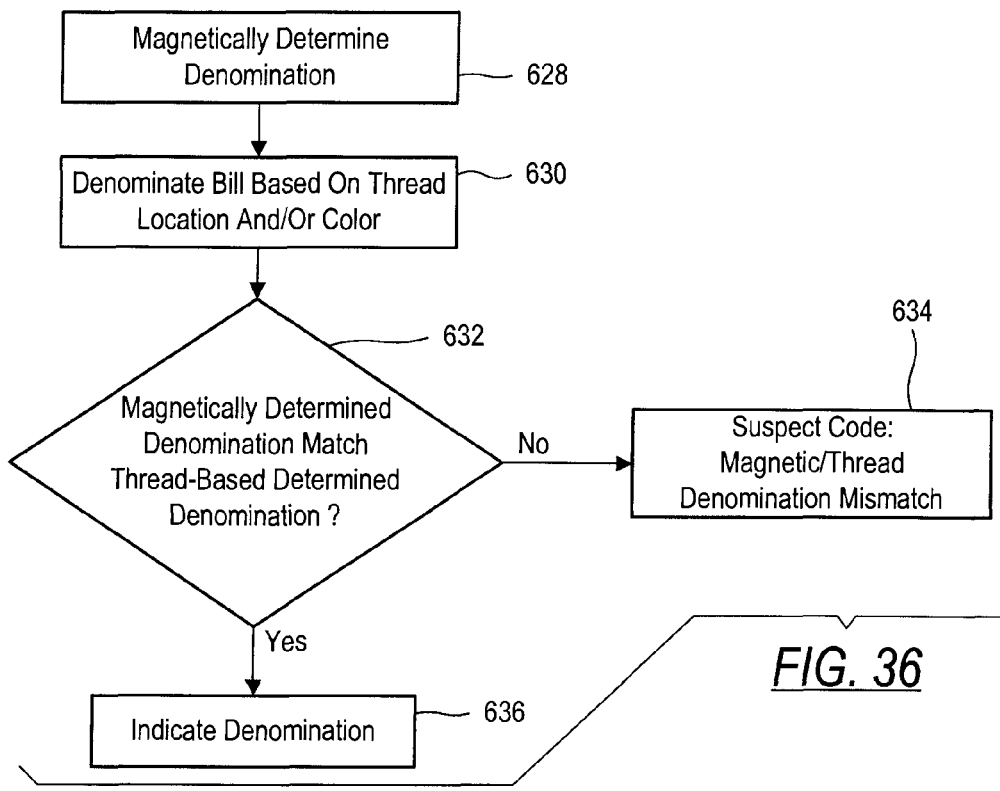
FIG. 36 is a flowchart illustrating the steps in denominating the bill magnetically and based on thread location according to principles of the present invention.

FIG. 36 is a flowchart illustrating the steps performed in denominating a bill both magnetically and based on thread location and/or color information. At step 628, a bill is magnetically denominated, for example, according to the methods described above in connection with FIG. 29. Provided the denomination of the bill is magnetically determined at step 628, the bill is then denominated based on the location and/or color of the security thread in the bill at step 630. The denominating step 630 may be performed, for example, according to the methods described in connection with FIGS. 26-28. At step 630, the denominating based on detected thread location and/or color is performed independently of the results of the magnetic denominating step 628. At step 632, the denomination as determined magnetically is compared with the denomination as determined based on thread location and/or color. If both magnetic and thread based denominating steps indicate the same denomination, the bill is accepted (at step 636) as being a bill having the denomination determined in steps 628 and 630. Otherwise, an appropriate suspect code is issued at step 634. Alternatively, the order of steps 628 and 630 may be reversed such that the bill is first denominated based on thread location and/or color and then magnetically denominated.

Figure 37:
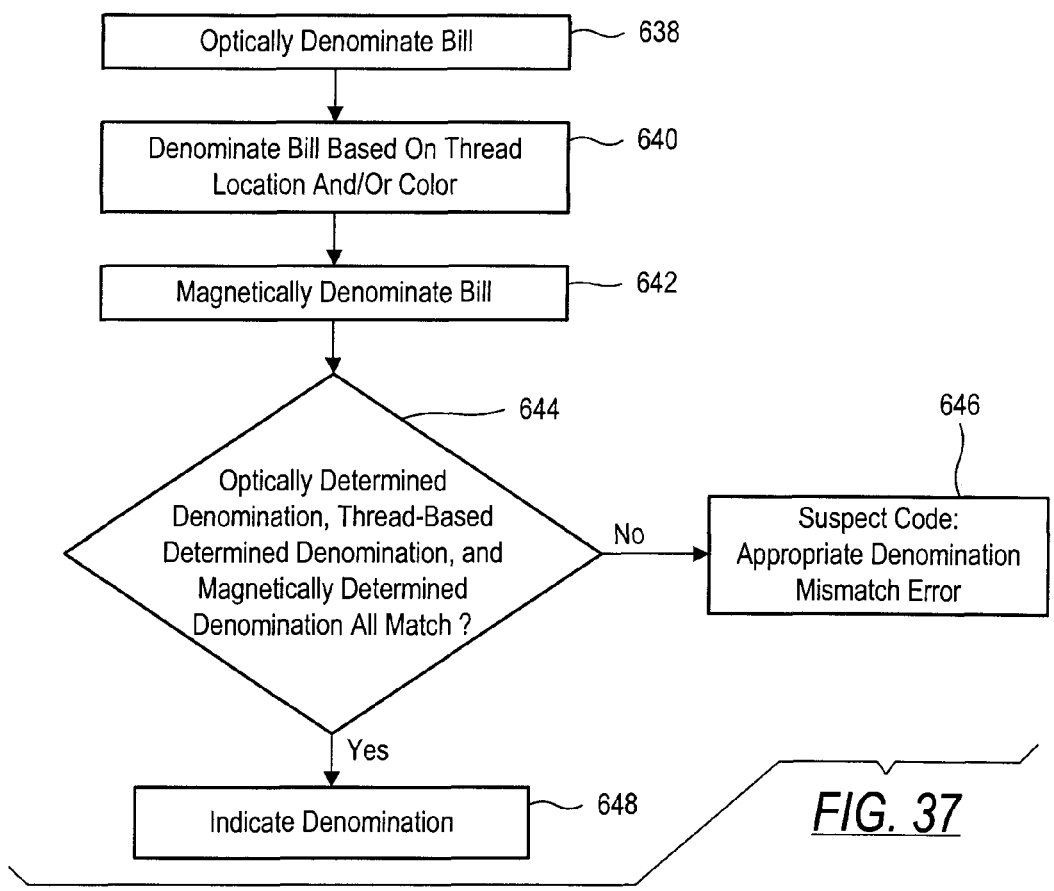
FIG. 37 is a flowchart illustrating the steps performed in denominating a bill optically, based on thread location and magnetically according to principles of the present invention.

FIG. 37 is a flowchart illustrating the steps performed in denominating a bill optically, based on thread location and/or color information, and magnetically. At step 638, a bill is optically denominated, for example, according to the methods described above in connection with FIG. 25. Provided the denomination of the bill is optically determined at step 638, the bill is then denominated based on the location and/or color of the security thread in the bill at step 640. The denominating step 640 may be performed, for example, according to the methods described in connection with FIGS. 26-28. At step 640, the denominating based on detected thread location and/or color is performed independently of the results of the optical denominating step 638. Provided the denomination of the bill is determined at step 640, the bill is then denominated magnetically at step 642, for example, according to the methods described in connection with FIG. 29. At step 642, the magnetic denominating is performed independently of the results of the denominating steps 638 and 640. At step 644, the denominations as determined optically, magnetically, and based on thread location and/or color are compared. If all denominating steps 638-642 indicate the same denomination, the bill is accepted (at step 648) as being a bill having the denomination determined in steps 638-642. Otherwise, an appropriate suspect code is issued at step 646. Alternatively, the order of steps 638-642 may be rearranged. For example, a bill may be first denominated optically, then be denominated magnetically, and finally be denominated based on thread location and/or color. Alternatively, a bill may be first denominated magnetically, then be denominated optically, and finally be denominated based on thread location and/or color. Alternatively, a bill may be first denominated magnetically, then be denominated based on thread location and/or color, and finally be denominated optically. Alternatively, a bill may be first denominated based on thread location and/or color, and then be denominated magnetically, and finally be denominated optically. Alternatively, a bill may be first denominated based on thread location and/or color, and then be denominated optically, and finally be denominated magnetically.

Figure 38:
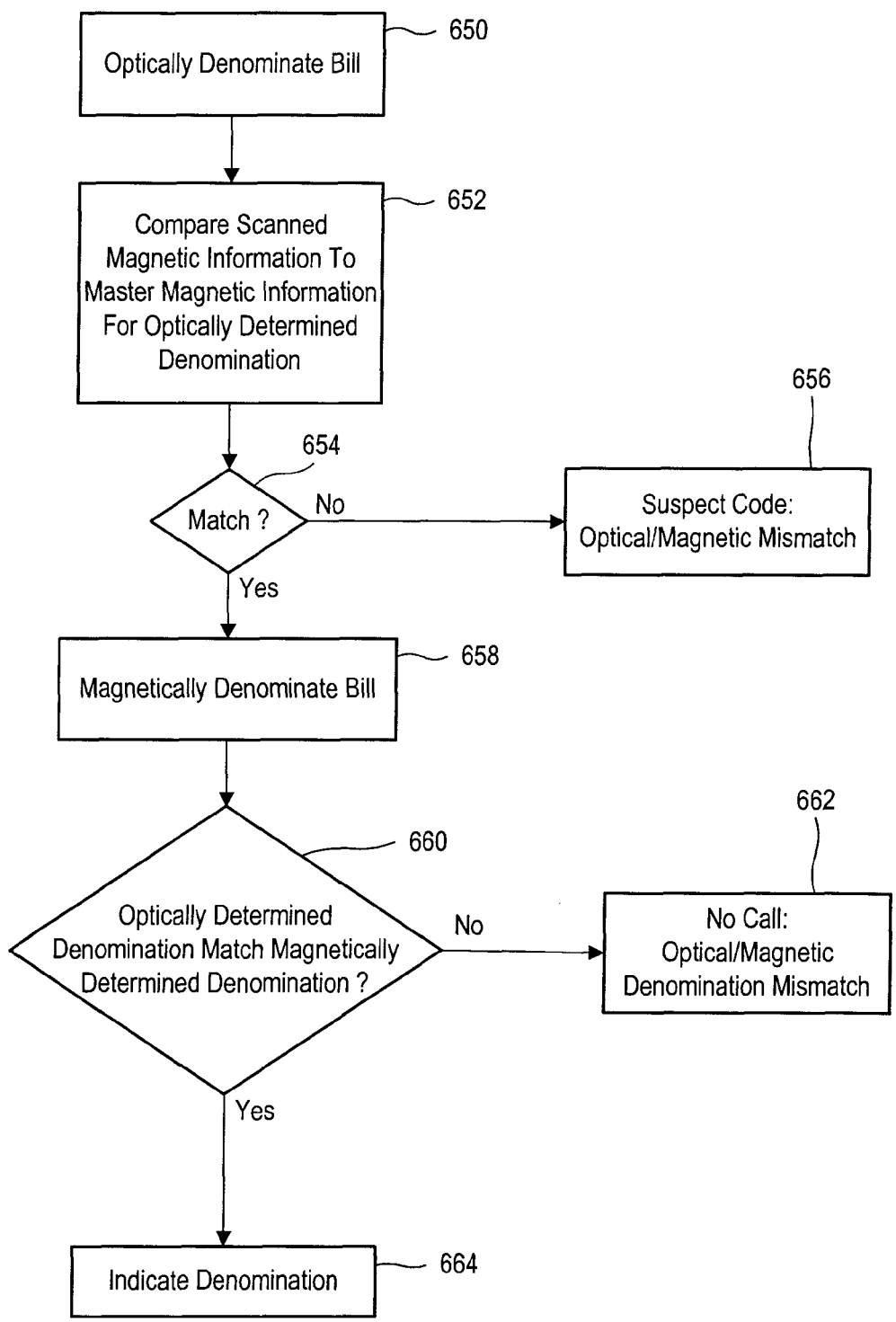
FIG. 38 is a flowchart illustrating the steps performed in denominating a bill based on a first characteristic and authenticating it based on a second characteristic according to principles of the present invention.

FIG. 38 is a flowchart illustrating the steps performed in a method whereby a bill is denominated based on a first characteristic, then authenticated based on a second characteristic, and if the bill is authenticated, then the bill is denominated again based on the second characteristic. According to the flowchart of FIG. 38, at step 650, a bill is optically denominated, for example, according to the methods described above in connection with FIG. 25. Provided the denomination of the bill is optically determined at step 650, the bill is then magnetically authenticated at step 652. The magnetic authentication step 652 may be performed, for example, according to the methods described in connection with in FIG. 29. At step 652, however, the detected magnetic information is only compared to master magnetic information associated with the denomination determined in step 650. If the master magnetic information for the denomination indicated in step 650 does not sufficiently match (step 654) the detected magnetic information for the bill under test, an appropriate suspect code is issued at step 656. Otherwise, the bill is denominated again (at step 658) but this time using magnetic information. If the magnetically determined denomination does not match (step 660) the optically determined denomination, an appropriate error code is issued at step 662. If the magnetically determined denomination does match (step 660) the optically determined denomination, the denomination as determined at steps 650 and 658 is indicated as the denomination of the bill under test at step 664.

The method of FIG. 38 is advantageous in providing a high degree of certainty in the determination of the denomination of a bill while shortening processing time when a bill fails an earlier test. For example, at step 650 a bill is optically denominated. If the bill can not be called as a specific denomination under the optical test, a no call code is issued such as at step 506 in FIG. 25 and the denominating/authenticating process ends with respect to the bill. If the bill is successfully optically denominated, the bill is then authenticated based on magnetic information at step 652. Processing time is saved at this step by comparing, the scanned magnetic information for the bill under test only with master magnetic information associated with the denomination as determined optically at step 650. If the scanned magnetic information does not sufficiently match the master magnetic information for that denomination, an appropriate suspect code is issued and the denominating/authenticating process ends with respect to the bill. If the bill successfully passes the authentication step 654, the bill is then denominated using the magnetic information. Here the scanned magnetic information is compared to master magnetic information for a number of denominations. It is then determined which denomination is associated with the master magnetic information that best matches the scanned magnetic information and this denomination is compared with the optically determined denomination to verify that they agree. For example, a bill may be optically determined to be a $100 bill. The magnetic information employed may be magnetic patterns similar to the optically generated patterns described above and in U.S. Pat. No. 5,295,196. At step 652, the scanned magnetic pattern is correlated against the master magnetic pattern or patterns associated with $100 bills. Assume, for example, that a correlation value of at least 850 is required to pass the authentication test. If the scanned magnetic pattern yields a correlation of 860 when compared to the master magnetic pattern or patterns associated with $100 bills, the bill then passes the authentication step 654. At this point, the bill is magnetically denominated independently of the results of the optical denominating step 650. This step ensures that the best match magnetically matches the best match optically. For example, if at step 658, the highest correlation is 860 which is associated with a $100 bill master magnetic pattern, then the magnetic denominating and optical denominating steps both point to a $100 bill and accordingly, the bill is indicated to be a $100 bill at step 664. However, if the highest correlation is 900 which is associated with a $20 bill master magnetic pattern, then the optically determined denomination and the magnetically determined denomination disagree and an appropriate error message is issued at step 662.

The method of FIG. 38 may be particularly useful in denominating and authenticating bills of higher denominations such as $20, $50, and $100 bills. The higher value of these notes may make it desirable to undertake the additional denominating steps 658-664. The method of FIG. 38 could be modified so that if a bill were determined to be a $20, $50, or $100 at step 650 then the steps as indicated in FIG. 38 would be followed. However, if a bill were determined to be a $1, $2, $5, or $10 at step 650, then instead of magnetically denominating the bill at step 658, the bill could be immediately accepted such as in FIG. 32.

Figure 39:
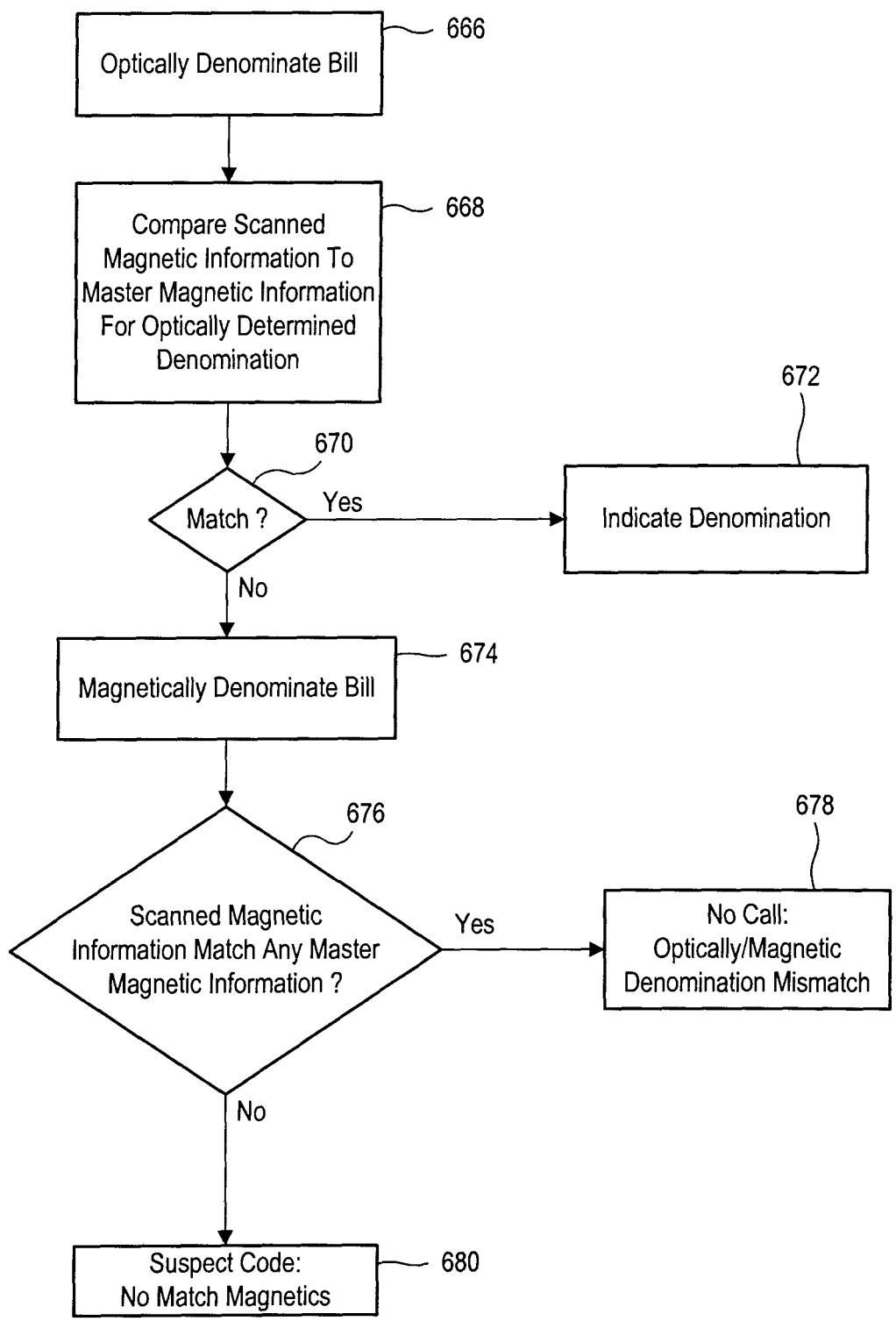
FIGS. 39-47 illustrate alternative methods for denominating and/or authenticating according to principles of the present invention.

FIG. 39 is a flowchart illustrating the steps performed in a method whereby a bill is denominated based on a first characteristic, then authenticated based on a second characteristic, and if the bill fails the authentication test, then the bill is denominated again based on the second characteristic. According to the flowchart of FIG. 39, at step 666, a bill is optically denominated, for example, according to the methods described above in connection with FIG. 25. Provided the denomination of the bill is optically determined at step 666, the bill is then magnetically authenticated at step 668. The magnetic authentication step 668 may be performed, for example, according to the methods described in connection with in FIG. 29. At step 668, however, the detected magnetic information is only compared to master magnetic information associated with the denomination determined in step 666. If the master magnetic information for the denomination indicated in step 666 matches (step 670) the detected magnetic information for the bill under test, the bill is indicated (at step 672) to have the denomination as determined at step 666. Otherwise, the bill is denominated again (at step 674) but this time using magnetic information. If the detected magnetic information sufficiently matches (step 676) any of the stored master magnetic information, an appropriate error code is issued at step 678. Because the bill failed the test at step 670, if the scanned magnetic information matches any of the stored master magnetic information, the matching master magnetic information will be associated with a denomination other than the denomination determined optically at step 666. Accordingly, at step 678, the magnetically determined denomination differs from the optically determined denomination and an appropriate error code may be generated such as a no call code indicating that the optical and magnetic tests resulted in different denomination determinations thus preventing the system from calling the denomination of the bill under test. Such an error might be indicative of a situation where the bill under test is a genuine bill that had its optical or magnetic appearance altered, for example, where a genuine $1 bill was changed so that it appeared optically at least in part to be like a higher denomination bill such as a $20 bill. If the detected magnetic information does not match (step 676) any of the stored master magnetic information, an appropriate suspect code is issued at step 680. The error code at step 680 may indicate that the scanned bill does not match magnetically any of the stored master magnetic information associated with genuine bills.

The method of FIG. 39 is advantageous in that processing time is saved where a bill is determined to be genuine after passing two tests. Furthermore, when a bill fails the test at step 670, an additional test is performed to better define the suspect qualities of a bill which is rejected.

In FIGS. 38 and 39 the first characteristic is optical information and the second characteristic is magnetic information. Alternatively, the methods of FIGS. 38 and 39 may be performed with other combinations of characteristic information wherein the first and second characteristic information comprise a variety of characteristic information as described above such as magnetic, optical, color, and thread based information. Examples of such alternatives are discussed below in connection with FIGS. 40-44. Alternatively, the methods of FIGS. 38 and 39 may be performed utilizing first characteristic information to denominate a bill, then using second characteristic information to authenticate the bill and finally denominating the bill again using third characteristic information. Again the variety of characteristic information described above such as magnetic, optical, color, and thread based information may be employed in various combinations as first, second, and third characteristic information.

Figure 40:
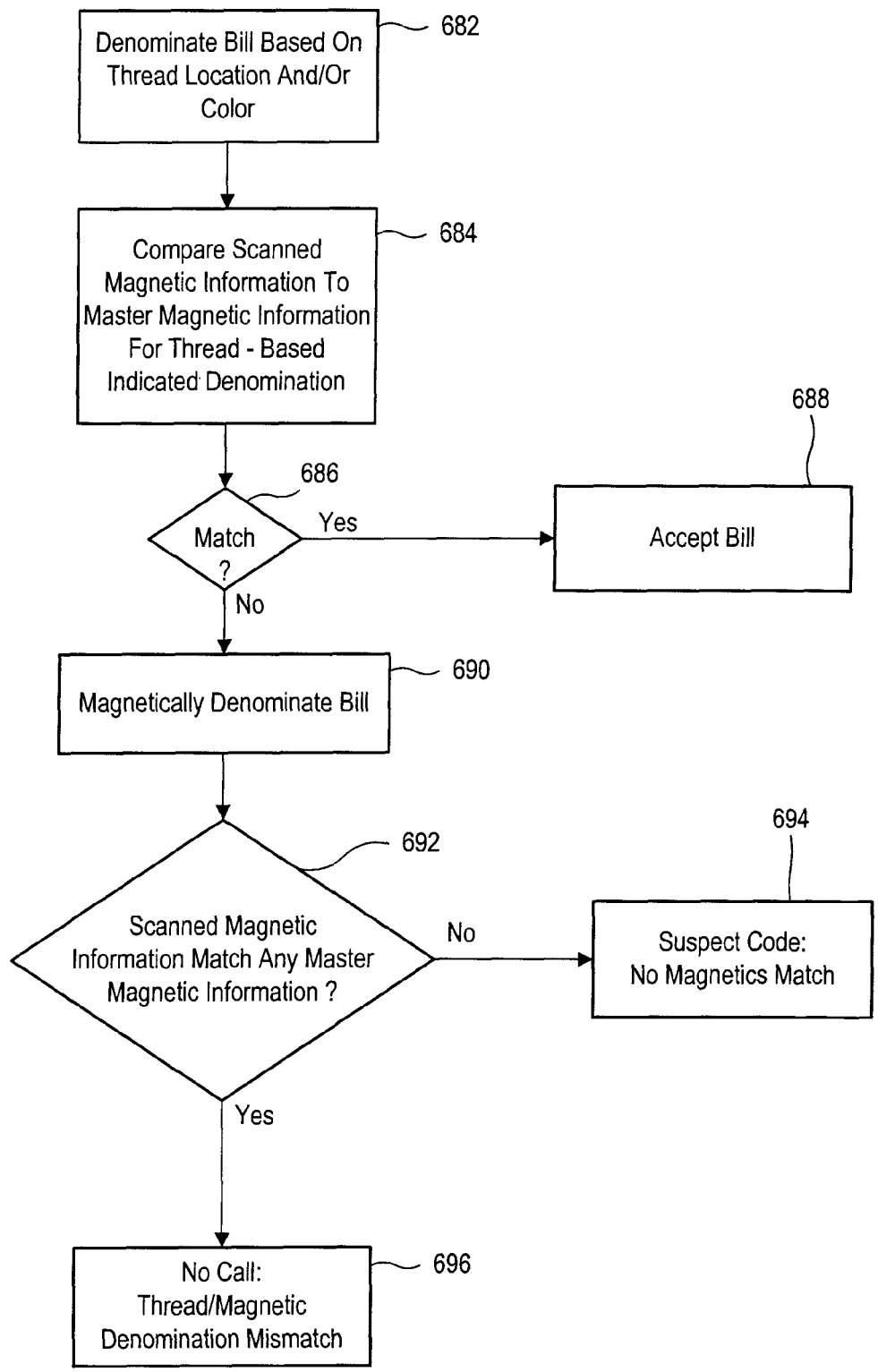

FIG. 40 is similar to FIG. 39 and is a flowchart illustrating the steps performed in a method whereby a bill is denominated based on a first characteristic, then authenticated based on a second characteristic, and if the bill fails the authentication test, then the bill is denominated again based on the second characteristic. According to the flowchart of FIG. 40, at step 682, a bill is denominated based on thread location and/or color, for example, according to the methods described above in connection with FIGS. 26-28. Provided the denomination of the bill is determined at step 682, the bill is then magnetically authenticated at step 684. The magnetic authentication step 684 may be performed, for example, according to the methods described in connection with in FIG. 29. At step 684, however, the detected magnetic information is only compared to master magnetic information associated with the denomination determined in step 682. If the master magnetic information for the denomination indicated in step 682 matches (step 686) the detected magnetic information for the bill under test, the bill is accepted and indicated (at step 688) to have the denomination as determined at step 682. Otherwise, the bill is denominated again (at step 690) but this time using magnetic information. If the detected magnetic information sufficiently matches (step 692) any of the stored master magnetic information, an appropriate error code is issued at step 696. Because the bill failed the test at step 686, if the scanned magnetic information matches any of the stored master magnetic information, the matching master magnetic information will be associated with a denomination other than the denomination determined at step 682. Accordingly, at step 696, the magnetically determined denomination differs from the thread-based determined denomination and an appropriate error code may be generated such as a no call code indicating that the thread-based and magnetic tests resulted in different denomination determinations thus preventing the system from calling the denomination of the bill under test. If the detected magnetic information does not match (step 692) any of the stored master magnetic information, an appropriate suspect code is issued at step 694. The error code at step 694 may indicate that the scanned bill does not match magnetically any of the stored master magnetic information associated with genuine bills.

Figure 41:
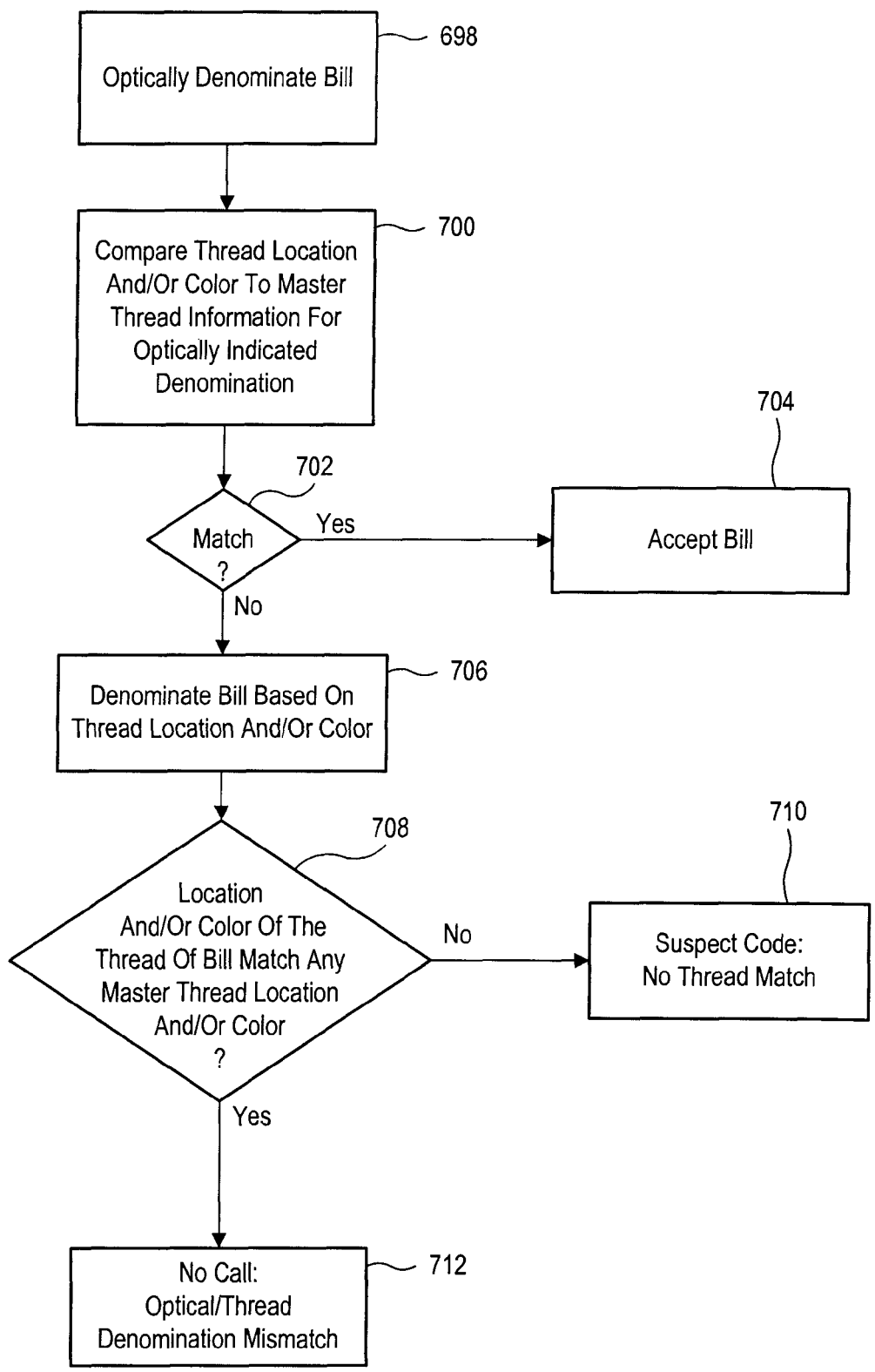

FIG. 41 is also similar to FIG. 39 and is a flowchart illustrating the steps performed in a method whereby a bill is denominated based on a first characteristic, then authenticated based on a second characteristic, and if the bill fails the authentication test, then the bill is denominated again based on the second characteristic. According to the flowchart of FIG. 41, at step 698, a bill is optically denominated, for example, according to the methods described above in connection with FIG. 25. Provided the denomination of the bill is determined at step 698, the bill is then authenticated based on thread location and/or color at step 700. The authentication step 700 may be performed, for example, according to the methods described in connection with in FIGS. 26-28. At step 700, however, the detected thread information is only compared to master thread information associated with the denomination determined in step 698. If the master thread information for the denomination indicated in step 698 matches (step 702) the detected thread information for the bill under test, the bill is accepted and indicated (at step 704) to have the denomination as determined at step 698. Otherwise, the bill is denominated again (at step 706) but this time using thread information. If the detected thread information matches (step 708) any of the stored master thread information, an appropriate error code is issued at step 712. Because the bill failed the test at step 702, if the thread-based information matches any of the stored master thread information, the matching master thread information will be associated with a denomination other than the denomination determined at step 698. Accordingly, at step 712, the thread-based determined denomination differs from the optically determined denomination and an appropriate error code may be generated such as a no call code indicating that the thread-based and optical tests resulted in different denomination determinations thus preventing the system from calling the denomination of the bill under test. If the detected thread information does not match (step 708) any of the stored master thread information, an appropriate suspect code is issued at step 710. The error code at step 710 may indicate that the thread characteristics of the scanned bill does not match any of the stored master thread information associated with genuine bills.

Figure 42:
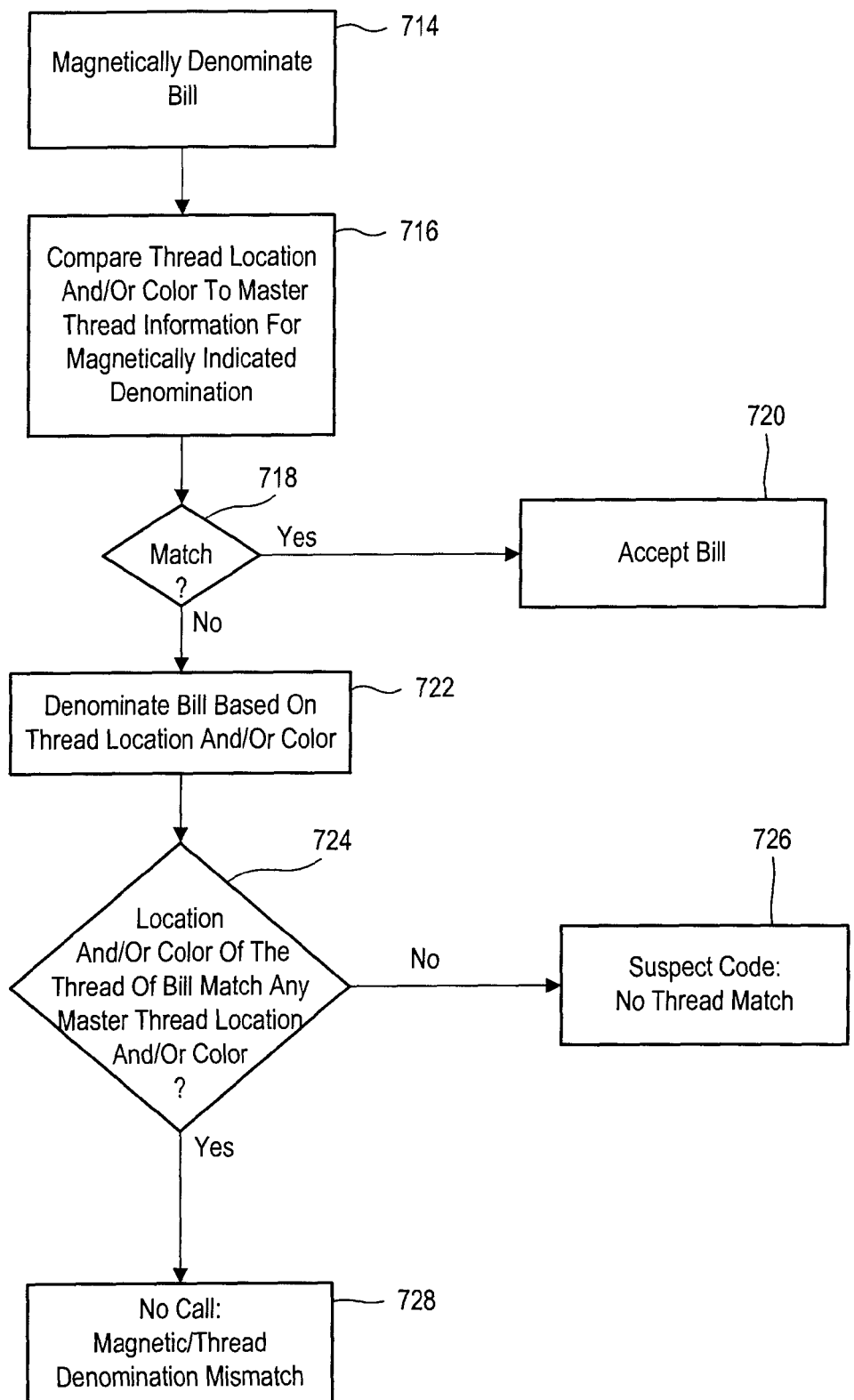

FIG. 42 is also similar to FIG. 39 and is a flowchart illustrating the steps performed in a method whereby a bill is denominated based on a first characteristic, then authenticated based on a second characteristic, and if the bill fails the authentication test, then the bill is denominated again based on the second characteristic. According to the flowchart of FIG. 42, at step 714, a bill is magnetically denominated, for example, according to the methods described above in connection with FIG. 29. Provided the denomination of the bill is determined at step 714, the bill is then authenticated based on thread location and/or color at step 716. The authentication step 716 may be performed, for example, according to the methods described in connection with in FIGS. 26-28. At step 716, however, the detected thread information is only compared to master thread information associated with the denomination determined in step 714. If the master thread information for the denomination indicated in step 714 matches (step 718) the detected thread information for the bill under test, the bill is accepted and indicated (at step 720) to have the denomination as determined at step 714. Otherwise, the bill is denominated again (at step 722) but this time using thread information. If the detected thread information matches (step 724) any of the stored master thread information, an appropriate error code is issued at step 728. Because the bill failed the test at step 718, if the thread-based information matches any of the stored master thread information, the matching master thread information will be associated with a denomination other than the denomination determined at step 714. Accordingly, at step 728, the thread-based determined denomination differs from the magnetically determined denomination and an appropriate error code may be generated such as a no call code indicating that the thread-based and magnetic tests resulted in different denomination determinations thus preventing the system from calling the denomination of the bill under test. If the detected thread information does not match (step 724) any of the stored master thread information, an appropriate suspect code is issued at step 726. The error code at step 726 may indicate that the thread characteristics of the scanned bill does not match any of the stored master thread information associated with genuine bills.

Figure 43:
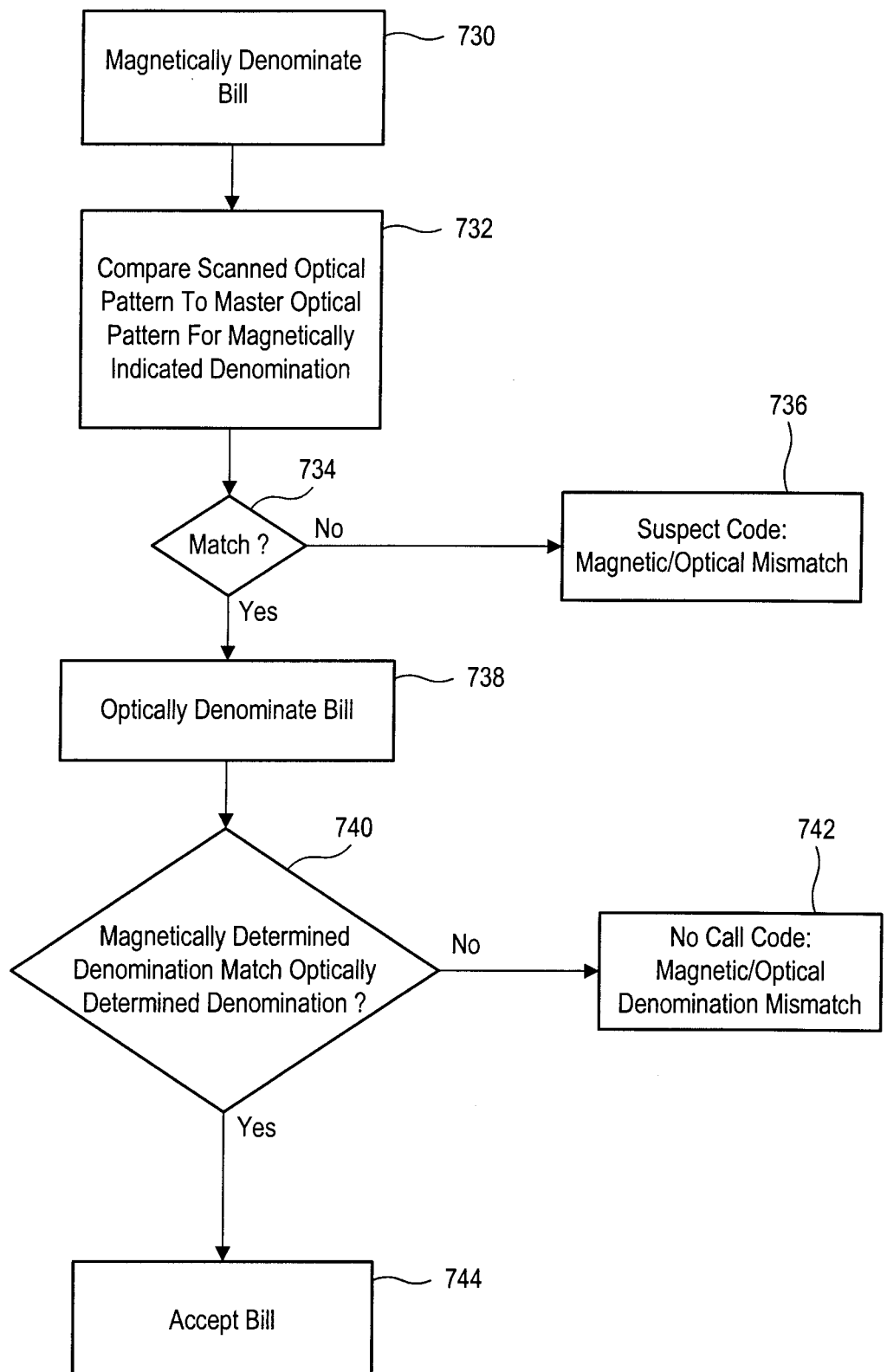

FIG. 43 is similar to FIG. 38 and is a flowchart illustrating the steps performed in a method whereby a bill is denominated based on a first characteristic, then authenticated based on a second characteristic, and if the bill is authenticated, then the bill is denominated again based on the second characteristic. According to the flowchart of FIG. 43, at step 730, a bill is magnetically denominated, for example, according to the methods described above in connection with FIG. 29. Provided the denomination of the bill is magnetically determined at step 730, the bill is then optically authenticated at step 732. The optical authentication step 732 may be performed, for example, according to the methods described in connection with in FIG. 25. At step 732, however, the detected optical information is only compared to master optical information associated with the denomination determined in step 730. If the master optical information for the denomination indicated in step 730 does not sufficiently match (step 734) the detected optical information for the bill under test, an appropriate suspect code is issued at step 736. Otherwise, the bill is denominated again (at step 738) but this time using optical information. If the optically determined denomination does not match (step 740) the magnetically determined denomination, an appropriate error code is issued at step 742. If the optically determined denomination does match (step 740) the magnetically determined denomination, the denomination as determined at steps 730 and 738 is indicated as the denomination of the bill under test at step 744.

Figure 44:
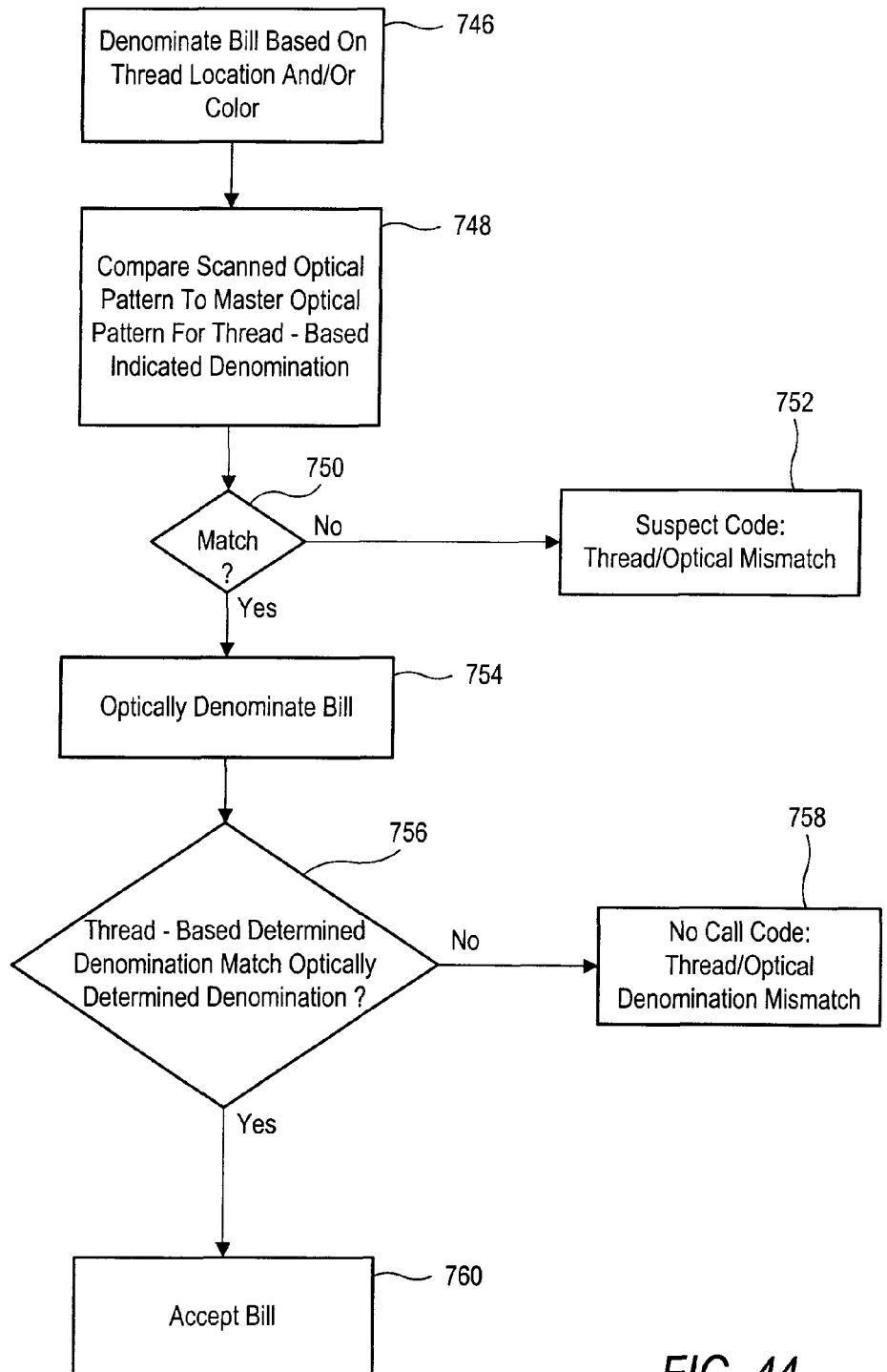

FIG. 44 is also similar to FIG. 38 and is a flowchart illustrating the steps performed in a method whereby a bill is denominated based on a first characteristic, then authenticated based on a second characteristic, and if the bill is authenticated, then the bill is denominated again based on the second characteristic. According to the flowchart of FIG. 44, at step 746, a bill is denominated based on thread location and/or color, for example, according to the methods described above in connection with FIGS. 26-28. Provided the denomination of the bill is determined at step 746, the bill is then optically authenticated at step 748. The optical authentication step 748 may be performed, for example, according to the methods described in connection with in FIG. 25. At step 748, however, the detected optical information is only compared to master optical information associated with the denomination determined in step 746. If the master optical information for the denomination indicated in step 746 does not sufficiently match (step 750) the detected optical information for the bill under test, an appropriate suspect code is issued at step 752. Otherwise, the bill is denominated again (at step 754) but this time using optical information. If the optically determined denomination does not match (step 756) the thread-based determined denomination, an appropriate error code is issued at step 758. If the optically determined denomination does match (step 740) the thread-based determined denomination, the denomination as determined at steps 746 and 754 is indicated as the denomination of the bill under test at step 760.

Figure 45:
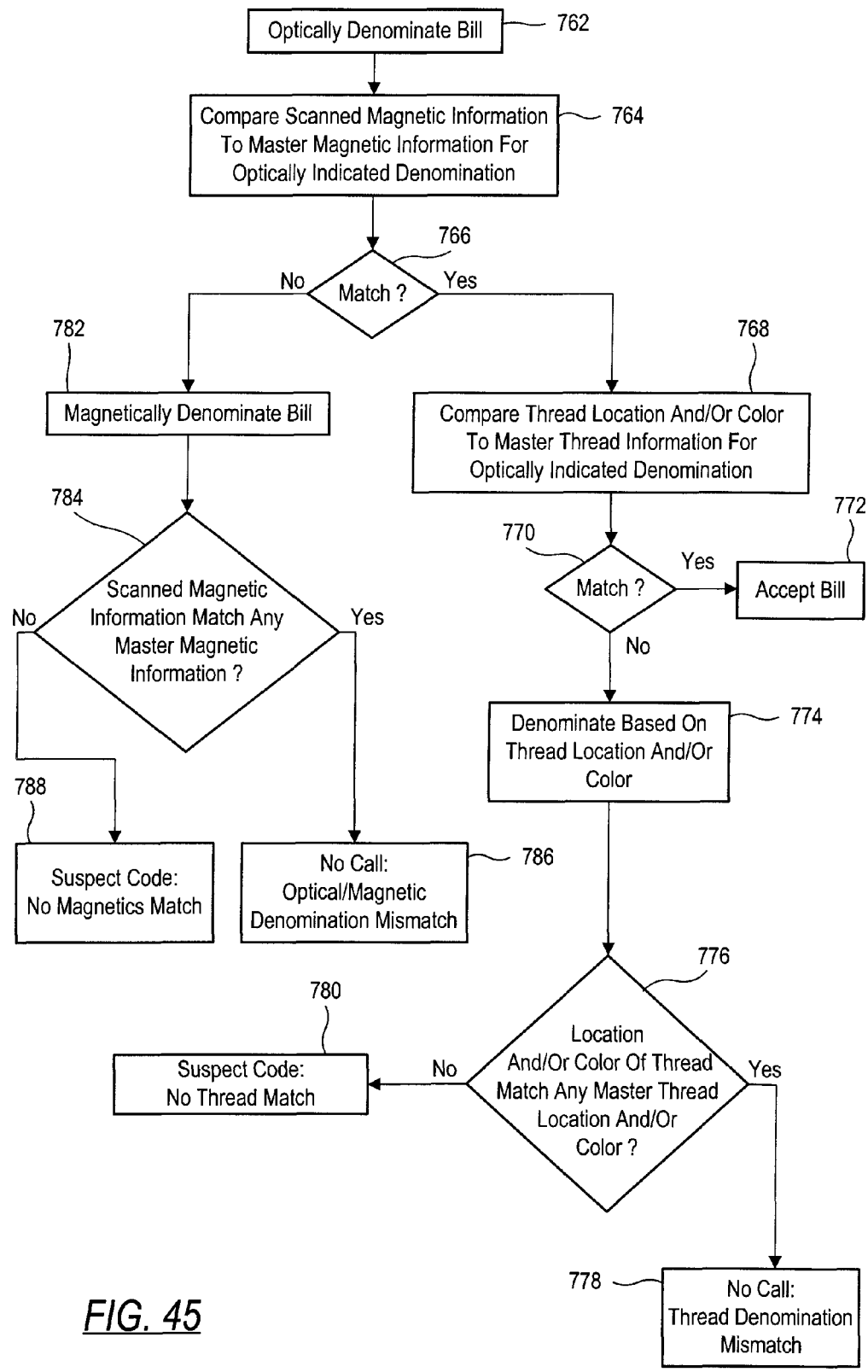
Figure 46:
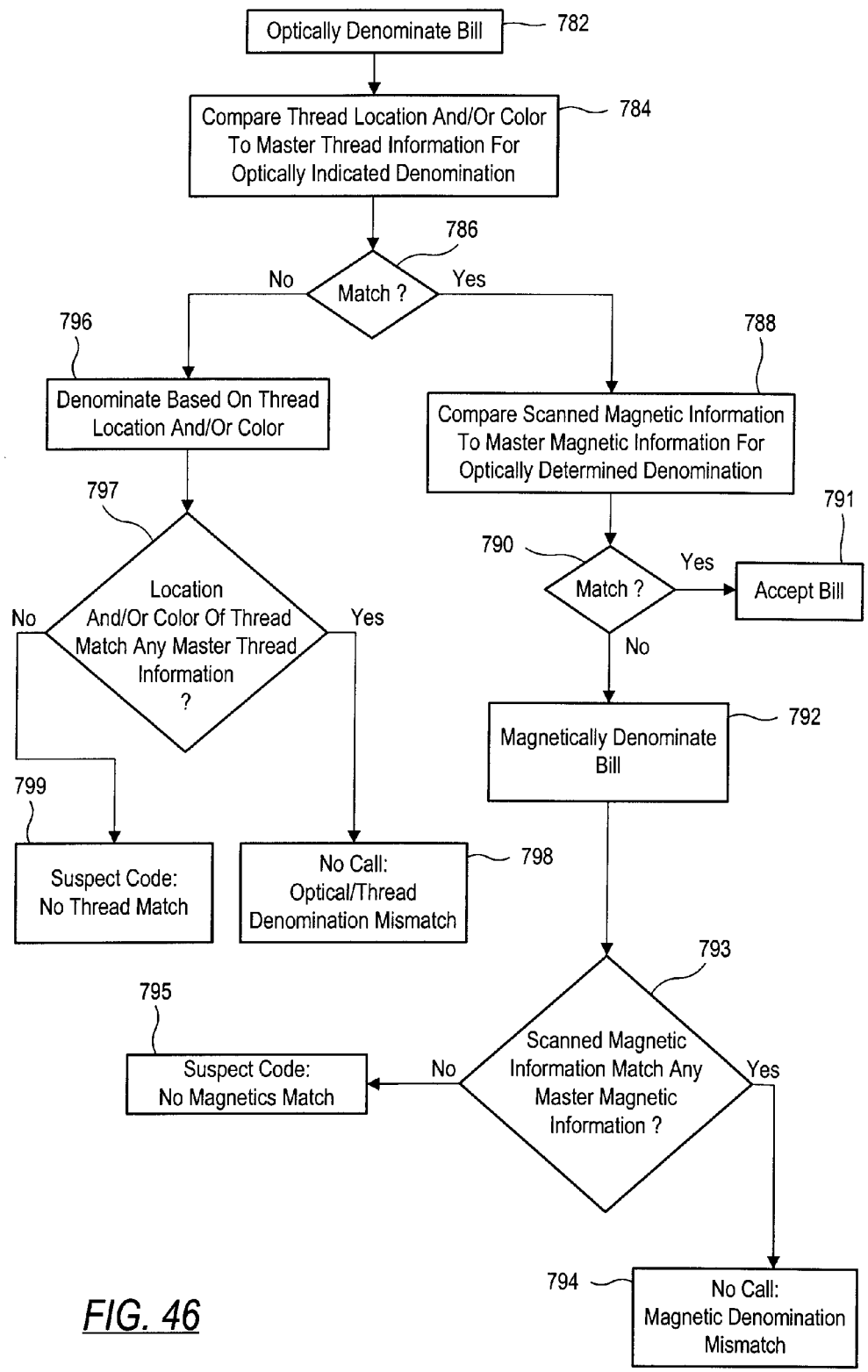

FIGS. 45 and 46 illustrate methods where for a bill to be accepted it is first denominated utilizing first characteristic information, then authenticated using second characteristic information, and finally authenticated again using third characteristic information.

According to the flowchart of FIG. 45, at step 762, a bill is optically denominated, for example, according to the methods described above in connection with FIG. 25. Provided the denomination of the bill is optically determined at step 762, the bill is then magnetically authenticated at step 764. The magnetic authentication step 764 may be performed, for example, according to the methods described in connection with in FIG. 29. At step 764, however, the detected magnetic information is only compared to master magnetic information associated with the denomination determined in step 762. If the master magnetic information for the denomination indicated in step 762 matches (step 766) the detected magnetic information for the bill under test, the bill is then authenticated based on thread location and/or color at step 768. The authentication step 768 may be performed, for example, according to the methods described in connection with in FIGS. 26-28. At step 768, however, the detected thread information is only compared to master thread information associated with the denomination determined in step 762. If the master thread information for the denomination indicated in step 762 matches (step 770) the detected thread information for the bill under test, the bill is accepted and indicated (at step 772) to have the denomination as determined at step 762. Otherwise, the bill is denominated again (at step 774) but this time using thread information. If the detected thread information matches (step 776) any of the stored master thread information, an appropriate error code is issued at step 778. Because the bill failed the test at step 770, if the thread-based information matches any of the stored master thread information, the matching master thread information will be associated with a denomination other than the denomination determined at step 762. Accordingly, at step 778, the thread-based determined denomination differs from the optically determined denomination and an appropriate error code may be generated such as a no call code indicating that the thread-based and optical tests resulted in different denomination determinations thus preventing the system from calling the denomination of the bill under test. If the detected thread information does not match (step 776) any of the stored master thread information, an appropriate suspect code is issued at step 780. The error code at step 780 may indicate that the thread characteristics of the scanned bill does not match any of the stored master thread information associated with genuine bills.

If at step 766 the master magnetic information for the denomination indicated in step 762 does not match the detected magnetic information for the bill under test, the bill is denominated again (at step 782) but this time using magnetic information. If the detected magnetic information sufficiently matches (step 784) any of the stored master magnetic information, an appropriate error code is issued at step 786. Because the bill failed the test at step 766, if the scanned magnetic information matches any of the stored master magnetic information, the matching master magnetic information will be associated with a denomination other than the denomination determined optically at step 762. Accordingly, at step 786, the magnetically determined denomination differs from the optically determined denomination and an appropriate error code may be generated such as a no call code indicating that the optical and magnetic tests resulted in different denomination determinations thus preventing the system from calling the denomination of the bill under test. If the detected magnetic information does not match (step 784) any of the stored master magnetic information, an appropriate suspect code is issued at step 788. The error code at step 788 may indicate that the scanned bill does not match magnetically any of the stored master magnetic information associated with genuine bills.

According to the flowchart of FIG. 46, at step 782, a bill is optically denominated, for example, according to the methods described above in connection with FIG. 25. Provided the denomination of the bill is determined at step 782, the bill is then authenticated based on thread location and/or color at step 784. The authentication step 784 may be performed, for example, according to the methods described in connection with in FIGS. 26-28. At step 784, however, the detected thread information is only compared to master thread information associated with the denomination determined in step 782. If the master thread information for the denomination indicated in step 782 matches (step 786) the detected thread information for the bill under test, the bill is then magnetically authenticated at step 788. The magnetic authentication step 788 may be performed, for example, according to the methods described in connection with in FIG. 29. At step 788, however, the detected magnetic information is only compared to master magnetic information associated with the denomination determined in step 782. If the master magnetic information for the denomination indicated in step 782 matches (step 790) the detected magnetic information for the bill under test, the bill is indicated (at step 791) to have the denomination as determined at step 782. Otherwise, the bill is denominated again (at step 792) but this time using magnetic information. If the detected magnetic information sufficiently matches (step 793) any of the stored master magnetic information, an appropriate error code is issued at step 794. Because the bill failed the test at step 790, if the scanned magnetic information matches any of the stored master magnetic information, the matching master magnetic information will be associated with a denomination other than the denomination determined optically at step 782. Accordingly, at step 794, the magnetically determined denomination differs from the optically determined denomination and an appropriate error code may be generated such as a no call code indicating that the optical and magnetic tests resulted in different denomination determinations thus preventing the system from calling the denomination of the bill under test. If the detected magnetic information does not match (step 793) any of the stored master magnetic information, an appropriate suspect code is issued at step 795. The error code at step 795 may indicate that the scanned bill does not match magnetically any of the stored master magnetic information associated with genuine bills.

If at step 786 the master thread information for the denomination indicated in step 782 does not match the detected thread information for the bill under test, the bill is denominated again (at step 796) but this time using thread information. If the detected thread information matches (step 797) any of the stored master thread information, an appropriate error code is issued at step 798. Because the bill failed the test at step 786, if the thread-based information matches any of the stored master thread information, the matching master thread information will be associated with a denomination other than the denomination determined at step 782. Accordingly, at step 798, the thread-based determined denomination differs from the optically determined denomination and an appropriate error code may be generated such as a no call code indicating that the thread-based and optical tests resulted in different denomination determinations thus preventing the system from calling the denomination of the bill under test. If the detected thread information does not match (step 797) any of the stored master thread information, an appropriate suspect code is issued at step 799. The error code at step 799 may indicate that the thread characteristics of the scanned bill does not match any of the stored master thread information associated with genuine bills.

Figure 47:
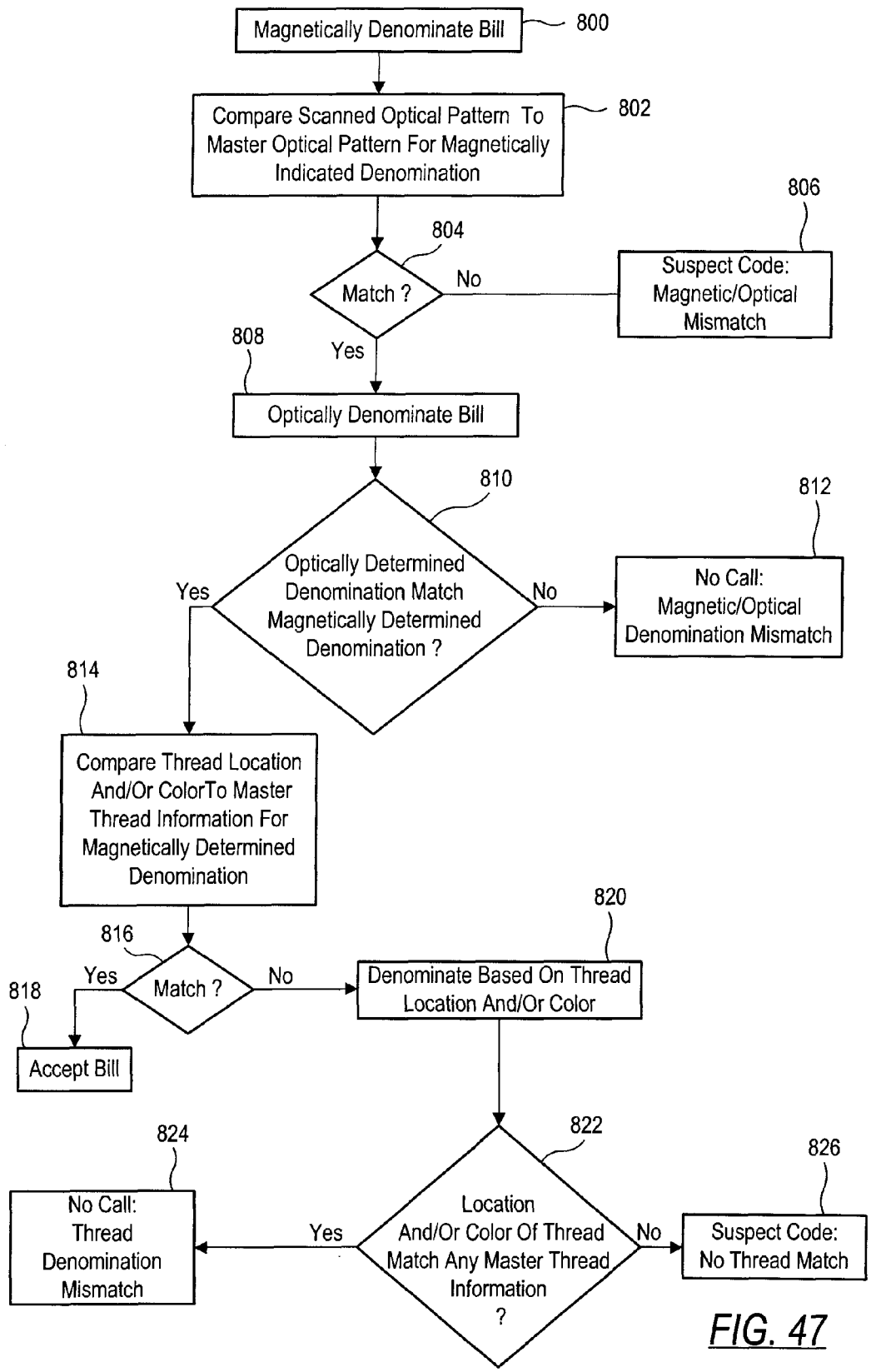

FIG. 47 illustrates a method where for a bill to be accepted it is first denominated utilizing first characteristic information, then authenticated using second characteristic information, then denominated using the second characteristic information, and finally authenticated using third characteristic information. According to the flowchart of FIG. 47, at step 800, a bill is magnetically denominated, for example, according to the methods described above in connection with FIG. 29. Provided the denomination of the bill is magnetically determined at step 800, the bill is then optically authenticated at step 802. The optical authentication step 802 may be performed, for example, according to the methods described in connection with in FIG. 25. At step 802, however, the detected optical information is only compared to master optical information associated with the denomination determined in step 800. If the master optical information for the denomination indicated in step 800 does not sufficiently match (step 804) the detected optical information for the bill under test, an appropriate suspect code is issued at step 806. Otherwise, the bill is denominated again (at step 808) but this time using optical information. If the optically determined denomination does not match (step 810) the magnetically determined denomination, an appropriate error code is issued at step 812. If the optically determined denomination does match (step 810) the magnetically determined denomination, the bill is then authenticated based on thread location and/or color at step 814. The authentication step 814 may be performed, for example, according to the methods described in connection with in FIGS. 26-28. At step 814, however, the detected thread information is only compared to master thread information associated with the denomination determined in step 800. If the master thread information for the denomination indicated in step 800 matches (step 816) the detected thread information for the bill under test, the bill is accepted and indicated (at step 818) to have the denomination as determined at step 800.

Otherwise, the bill is denominated again (at step 820) but this time using thread information. If the detected thread information matches (step 822) any of the stored master thread information, an appropriate error code is issued at step 824. Because the bill failed the test at step 816, if the thread-based information matches any of the stored master thread information, the matching master thread information will be associated with a denomination other than the denomination determined at step 800. Accordingly, at step 824, the thread-based determined denomination differs from the magnetically determined denomination and an appropriate error code may be generated such as a no call code indicating that the thread-based and magnetic tests resulted in different denomination determinations thus preventing the system from calling the denomination of the bill under test. If the detected thread information does not match (step 822) any of the stored master thread information, an appropriate suspect code is issued at step 826. The error code at step 826 may indicate that the thread characteristics of the scanned bill does not match any of the stored master thread information associated with genuine bills.

FIGS. 45-47 provide examples of combinations of characteristic information employed as first, second, and third characteristic information. Alternatively, the methods of FIGS. 45-47 may be performed with other combinations of characteristic information wherein the first, second, and third characteristic information comprise a variety of characteristic information as described above such as magnetic, optical, color, and thread based information.

In general, with respect to the methods described above in connection with FIGS. 25-47, the decision whether to authenticate a bill using one or more tests and/or to denominate a bill two or more times may be based on the value of the note as determined during the initial denominating step. For example, for a bill initially determined to be a $1 or $2 bill using a first denominating method, it may be desirable to immediately accept the bill or perform one authentication test such as illustrated in FIGS. 25-33. For bills initially determined to be of some immediate value such as $5 and $10 bills, it may be desirable to perform a second denominating step and/or an authenticating step before accepting the bill such as in FIGS. 34-36 and 38, and 43-44. For bills initially determined to be of a high value such as $20, $50, and $100 bills, it may be desirable to perform two, three, or more denominating and/or authenticating steps such as in FIGS. 37 and 45-47.

Likewise, it may be desirable to perform additional denominating and/or authenticating steps in unattended currency handling machines such as unattended redemption machines. Additional screening steps may be desirable with these machines that accept money directly from customers such as bank customers or casino patrons for credit to their accounts or denomination exchanges as opposed to machines employed in environments where an employee such as a bank teller or casino employee receives money from customers and then the employee processes the bills with the aid of the currency machine.

The above described embodiments of sensors and methods may be employed in currency discriminators such as, for example, those described above in connection with FIGS. 4*a*, 6-12, 15 or the discriminator described in U.S. Pat. No. 5,295,196 incorporated herein by reference.

The issuance of an error code such as a no call code or a suspect code may be used to suspend processing of a stack of bills, for example, as described in U.S. Pat. No. 5,295,196 incorporated herein by reference. These codes may cause the operation of a single or multiple output pocket discriminator to be suspended such that the bill triggering one of these codes is the last bill delivered to an output pocket before the operation of the system is suspended. Alternatively, a random bill may trigger these codes, for example the second-to-last bill. Accordingly, the triggering bill may be easily examined by the operator of the system so that appropriate action may be taken based on the operator's evaluation of the triggering bill. Alternatively, in a multiple output pocket system such as a two output pocket system, the issuance of one of these error codes may cause triggering bills to be diverted to a different output pocket such as a reject pocket. Alternatively, bills that result in a no call code may be diverted to one output pocket and those that result in a suspect code may be diverted to a different pocket. Accepted bills may be routed to one or more other output pockets.

Figure 48A:
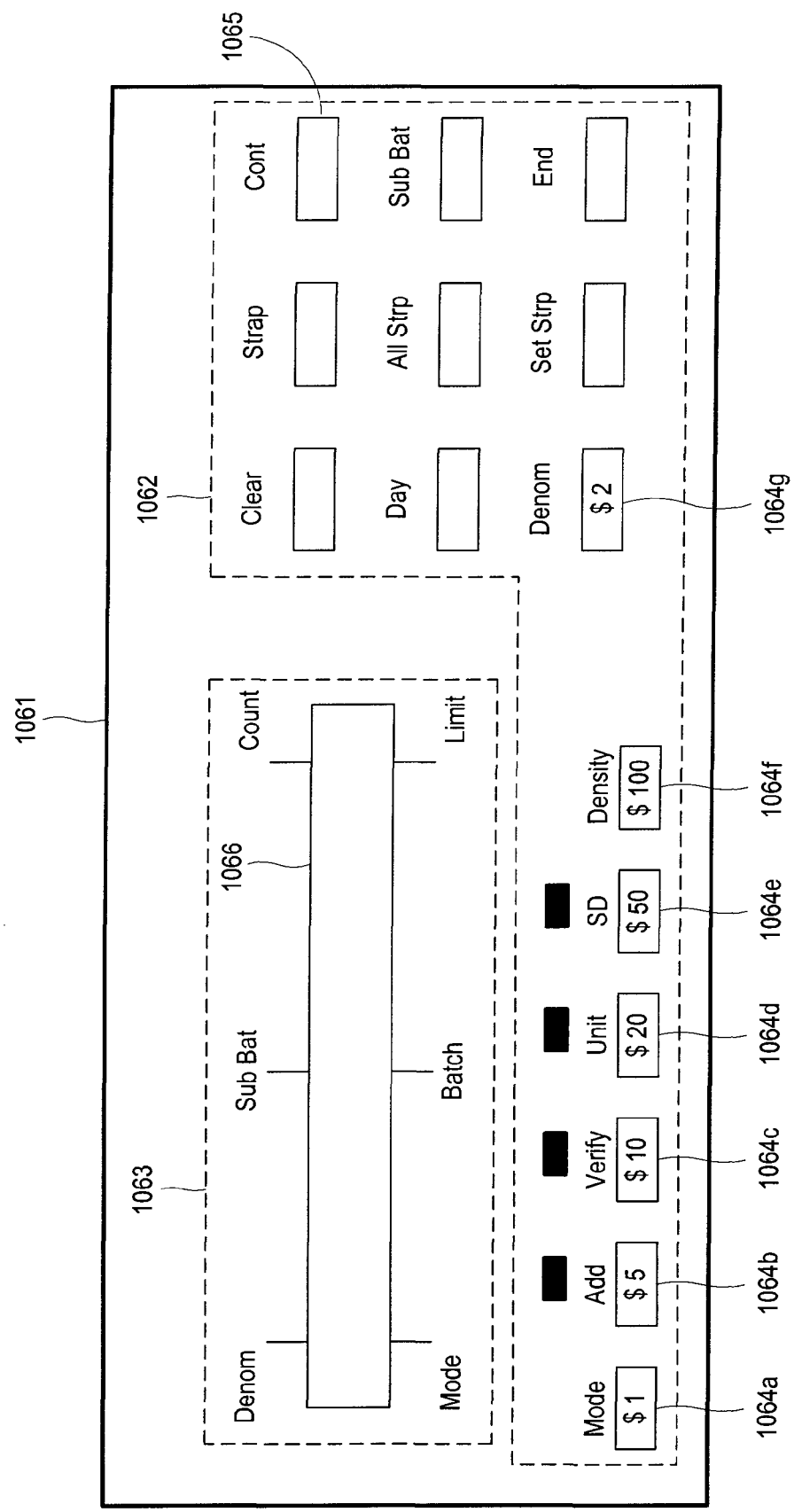
FIGS. 48a-48c illustrate control panels.

The operation of selection elements will now be described in more detail in conjunction with FIG. 48a which is a front view of a control panel 1061 of one embodiment of the present invention. The control panel 1061 comprises a keypad 1062 and a display section 1063. The keypad 1062 comprises a plurality of keys including seven denomination selection elements 1064a-1064g, each associated with one of seven U.S. currency denominations, i.e., $1, $2, $5, $10, $20, $50, and $100. Alternatively, the keys may be for 2, 5, 10, 20 and 50 notes or any combination of foreign currency. For document processing systems, the denomination selection elements may be labeled according to the currency system which a system is designed to handle and accordingly, there may be more or less than seven denomination selection elements. The $1 denomination selection key 64a also serves as a mode selection key. It should be noted that the denomination selection elements can be used to enter not only the value of currency, but all types of documents including checks. The keypad 1062 also comprises a "Continuation" selection element 1065. Various information such as instructions, mode selection information, authentication and discrimination information, individual denomination counter values, and total batch counter value are communicated to the operator via an LCD 1066 in the display section 1063. The full image processing unit and the discrimination and authentication unit according to one embodiment of the present invention have a number of operating modes including a mixed mode, a stranger mode, a sort mode, a face mode, and a forward/reverse orientation mode.

Figure 48B:
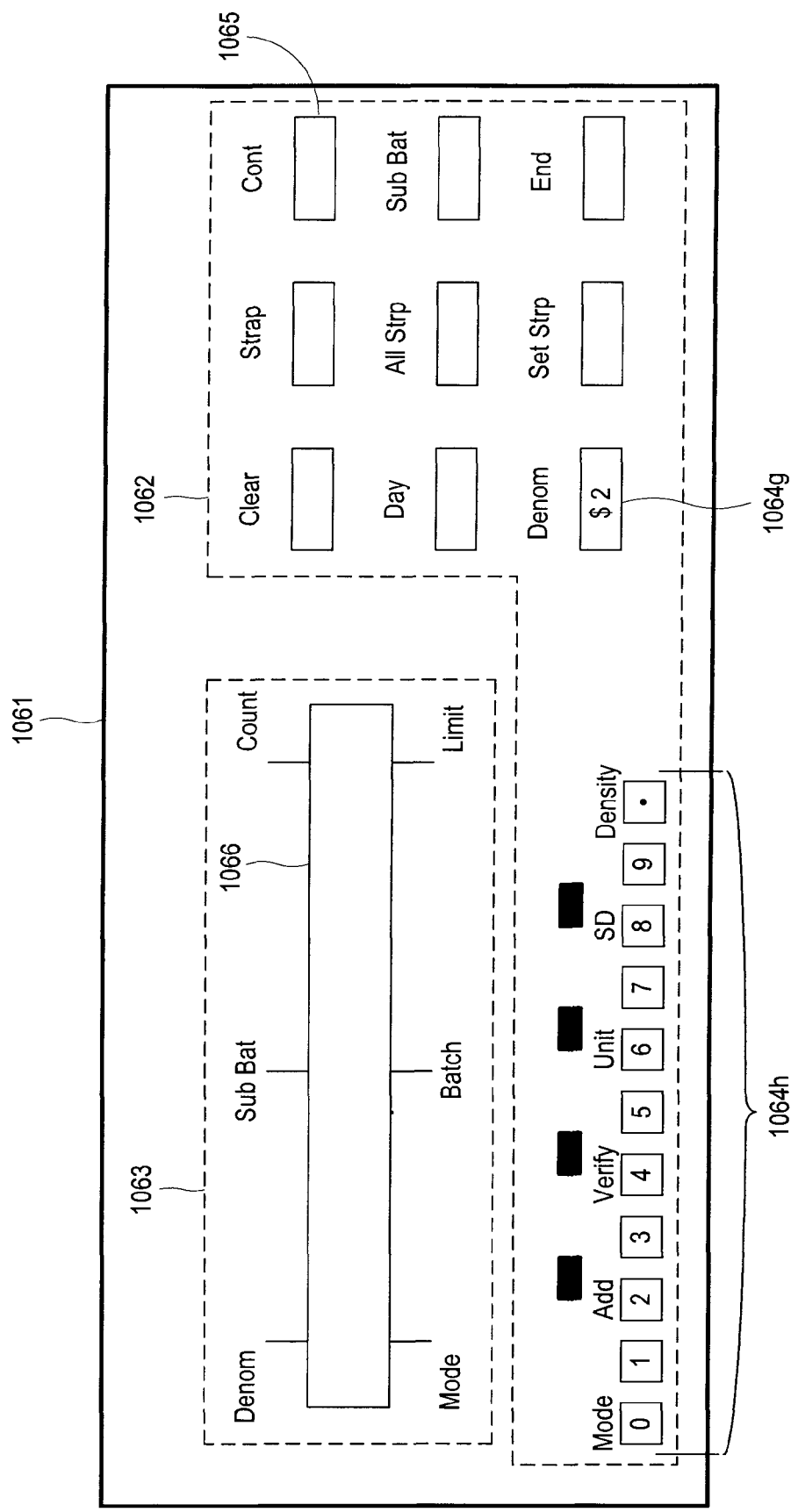
Figure 48C:
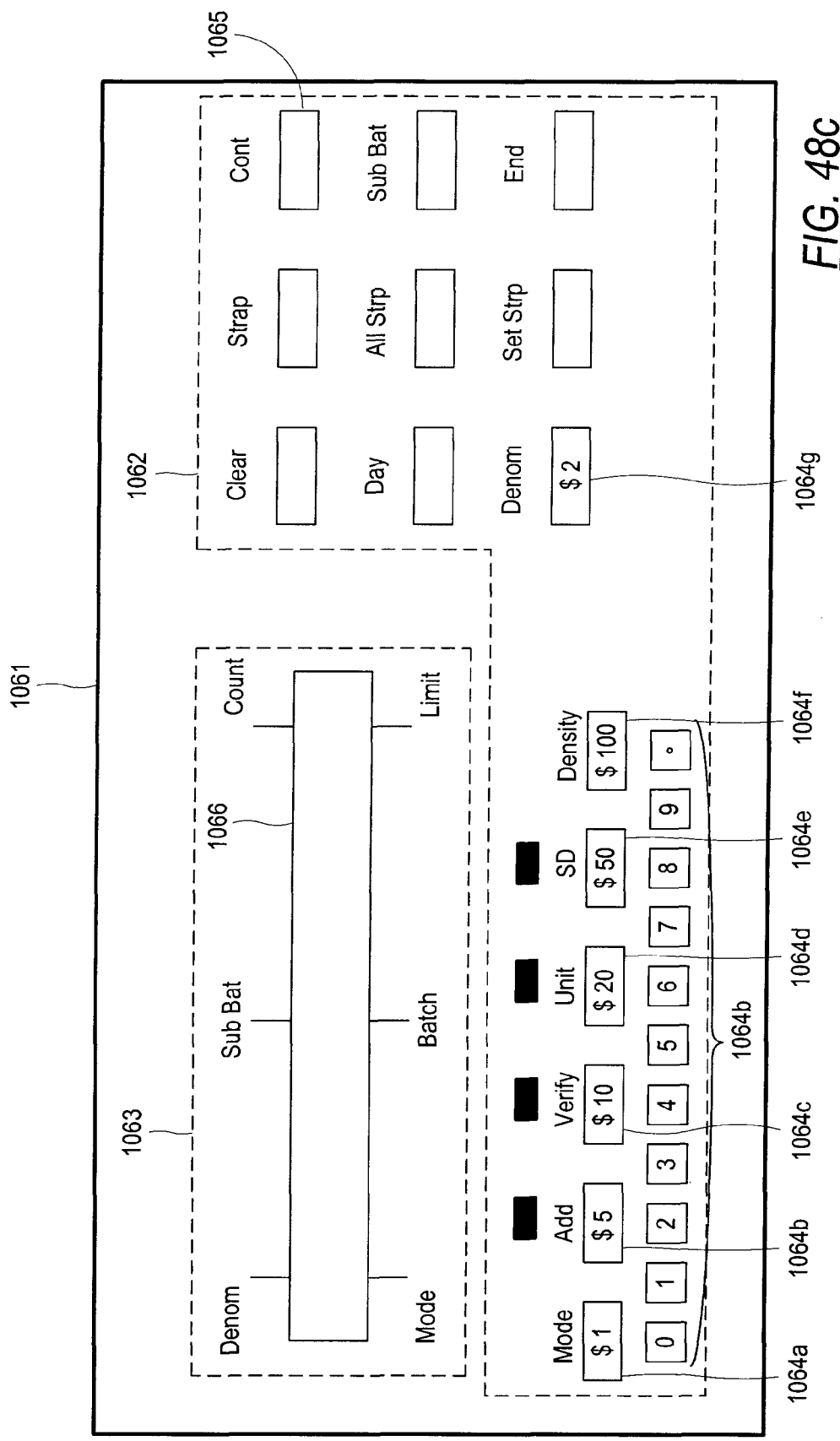

FIG. 48b illustrates an alternate embodiment of the control panel 1061. A set of numeric keys with a decimal point collectively labeled 1064h is engaged by the user to enter numeric data from all types of documents. FIG. 48c illustrates a control panel 1061 with both numeric keys and decimal point 1064h and denomination keys 1064a-1064f. The user has the choice of entering the data by the denomination keys 1064a-1064f or the numeric keys. The remaining elements of the control panels in FIGS. 48b and 48c function as described above.

The operation of a document processing system having the denomination selection elements 1064a-1064g and the continuation element 1065 will now be discussed in connection with several operating modes.

(A) Mixed Mode

Mixed mode is designed to accept a stack of bills of mixed denomination, total the aggregate value of all the bills in the stack and display the aggregate value in the display 1063. By "stack" it is meant to not only include a single stack of bills, but multiple stacks as well. Information regarding the number of bills of each individual denomination in a stack may also be stored in denomination counters. When an otherwise acceptable bill remains unidentified after passing through the system, operation of the system may be resumed and the corresponding denomination counter and/or the aggregate value counter may be appropriately incremented by selecting the denomination selection key 1064a-1064g associated with the denomination of the unidentified bill. For example, if the system stops operation with an otherwise acceptable $5 bill being the last bill deposited in the output receptacle, the operator may simply select key 64b. When key 64b is depressed, the operation of the system is resumed and the $5 denomination counter is incremented and/or the aggregate value counter is incremented by $5. Furthermore, the flagged bill may be routed from the inspection station to an appropriate output receptacle. Otherwise, if the operator determines the flagged bill is unacceptable, the bill may be removed from the output receptacle or the inspection station or the flagged bill may be routed to the reject receptacle. The continuation key 1065 is depressed after the unacceptable bill is removed, and the system resumes operation without affecting the total value counter and/or the individual denomination counters.

(B) Stranger Mode

Stranger mode is designed to accommodate a stack of bills all having the same denomination, such as a stack of $10 bills. In such a mode, when a stack of bills is processed by the system the denomination of the first bill in the stack is determined and subsequent bills are flagged if they are not of the same denomination. Alternatively, the system may be designed to permit the operator to designate the denomination against which bills will be evaluated with those of a different denomination being flagged. Assuming the first bill in a stack determines the relevant denomination and assuming the first bill is a $10 bill, then provided all the bills in the stack are $10 bills, the display 1063 will indicate the aggregate value of the bills in the stack and/or the number of $10 bills in the stack. However, if a bill having a denomination other than $10 is included in the stack, the system will stop operating with the non-$10 bill or "stranger bill" being the last bill deposited in the output receptacle in the case of the discriminator system or the inspection station. The stranger bill may then be removed from the output receptacle and the system is started again either automatically or by depression of the "Continuation" key 1065 depending on the set up of the system. An unidentified but otherwise acceptable $10 bill may be handled in a manner similar to that described above in connection with the mixed mode, e.g., by depressing the $10 denomination selection element 1064c, or alternatively, the unidentified but otherwise acceptable $10 bill may be removed from the output receptacle and placed into the input hopper to be re-scanned. Upon the completion of processing the entire stack, the display 1063 will indicate the aggregate value of the $10 bills in the stack and/or the number of $10 bills in the stack. All bills having a denomination other than $10 will have been set aside and will not be included in the totals. Alternatively, these stranger bills can be included in the totals via operator selection choices. For example, if a $5 stranger bill is detected and flagged in a stack of $10 bills, the operator may be prompted via the display as to whether the $5 bill should be incorporated into the running totals. If the operator responds positively, the $5 bill is incorporated into appropriate running totals, otherwise it is not. Alternatively, when the system stops on a stranger bill, such as a $5, the operator may depress the denomination selection element associated with that denomination to cause the value of the stranger bill to be incorporated into the totals. Likewise for other types of flagged bills such as no calls. Alternatively, a set-up selection may be chosen whereby all stranger bills are automatically incorporated into appropriate running totals.

(C) Sort Mode

According to one embodiment, the sort mode is designed to accommodate a stack of bills wherein the bills are separated by denomination. For example, all the $1 bills may be placed at the beginning of the stack, followed by all the $5 bills, followed by all the $10 bills, etc. Alternatively, the sort mode may be used in conjunction with a stack of bills wherein the bills are mixed by denomination. The operation of the sort mode is similar to that of the stranger mode except that after stopping upon the detection of a different denomination bill, the system is designed to resume operation upon removal of all bills from the output receptacle. Returning to the above example, assuming the first bill in a stack determines the relevant denomination and assuming the first bill is a $1 bill, then the system processes the bills in the stack until the first non-$1 bill is detected, which in this example is the first $5 bill. At that point, the system will stop operating with the first $5 being the last bill deposited in the output receptacle. The display 1063 may be designed to indicate the aggregate value of the preceding $1 bills processed and/or the number of preceding $1 bills. The scanned $1 bills and the first $5 bill are removed from the output receptacle and placed in separate $1 and $5 bill stacks. The system will start again automatically and subsequent bills will be assessed relative to being $5 bills. The system continues processing bills until the first $10 bill is encountered. The above procedure is repeated and the system resumes operation until encountering the first bill which is not a $10 bill, and so on. Upon the completion of processing the entire stack, the display 1063 will indicate the aggregate value of all the bills in the stack and/or the number of bills of each denomination in the stack. This mode permits the operator to separate a stack of bills having multiple denominations into separate stacks according to denomination.

(D) Face Mode

Face mode is designed to accommodate a stack of bills all faced in the same direction, e.g., all placed in the input receptacle face up (that is the portrait or black side up for U.S. bills) and to detect any bills facing the opposite direction. In such a mode, when a stack of bills is processed by the system, the face orientation of the first bill in the stack is determined and subsequent bills are flagged if they do not have the same face orientation. Alternatively, the system may be designed to permit designation of the face orientation to which bills will be evaluated with those having a different face orientation being flagged. Assuming the first bill in a stack determines the relevant face orientation and assuming the first bill is face up, then provided all the bills in the stack are face up, the display 1063 will indicate the aggregate value of the bills in the stack and/or the number of bills of each denomination in the stack. However, if a bill faced in the opposite direction (i.e., face down in this example) is included in the stack, the system will stop operating with the reverse-faced bill being the last bill deposited in the output receptacle. The reverse-faced bill then may be removed from the output receptacle. In automatic re-start embodiments, the removal of the reverse-faced bill causes the system to continue operating. The removed bill may then be placed into the input receptacle with the proper face orientation. Alternatively, in non-automatic re-start embodiments, the reverse-faced bill may be either placed into the input receptacle with the proper face orientation and the continuation key 1065 depressed, or placed back into the output receptacle with the proper face orientation. Depending on the set up of the system when a bill is placed back into the output receptacle with the proper face orientation, the denomination selection key associated with the reverse-faced bill may be selected, whereby the associated denomination counter and/or aggregate value counter are appropriately incremented and the system resumes operation. Alternatively, in embodiments wherein the system is capable of determining denomination regardless of face orientation, the continuation key 1065 or a third key may be depressed whereby the system resumes operation and the appropriate denomination counter and/or total value counter is incremented in accordance with the denomination identified by the discriminating system. In systems that require a specific face orientation, any reverse-faced bills will be unidentified bills. In systems that can accept a bill regardless of face orientation, reverse-faced bills may be properly identified. The later type of system may have a discrimination and authentication system with a scanhead on each side of the transport path. Examples of such dual-sided systems are disclosed above. The ability to detect and correct for reverse-faced bills is important as the Federal Reserve requires currency it receives to be faced in the same direction.

In a multi-output receptacle system, the face mode may be used to route all bills facing upward to one output receptacle and all bills facing downward to another output receptacle. In single-sided discriminators, reverse-faced bills may be routed to an inspection station for manual turnover by the operator and the unidentified reverse-faced bills may then be passed by the system again. In dual-sided systems, identified reverse-faced bills may be routed directly to an appropriate output receptacle. For example, in dual-sided discriminators bills may be sorted both by face orientation and by denomination, e.g., face up $1 bills into pocket #1, face down $1 bills into pocket #2, face up $5 bills into pocket #3, and so on or simply by denomination, regardless of face orientation, e.g., all $1 bills into pocket #1 regardless of face orientation, all $2 bills into pocket #2, etc.

(E) Forward/Reverse Orientation Mode

Forward/Reverse Orientation mode ("Orientation" mode) is designed to accommodate a stack of bills all oriented in a predetermined forward or reverse orientation direction. For example in a system that feeds bills along their narrow dimension, the forward direction may be defined as the fed direction whereby the top edge of a bill is fed first and conversely for the reverse direction. In a system that feeds bills along their long dimension, the forward direction may be defined as the fed direction whereby the left edge of a bill is fed first and conversely for the reverse direction. In such a mode, when a stack of bills is processed by the system, the forward/reverse orientation of the first bill in the stack is determined and subsequent bills are flagged if they do not have the same forward/reverse orientation. Alternatively, the system may be designed to permit the operator to designate the forward/reverse orientation against which bills will be evaluated with those having a different forward/reverse orientation being flagged. Assuming the first bill in a stack determines the relevant forward/reverse orientation and assuming the first bill is fed in the forward direction, then provided all the bills in the stack are also fed in the forward direction, the display 63 will indicate the aggregate value of the bills in the stack and/or the number of bills of each denomination in the stack. However, if a bill having the opposite forward/reverse orientation is included in the stack, the system will stop operating with the opposite forward/reverse oriented bill being the last bill deposited in the output receptacle. The opposite forward/reverse oriented bill then may be removed from the output receptacle. In automatic re-start embodiments, the removal of the opposite forward/reverse oriented bill causes the system to continue operating. The removed bill may then be placed into the input receptacle with the proper face orientation. Alternatively, in non-automatic re-start embodiments, the opposite forward/reverse oriented bill may be either placed into the input receptacle with the proper forward/reverse orientation and the continuation key 65 depressed, or placed back into the output receptacle with the proper forward/reverse orientation. Depending on the set up of the system, when a bill is placed back into the output receptacle with the proper forward/reverse orientation, the denomination selection key associated with the opposite forward/reverse oriented bill may be selected, whereby the associated denomination counter and/or aggregate value counter are appropriately incremented and the system resumes operation. Alternatively, in embodiments wherein the system is capable of determining denomination regardless of forward/reverse orientation, the continuation key 1065 or a the third key may be depressed whereby the system resumes operation and the appropriate denomination counter and/or total value counter is incremented in accordance with the denomination identified by the system. In single-direction systems, any reverse-oriented bills will be unidentified bills. In dual-direction units, reverse-oriented bills may be properly identified by the discriminating unit. An example of a dual-direction system is described in U.S. Pat. No. 5,295,196. The ability to detect and correct for reverse-oriented bills is important as the Federal Reserve may soon require currency it receives to be oriented in the same forward/reverse direction.

In a multi-output receptacle system, the orientation mode may be used to route all bills oriented in the forward direction to one output receptacle and all bills oriented in the reverse direction to another output receptacle. In single-direction discriminators, reverse-oriented bills may be routed to an inspection station for manual turnover by the operator and the unidentified reverse-oriented bills may then be passed by the system again. In systems capable of identifying bills fed in both forward and reverse directions ("dual-direction systems"), identified reverse-oriented bills may be routed directly to an appropriate output receptacle. For example, in dual-direction systems bills may be sorted both by forward/reverse orientation and by denomination, e.g., forward $1 bills into pocket #1, reverse $1 bills into pocket #2, forward $5 bills into pocket #3, and so on or simply by denomination, regardless of forward/reverse orientation, e.g., all $1 bills into pocket #1 regardless of forward/reverse orientation, all $2 bills into pocket #2, etc.

(F) Suspect Mode

In addition to the above modes, a suspect mode may be activated in connection with these modes whereby one or more authentication tests may be performed on the bills in a stack. When a bill fails an authentication test, the system will stop with the failing or suspect bill being the last bill transported to the output receptacle. The suspect bill then may be removed from the output receptacle and set aside.

(G) Other Modes

A proof of deposit mode may be activated when a user presses a dedicated key on the machine. This mode enables the system to process checks, loan payment coupons, and other proof of deposit media. Another key may be pressed to activate bank source mode. When the machine is in this mode, the output documents are separated into documents from one source and documents from all other sources. For example, checks may be separated into checks issued from the bank which owns the machine and checks issued by all other financial institutions. Such separation may be accomplished by using two bins or one bin whereby the machine stops when an "outside" check (i.e., a check from a non-owner financial institution) is detected. Finally, the user may press a key to have the machine enter stored image mode. When operating in this mode, the system holds deposit images at the machine which is later polled for data pickup by the central accounting system. Such a mode eases data congestion between the system and the central accounting system.

Likewise, one or more of the above described modes may be activated at the same time. For example, the face mode and the forward/reverse orientation mode may be activated at the same time. In such a case, bills that are either reverse-faced or opposite forward/reverse oriented will be flagged.

According to one embodiment, when a bill is flagged, for example, by stopping the transport motor with the flagged bill being the last bill deposited in the output receptacle, the discrimination and authentication unit indicates to the operator why the bill was flagged. This indication may be accomplished by, for example, lighting an appropriate light, generating an appropriate sound, and/or displaying an appropriate message in the display section 1063 (FIG. 48). Such indication might include, for example, "no call", "stranger", "failed magnetic test", "failed UV test", "no security thread", etc.

Figure 49A:
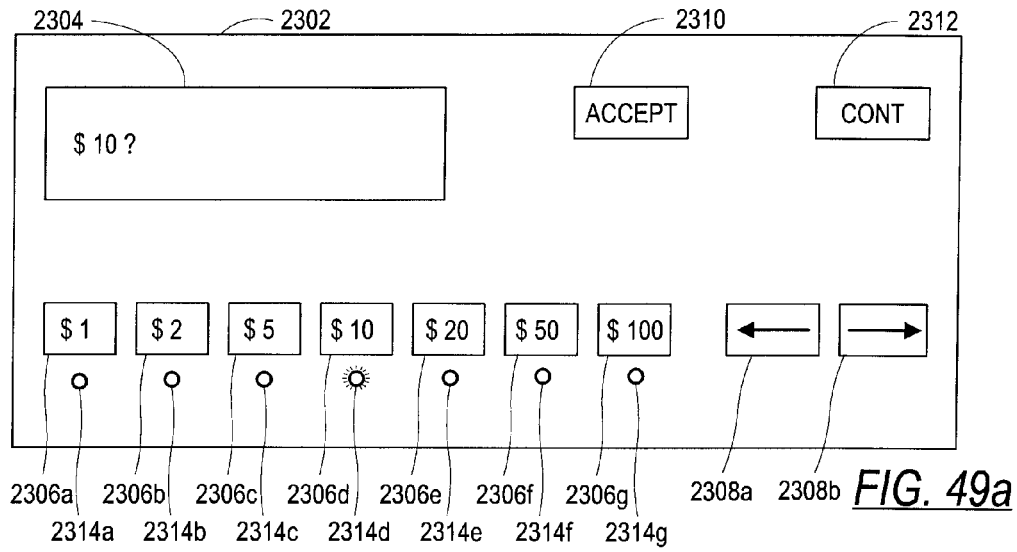

Means for entering the value of no call bills or other documents were discussed above in connection with FIG. 48 and the operating modes discussed above. Now several additional means will be discussed in connection with FIGS. 49-53. FIG. 49*a* is a front view of a control panel 2302 similar to that of FIG. 48. The control panel 2302 comprises a display area 2304, several denomination selection elements 2306*a-g* in the form of keys, left and right scroll keys 2308*a-b*, an accept selection element 2310, and a continuation selection element 2312. Each denomination selection element 2306*a-g* has a prompting means associated therewith. In FIG. 49*a*, the prompting means are in the form of small lights or lamps 2314*a-g* such as LEDs. In FIG. 49*a*, the light 2314*d* associated with the $10 denomination key 2306*d* is illuminated so as to prompt the operator that a denomination of $10 is being suggested. Alternatively, instead of the lamps 2314*a-g* being separate from the denomination keys 2306*a-g*, the denomination keys could be in the form of illimitable keys whereby one of the keys 2306*a-g* would light up to suggest its corresponding denomination to the operator. In place of, or in addition to, the illimitable lights 2314*a-g* or keys, the display area 2304 may contain a message to prompt or suggest a denomination to the operator. In FIG. 49*a*, the display area 2304 contains the message "$10?" to suggest the denomination of $10. In the embodiment of FIG. 48, the display area 1063 may be used to suggest a denomination to the operator without the need of illimitable lights and keys. The value of any document can also be entered via the keyboard.

Figure 49B:
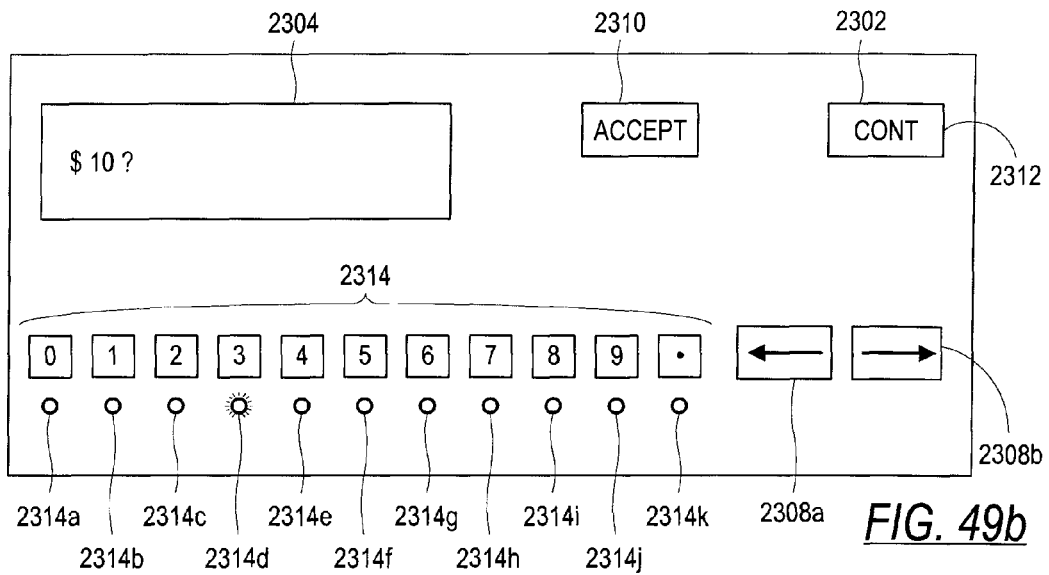

FIG. 49*b* illustrates a control panel similar to that of FIG. 49*a* except that the denomination keys have been replaced by numeric keys and a decimal point which are collectively referred to as 2314*h*. Additional lights 2314*i-k* are used by the system to suggest values to be entered by the user. The remainder of the panel functions as described above. This embodiment is particularly useful in processing financial institution documents although it can be used for currency as well.

Figure 50A:
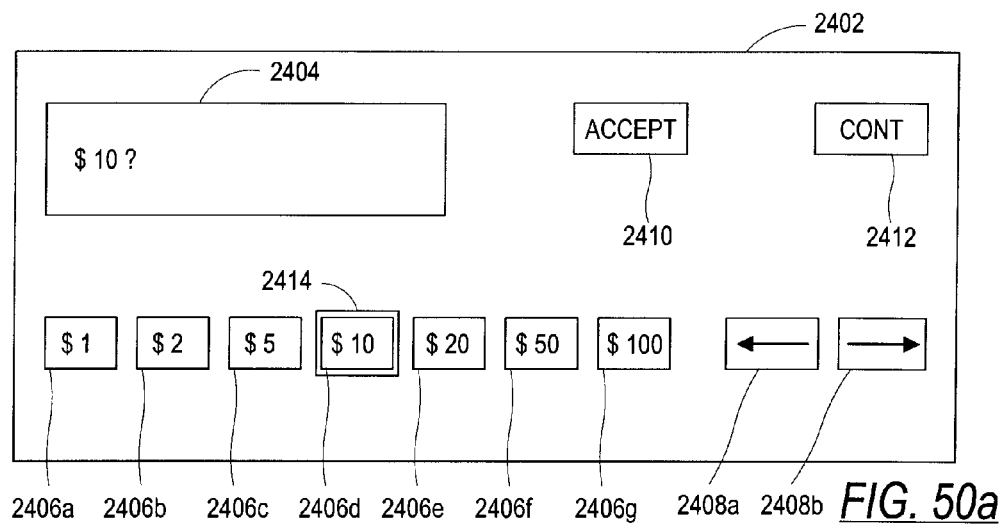

The control panel 2402 of FIG. 50*a* is similar to the control panel 2302 of FIG. 49*a*; however, the denomination selection elements 2406*a-g*, scroll keys 2408*a-b*, accept key 2410, and continuation key 2412 are displayed keys in a touch-screen environment. To select any given key, the operator touches the screen in the area of the key to be selected. The operation of a touch screen is described in more detail in connection with FIG. 55. The system may contain prompting means to suggest a denomination to the operator. For example, an appropriate message may be displayed in a display area 2404. Alternatively, or additionally, the prompting means may include means for highlighting one of the denomination selection elements 2406*a-g*. For example, the appearance of one of the denomination selection elements may be altered such as by making it lighter or darker than the remaining denomination selection elements or reversing the video display (e.g., making light portions dark and making the dark portions light or swapping the background and foreground colors). Alternatively, a designated denomination selection element may be highlighted by surrounding it with a box, such as box 2414 surrounding the $10 key 2406*d*.

Figure 50B:
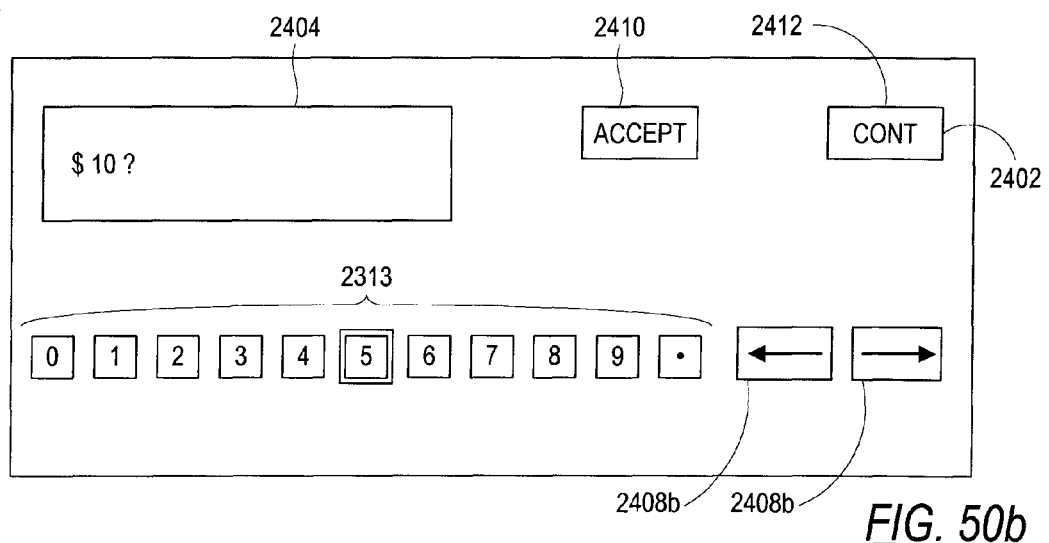

FIG. 50*b* illustrates a control panel similar to that of FIG. 50*a* except that the denomination keys have been replaced by numeric keys and a decimal point which are collectively referred to as 2313*h*. The remainder of the panel functions as described above. This embodiment is particularly useful in processing financial institution documents although it can be used for currency as well.

Figure 51A:
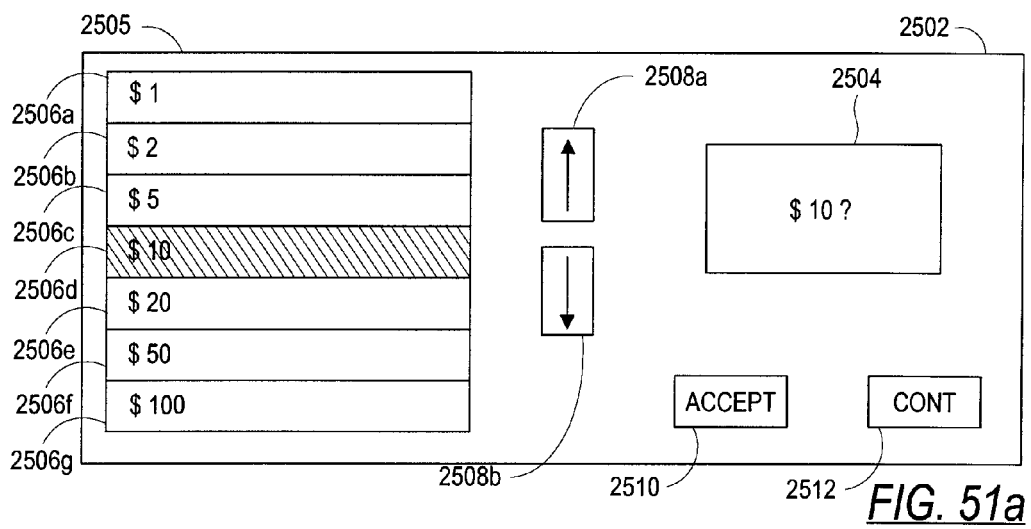

Another embodiment of a control panel 2502 is depicted in FIG. 51*a*. The control panel 2502 has several denomination indicating elements 2506*a-g* in the form of menu list 2505, scroll keys 2508*a-b*, an accept selection element 2510, and a continuation selection element 2512. The various selection elements may be, for example, physical keys or displayed keys in a touch screen environment. For example, the menu list 2505 may be displayed in a non-touch screen activated display area while the scroll keys 2508*a-b*, accept key 2510, and continuation key 2512 may be physical keys or displayed touch screen keys. In such an environment a user may accept a denominational selection by pressing the accept key 2510 when the desired denomination indicating element is highlighted and may use the scroll keys 2508*a-b* to vary the denomination indicating element that is highlighted. Alternatively, the denomination indicating elements 2506*a-g* may themselves be selection elements such as by being displayed touch screen active keys. In such an embodiment a given denomination element may be made to be highlighted and/or selected by touching the screen in the area of one of the denomination selection elements 2506*a-g*. The touching of the screen in the area of one of the denomination selection elements may simply cause the associated denomination selection element to become highlighted requiring the touching and/or pressing of the accept key 2510 or alternatively may constitute acceptance of the associated denomination selection element without requiring the separate selection of the accept key 2510. The discrimination and authentication unit may contain prompting means to suggest a denomination to the operator. For example, an appropriate message may be displayed in a display area 2504. Alternatively, or additionally, the prompting means may include means for highlighting one of the denomination indicating elements 2506*a-g*. For example, the appearance of one of the denomination indicating elements may be altered such as by making it lighter or darker than the remaining denomination indicating elements or by reversing the video display (e.g., making light portions dark and making the dark portions light or swapping the background and foreground colors). In FIG. 51*a*, the hash marks are used to symbolize the alternating of the display of the $10 denomination indicating element 2506*d* relative to the other denomination indicating elements such as by using a reverse video display.

Figure 51B:
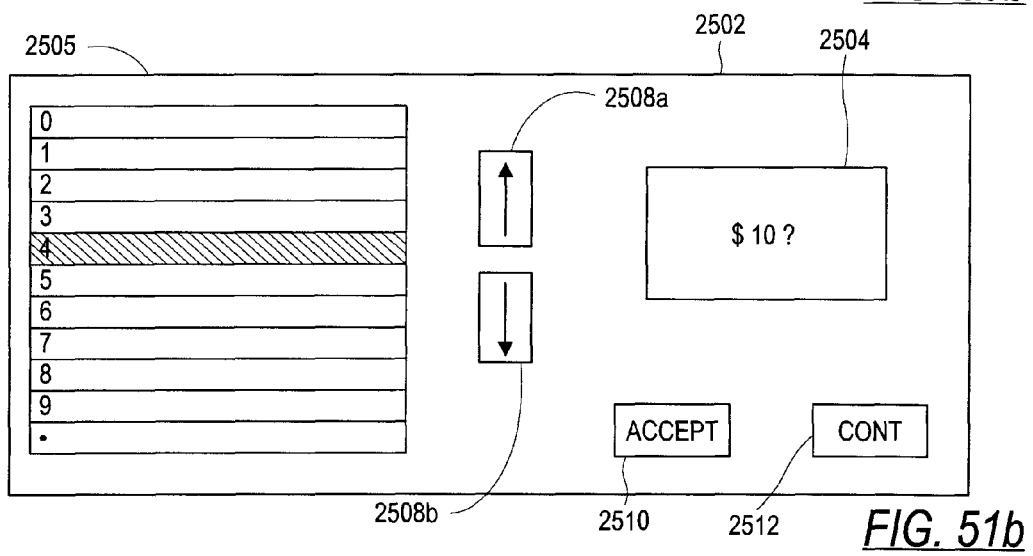

FIG. 51*b* illustrates a control panel similar to that of FIG. 51*a* except that the denomination selection elements have been replaced by numeric and a decimal selection elements which are collectively referred to as 2506*h*. The remainder of the panel functions as described above. This embodiment is particularly useful in processing financial institution documents although it can be used for currency as well.

Control panel 2602 of FIG. 52 is similar to control panel 2502 of FIG. 51; however, the control panel 2602 does not have a separate display area. Additionally, the order of the denomination indicating elements 2606*a-g* of menu list 2605 is varied relative to those of menu list 2505. The order of the denomination selection element may be user-defined (i.e., the operator may preset the order in which the denominations should be listed) or may be determined by the discrimination and authentication unit and be, for example, based on the historical occurrence of no calls of each denomination, based on the denomination of the most recently detected no call, based on calculated correlation values for a given no call bill, or perhaps based on random selection. Such criteria will be described in more detail below.

The control panel 2702 of FIGS. 53*a* and 53*b* comprises a display area 2704, an accept key 2710, a next or other denomination key 2711, and a continuation key 2712. Alternatively, the accept key may be designated a "YES" key while the other denomination key may be designated a "NO" key. These keys may be physical keys or displayed keys. The system prompts or suggest a denomination by displaying an appropriate message in the display area 2704. If the operator wishes to accept this denomination suggestion, the accept key 2710 may be selected. If other the operator wishes to select a different denomination, the other denomination key 2711 may be selected. If in the example given in FIG. 53*a* the operator wishes to select a denomination other than the $5 prompted in the display area 2704, the other denomination key 2711 may be selected which results in prompting of a different denomination, e.g., $2 as shown in FIG. 53*b*. The "OTHER DENOM" key 2711 may be repeatedly selected to scroll through the different denominations.

Figure 54:
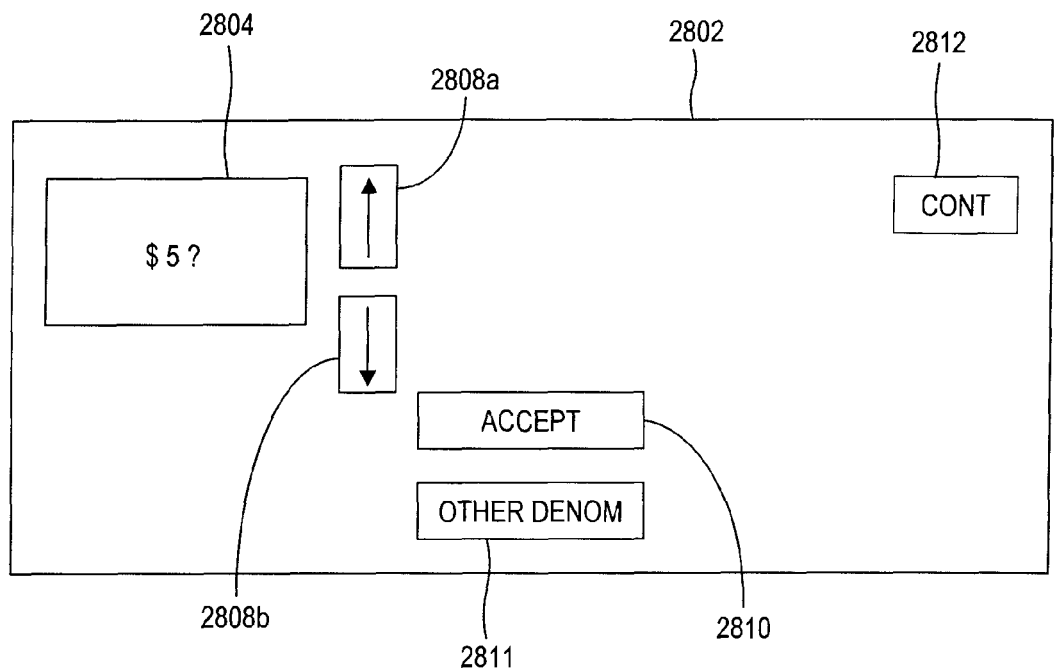
FIG. 54 illustrates one embodiment of the control panel according to principles of the present invention.

The control panel 2802 of FIG. 54 is similar to that of FIGS. 53*a-b* and additionally comprises scroll keys 2808*a-b*. These scroll keys 2808*a-b* may be provided in addition to or in place of the other denomination key 2811. The order in which denominations are suggested to an operator, for example, in FIGS. 53 and 54, may be based on a variety of criteria as will be discussed below such as user-defined criteria or order, historical information, previous bill denomination, correlation values, or previous no call information.

Now several embodiments of the operation of the control panels such as those of FIGS. 48 and 49-54 will be discussed. These can be employed in conjunction with a variety of discriminators and scanners. In particular, several methods for reconciling the value of no call bills will be discussed in connection with these control panels. As discussed above, for example, in connection with the several previously described operating modes, when a system encounters a no call bill, that is, when a system is unable to determine or call the denomination of a bill, any counters keeping track of the number or value of each denomination of bills or of the total value of the bills processed will not include the no call bill. Traditionally, any no calls bills had to be set aside and manually counted by hand with the operator being required to add their values to the totals provided by the discrimination and authentication unit or the full-imaging unit. As discussed above, this can lead to errors and reduced efficiency. To counter this problem, according to an embodiment of the present invention, means are provided for incorporating the value of no call bills. In single pocket systems, reconciliation may be accomplished on-the-fly with the system suspending operation when each no call is encountered, prompting the operator to enter the value of the no call, and then resuming operation. In multi-output pocket systems, no call bills may be reconciled either on-the-fly or after the completion of processing all the bills placed in the input hopper or after completion of processing some other designated batch of bills. Under the first approach, the operation of the system is suspended when each no call bill is detected with or without the no call bill being routed to a special location. The operator is then prompted to enter the value of the no call whereupon the system resumes operation. Based on the value indicated by the operator, appropriate counters are augmented. Under the second approach, any no call bills are routed to a special location while the discrimination and authentication unit or the full image processing unit continue processing subsequent bills. When all the bills have been processed, the operator is prompted to reconcile the values of any intervening no call bills. For example, assume a stack of fifty bills is placed in the input hopper and processed with four no calls being routed to a separate output receptacle from the receptacle or receptacles into which the bills whose denominations have been determined. After all fifty bills have been processed, the operation of the transport mechanism is halted and the operator is prompted to reconcile the value of the four no call bills. The methods for reconciling these four no calls will be discussed below after describing several denomination indicating and/or prompting means and methods. Alternatively, instead of waiting until all the bills in the stack have been processed, the system may prompt the operator to reconcile the value of any no call bills while the remaining bills are still being processed. When the operator indicates the denominations of the no call bills, appropriate counters are augmented to reflect the value of the no call bills.

Several embodiments of means for permitting the operator to indicate the value of a flagged bill or document such as a no call and/or for prompting the operator as to the value of a flagged bill such as a no call will now be discussed. A first method was discussed above in connection with several operating modes and in connection with FIG. 48. According to one embodiment, the control panel of FIG. 48 comprises denomination indicating means in the form of the denomination selection elements 2064*a*-*g* for permitting the operator to indicate the denomination of a bill but does not additionally comprise means for prompting the operator as to the denomination of a particular bill. Under this method, the operator examines a no call bill. If the bill is acceptable, the operator selects the denomination selection element associated with the denomination of the no call bill and the appropriate counters are augmented to reflect the value of the no call bill. For example, if the operator determines a no call bill is an acceptable $10 bill, the operator may press the $10 selection element 2064*c* of FIG. 48. If the operation of the system had been suspended, the selection of a denomination selection causes the operation of the system to resume. In a on-the-fly reconciliating machine (i.e., one that suspends operation upon detection of each no call bill), if the operator determines that a particular no call bill is unacceptable, a continuation selection element may be selected to cause the system to resume operation without negatively affecting the status of any counters. Under this approach, the denomination selection elements provide the operator with means for indicating the value of a no call bill. In FIGS. 49-54, additional examples of means for indicating the value of no call bills are provided. For example, in FIGS. 49-52, according to one embodiment, a denomination may be indicated in a similar manner by pressing one of the denomination selection elements. Alternatively, or additionally, a denomination may be indicated by selecting one of the denomination selection elements and selecting an accept key. Another example of a method of indicating a particular denomination selection element would be by utilizing one or more scroll keys. The selection of a denomination selection element may be indicated by, for example, the lights 2314 of FIG. 51, or by highlighting a particular selection element as in FIGS. 50-52. Alternatively a displayed message, as in FIGS. 49-51, 53, and 54, may be used to indicate which denomination is currently selected. The scroll keys could be used to alter which denomination is presently selected, for example, by altering which light 2314 is illuminated, which selection element is highlighted, or which denomination appears in the displayed message. Selection of an accept key while a particular denomination is selected may be used to indicate the selected denomination to the discrimination and authentication unit or the full image processing unit.

In addition to means for permitting the operator to indicate the denomination of one or more no calls, a document processing system may be provided with one or more means of prompting the operator as to the denomination of a no call bill. These means can be the means used to indicate which denomination is currently selected, e.g., the lights 2314 of FIG. 49, the highlighting of FIGS. 50-52, and/or the displayed message of FIGS. 49-51, 53, and 54. Several methods that may be employed in prompting the operator to enter the value of one or more no call bills will now be discussed.

A system containing means for prompting an operator as to the value of a no call bill or document may base its selection of the denomination to be prompted to the operator on a variety of criteria. According to one embodiment, default denomination or sequence of denominations may be employed to prompt a denomination to an operator. For example, the system may begin by prompting the lowest denomination, e.g., $1. Alternatively, the operator may begin by prompting the operator with the first denomination in a pre-defined sequence or on a menu list. The order of the denominations in the sequence or on the menu list may be a default order, e.g., increasing or decreasing denominational order, user-defined order, manufacturer-defined order.

According to another embodiment, a denomination to be prompted to the operator is determined on a random basis. The system simply randomly or pseudo-randomly chooses one of a plurality of denominations and suggests this denomination to the operator. The denomination prompted to an operator may remain the same for all no call bills or alternatively, a new randomly selected denomination may be chosen for each no call encountered. If the operator agrees that a given no call bill is of the denomination suggested by the prompting means and finds the particular no call bill to be acceptable, the operator may simply choose the accept element or the corresponding denomination selection element depending on the embodiment of the control panel employed. If the operator finds a particular bill to be acceptable but does not have the suggested denomination, the operator may alter the denomination that is selected by, for example, altering the displayed suggested denomination by using the scroll keys, scrolling among the plurality of denomination selection and/or indicating elements, or directly selecting the appropriate denomination by pressing or touching the appropriate denomination selection element. If the operator finds that a no call bill is not acceptable, the operator may simply select a continuation key.

According to another embodiment, a denomination to be prompted to the operator is determined on the basis of the denomination of the last bill that was identified by the system. For example, suppose the tenth bill in a stack was determined by the system to be a $10, the eleventh bill was a no call and indicated by the operator to be a $5 bill, and the twelfth was a no call bill. According to this embodiment, the system would suggest to the operator that the twelfth bill is a $10 bill. The operator may accept this suggestion or alter the suggested denomination as described above.

According to another embodiment, a denomination to be prompted to the operator is determined on the basis of the denomination of the last no call bill as indicated by the operator. For example, suppose the tenth bill was a no call and indicated by the operator to be a $5 bill, the eleventh bill in a stack was determined by the system to be a $10, and the twelfth was a no call bill. According to this embodiment, the system would suggest to the operator that the twelfth bill is a $5 bill. The operator may accept this suggestion or alter the suggested denomination as described above.

According to another embodiment, a denomination to be prompted to the operator is determined on the basis of the denomination of the immediately preceding bill, regardless of whether the denomination of that bill was determined by the system or was indicated by the operator. For example, suppose the tenth bill in a stack was determined by the system to be a $10, the eleventh bill was a no call and indicated by the operator to be a $5 bill, and the twelfth was also a no call bill. According to this embodiment, the system would suggest to the operator that the twelfth bill is a $5 bill. The operator may accept this suggestion or alter the suggested denomination as described above.

According to another embodiment, a denomination to be prompted to the operator is determined on the basis of historical information concerning no call bills such as statistical information regarding previous no call bills. For example, suppose that for a given system 180 no calls had been encountered since the system was placed in service. According to this embodiment, information regarding these no calls is stored in memory. Assume that of these 180 no call bills, 100 were indicated by the operator to be $5s, 50 were $10s, and the remaining 30 were $20s. According to this embodiment, the system would suggest to the operator that a no call bill was a $5. The operator may accept this suggestion or alter the suggested denomination as described above. Variations on the data which constitute the historical basis may be made. For example, the historical basis according to this embodiment may be all no calls encountered since a given machine was place in service as in the above example, the last predetermined number of no calls detected, e.g., the last 100 no calls detected, or the last predetermined number of bills processed, e.g., the no calls encountered in the last 1000 bills processed. Alternatively, the historical basis may be set by the manufacturer based on historical data retrieved from a number of systems.

According to another embodiment, a denomination to be prompted to the operator is determined on the basis of a comparison of information retrieved from a given no call bill and master information associated with genuine bills. For example, in some systems, the denomination of a bill is determined by scanning the bill, generating a scanned pattern from information retrieved via the scanning step, and comparing the scanned pattern with one or more master patterns associated with one or more genuine bills associated with one or more denominations. If the scanned pattern sufficiently matches one of the master patterns, the denomination of the bill is called or determined to be the denomination associated with the best matching master pattern. However, in some systems, a scanned pattern must meet some threshold degree of matching or correlation before the denomination of a bill will be called. In such systems, bills whose scanned pattern does not sufficiently match one of the master patterns are not called, i.e., they are no calls. According to the present embodiment, the system would suggest to the operator that a no call had the denomination associated with the master pattern that most closely matched its scanned pattern even though that match was insufficient to call the denomination of the bill without the concurrence of the operator. The operator may accept this suggestion or alter the suggested denomination as described above. For example, in a system similar to that described in U.S. Pat. No. 5,295,196, the system may prompt the operator with the denomination associated with the master pattern that has the highest correlation with the scanned pattern associated with the given no call bill. For example, if the highest correlation for a bill is below 800, the bill is a no call bill. In such a case, assume the highest correlation is 790 and this correlation is associated with a $1 bill. When this no call bill is to be reconciled, the system would suggest to the operator that the no call was a $1 bill.

According to another embodiment, a denomination to be prompted to the operator is determined on the basis of preset criteria established by the manufacturer. For example, in FIG. 51*a*, the denomination indicating elements are arranged in increasing denominational order. The system may be designed to default so that a given one of these denomination selection elements is initially highlighted when no call bills are to be reconciled. For example, for each no call the $10 element 2506*d* may initially be selected. Alternatively, the system may be designed to default to the first denomination selection element listed, e.g., the $1 denomination element 2506*a*.

According to another embodiment, a denomination to be prompted to the operator is determined on the basis of user-defined criteria set by the operator of a document processing system. For example, in FIG. 51, the operator may designate the system to default so that a given one of the denomination indicating elements is initially highlighted when no call bills are to be reconciled. For example, for each no call the operator may designate that the $10 element 2506*d* is to be initially selected. The operator may be permitted to set the default no call denomination, for example, in a set up mode entered into before bills in a stack are processed.

In addition to the ways discussed above whereby an initial denomination is prompted to the operator in connection with the reconciling a no call bill, according to other embodiments one or more alternate denominations are may also be suggested. For example, according to the method whereby the initial bill is suggested to the operator based on the denomination associated with a master pattern having the highest correlation relative to a scanned pattern, if the operator rejects the initial suggestion, the system may be designed to then suggest an alternate denomination based on the master pattern associated with a genuine bill of a different denomination having the next highest correlation value. If the operator rejects the second suggestion, the system may be designed to then suggest a second alternate denomination based on the master pattern associated with a genuine bill of a different denomination having the next highest correlation value, and so on.

For example, suppose the highest correlation was associated with a $1, the second highest correlation was associated with $10, and the third highest correlation was associated with $50. According to this embodiment, the system would initially suggest that the no call was a $1. If the operator determined the no call was not a $1, the system would then suggest that the no call was a $10. If the operator determined the no call was not a $10, the system would then suggest that the no call was a $50. For example, according to the embodiment of FIGS. 53*a-b*, the system would first ask whether the no call was a $1 by displaying the message "$1?" in the display area 2704. If the no call was a $1, the operator would depress the accept or yes key 2710. If the no call was not a $1 bill, the operator would depress the other denomination or no key 2711, in which case, the display area would display the message "$10?" and so on. Alternatively, the denomination selection elements may be arranged so that their relative order is based on the correlation results. For example, taking the menu list 2605 of FIG. 52, the denomination elements may be ordered in the order of decreasing correlation values, e.g., according to the previous example with the $1 denomination element being listed first, the $10 denomination element being listed second, the $50 denomination element being listed third and so on. Alternatively, the denomination elements may be listed in the reverse order. According to another embodiment, the denomination element associated with the highest correlation may be listed in the middle of the list surrounded by the denomination elements associated with the second and third highest correlations, and so on. For the above example, the $1 element 2606*a* would be listed in the middle of the menu list 2605 surrounded by the $10 element 2606*d* on one side and the $50 element 2606*f* on the other side.

Likewise, the order in which denominations are suggested to the operator and/or arranged on the control panel may be based on other criteria such as those described above, such as the prior bill information (e.g., last bill, last no call, last call denomination), historical information, user-defined order, manufacturer-defined order, and random order. For example, using the historical data example given above based on 180 no calls (100 $5 no calls, 50 $10 no calls, and 30 $20 no calls), the order that denominations are suggested to the operator may be first $5, then $10, and then $20. Alternatively, using the last bill information and assuming the following sequence of bills ($2, $5, $5, $5, $20, $10, no call indicated to be a $50, no call); the system would suggest denominations for the last no call in the following order: $50, $10, $20, $5, $2 Likewise the order in which the denominations are arranged on a control panel such as in FIGS. 52 and 50 may be determined based on such information, for example, according to the orders described above in connection with using correlation values. For example, the denominations may be listed in the prompting order suggested above (e.g., $5, $10, $20 in the historical information example and $50, $10, $20, $5, $2 in the last bill example). Alternatively they may be listed in the reverse order. Alternatively, they may be arranged with the first suggested denomination being in the center of the list and being initially highlighted or selected. This first suggested denomination may be surrounded by the second and third suggested denominations which are in turn surrounded by the fourth and fifth suggested denomination, and so on. A default sequence may be used to provide the order for any remaining denominations which are not dictated by a particular prompting criteria in a given situation. In the above examples, the denominations might be arranged on a menu list in the following orders: $2, $1, $10, $5, $20, $50, $100 for the historical information example and $1, $5, $10, $50, $20, $2, $100. In general, an example of a listing order according to this approach could be from top to bottom: 6th priority or suggested denomination, 4th, 2nd, 1st, 3rd, 5th, and 7th.

Embodiments arranging the respective order in which denominations are suggested to the operator and/or displayed on the control panel will likely aid the operator by reducing the projected number of times the operator will need to hit one of the scroll keys and/or "OTHER DENOM" or "NO" key.

Now several methods will be described in connection reconciliation of no calls in multi-output pocket machines after all bills in a stack have been processed. Recalling a previous example in which four no call bills were separated out from a stack of fifty bills and the machine halted after processing all fifty bills, the system then prompts the operator to reconcile the value of the four no call bills. For example, assume the no call bills corresponded to the 5th, 20th, 30th, and 31st bills in the stack and were $2, $50, $10, and $2 bills respectively. The degree of intelligence employed by the system in prompting the operator to reconcile the value of the no call bills may vary depending on the particular embodiment employed. According to one embodiment the operator may depress or select the denomination selection elements corresponding the denominations of the no call bills without any prompting from the system as to their respective denominations. For example, using the control panel of FIG. 48, the operator would depress the $2 selection element 1064*g* twice, the $10 selection element 1064*c* once, and the $50 selection element 1064*e* once. The system may or may not inform the operator that four no call bills must be reconciled and may or may not limit the operator to entering four denominations. Likewise, in other embodiments, the operator may use the scroll keys to cause the desired denomination to become selected and then depress the accept key. Alternatively, a numerical keypad may be provided for permitting the operator to indicate the number of bills of each denomination that have not been called. For example, the above example, the operator could use the scroll keys so that the $2 denomination was selected, then press "2" on the keypad for the number of $2 no calls in the batch, and then press an enter or accept key. Then the operator could use the scroll keys so that the $10 denomination was selected, then press "1" on the keypad for the number of $10 no calls in the batch, and then press an enter or accept key and so on. The keypad may comprise, for example, keys or selection elements associated with the digits 0-9.

Alternatively, the system may prompt the operator as to the denomination of each no call bill, for example, by employing one of the prompting methods discussed above, e.g., default, random, user-defined criteria, manufacturer defined criteria, prior bill information (last bill, last no call, last called denomination), historical information, scanned and master comparison information (e.g., highest correlation). For example, the system may serially interrogate the examiner as to the denomination of each no call, for example, the display may initially query "Is 1st no call a $2?". Depending on the embodiment of the control panel being used, the operator could then select "ACCEPT" or "YES" or select the $2 denomination selection element, select "OTHER DENOM" or "NO" or use the scroll keys or select the appropriate denomination selection element, or if the operator finds the first bill unacceptable, the operator may put the first no call bill aside and select "CONT". The system may then query the operator as to the denomination of the second no call bill, and so on. The denomination prompted to the operator would depend on the prompting criteria employed. For example, suppose the prompting criteria was the denomination of the preceding bill and further suppose that in the four no call example given above that the first bill was a $2, the 2nd bill was a $10, the 3rd bill was a $1, the 4th bill was a $1, the 19th bill was a $50, the 29th bill was a $10, and as stated above, the 30th bill was a $10. The system would then prompt the operator as to whether the first no call was a $1. Since the first no call is a $2, the operator would choose "NO", "OTHER DENOM", scroll, or hit the $2 selection element depending on the embodiment be used. If the "NO" or "OTHER DENOM" key were pressed, the system would review the preceding bills in reverse order and suggest the first denomination encountered that had not already been suggested, in this case a $10. If the "NO" or "OTHER DENOM" key were pressed again, the system would then suggest a $2. A predetermined default sequence may be utilized when prior bill information does not contain the desired denomination. Once the operator indicates that the first no call is a $2, the system would then prompt the operator as to whether the second no call was a $50. Since the second no call was indeed a $50 the operator would choose "ACCEPT", "YES", or select the $50 denomination selection element depending on the embodiment chosen. The system would then suggest that the third no call was a $10 and the operator would similarly indicate acceptance of the $10 suggested denomination. Finally, the system would suggest that the fourth no call was a $10. Since the last no call was a $2, the operator would reject the $10 suggestion and indicate that the fourth no call bill was a $2 as described above. The operation of a document processing system using a different prompting criteria would proceed in a similar manner and as described above with respect to each of the described prompting methods.

While discussed above with respect to no calls, the above embodiments could also be employed in connection with other types of flagged bills such as reverse-faced bills, reverse forward/reverse oriented bills, unfit bills, suspect bills, etc.

Figure 55:
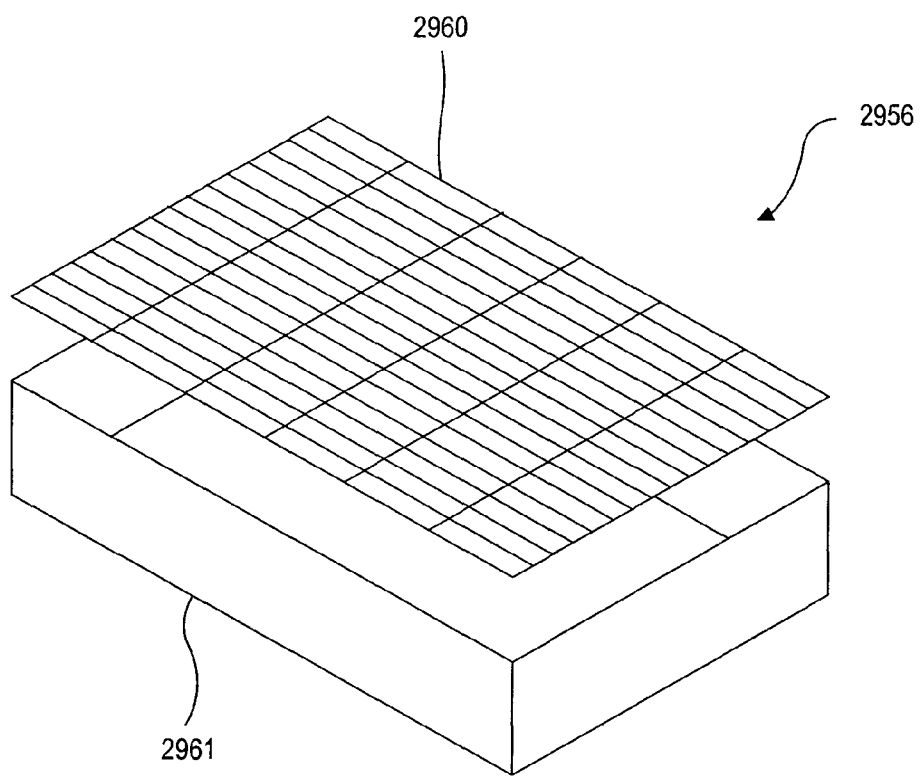
FIG. 55 shows the touch screen according to principles of the present invention.

Referring now to FIG. 55, the touch screen I/O device 2956 includes a touch screen 2960 mounted over a graphics display 2961. In one embodiment, the display 2961 is a liquid crystal display (LCD) with backlighting. The display may have, for example, 128 vertical pixels and 256 horizontal pixels. The display 2961 contains a built-in character generator which permits the display 2961 to display text and numbers having font and size pre-defined by the manufacturer of the display. Moreover, a controller such as a CPU is programmed to permit the loading and display of custom fonts and shapes (e.g., key outlines) on the display 2961. The display 2961 is commercially available as Part No. GMF24012EBTW from Stanley Electric Company, Ltd., Equipment Export Section, of Tokyo, Japan.

The touch screen 2960 may be an X-Y matrix touch screen forming a matrix of touch responsive points. The touch screen 2960 includes two closely spaced but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the controller. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit which is detected by the controller through the respective buses at the edges of the two polyester layers, thereby providing a means for detecting the X and Y coordinates of the switch closure. A matrix touch screen 2960 of the above type is commercially available from Dynapro Thin Film Products, Inc. of Milwaukee, Wis.

As illustrated in FIG. 55, the touch screen 2960 forms a matrix of ninety-six optically transparent switch elements having six columns and sixteen rows. The controller is programmed to divide the switch elements in each column into groups of three to form five switches in each column. Actuation of any one of the three switch elements forming a switch actuates the switch. The uppermost switch element in each column remains on its own and is unused.

Although the touch screen 2960 uses an X-Y matrix of optically transparent switches to detect the location of a touch, alternative types of touch screens may be substituted for the touch screen 2960. These alternative touch screens use such well-known techniques as crossed beams of infrared light, acoustic surface waves, capacitance sensing, and resistive membranes to detect the location of a touch. The structure and operation of the alternative touch screens are described and illustrated, for example, in U.S. Pat. Nos. 5,317,140, 5,297,030, 5,231,381, 5,198,976, 5,184,115, 5,105,186, 4,931,782, 4,928,094, 4,851,616, 4,811,004, 4,806,709, and 4,782,328, which are incorporated herein by reference.

Figure 56A:
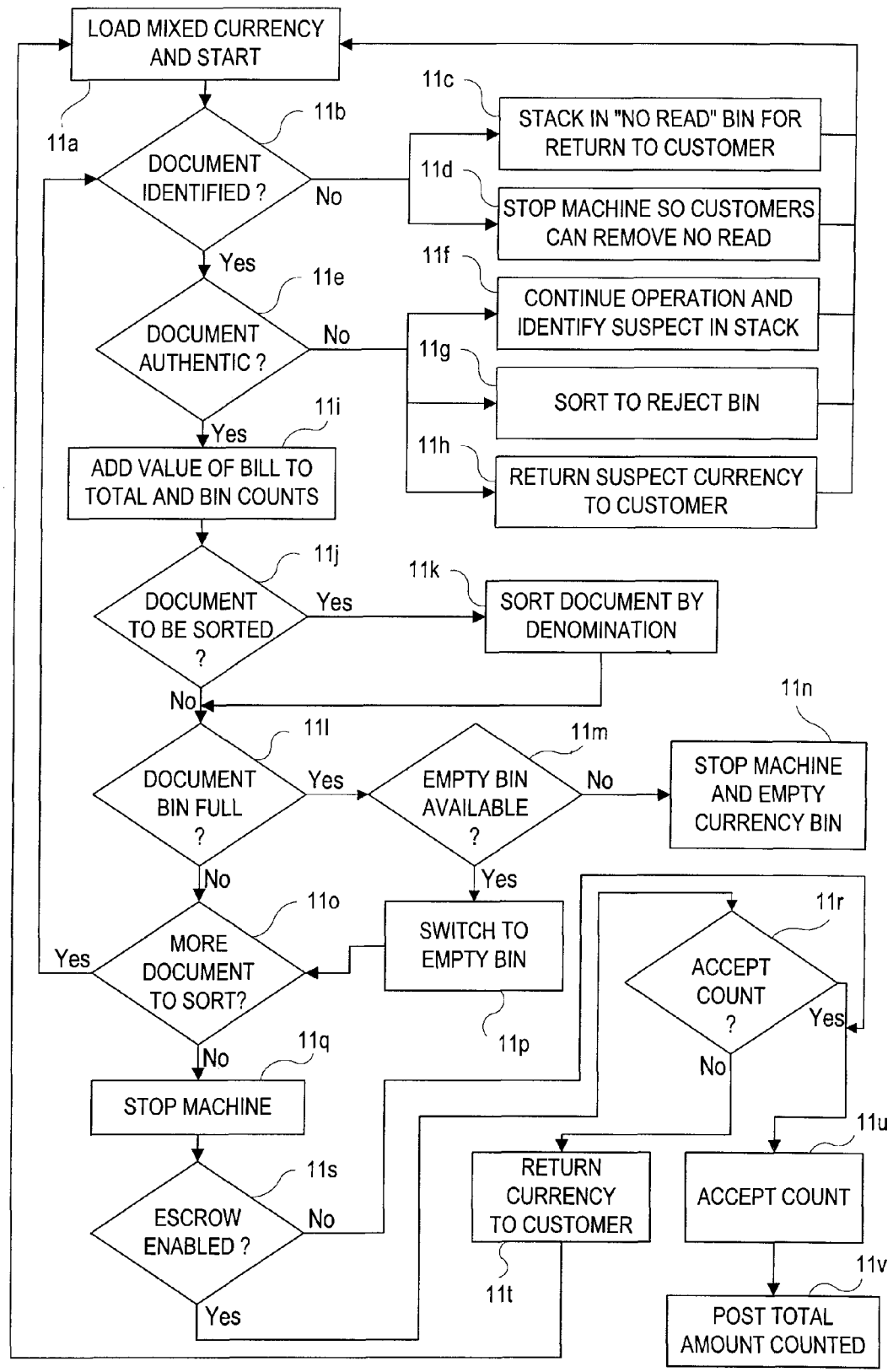
FIG. 56a is a flowchart of conducting a document transaction according to principles of the present invention.

The details of conducting a document transaction are illustrated in FIG. 56a. The functionality described below may reside at a single location or may be split across several locations throughout the document processing system, for example, in the full image scanner, at the central office computer, and at a personal computer attached to the document processing system. The user loads mixed documents at step 11a into the machine. This can be accomplished, as discussed above, by placing the documents in receptacle 16 on the machine. Next, still at step 11a, the user initiates the processing of the documents. This can be accomplished, for example, by having the user press a start key on a touch screen on the communications panel 26, as discussed above, to initiate a transaction. By "document transaction", it is meant to include not only all documents as described above, but also all forms of storage media including all forms of magnetic storage media (e.g., smart cards, debit cards), all forms of optical storage media (e.g., CD disks) and all forms of solid state storage media. Stored on the media is an amount indicating an amount of funds.

The machine attempts to identify the document at step 11b. If step 11b fails to identify the document, several alternatives are possible depending upon the exact implementation chosen for the machine. For example, as described previously, if it fails to identify the document, the system can use two canisters and place an unidentified document in a "no read" canister. Alternatively, at step 11d, the machine can be stopped so that the user can remove the "no read" document immediately. In this alternative, if the document can not be recognized by the machine, the unidentified document is diverted, for example, to a return slot so that it can be removed from the machine by the user. Also, the image can be displayed on the teller's video terminal so that the teller can analyze the image without removing the document. Alternatively, the teller may physically remove the document from the output receptacle, inspect the document and then enter the missing data so the document could be processed. After completing these steps, the system returns to step 11b to identify the other loaded documents.

In the event that the user wishes to deposit "no read" document that are returned to the user, the user may key in the value and number of such document and deposit them in an envelope for later verification. A message on the display screen may advise the user of this option. For example, if four $10 bills are returned, then re-deposited by the user in an envelope, the user may press a "$10" key on the keyboard four times. The user then receives immediate credit for all the documents denominated and authenticated by the scanner. Credit for re-deposited "no read" documents is given only after a bank picks up the envelope and manually verifies the amount. Alternatively, at least preferred users can be given full credit immediately, subject to later verification, or immediate credit can be given up to a certain dollar limit. In the case of counterfeit documents that are not returned to the user, the user can be notified of the detection of a counterfeit suspect at the machine or later by a written notice or personal call, depending upon the preferences of the financial institution.

If step 11b identifies the documents, next, at step 11e, the machine attempts to authenticate the documents to determine if the documents are genuine. The authentication process is described in greater detail below. If the documents are not genuine, then the system proceeds to one of three steps depending upon which option a user chooses for their machine. At step 11*f*, the system may continue operation and identify the suspect documents in the stack. In this alternative, a single canister is used for all documents, regardless of whether they are verified bills, no reads, or counterfeit suspects. On the other hand, at step 11*g* the machine may outsort the currency, for example, to a reject bin. The machine may also return the suspect currency at step 11*h* directly to the user. This is accomplished by diverting the currency to the return slot. Also, the machine maintains a count of the total number of counterfeit documents. If this total reaches a certain threshold value, an alarm condition will be generated. The alarm condition may be handled, for example, by turning on a light on the machine or by alerting the central office.

As mentioned above, the system may use a single canister to hold the documents. If a single canister system is used, then the various documents are identified within the single canister by placing different colored markers at the top of different documents. These documents are inserted into the bill transport path so they follow the respective bills to be inserted into the canister. Specifically, a first marker, e.g., a marker of a first color, is inserted to indicate the document is a counterfeit suspect that is not to be returned to the user. A second type of marker, e.g., a marker of a second color, can be inserted to indicate that the document is a counterfeit suspect. A third type of marker, e.g., of a third color, is inserted to indicate that a marked batch of documents represents a deposit whose verified amount did not agree with the user's declared balance. Because this third type of marker identifies a batch of documents instead of a single document, it is necessary to insert a marker at both the beginning and end of a marked batch. The marker could vary in size, contain bar-codes, or vary in color to easily identify different types of documents such as checks and currency.

If the document is authenticated, the total count $B_{total}$ and bin count $B_{counti}$ (where "i" is the "ith" bin) are incremented at step 11*i*. The total count $B_{total}$ is used by the machine to establish the amount deposited by the user and the bin counts are used to determine the amount of documents in a particular bin.

The machine then determines whether sorting is required at step 11*j*. If the answer is affirmative, then the document is sorted by denomination at step 11*k*. Rather than using single or double bins, as described above, this option includes a bin for each denomination and a bin for each type of document such as checks and loan coupons. A bin would also be designated to receive a combination of documents. For example, one bin could be designated to bank proof-of-deposit documents such as checks, loan coupons, and savings deposit slips. Sorting is accomplished by a sorting and counting module which sorts the documents placing each denomination in a specific bin. The sorting algorithm used can be any that is well known in the art.

After sorting at step 11*k* or if the answer to step 11*j* is negative, the machine proceeds to step 11*l*. At step 11*l*, the machine tests if the document bin in use is full. That is, the machine compares $B_{counti}$ to the maximum allowed for a bin. If it is full, at step 11*m*, the machine determines if there is an empty document bin. If there is no empty document bin available, at step 11*m*, the machine stops. The document is emptied at step 11*n*. If an empty document bin exists, the machine switches to the empty bin and places the document into that bin at step 11*p*.

At step 11*o*, the system determines when the last document in the deposited stack of documents has been counted. If counting is complete, the machine is stopped at step 11*q*.

The transport mechanism may also include an escrow holding area where the document being processed in a pending deposit transaction is held until the transaction is complete. Thus, from step 11*q*, the system proceeds to step 11*s*, to determine if escrow has been enabled. If escrow has not been enabled, the count of the machine is accepted at step 11*u* and the total amount $B_{total}$ is posted to the user at step 11*v*. If escrow has been enabled, at step 11*r*, the user is given the choice of accepting the count. If the user decides not to accept the count, at step 11*t*, the document is returned to the user. From step 11*t*, the machine proceeds to step 11*a* where the user is given another chance of counting the document. If the user decides to accept the count at step 11*r*, the machine proceeds to step 11*u* where the count is accepted and step 11*v* where the total count is displayed to the user. At this point, the document counting transaction is complete.

Figure 56B:
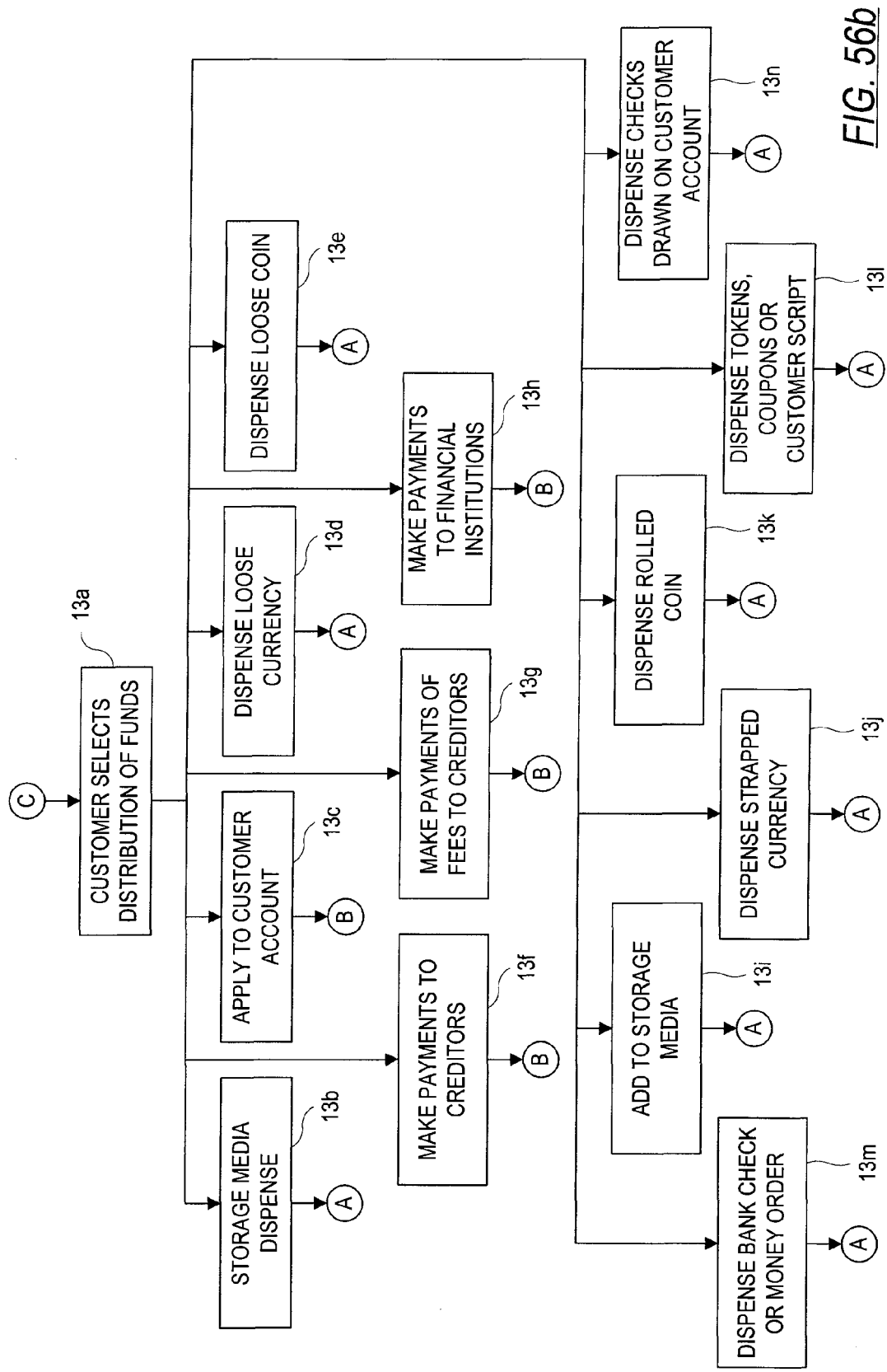
FIGS. 56b, 56c, and 56d are flowcharts of the funds distribution algorithm according to principles of the present invention.
Figure 56C:
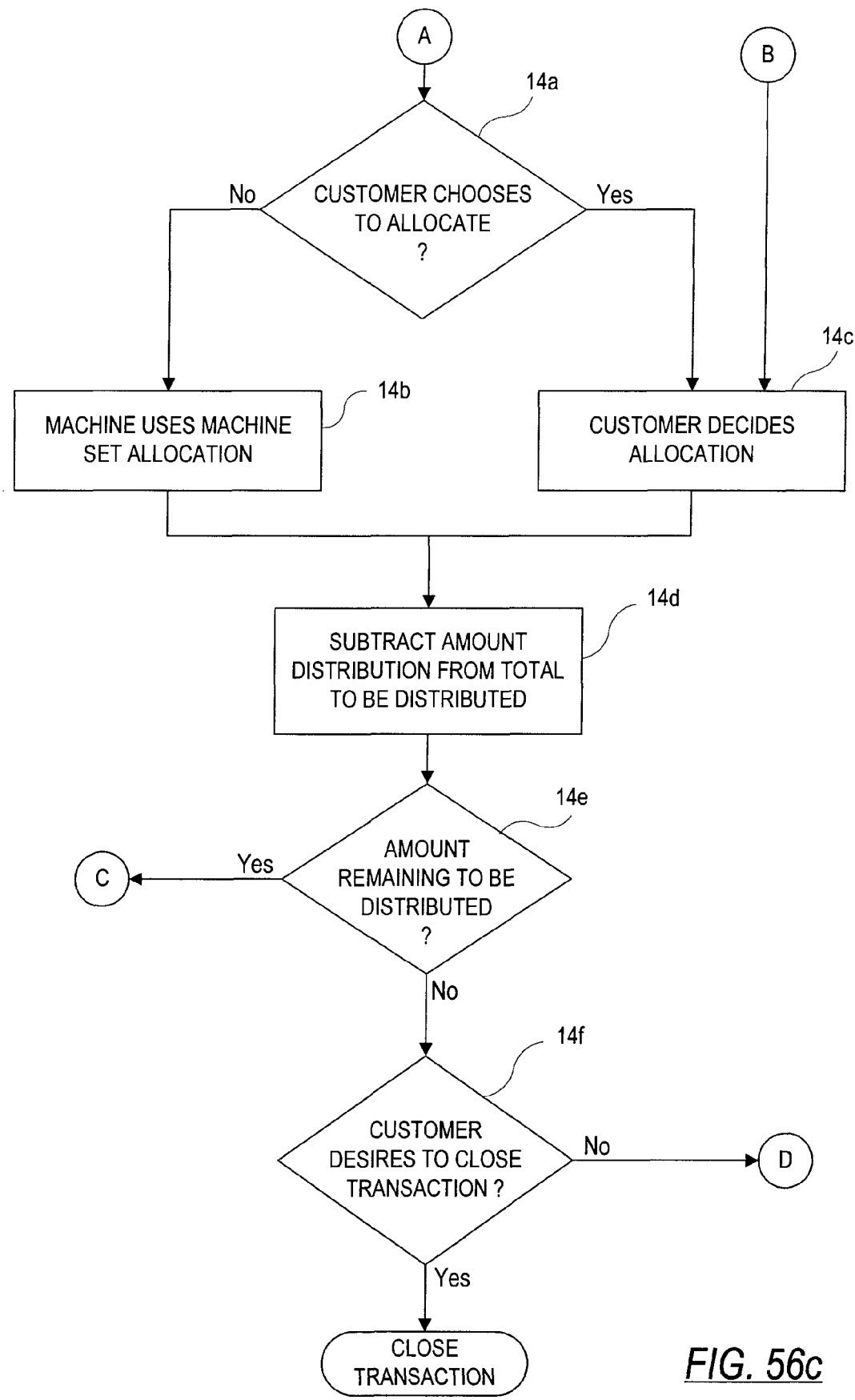
Figure 56D:
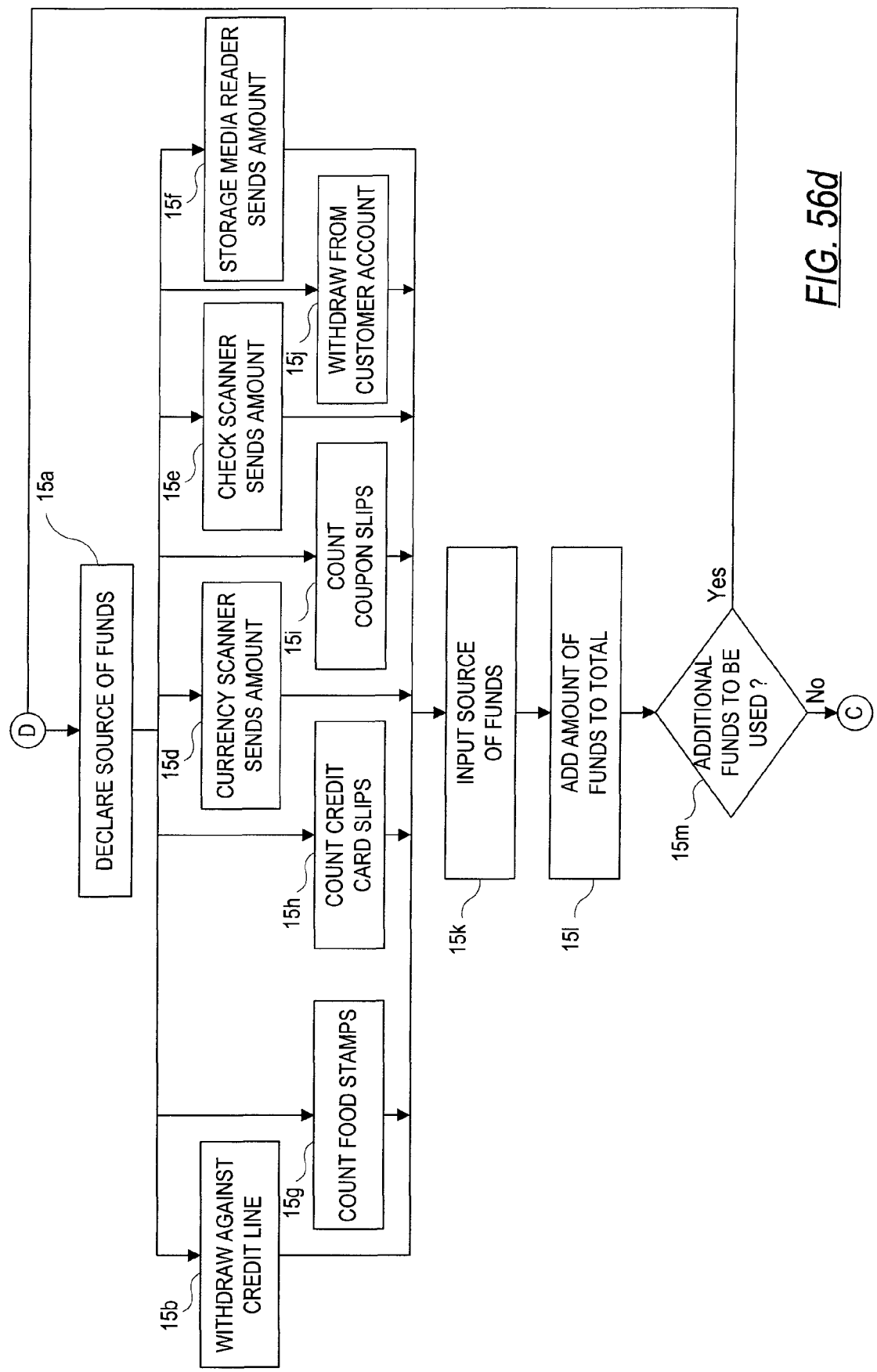
Figure 56E:
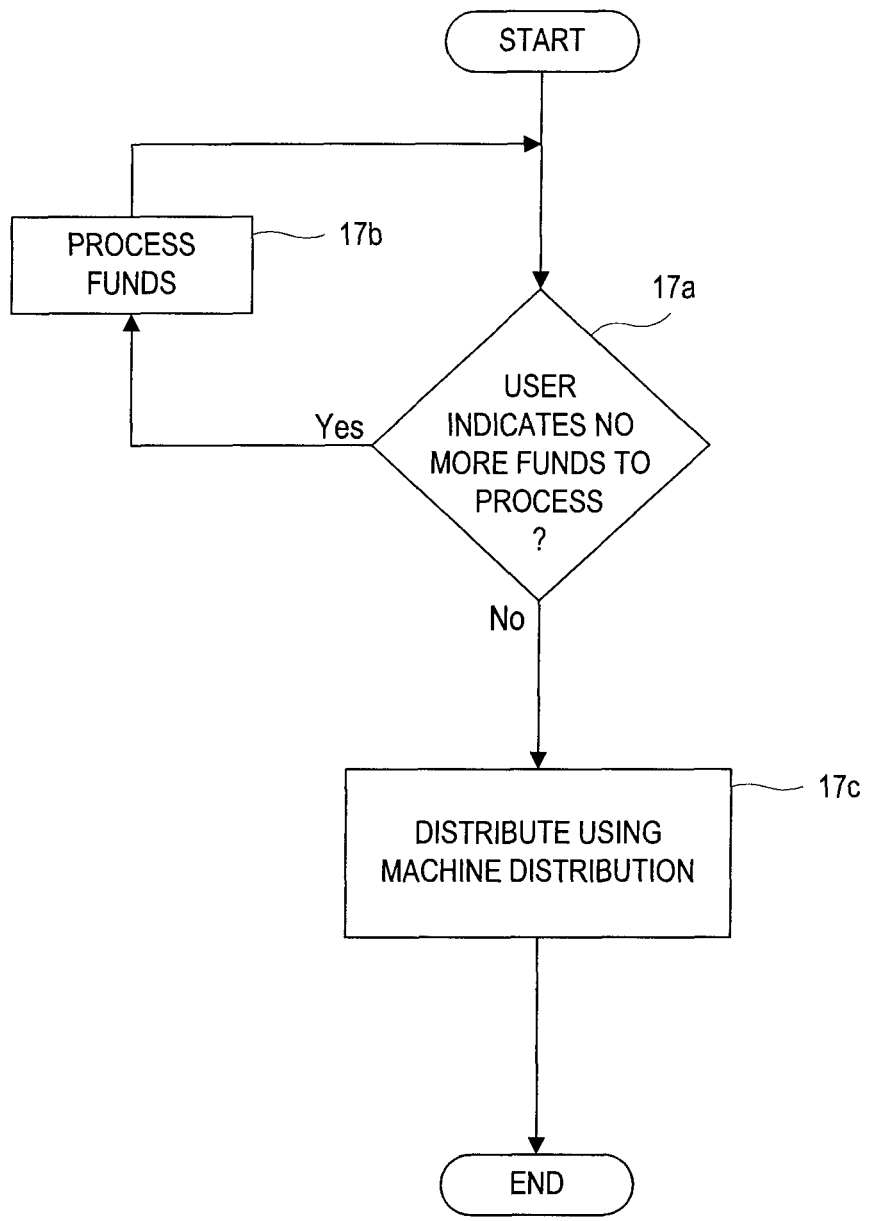
FIG. 56e is a flowchart of an alternate funds distribution algorithm according to principles of the present invention.
Figure 56F:
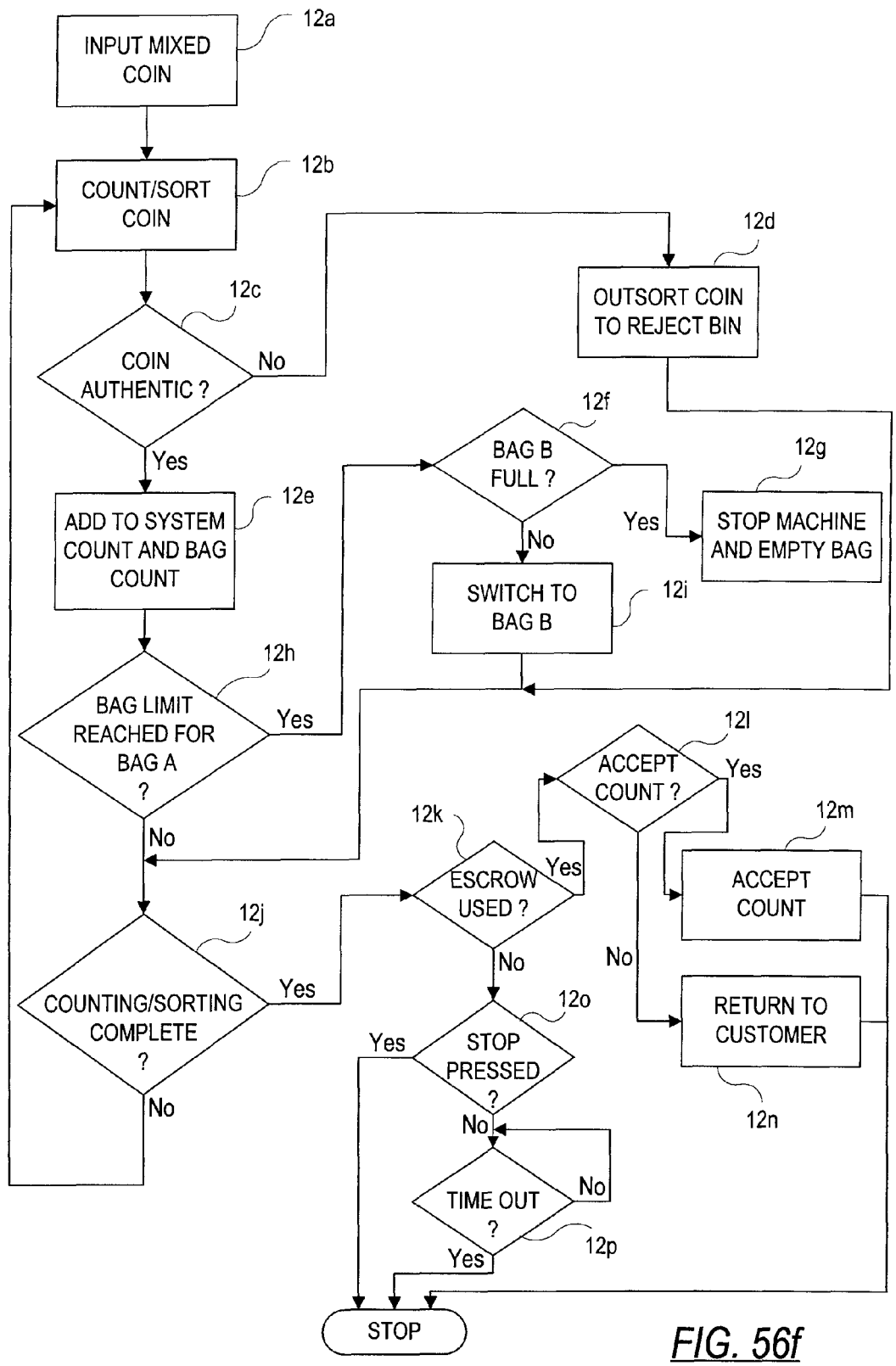
FIG. 56f is a flowchart of the coin sorting algorithm according to principles of the present invention.

A coin transaction is described in greater detail in FIG. 56*f*. As shown, a customer loads mixed coins into the system at step 12*a*. The coins are sorted, authenticated, and bagged one at a time. At step 12*b*, the machine sorts the coin. The sorting process is described in greater detail below. At step 12*c*, the machine determines if the coin is authentic. This process is also described in greater detail below. If the coin is not authentic, the machine outsorts the coin to a reject bin at step 12*d* and then proceeds to step 12*i* and determines if counting and sorting is complete.

If the coin is authentic, the coin count Ctotal and bag count Cbagi (where "i" represents the "ith" bag) is incremented by one at step 12*e*. The system count $C_{total}$ represents the total value of the coins deposited while the bag count represents the number of coins in a bag. After sorting and authenticating the coin, the system attempts to place the coin in a bag at step 12*h*. All coins can be placed in one bag or one bag per denomination can be used. Alternatively, any number of denominations, for example, two, could be placed in a bag. At step 12*h*, the system checks to see if the limit of the bag has been reached. That is, the system compares $C_{bagi}$ to the predetermined limit for a bag. If the limit has been reached for the bag in current use (e.g., bag A), the machine next checks to see if another bag (e.g., bag B) is full at step 12*f*. If bag B is full, the machine is stopped and an operator empties the bag at step 12*g*. If the other bag (e.g., bag B) is not full, then at step 12*i* the machine switches to this bag and the coin is placed there. The machine then proceeds to step 12*j* where a test is performed to determine if counting is complete.

At step 12*j*, the machine determines if sorting is complete. This is accomplished by sensing whether there are additional coins to sort in the coin bin. If sorting is not complete, the system continues at step 12*b* by counting and sorting the next coin.

If sorting has been completed, at step 12*k* the machine checks whether the escrow option has been enabled. If it has, at step 12*l*, the machine asks the customer whether they wish to accept the count. If the customer replies in the affirmative, at step 12*m* the machine accepts the count $C_{total}$ and posts the total to the customer. If the customer replies with a negative answer at step 12*l*, then the machine returns the coins to the customer at step 12*n* and the counting is complete.

If escrow has not been enabled, the machine checks at step 12*o* to see if stop has been pressed. If it has, the machine stops. If stop has not been pressed, then the machine waits for a certain period of time to time out at step 12*p* and stops when this time period has been reached.

The operation of the distribution step is now described in greater detail. As mentioned previously, at step 10*c* of flowchart of FIG. 2, the user allocates the amount deposited, whether the amount deposited is in the form of bills or coin. This step is illustrated in detail in FIGS. 56b, 56c, and 56d.

The machine inputs the funds at step 15k and sets $S_{total}$ (the total funds to be allocated) equal to either $B_{total}$ at step 151. The user has the choice of adding more funds at step 15m. If the answer is affirmative, more funds are added. This process is described in detail below. If the answer is negative, the machine proceeds to step 13a with the user selecting the amount and destination for the distribution of funds. The user is prompted by screen 52 to make these selections.

The user then has several options for distribution destinations. The user can choose to proceed to step 13b where an amount is transferred onto some storage media, for example, a smart card, and the storage media is automatically dispensed to the user. Another option, at step 13c, is to have an amount distributed to a user account, for example, an account in a grocery store. Another choice is to distribute an amount in the form of loose document to the user at step 13d or loose coin at step 13e. The user can also choose to distribute the amount to creditors at step 13f or make payment of fees to creditors at step 13g. The user might make payment of fees to financial institutions at step 13h. These could include mortgage payments, for example. The user can choose to add the amount to some form of storage media, for example, a smart card, at step 13i. The user might also choose to dispense strapped document at step 13j, rolled coin at step 13k, in the form of tokens, coupons, or user script at step 13l, dispense a bank check or money order at step 13m, or dispense a check dawn on a customer account at step 13n.

For some of the distribution selections, e.g. distribution of loose bills, the user may wish to have certain denominations returned to him or may wish to accept a machine allocation. For example, the user may choose to allocate a $100 deposit as four $20 bills, one $10 bill, and two $5 bills rather than accepting the default machine allocation. Those distributions where the user has a choice of allocating the deposit themselves or accepting a machine allocation, follow path A. If the machine proceeds via path A, at step 14a the user is asked whether they wish to allocate the amount. If the answer is affirmative, the user will then decide the allocation at step 14c. However, if the answer at step 14a is negative, then the machine decides the allocation at step 14b. Machine allocation is appropriate for dispensing all forms of bills, coins, tokens, coupons, user script and to storage media.

On the other hand, some distributions, e.g. deposits to bank accounts, require the user to allocate the deposit. For example, for a $500 deposit, a user may allocate $250 to a savings account and $250 to a checking account. Those distributions where the user is required to allocate the amount deposited follow path B. If the machine proceeds via path B, at step 14c the user decides the allocation. The machine then continues at step 14c.

After steps 14c or 14d, the machine proceeds to step 14d where the amount distributed is subtracted from the total amount deposited. At step 14e, the machine determines whether there is anything left to distribute after the subtraction. If the answer is affirmative, the machine proceeds to step 13a where the user again decides a place to distribute the amount allocated.

At step 14f, the user decides whether they wish to close the transaction. If they do, the transaction is closed. The closing completes step 10c of FIG. 2. On the other hand, they may not wish to end the transaction. For example, they may wish to add more cash, coins, or credit from other sources. If this is the case, the machine proceeds to step 15a of FIG. 56d.

At step 15a, the user decides which additional source of funds is to be used. The user could choose, at step 15b, to withdraw funds from a credit line, for example, from a credit card or bank. The user could choose to deposit more bills at step 15d. These steps were discussed above. The user could also choose to write a check and have this scanned in at step 15e, take a value from a form of storage media, for example, a smart card, at step 15f, add values from food stamps at step 15g, count credit card slips at step 15h or coupon slips at step 15i, or withdraw from a user account at step 15j.

At step 15k, these additional funds are input into the system. For example, the algorithm illustrated in FIG. 56a is used to input an amount of additional funds from newly deposited bills. At step 15l, this amount is added to the total amount of funds. At step 15m, the user is given the choice of adding more funds. If the answer is affirmative, the system returns to step 15a where the user declares the source of additional funds. If the answer is negative, the machine returns to step 13a in FIG. 56b where the user is again asked to determine the distribution of the funds. The machine then proceeds as described above.

As described, the user can initiate a document transaction by directly depositing funds from some form of storage media including all forms of magnetic, optical, and solid-state media. In the case of a document transaction using storage media, the user may insert their media into a media reader so that it may be read. The machine then may prompt the user for the amount to be removed from the media and distributed to other sources. Conversely, the machine might remove all the funds available from the media. In any case, once the deposit amount has been removed from the media, the machine proceeds to step 15k in FIG. 56d. The remaining steps are the same as described above.

Also as described above, the user can initiate a transaction by depositing funds from an outside source. By outside source, it is meant to include a credit card account, bank account, store account, or other similar accounts. The user may initiate a transaction by using the touch screen to enter account information, such as the account number and PIN number to access the account. The user might also initiate the transaction by moving an account identification card through a media reader, then using the communications panel to enter other data such as the amount to be withdrawn from the account. Then, the system proceeds to step 15k of FIG. 56d. The remaining steps are described are the same as described above.

The alternate funds distribution algorithm is illustrated in FIG. 56e. At step 17a, the user indicates whether there are any more funds to process. If the answer is affirmative, at step 17b, the machine processes more funds. If the answer is negative, then at step 17c, the dispensing unit distributes the funds according to its programming. Operation of the machine then stops.

As described above, the processing system has the advantage of being able to process mixed currency or documents utilizing full image scanning and a discriminator. The deposits in the system are processed substantially immediately. In addition, the full image of the scanned document can be communicated to a central office from which two-way communication with a system at a remote location is allowed. Finally, the processing system provides all the benefits of an automated teller machine.

Figure 57A:
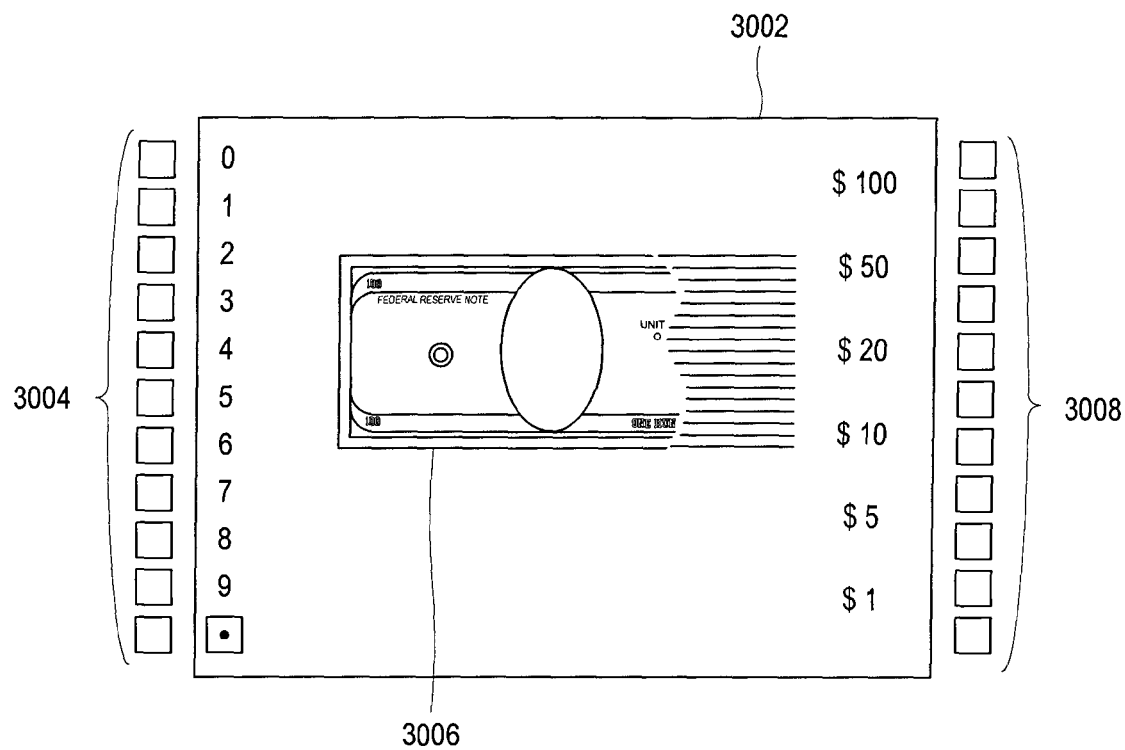
FIG. 57a illustrates means for entering the value of a no-call document according to principles of the present invention.
Figure 57B:
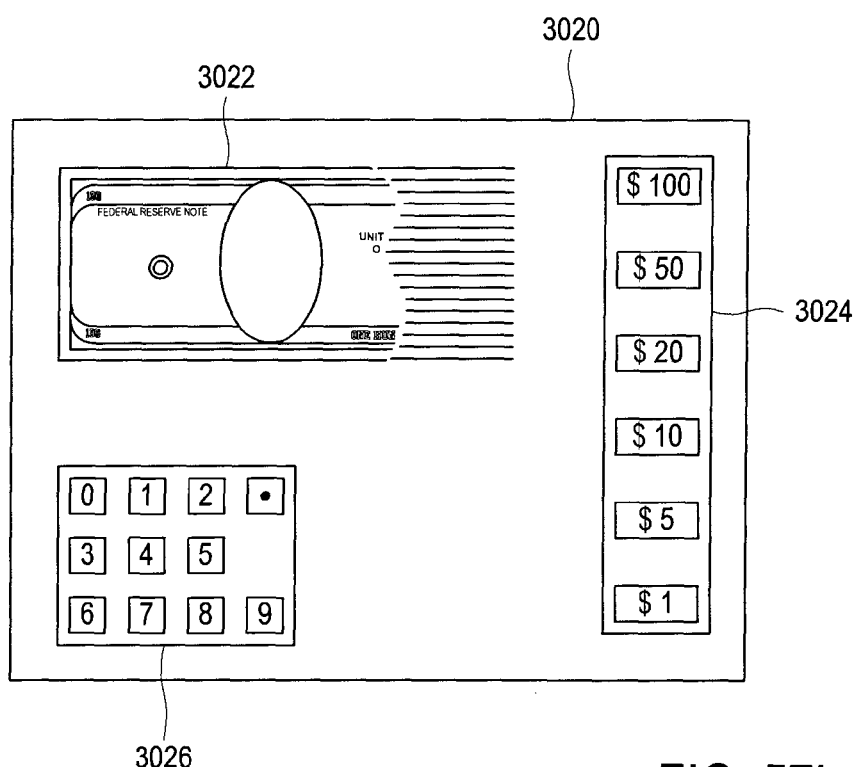
FIG. 57b illustrates means for entering the value of a no-call document on a touch screen according to principles of the present invention.

An alternate embodiment of a control panel 3002 is shown in FIG. 57a. A set of keys 3004 is used to enter numeric data which is shown on the screen which appears to be missing from bill 3006. Alternatively, the user may enter denomination information using keys 3008 which relate to denominations which appear on the screen. In yet another embodiment of the control panel, a touch screen 3020 is used to enter no-call information concerning bill 3022. The user can enter the missing information using a keypad 3026 or denomination keys 3024 which appear on the touch screen. Additionally, the user could use a standard alphanumeric keyboard to complete the document image as required. Alternatively, if a personal computer terminal is used, a mouse could be used identify and select appropriate fields. For example, if the document were a check, the unidentified field may be the signature field or the amount field. The user would "click" this field. A second screen would appear on the terminal where the missing data would be entered. These routines could be customer-specific based upon the customer's needs.

Figure 58:
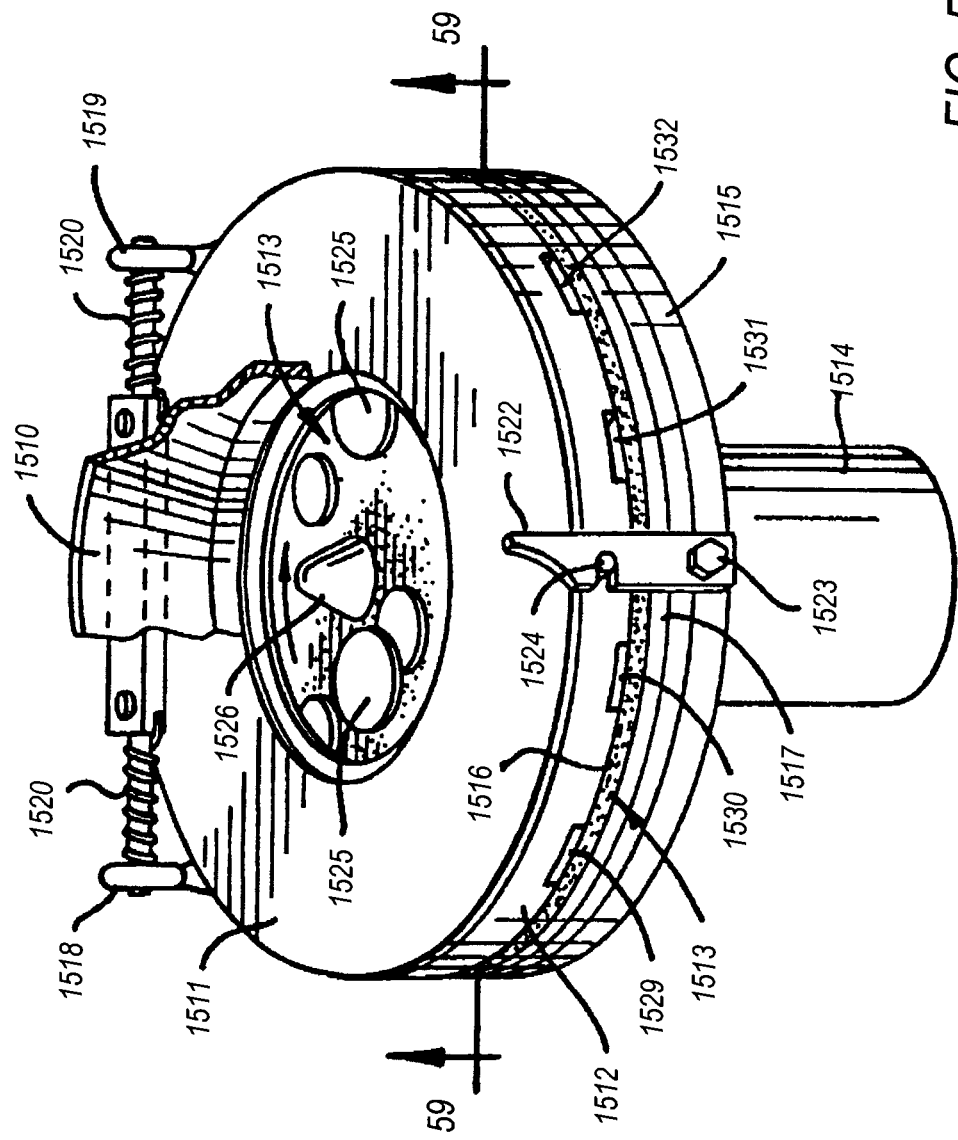
FIG. 58 is perspective view of a disc-type coin sorter embodying the present invention, with a top portion thereof broken away to show internal structure.

As stated before, the system may include a coin sorting and discrimination module 19. FIGS. 58-61 illustrate a disc-type coin sorter used in coin sorting and discrimination module 19 that uses a coin-driving member having a resilient surface for moving coins along a metal coin-guiding surface of a stationary coin-guiding member. Alternatively, the coin sorter may be a rail sorter such as the disclosed in U.S. Pat. No. 5,163,868 or U.S. Pat. No. 5,114,381, both of which are incorporated by reference herein in their entirety. The sorter may also be a core sorter such as that disclosed in U.S. Pat. No. 2,835,260, sifter-type sorter such as that disclosed in U.S. Pat. No. 4,360,034, or any type of coin-counting disk such as that described in U.S. Pat. No. 4,543,969, all of which are incorporated by reference herein in their entirety. Additionally, the coin sorter may be a drum sorter, dual-disc sorter, or any other coin sorter as is known to those skilled in the art. Alternatively, the simple coin sorter with coin discrimination can be used to verify the deposit of coin. Such sorters are described in U.S. Pat. No. 2,669,998, No. 2,750,949, and No. 5,299,977, all of which are incorporated by reference herein in their entirety. The coin-driving member is a rotating disc, and the coin-guiding member is a stationary sorting head. As can be seen in FIG. 58, a hopper 1510 receives coins of mixed denominations and feeds them through central openings in a housing 1511 and a coin-guiding member in the form of an annular sorting head or guide plate 1512 inside or underneath the housing. As the coins pass through these openings, they are deposited on the top surface of a coin-driving member in the form of a rotatable disc 1513. This disc 1513 is mounted for rotation on a stub shaft (not shown) and driven by an electric motor 1514 mounted to a base plate 1515. The disc 1513 comprises a resilient pad 1516 bonded to the top surface of a solid metal disc 1517.

The top surface of the resilient pad 1516 is preferably spaced from the lower surface of the sorting head 1512 by a gap of about 0.005 inches (0.13 mm). The gap is set around the circumference of the sorting head 1512 by a three point mounting arrangement including a pair of rear pivots 1518, 1519 loaded by respective torsion springs 1520 which tend to elevate the forward portion of the sorting head. During normal operation, however, the forward portion of the sorting head 1512 is held in position by a latch 1522 which is pivotally mounted to the frame 1515 by a bolt 1523. The latch 1522 engages a pin 1524 secured to the sorting head. For gaining access to the opposing surfaces of the resilient pad 1516 and the sorting head, the latch is pivoted to disengage the pin 1524, and the forward portion of the sorting head is raised to an upward position (not shown) by the torsion springs 1520.

As the disc 1513 is rotated, the coins 1525 deposited on the top surface thereof tend to slide outwardly over the surface of the pad due to centrifugal force. The coins 1525, for example, are initially displaced from the center of the disc 1513 by a cone 1526, and therefore are subjected to sufficient centrifugal force to overcome their static friction with the upper surface of the disc. As the coins move outwardly, those coins which are lying flat on the pad enter the gap between the pad surface and the guide plate 1512 because the underside of the inner periphery of this plate is spaced above the pad 16 by a distance which is about the same as the thickness of the thickest coin. As further described below, the coins are sorted into their respective denominations, and the coins for each denomination issue from a respective exit slot, such as the slots 1527, 1528, 1529, 1530, 1531 and 1532 (see FIGS. 58 and 59) for dimes, pennies, nickels, quarters, dollars, and half-dollars, respectively. In general, the coins for any given currency are sorted by the variation in diameter for the various denominations.

Preferably most of the aligning, referencing, sorting, and ejecting operations are performed when the coins are pressed into engagement with the lower surface of the sorting head 1512. In other words, the distance between the lower surfaces of the sorting head 1512 with the passages conveying the coins and the upper surface of the rotating disc 1513 is less than the thickness of the coins being conveyed. As mentioned above, such positive control permits the coin sorter to be quickly stopped by braking the rotation of the disc 1513 when a preselected number of coins of a selected denomination have been ejected from the sorter. Positive control also permits the sorter to be relatively compact yet operate at high speed. The positive control, for example, permits the single file stream of coins to be relatively dense, and ensures that each coin in this stream can be directed to a respective exit slot.

Figure 59:
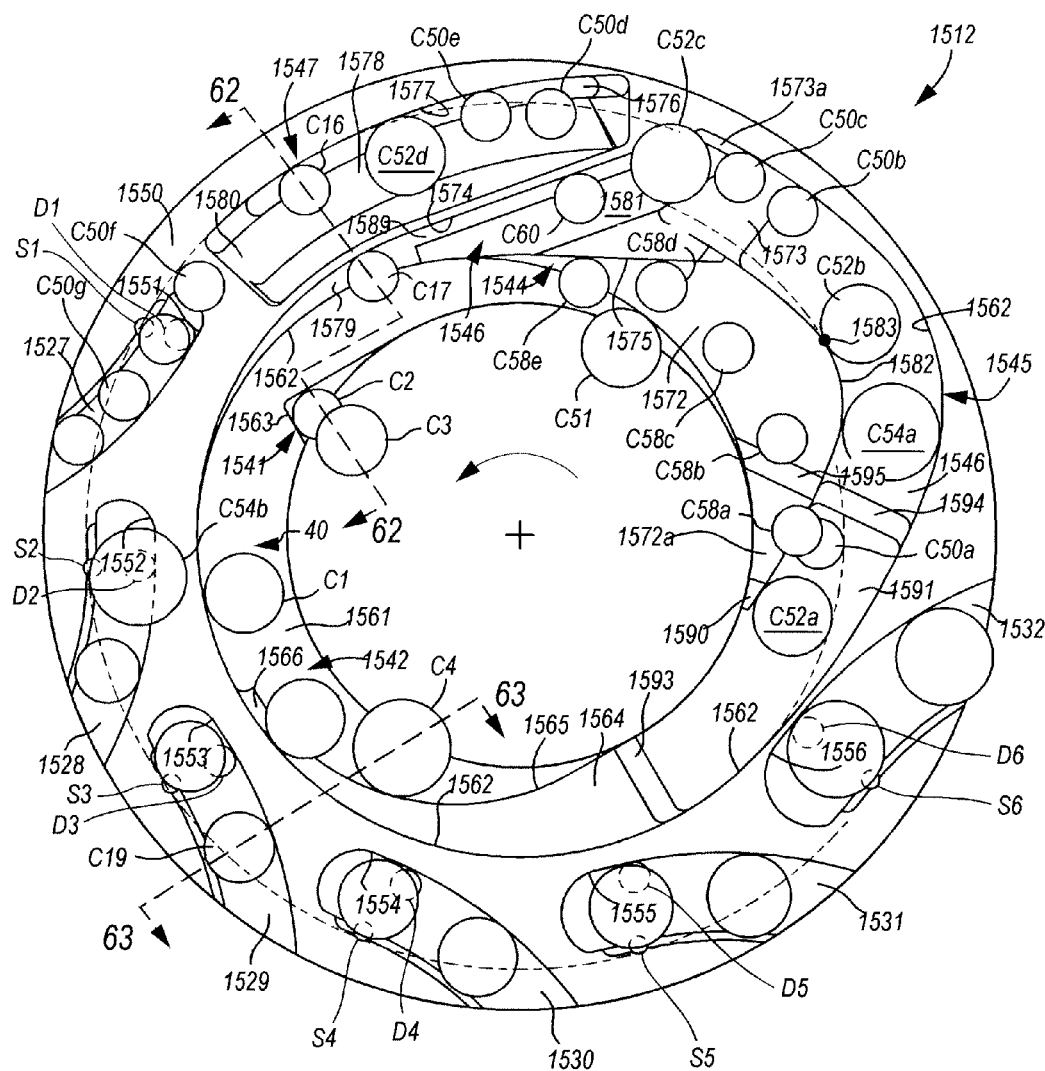
FIG. 59 is an enlarged horizontal section taken generally along line 59-59 in FIG. 58.

Turning now to FIG. 59, there is shown a bottom view of the preferred sorting head 1512 including various channels and other means especially designed for high-speed sorting with positive control of the coins, yet avoiding the galling problem. It should be kept in mind that the circulation of the coins, which is clockwise in FIG. 58, appears counterclockwise in FIG. 59 because FIG. 59 is a bottom view. The various means operating upon the circulating coins include an entrance region 1540, means 1541 for stripping "shingled" coins, means 1542 for selecting thick coins, first means 1544 for recirculating coins, first referencing means 1545 including means 1546 for recirculating coins, second referencing means 1547, and the exit means 1527, 1528, 1529, 1530, 1531 and 1532 for six different coin denominations, such as dimes, pennies, nickels, quarters, dollars and half-dollars. The lowermost surface of the sorting head 1512 is indicated by the reference numeral 1550.

Considering first the entrance region 1540, the outwardly moving coins initially enter under a semi-annular region underneath a planar surface 1561 formed in the underside of the guide plate or sorting head 1512. Coin C1, superimposed on the bottom plan view of the guide plate in FIG. 59 is an example of a coin which has entered the entrance region 1540. Free radial movement of the coins within the entrance region 1540 is terminated when they engage a wall 1562, though the coins continue to move circumferentially along the wall 1562 by the rotational movement of the pad 1516, as indicated by the central arrow in the counterclockwise direction in FIG. 59. To prevent the entrance region 1540 from becoming blocked by shingled coins, the planar region 1561 is provided with an inclined surface 1541 forming a wall or step 1563 for engaging the uppermost coin in a shingled pair. In FIG. 59, for example, an upper coin C2 is shingled over a lower coin C3. As further shown in FIG. 60, movement of the upper coin C2 is limited by the wall 1563 so that the upper coin C2 is forced off of the lower coin C3 as the lower coin is moved by the rotating disc 1513.

Returning to FIG. 59, the circulating coins in the entrance region 1540, such as the coin C1, are next directed to the means 1542 for selecting thick coins. This means 1542 includes a surface 1564 recessed into the sorting head 1512 at a depth of 0.070 inches (1.78 mm) from the lowermost surface 1550 of the sorting head. Therefore, a step or wall 1565 is formed between the surface 1561 of the entrance region 1540 and the surface 1564. The distance between the surface 1564 and the upper surface of the disc 1513 is therefore about 0.075 inches so that relatively thick coins between the surface 1564 and the disc 1513 are held by pad pressure. To initially engage such thick coins, an initial portion of the surface 1564 is formed with a ramp 1566 located adjacent to the wall 1562. Therefore, as the disc 1513 rotates, thick coins in the entrance region that are next to the wall 1562 are engaged by the ramp 1566 and thereafter their radial position is fixed by pressure between the disc and the surface 1564. Thick coins which fail to initially engage the ramp 1566, however, engage the wall 1565 and are therefore recirculated back within the central region of the sorting head. This is illustrated, for example, in FIG. 61 for the coin C4. This initial selecting and positioning of the thick coins prevents misaligned thick coins from hindering the flow of coins to the first referencing means 1545.

Returning now to FIG. 59, the ramp 1566 in the means 1542 for selecting the thick coins can also engage a pair or stack of thin coins. Such a stack or pair of thin coins will be carried under pad pressure between the surface 1564 and the rotating disc 1513. In the same manner as a thick coin, such a pair of stacked coins will have its radial position fixed and will be carried toward the first referencing means 1545. The first means 1545 for referencing the coins obtains a single-file stream of coins directed against the outer wall 1562 and leading up to a ramp 1573.

Coins are introduced into the referencing means 1545 by the thinner coins moving radially outward via centrifugal force, or by the thicker coin(s) C52a following concentricity via pad pressure. The stacked coins C58a and C50a are separated at the inner wall 1582 such that the lower coin C58a is carried against surface 1572a. The progression of the lower coin C58a is depicted by its positions at C58b, C58c, C58d, and C58e. More specifically, the lower coin C58 becomes engaged between the rotating disc 1513 and the surface 1572 in order to carry the lower coin to the first recirculating means 1544, where it is recirculated by the wall 1575 at positions C58d and C58e. At the beginning of the wall 1582, a ramp 1590 is used to recycle coins not fully between the outer and inner walls 1562 and 1582 and under the sorting head 1512. As shown in FIG. 59, no other means is needed to provide a proper introduction of the coins into the referencing means 1545.

The referencing means 1545 is further recessed over a region 1591 of sufficient length to allow the coins C54 of the widest denomination to move to the outer wall 1562 by centrifugal force. This allows coins C54 of the widest denomination to move freely into the referencing means 1545 toward its outer wall 1562 without being pressed between the resilient pad 1516 and the sorting head 1512 at the ramp 1590. The inner wall 1582 is preferably constructed to follow the contour of the recess ceiling. The region 1591 of the referencing recess 1545 is raised into the head 1512 by ramps 1593 and 1594, and the consistent contour at the inner wall 1582 is provided by a ramp 1595.

The first referencing means 1545 is sufficiently deep to allow coins C50 having a lesser thickness to be guided along the outer wall 1562 by centrifugal force, but sufficiently shallow to permit coins C52, C54 having a greater thickness to be pressed between the pad 1516 and the sorting head 1512, so that they are guided along the inner wall 1582 as they move through the referencing means 1545. The referencing recess 1545 includes a section 1596 which bends such that coins C52, which are sufficiently thick to be guided by the inner wall 1582 but have a width which is less than the width of the referencing recess 1545, are carried away from the inner wall 1582 from a maximum radial location 1583 on the inner wall toward the ramp 1573.

This configuration in the sorting head 1512 allows coins of all denominations to converge at a narrow ramped finger 1573a on the ramp 1573, with coins C54 having the largest width being carried between the inner and outer walls via the surface 1596 to the ramped finger 1573a so as to bring the outer edges of all coins to a generally common radial location. By directing the coins C50 radially inward along the latter portion of the outer wall 1562, the probability of coins being offset from the outer wall 1562 by adjacent coins and being led onto the ramped finger 1573a is significantly reduced. Any coins C50 which are slightly offset from the outer wall 1562 while being led onto the ramp finger 1573a may be accommodated by moving the edge 1551 of exit slot 1527 radially inward, enough to increase the width of the slot 1527 to capture offset coins C50 but to prevent the capture of coins of the larger denominations. For sorting Dutch coins, the width of the ramp finger 1573a may be about 0.140 inch. At the terminal end of the ramp 1573, the coins become firmly pressed into the pad 16 and are carried forward to the second referencing means 1547.

A coin such as the coin C50c will be carried forward to the second referencing means 1547 so long as a portion of the coin is engaged by the narrow ramped finger 1573a on the ramp 1573. If a coin is not sufficiently close to the wall 1562 so as to be engaged by this ramped finger 1573a, then the coin strikes a wall 1574 defined by the second recirculating means 1546, and that coin is recirculated back to the entrance region 1540.

The first recirculating means 1544, the second recirculating means 1546 and the second referencing means 1547 are defined at successive positions in the sorting head 1512. It should be apparent that the first recirculating means 1544, as well as the second recirculating means 1546, recirculate the coins under positive control of pad pressure. The second referencing means 1547 also uses positive control of the coins to align the outermost edge of the coins with a gaging wall 1577. For this purpose, the second referencing means 1547 includes a surface 1576, for example, at 0.110 inches (1.27 mm) from the bottom surface of the sorting head 1512, and a ramp 1578 which engages the inner edge portions of the coins, such as the coin C50d.

Figure 60:
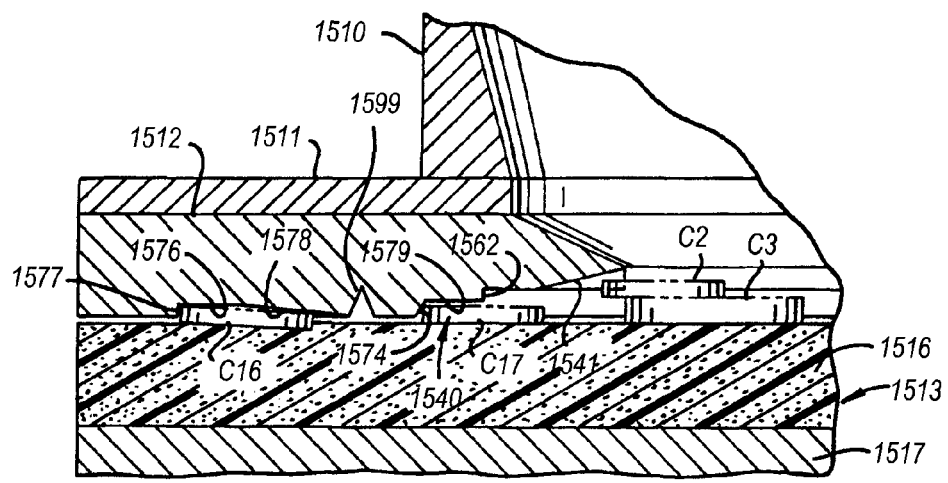
FIG. 60 is an enlarged section taken generally along line 62-62 in FIG. 59, showing the coins in full elevation.
Figure 61:
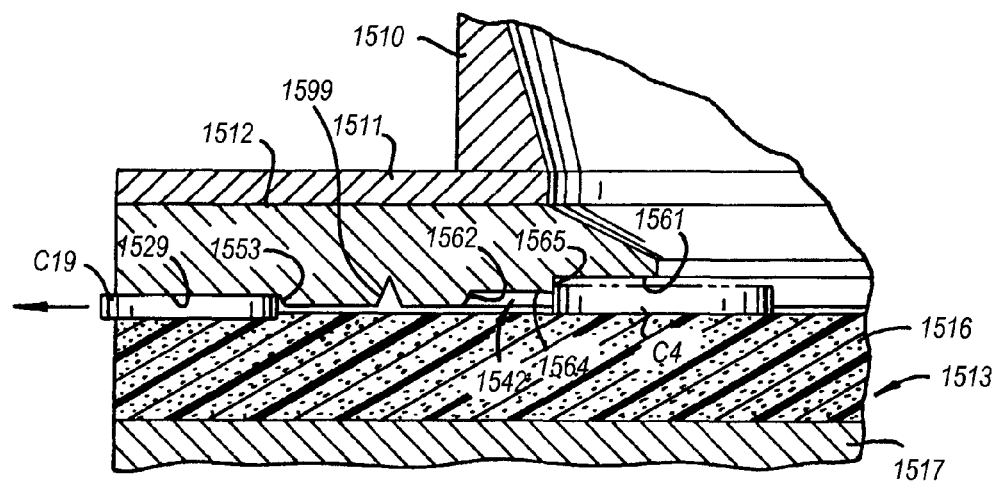
FIG. 61 is an enlarged section taken generally along line 63-63 in FIG. 59, showing in full elevation a nickel registered with an ejection recess.

As best shown in FIG. 59, the initial portion of the gaging wall 1577 is along a spiral path with respect to the center of the sorting head 1512 and the sorting disc 1513, so that as the coins are positively driven in the circumferential direction by the rotating disc 1513, the outer edges of the coins engage the gaging wall 1577 and are forced slightly radially inward to a precise gaging radius, as shown for the coin C16 in FIG. 60. FIG. 60 further shows a coin C17 having been ejected from the second recirculating means 1546.

Referring back to FIG. 59, the second referencing means 1547 terminates with a slight ramp 1580 causing the coins to be firmly pressed into the pad 1516 on the rotating disc with their outermost edges aligned with the gaging radius provided by the gaging wall 1577. At the terminal end of the ramp 1580 the coins are gripped between the guide plate 1512 and the resilient pad 1516 with the maximum compressive force. This ensures that the coins are held securely in the new radial position determined by the wall 1577 of the second referencing means 1547.

The sorting head 1512 further includes sorting means comprising a series of ejection recesses 1527, 1528, 1529, 1530, 1531 and 1532 spaced circumferentially around the outer periphery of the plate, with the innermost edges of successive slots located progressively farther away from the common radial location of the outer edges of all the coins for receiving and ejecting coins in order of increasing diameter. The width of each ejection recess is slightly larger than the diameter of the coin to be received and ejected by that particular recess, and the surface of the guide plate adjacent the radially outer edge of each ejection recess presses the outer portions of the coins received by that recess into the resilient pad so that the inner edges of those coins are tilted upwardly into the recess. The ejection recesses extend outwardly to the periphery of the guide plate so that the inner edges of these recesses guide the tilted coins outwardly and eventually eject those coins from between the guide plate 1512 and the resilient pad 1516.

The innermost edges of the ejection recesses are positioned so that the inner edge of a coin of only one particular denomination can enter each recess; the coins of all other remaining denominations extend inwardly beyond the innermost edge of that particular recess so that the inner edges of those coins cannot enter the recess.

For example, the first ejection recess 1527 is intended to discharge only dimes, and thus the innermost edge 1551 of this recess is located at a radius that is spaced inwardly from the radius of the gaging wall 1577 by a distance that is only slightly greater than the diameter of a dime. Consequently, only dimes can enter the recess 1527. Because the outer edges of all denominations of coins are located at the same radial position when they leave the second referencing means 1547, the inner edges of the pennies, nickels, quarters, dollars and half dollars all extend inwardly beyond the innermost edge of the recess 1527, thereby preventing these coins from entering that particular recess.

At recess 1528, the inner edges of only pennies are located close enough to the periphery of the sorting head 1512 to enter the recess. The inner edges of all the larger coins extend inwardly beyond the innermost edge 1552 of the recess 1528 so that they remain gripped between the guide plate and the resilient pad. Consequently, all the coins except the pennies continue to be rotated past the recess 1528.

Similarly, only nickels enter the ejection recess 1529, only the quarters enter the recess 1530, only the dollars enter the recess 1531, and only the half dollars enter the recess 1532.

Because each coin is gripped between the sorting head 1512 and the resilient pad 16 throughout its movement through the ejection recess, the coins are under positive control at all times. Thus, any coin can be stopped at any point along the length of its ejection recess, even when the coin is already partially projecting beyond the outer periphery of the guide plate. Consequently, no matter when the rotating disc is stopped (e.g., in response to the counting of a preselected number of coins of a particular denomination), those coins which are already within the various ejection recesses can be retained within the sorting head until the disc is re-started for the next counting operation.

One of six proximity sensors $S_1$-$S_6$ is mounted along the outboard edge of each of the six exit channels 1527-1532 in the sorting head for sensing and counting coins passing through the respective exit channels. By locating the sensors $S_1$-$S_6$ in the exit channels, each sensor is dedicated to one particular denomination of coin, and thus it is not necessary to process the sensor output signals to determine the coin denomination. The effective fields of the sensors $S_1$-$S_6$ are all located just outboard of the radius at which the outer edges of all coin denominations are gaged before they reach the exit channels 1527-1532, so that each sensor detects only the coins which enter its exit channel and does not detect the coins which bypass that exit channel. Only the largest coin denomination (e.g., U.S. half dollars) reaches the sixth exit channel 1532, and thus the location of the sensor in this exit channel is not as critical as in the other exit channels 1527-1531.

In addition to the proximity sensors $S_1$-$S_6$, each of the exit channels 1527-1532 also includes one of six coin discrimination sensors $D_1$-$D_6$. These sensors $D_1$-$D_6$ are the eddy current sensors, and will be described in more detail below in connection with FIGS. 62-65 of the drawings.

When one of the discrimination sensors detects a coin material that is not the proper material for coins in that exit channel, the disc may be stopped by de-energizing or disengaging the drive motor and energizing a brake. The suspect coin may then be discharged by jogging the drive motor with one or more electrical pulses until the trailing edge of the suspect coin clears the exit edge of its exit channel. The exact disc movement required to move the trailing edge of a coin from its sensor to the exit edge of its exit channel can be empirically determined for each coin denomination and then stored in the memory of the control system. An encoder on the sorter disc can then be used to measure the actual disc movement following the sensing of the suspect coin, so that the disc can be stopped at the precise position where the suspect coin clears the exit edge of its exit channel, thereby ensuring that no coins following the suspect coin are discharged.

Turning now to FIGS. 62-65, one embodiment of the present invention employs an eddy current sensor 1710 to perform as the coin handling system's coin discrimination sensors $D_1$-$D_6$. The eddy current sensor 1710 includes an excitation coil 1712 for generating an alternating magnetic field used to induce eddy currents in a coin 1714. The excitation coil 1712 has a start end 1716 and a finish end 1718. In this embodiment, an a-c. excitation coil voltage $V_{ex}$, e.g., a sinusoidal signal of 250 KHz and 10 volts peak-to-peak, is applied across the start end 1716 and the finish end 1718 of the excitation coil 1712. The alternating voltage $V_{ex}$ produces a corresponding current in the excitation coil 1712 which in turn produces a corresponding alternating magnetic field. The alternating magnetic field exists within and around the excitation coil 1712 and extends outwardly to the coin 1714. The magnetic field penetrates the coin 1714 as the coin is moving in close proximity to the excitation coil 1712, and eddy currents are induced in the coin 1714 as the coin moves through the alternating magnetic field. The strength of the eddy currents flowing in the coin 1714 is dependent on the material composition of the coin, and particularly the electrical resistance of that material. Resistance affects how much current will flow in the coin 1614 according to Ohm's Law (voltage=current*resistance).

The eddy currents themselves also produce a corresponding magnetic field. A proximal detector coil 1722 and a distal coil 1724 are disposed above the coin 1714 so that the eddy current-generated magnetic field induces voltages upon the coils 1722, 1724. The distal detector coil 1724 is positioned above the coin 1714, and the proximal detector coil 1722 is positioned between the distal detector coil 1724 and the passing coin 1714.

In one embodiment, the excitation coil 1712, the proximal detector coil 1722 and the distal detector coil 1724 are all wound in the same direction (either clockwise or counterclockwise). The proximal detection coil 1722 and the distal detector coil 1724 are wound in the same direction so that the voltages induced on these coils by the eddy currents are properly oriented.

The proximal detection coil 1722 has a starting end 1726 and a finish end 1728. Similarly, the distal coil 1724 has a starting end 1730 and a finish end 1632. In order of increasing distance from the coin 1614, the detector coils 1722, 1724 are positioned as follows: finish end 1728 of the proximal detector coil 1722, start end 1726 of the proximal detector coil 1722, finish end 1732 of the distal detector coil 1724 and start end 1730 of the distal detector coil 1724. The finish end 1728 of the proximal detection coil 1722 is connected to the finish end 1732 of the distal detector coil 1724 via a conductive wire 1734. It will be appreciated by those skilled in the art that other detector coil 1722, 1724 combinations are possible. For example, in an alternative embodiment the proximal detection coil 1722 is wound in the opposite direction of the distal detection coil 1724. In this case the start end 1726 of the proximal coil 1722 is connected to the finish end 1732 of the distal coil 1724.

Eddy currents in the coin 1714 induce voltages $V_{prox}$ and $V_{dist}$ respectively on the detector coils 1722, 1724. Likewise, the excitation coil 1712 also induces a common-mode voltage $V_{com}$ on each of the detector coils 1722, 1724. The common-mode voltage $V_{com}$ is effectively the same on each detector coil due to the symmetry of the detector coils' physical arrangement within the excitation coil 1712. Because the detector coils 1722, 1724 are wound and physically oriented in the same direction and connected at their finish ends 1728, 1732, the common-mode voltage $V_{com}$ induced by the excitation coil 1712 is subtracted out, leaving only a difference voltage $V_{diff}$ corresponding to the eddy currents in the coin 1714. This eliminates the need for additional circuitry to subtract out the common-mode voltage $V_{com}$. The common-mode voltage $V_{com}$ is effectively subtracted out because both the distal detection coil 1724 and the proximal detection coil 1722 receive the same level of induced voltage $V_{com}$ from the excitation coil 1712.

Unlike the common-mode voltage, the voltages induced by the eddy current in the detector coils are not effectively the same. This is because the proximal detector coil 1722 is purposely positioned closer to the passing coin than the distal detector coil 1724. Thus, the voltage induced in the proximal detector coil 1722 is significantly stronger, i.e., has greater amplitude, than the voltage induced in the distal detector coil 1724. Although the present invention subtracts the eddy current-induced voltage on the distal coil 1724 from the eddy current-induced voltage on the proximal coil 1722, the voltage amplitude difference is sufficiently great to permit detailed resolution of the eddy current response.

Figure 62:
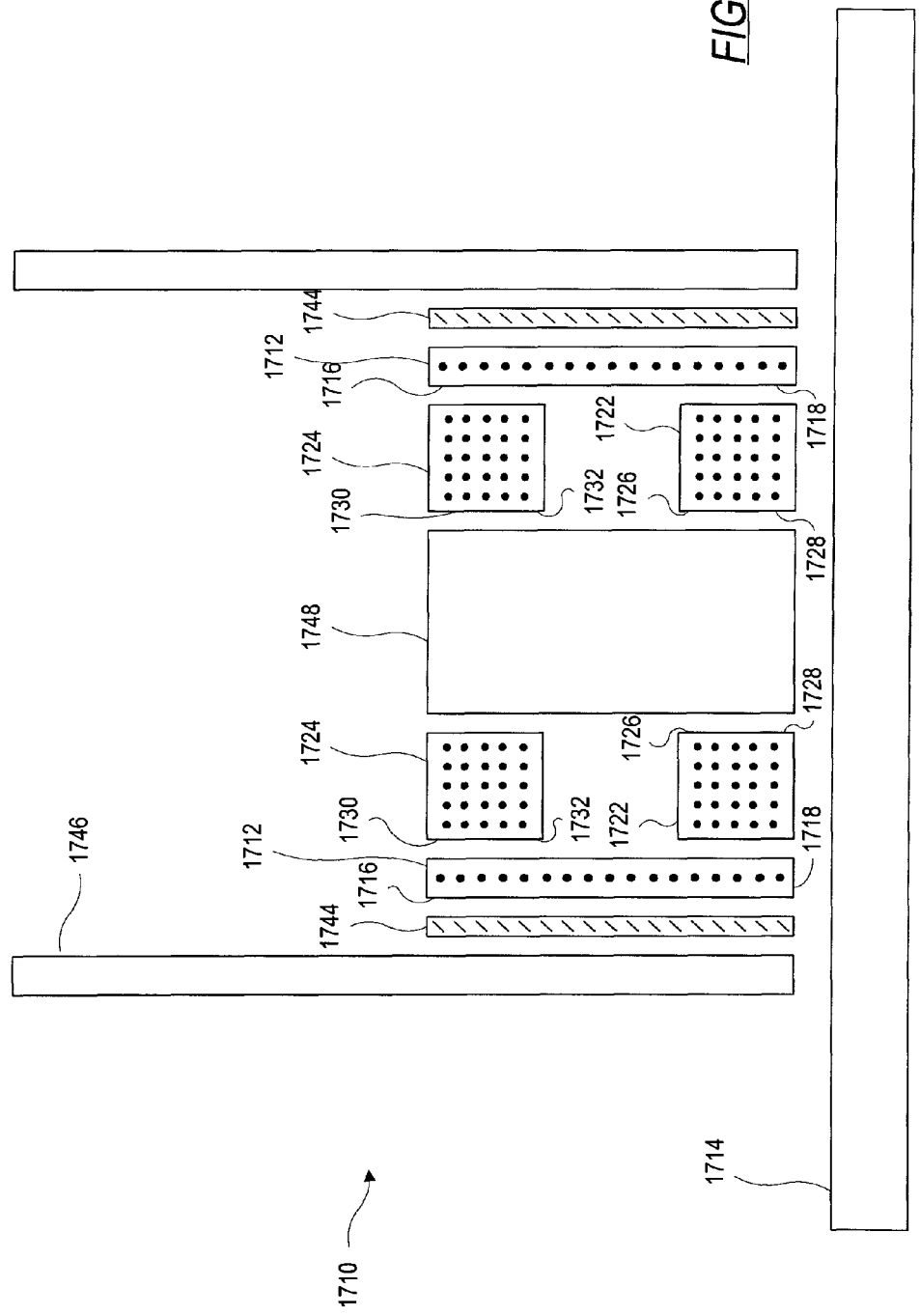
FIG. 62 is a diagrammatic cross-section of a coin and an improved coin discrimination sensor embodying the invention.
Figure 63:
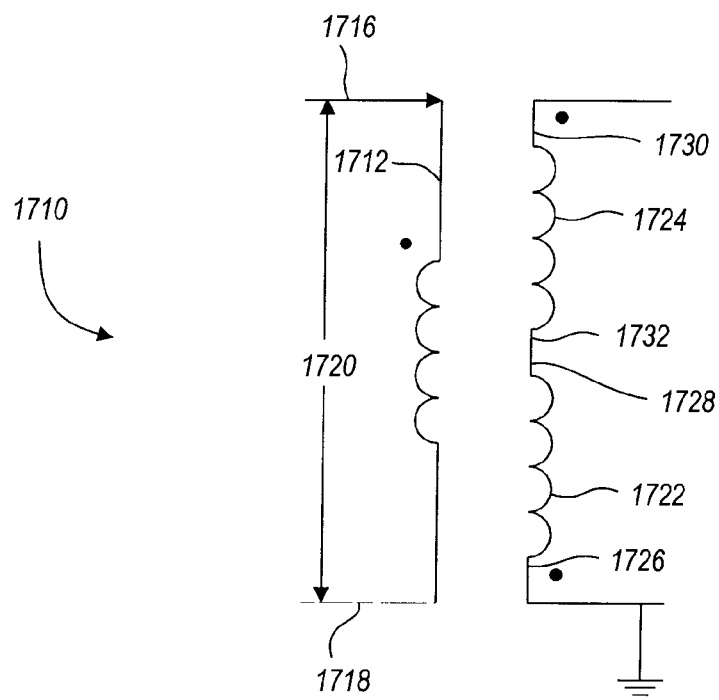
FIG. 63 is a schematic circuit diagram of the coin discrimination sensor of FIG. 62.
Figure 64:
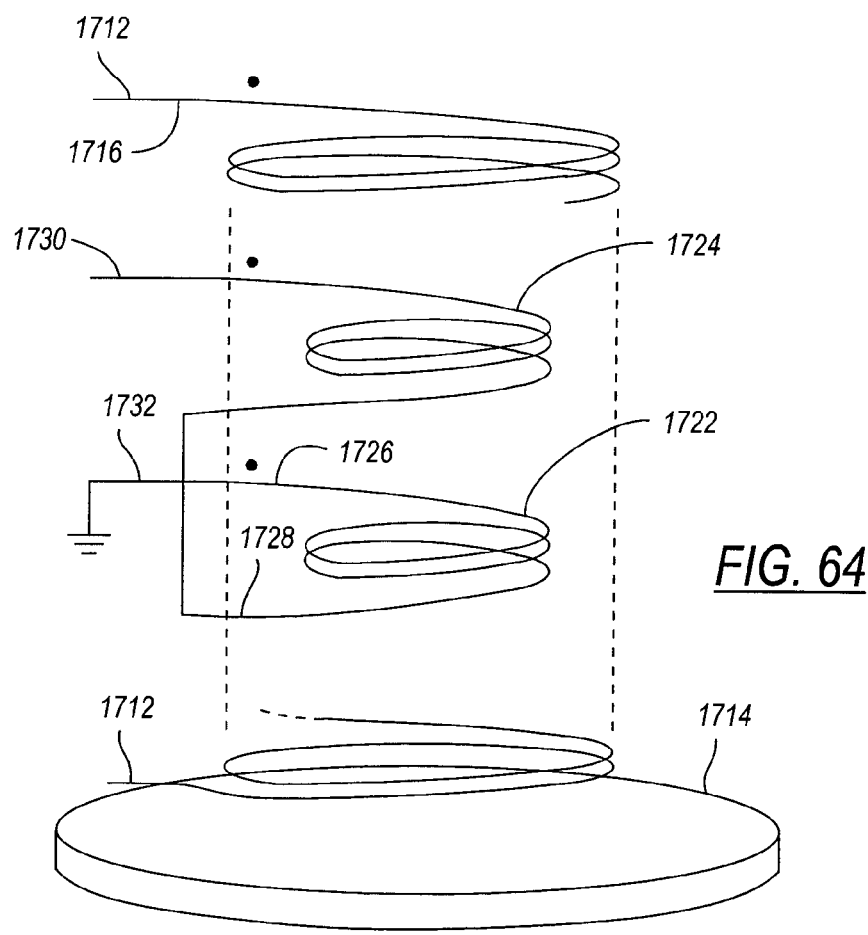
FIG. 64 is a diagrammatic perspective view of the coils in the coin discrimination sensor of FIG. 62.

As seen in FIG. 62, the excitation coil 1712 is radially surrounded by a magnetic shield 1734. The magnet shield 1734 has a high level of magnetic permeability in order to help contain the magnetic field surrounding the excitation coil 1712. The magnetic shield 1734 has the advantage of preventing a stray magnetic field from interfering with other nearby eddy current sensors. The magnetic shield is itself radially surrounded by a steel outer case 1736.

In one embodiment the excitation coil utilizes a cylindrical ceramic (e.g., alumina) core 1738. Alumina has the advantages of being impervious to humidity and providing a good wear surface. It is desirable that the core 1748 be able to withstand wear because it may come into frictional contact with the coin 1714. Alumina withstands frictional contact well because of its high degree of hardness, i.e., approximately 9 on mohs scale.

To form the eddy current sensor 1510, the detection coils 1722, 1724 are wound on a coil form (not shown). A preferred form is a cylinder having a length of 0.5 inch, a maximum diameter of 0.2620 inch, a minimum diameter of 0.1660 inch, and two grooves of 0.060 inch width spaced apart by 0.060 inch and spaced from one end of the form by 0.03 inch. Both the proximal detection coil 1722 and the distal detector coil 1724 have 350 turns of #44 AWG enamel covered magnet wire layer wound to generally uniformly fill the available space in the grooves. Each of the detector coils 1722, 1724 are wound in the same direction with the finish ends 1728, 1732 being connected together by the conductive wire 1734. The start ends 1726, 1730 of the detector coils 1722, 1724 are connected to separately identified wires in a connecting cable.

The excitation coil 1712 is a generally uniformly layer wound on a cylindrical alumina ceramic coil form having a length of 0.5 inch, an outside diameter of 0.2750 inch, and a wall thickness of 0.03125 inch. The excitation coil 1712 is wound with 135 turns of #42 AWG enamel-covered magnet wire in the same direction as the detector coils 1722, 1724. The excitation coil voltage $V_{ex}$ is applied across the start end 1716 and the finish end 1718.

After the excitation coil 1712 and detector coils 1722, 1724 are wound, the excitation coil 1712 is slipped over the detector coils 1722, 1724 around a common center axis. At this time the sensor 1710 is connected to a test oscillator (not shown) which applies the excitation voltage $V_{ex}$ to the excitation coil 1712. The excitation coil's position is adjusted along the axis of the coil to give a null response from the detector coils 1722, 1724 on an a-c. voltmeter with no metal near the coil windings.

Then the magnetic shield 1644 is the slipped over the excitation coil 1712 and adjusted to again give a null response from the detector coils 1722, 1724.

The magnetic shield 1744 and coils 1712, 1722, 1724 within the magnetic shield 1744 are then placed in the steel outer case 1746 and encapsulated with a polymer resin (not shown) to "freeze" the position of the magnetic shield 1744 and coils 1712, 1722, 1724.

After curing the resin, an end of the eddy current sensor 1710 nearest the proximal detector coil 1722 is sanded and lapped to produce a flat and smooth surface with the coils 1712, 1722 slightly recessed within the resin.

In order to detect the effect of the coin 1714 on the voltages induced upon the detector coils 1722, 1724, it is preferred to use a combination of phase and amplitude analysis of the detected voltage. This type of analysis minimizes the effects of variations in coin surface geometry and in the distance between the coin and the coils.

The voltage applied to the excitation coil 1712 causes current to flow in the coil 1712 which lags behind the voltage 1720. For example, the current may lag the voltage 1720 by 90 degrees in a superconductive coil. In effect, the coin's 1714 eddy currents impose a resistive loss on the current in the excitation coil 1712. Therefore, the initial phase difference between the voltage and current in the excitation coil 1712 is decreased by the presence of the coin 1714. Thus, when the detector coils 1724, 1726 have a voltage induced upon them, the phase difference between the voltage applied to the excitation coil 1712 and that of the detector coils is reduced due to the eddy current effect in the coin. The amount of reduction in the phase difference is proportional to the electrical and magnetic characteristics of the coin and thus the composition of the coin. By analyzing both the phase difference and the maximum amplitude, an accurate assessment of the composition of the coin is achieved.

Figure 65A:
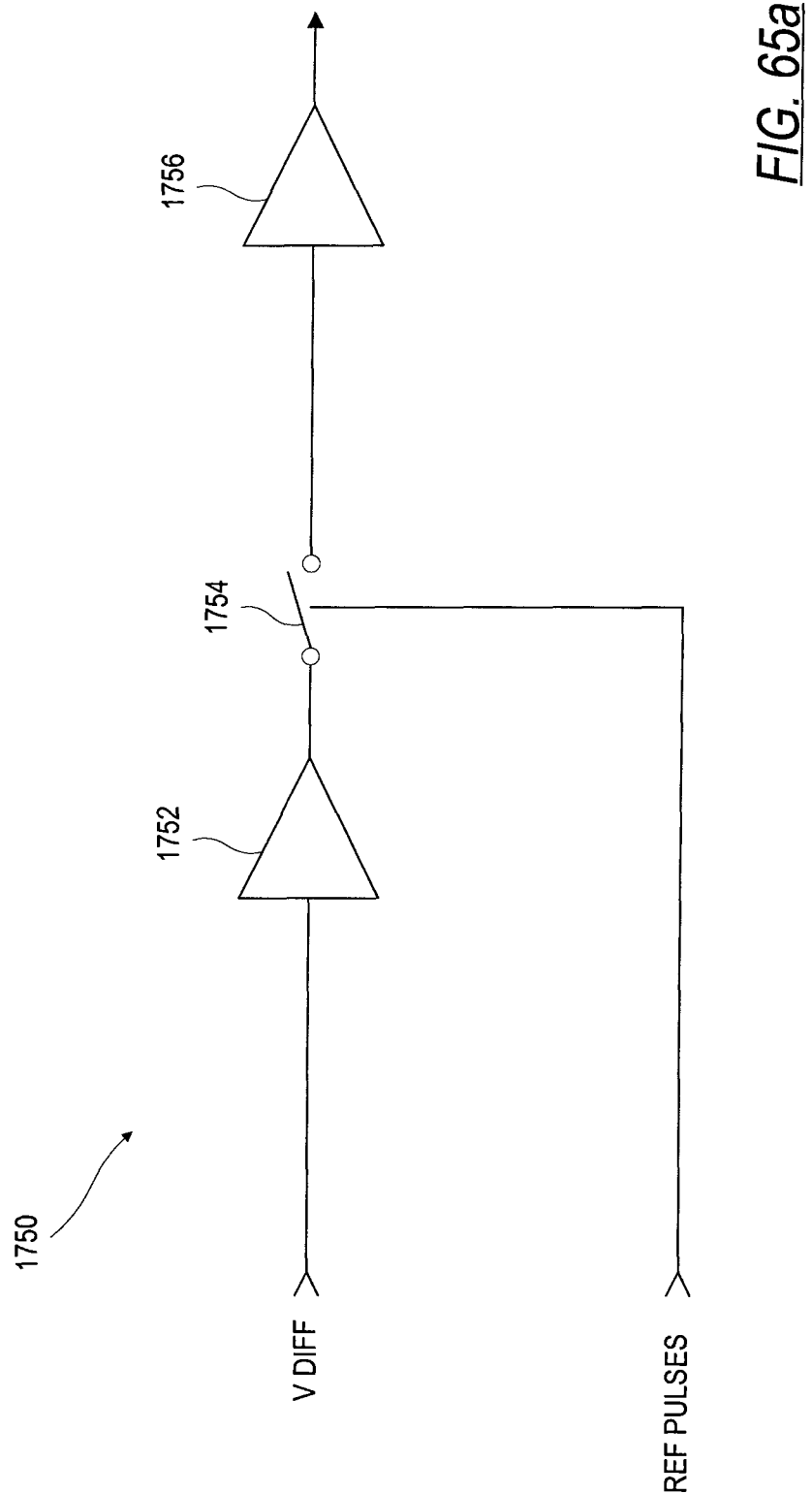
FIG. 65a is a circuit diagram of a detector circuit for use with the discrimination sensor of this invention.
Figure 65B:
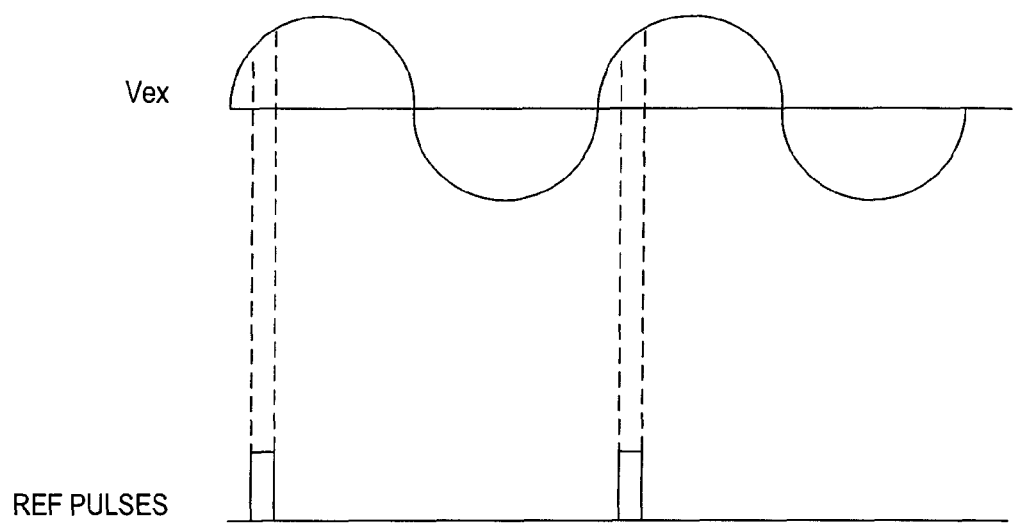
Figure 66:
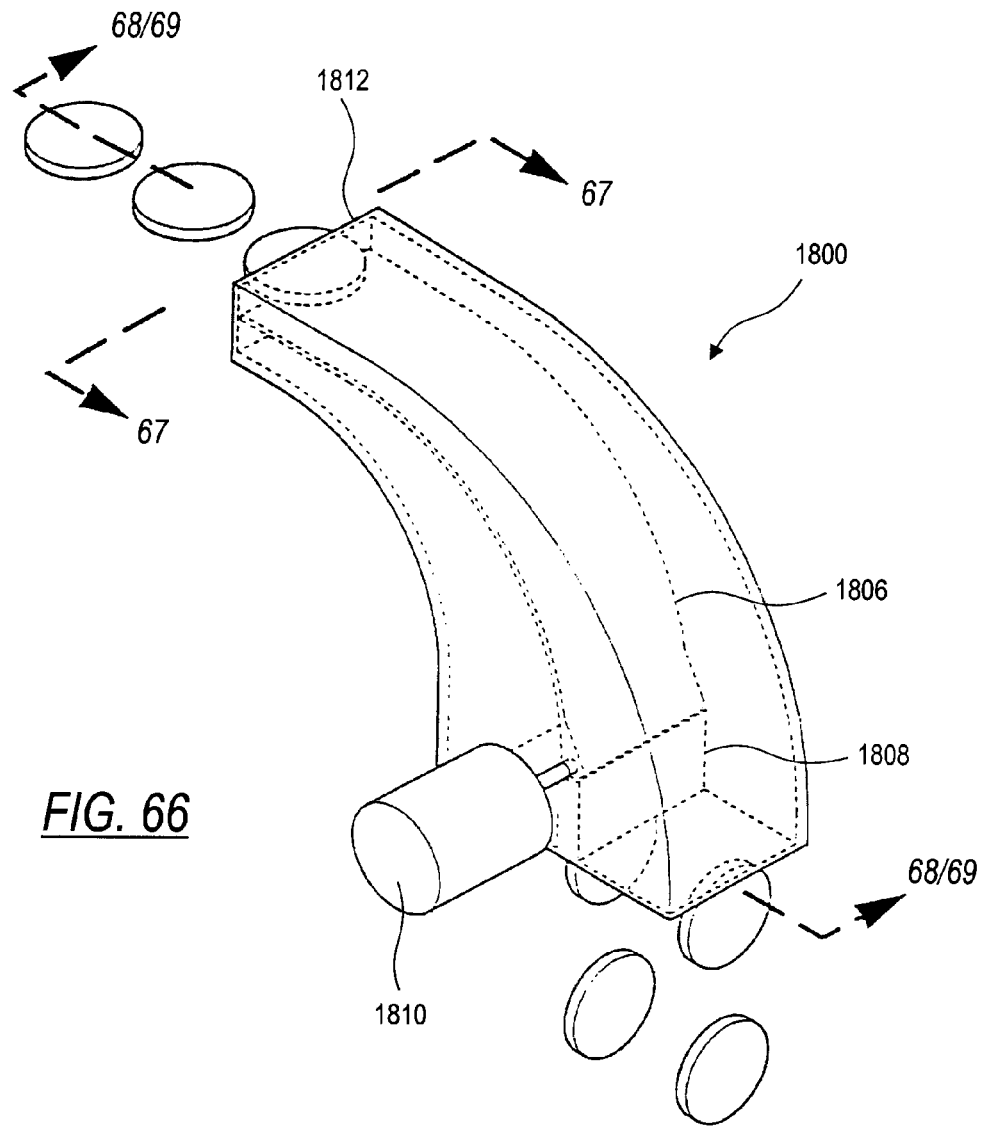
FIG. 66 is a perspective view of an outboard shunting device embodying the present invention.

FIGS. 65A and 65B illustrate a preferred phase-sensitive detector 1750 for sampling the differential output signal $V_{diff}$ from the two detector coils 1722, 1724. The differential output signal $V_{diff}$ is passed through a buffer amplifier 252 to a switch 1754, where the buffered $V_{diff}$ is sampled once per cycle by momentarily closing the switch 1754. The switch 1754 is controlled by a series of reference pulses produced from the $V_{ex}$ signal, one pulse per cycle. The reference pulses 1758 are synchronized with excitation voltage $V_{ex}$, so that the amplitude of the differential output signal $V_{diff}$ during the sampling interval is a function not only of the amplitude of the detector coil voltages 1736, 1738, but also of the phase difference between the signals in excitation coil 1712 and the detection coils 1736, 1738.

The pulses derived from $V_{ex}$ are delayed by an "offset angle" which can be adjusted to minimize the sensitivity of $V_{diff}$ to variations in the gap between the proximal face of the sensor 1710 and the surface of the coin 1714 being sensed. The value of the offset angle for any given coin can be determined empirically by moving a standard metal disc, made of the same material as the coin 1714, from a position where it contacts the sensor face, to a position where it is spaced about 0.001 to 0.020 inch from the sensor face. The signal sample from the detector 1750 is measured at both positions, and the difference between the two measurements is noted. This process is repeated at several different offset angles to determine the offset angle which produces the minimum difference between the two measurements.

Each time buffered $V_{diff}$ is sampled, the resulting sample is passed through a second buffer amplifier 1756 to an analog-to-digital converter (not shown). The resulting digital value is supplied to a microprocessor (not shown) which compares that value with several different ranges of values stored in a lookup table (not shown). Each stored range of values corresponds to a particular coin material, and thus the coin material represented by any given sample value is determined by the particular stored range into which the sample value falls. The stored ranges of values can be determined empirically by simply measuring a batch of coins of each denomination and storing the resulting range of values measured for each denomination.

If desired, the coin sorting and discrimination module 19 may be replaced with a coin discriminating module which does not sort the coins or a coin sorting module only. Such modules would align the coins of all denominations in a single file and guide them past a single coin discrimination sensor to determine whether the coins are genuine. The coins of all denominations would then be discharged into a single storage receptacle and sorted at a later time. Coins that are detected to be non-genuine would be diverted and returned to the customer at the coin return station 4.

Figure 67:
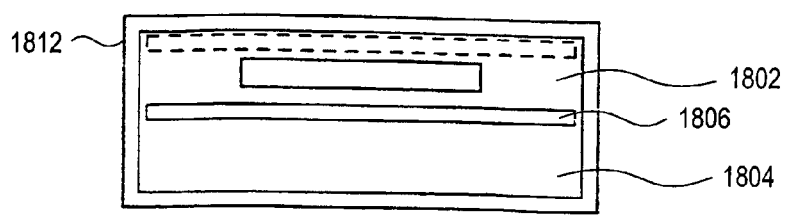
FIG. 67 is a section taken generally along line 67-67 in FIG. 66.
Figure 68:
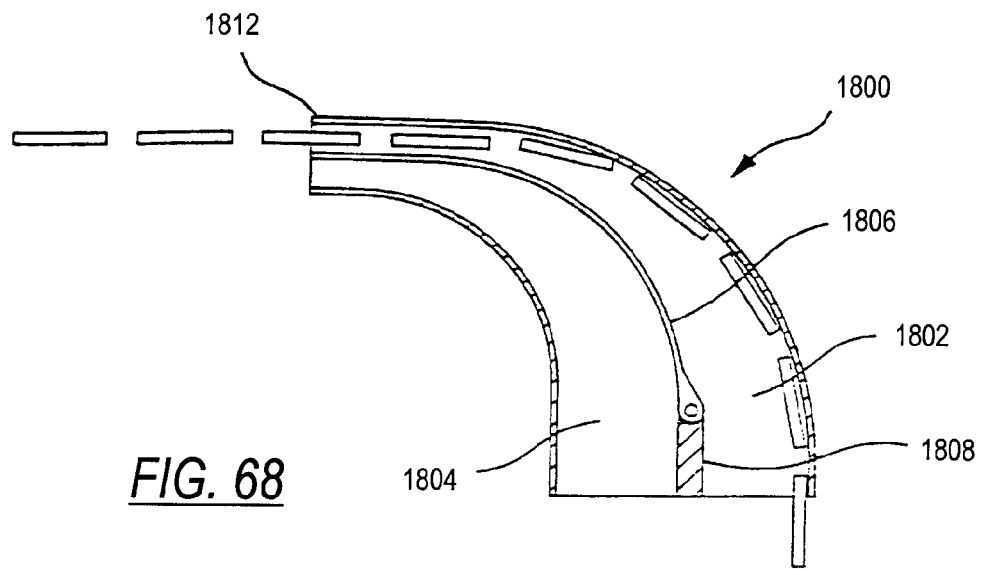
FIG. 68 is a section taken generally along line 68-68 in FIG. 66, showing a movable partition in a nondiverting position.
Figure 69:
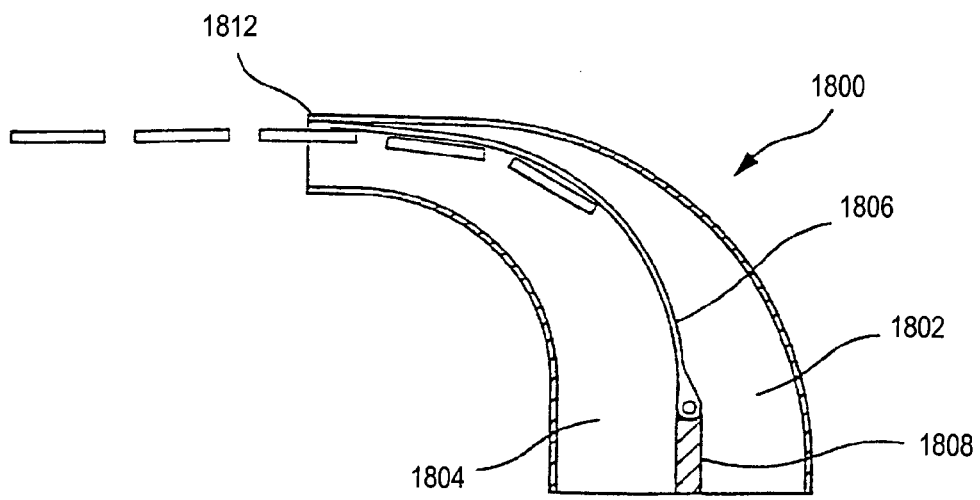
FIG. 69 is the same section illustrated in FIG. 68, showing the movable portion in a diverting position.

When an invalid coin is detected by one of the discriminating sensors described above, the invalid coin is separated from the valid coins and returned to the customer. In the illustrative module 8, this separation is effected outside the sorting disc by the shunting device illustrated in FIGS. 66-69. The curved exit chute 1800 includes two slots 1802, 1804 separated by an internal partition 1806. The internal partition 1806 is pivotally mounted to a stationary base 1808 so that the internal partition 1806 may be moved, perpendicular to the plane of the coins, by an actuator 1810 between an up position (FIG. 69) and a down position (FIG. 68). The exit chute 1800 is positioned adjacent an exit channel of the coin sorter such that coins exiting the coin sorter are guided into the slot 1802 when the internal partition 1806 is in the down position (FIG. 67). When an invalid coin is detected by the discriminating sensor D, the actuator 1810 moves the internal partition 1806 to the up position (FIG. 69) so that the invalid coin now enters the slot 1804 of the exit chute 1800. Coins entering the slot 1804 are discharged into the tube that conveys those coins to the coin-return slot 62 at the front of the system. While FIGS. 66-69 illustrate only a single exit chute, it will be apparent that a similar exit chute is provided at each of the six coin exit locations around the circumference of the sorting disc.

The actuator 1810 moves the internal partition 1806 between the up and down positions in response to detection of invalid and valid coins. Thus, if the internal partition 1806 is in the down position and an invalid coin is detected, the partition 1806 is moved to the up position so that the invalid coin will be diverted into the slot 1804. Alternatively, an invalid coin may be separated from the valid coins by use of inboard actuators in the sorting head, activated by signals derived from one or more sensors mounted in the sorting head upstream of the actuators. Such an arrangement is described in U.S. Pat. No. 5,299,977, which is incorporated herein by reference.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

The invention claimed is:

1. A check and U.S. bank note processing device configured to process both checks and U.S. bank notes, the device comprising:
   an input receptacle configured to receive checks and U.S. bank notes;
   an output receptacle;
   a transport mechanism configured to transport the checks and U.S. bank notes from the input receptacle past an image scanner;
   the image scanner being configured to obtain an image of each check and U.S. bank note transported past the image scanner;
   the device being configured to determine the denominations of transported U.S. bank notes;
   the device being configured to capture information including a bank number and an account number from checks transported past the image scanner; and
   a memory configured to store the information captured from checks transported past the image scanner.

2. The device of claim 1 wherein the output receptacle comprises one and only one output receptacle.

3. The device of claim 2 configured to identify the bank which issued each check processed and to stop the transport mechanism upon the detection of a check not issued by a particular bank.

4. The device of claim 2 configured to identify the bank which issued each check processed and to stop the transport mechanism upon the detection of a check being issued by a bank meeting a flagging criteria.

5. The device of claim 1 wherein the output receptacle comprises a plurality of output receptacles.

6. The device of claim 5 configured to identify the bank which issued each check processed and to sort checks into the output receptacles based on the identity of the bank which issued each check.

7. The device of claim 5 configured to separate checks into the output receptacles based on the source of each check.

8. The device of claim 5 configured to separate checks and U.S. bank notes into the output receptacles based on document type.

9. The device of claim 1 wherein the output receptacle comprises exactly two output receptacles.

10. The device of claim 9 configured to identify the bank which issued each check processed and to sort checks into the two output receptacles based on the identity of the bank which issued each check.

11. The device of claim 9 configured to separate checks into the output receptacles based on the source of each check.

12. The device of claim 1 configured to identify the bank which issued each check processed and to stop the transport mechanism upon the detection of a check being issued by a bank meeting a flagging criteria.

13. The device of claim 1 wherein the checks and U.S. bank notes are rectangular and wherein the transport mechanism is configured to transport the checks and U.S. bank notes in a wide-edge leading manner.

14. The device of claim 1 wherein the checks and U.S. banks are transported past the image scanner along a common transport path.

15. The device of claim 1 configured to automatically determine the denominations of the U.S. bank notes from the obtained images of the U.S. bank notes transported past the image scanner.

16. The device of claim 15 wherein the device is configured to automatically determine the denominations of the U.S. bank notes at a rate of at least 800 U.S. bank notes per minute.

17. The device of claim 15 wherein the device is configured to automatically determine the denominations of the U.S. bank notes at a rate of at least 1000 U.S. bank notes per minute.

18. The device of claim 1 wherein the device is configured to automatically determine the denominations of the U.S. bank notes at a rate of at least 800 U.S. bank notes per minute.

19. The device of claim 1 wherein the device is configured to automatically determine the denominations of the U.S. bank notes at a rate of at least 1000 U.S. bank notes per minute.

20. The device of claim 1 configured to count the number of bank notes belonging to each of a plurality of denominations and store the count information in a memory.

21. The device of claim 1 configured to determine an aggregate total of bank notes scanned and store the aggregate total in a memory.

22. The device of claim 1 configured to automatically determine the denominations of the U.S. bank notes and to total the value for all of the U.S. bank notes in a batch of U.S. bank notes processed by the device including U.S. bank notes of a plurality of denominations.

23. The device of claim 22 configured to display the total value on a display of the device.

24. The device of claim 1 wherein the device is configured to capture a check number from each check transported past the image scanner.

25. The device of claim 1 wherein the device is configured to capture a check amount from each check transported past the image scanner.

26. The device of claim 1 further comprising an interface configured to permit the image of each check transported past the image scanner to be communicated to a remote processor.

27. The device of claim 26 wherein the remote processor is configured to extract alphanumeric information from the image of each check.

28. The device of claim 27 wherein the remote processor is configured to extract a check number from the image of each check.

29. The device of claim 27 wherein the remote processor is configured to extract a bank number from the image of each check.

30. The device of claim 27 wherein the remote processor is configured to extract an account number from the image of each check.

31. The device of claim 27 wherein the remote processor is configured to extract a check amount from the image of each check.

32. The device of claim 1 wherein the image scanner is configured to obtain an image of front and back surfaces of each check and U.S. bank note.

33. The device of claim 1 wherein the image scanner is configured to obtains an image of an entire surface of each check and U.S. bank note.

34. The device of claim 1 wherein the image scanner and transport mechanism are enclosed in a device housing and wherein the device housing has a depth of about 15 inches.

35. The device of claim 1 wherein the image scanner and transport mechanism are enclosed in a device housing and wherein the device housing has a width of about 13½ inches.

36. The device of claim 1 wherein the image scanner and transport mechanism are enclosed in a device housing and wherein the device housing has a footprint of about 1.4 square feet.

37. The device of claim 1 wherein the image scanner and transport mechanism are enclosed in a device housing and wherein the device housing has a volume of about 2 cubic feet.

38. The device of claim 1, wherein the output receptacle is configured to receive and securely store at least a portion of the U.S. bank notes transported by the transport mechanism.

39. The device of claim 38, wherein the U.S. bank notes are transported, the images are obtained, and the denominations are determined at a rate of at least 800 U.S. bank notes per minute.

40. The device of claim 38, wherein the U.S. bank notes are transported, the images are obtained, and the denominations are determined at a rate of at least 1000 U.S. bank notes per minute.

41. The device of claim 38, wherein the U.S. bank notes and checks have a wide edge and a narrow edge, and wherein the transport mechanism is configured to transport the U.S. bank notes and checks with a wide edge of each U.S. bank and check note being generally perpendicular to the direction of transport by the transport mechanism.

42. The device of claim 1, further comprising a secure housing defining an outer insecure area and an inner secure area, wherein the input receptacle is at least partially located in the outer insecure area, and wherein the image scanner, transport mechanism, and output receptacle are located in the inner secure area such that a U.S. bank note after being transported is generally inaccessible to an operator of the device.

43. The device of claim 42, wherein the U.S. bank notes are transported, the images are obtained, and the denominations are determined at a rate of at least 800 U.S. bank notes per minute.

44. The device of claim 42, wherein the U.S. bank notes are transported, the images are obtained, and the denominations are determined at a rate of at least 1000 U.S. bank notes per minute.

45. The device of claim 42, wherein the U.S. bank notes and checks have a wide edge and a narrow edge, and wherein the transport mechanism is configured to transport the U.S. bank notes and checks with a wide edge of each U.S. bank note and check being generally perpendicular to the direction of transport by the transport mechanism.

46. A method of processing checks and U.S. bank notes using a check and U.S. bank note processing device configured to process both checks and U.S. bank notes, the method comprising the acts of:
- receiving checks and U.S. bank notes in an input receptacle of the device;
- the device transporting the checks and U.S. bank notes from the input receptacle past an image scanner and to an output receptacle;
- the device obtaining an image of each check and U.S. bank note transported past the image scanner;
- the device determining the denominations of transported U.S. bank notes;
- the device capturing information including a bank number and an account number from checks transported past the image scanner; and
- storing the information captured from checks transported past the image scanner in a memory.

47. The method of claim 46 wherein the checks and U.S. bank notes are rectangular and wherein the act of transporting comprises transporting the checks and U.S. bank notes in a wide-edge leading manner.

48. The method of claim 46 wherein the output receptacle comprises a plurality of output receptacles; and further comprising
- identifying the bank which issued each check processed; and
- sorting the checks into the output receptacles based on the identity of the bank which issued each check.

49. The method of claim 46 further comprising automatically determining, at a rate of at least 800 U.S. bank notes per minute, the denominations of the U.S. bank notes from the obtained images of the U.S. bank notes transported past the image scanner.

50. The method of claim 46 further comprising automatically determining at a rate of at least 800 U.S. bank notes per minute the denominations of the U.S. bank notes.

51. The method of claim 46 further comprising counting the number of bank notes belonging to each of a plurality of denominations and storing the count information in a memory.

52. The method of claim 46 further comprising determining an aggregate total of bank notes transported and storing the aggregate total in a memory.

53. The method of claim 46, further comprising securely storing the transported U.S. bank notes in the processing device.

54. The method of claim 53, wherein the U.S. bank notes are transported, images are obtained, and denominations are determined at a rate of at least 800 U.S. bank notes per minute.

55. The method of claim 53, wherein the U.S. bank notes are transported, images are obtained, and denominations are determined at a rate of at least 1000 U.S. bank notes per minute.

56. The method of claim 53, wherein the U.S. bank notes and checks have a wide edge and a narrow edge, and the transporting comprises transporting the U.S. bank notes and checks with a wide edge of each U.S. bank note and check being generally perpendicular to the direction of transport.

57. A check and U.S. bank note processing device configured to process both checks and U.S. bank notes, the device comprising:
- an input receptacle configured to receive checks and U.S. bank notes;
- an output receptacle;
- a transport mechanism configured to transport the checks and U.S. bank notes from the input receptacle past an image scanner;
- the image scanner being configured to obtain an image of each check and U.S. bank note transported past the image scanner;
- the device being configured to determine the denominations of transported U.S. bank notes;
- the device being configured to extract information including bank numbers and account numbers from the images of checks transported past the image scanner; and
- a memory configured to store the bank numbers and account numbers extracted from the images of checks transported past the image scanner.

58. The device of claim 57 wherein the checks and U.S. bank notes are rectangular and wherein the transport mechanism is configured to transport the checks and U.S. bank notes in a wide-edge leading manner.

59. The device of claim 57 configured to automatically determine, at a rate of at least 800 U.S. bank notes per minute, the denominations of the U.S. bank notes from the obtained images of the U.S. bank notes transported past the image scanner.

60. The device of claim 57 wherein the device is configured to automatically determine the denominations of the U.S. bank notes at a rate of at least 1000 U.S. bank notes per minute.

61. The device of claim 57 configured to count the number of bank notes belonging to each of a plurality of denominations and store the count information in a memory.

62. The device of claim 57 configured to determine an aggregate total of bank notes scanned and store the aggregate total in a memory.

63. The device of claim 57 wherein the device is configured to extract a check number from each check transported past the image scanner.

64. The device of claim 57 wherein the device is configured to extract a check amount from each check transported past the image scanner.

65. The device of claim 57 wherein the image scanner is configured to obtain an image of front and back surfaces of each check and U.S. bank note.

66. The device of claim 57 wherein the image scanner is configured to obtains an image of an entire surface of each check and U.S. bank note.

67. The device of claim 57, wherein the output receptacle is configured to receive and securely store at least a portion of the U.S. bank notes transported by the transport mechanism.

68. The device of claim 67, wherein the U.S. bank notes and checks have a wide edge and a narrow edge, and wherein the transport mechanism is configured to transport the U.S. bank notes and checks with a wide edge of each U.S. bank and check note being generally perpendicular to the direction of transport by the transport mechanism.

69. The device of claim 68, wherein the U.S. bank notes are transported, the images are obtained, and denominations are determined at a rate of at least 800 U.S. bank notes per minute.

70. The device of claim 57, further comprising a secure housing defining an outer insecure area and an inner secure area, wherein the input receptacle is at least partially located in the outer insecure area, and wherein the image scanner, transport mechanism, and output receptacle are located in the inner secure area such that a U.S. bank note after being transported is generally inaccessible to an operator of the device.

71. A method of processing checks and U.S. bank notes using a check and U.S. bank note processing device configured to process both checks and U.S. bank notes, the method comprising the acts of:
- receiving checks and U.S. bank notes in an input receptacle of the device;
- the device transporting the checks and U.S. bank notes from the input receptacle past an image scanner to an output receptacle;
- the device obtaining an image of each check and U.S. bank note transported past the image scanner;
- the device determining the denominations of transported U.S. bank notes;
- the device capturing information including bank numbers and account numbers from checks transported past the image scanner; and
- storing the information captured from checks transported past the image scanner in a memory.

72. The method of claim 71 wherein the checks and U.S. bank notes are rectangular and wherein the act of transporting comprises transporting the checks and U.S. bank notes in a wide-edge leading manner.

73. The method of claim 71 wherein the output receptacle comprises a plurality of output receptacles; and further comprising
- identifying the bank which issued each check processed; and
- sorting the checks into the output receptacles based on the identity of the bank which issued each check.

74. The method of claim 71 further comprising automatically determining, at a rate of at least 800 U.S. bank notes per minute, the denominations of the U.S. bank notes from the obtained images of the U.S. bank notes transported past the image scanner.

75. The method of claim 74 wherein the checks and U.S. bank notes are rectangular and wherein the act of transporting comprises transporting the checks and U.S. bank notes in a wide-edge leading manner.

76. The method of claim 71 further comprising counting the number of bank notes belonging to each of a plurality of denominations and storing the count information in a memory.

77. The method of claim 71 further comprising determining an aggregate total of bank notes transported and storing the aggregate total in a memory.

78. A check and U.S. bank note processing device configured to process both checks and U.S. bank notes, the device comprising:
- an input receptacle configured to receive checks and U.S. bank notes;
- an output receptacle;
- a transport mechanism configured to transport the checks and U.S. bank notes from the input receptacle past an image scanner;
- the image scanner being configured to obtain an image of each check and U.S. bank note transported past the image scanner;
- the device being configured to determine the denominations of transported U.S. bank notes;
- the device being configured to capture information from checks transported past the image scanner; the device being configured to capture account numbers, bank numbers, and/or check numbers of checks transported past the image scanner; and
- a memory configured to store the information captured from checks transported past the image scanner including the captured account numbers, bank numbers, and/or check numbers of checks transported past the image scanner.

79. The device of claim 78 wherein the checks and U.S. bank notes are rectangular and wherein the transport mechanism is configured to transport the checks and U.S. bank notes in a wide-edge leading manner.

80. The device of claim 78 configured to automatically determine, at a rate of at least 800 U.S. bank notes per minute, the denominations of the U.S. bank notes from the obtained images of the U.S. bank notes transported past the image scanner.

81. The device of claim 78 wherein the device is configured to automatically determine the denominations of the U.S. bank notes at a rate of at least 1000 U.S. bank notes per minute.

82. The device of claim 78 configured to count the number of bank notes belonging to each of a plurality of denominations and store the count information in a memory.

83. The device of claim 78 configured to determine an aggregate total of bank notes scanned and store the aggregate total in a memory.

84. A method of processing checks and U.S. bank notes using a check and U.S. bank note processing device configured to process both checks and U.S. bank notes, the method comprising the acts of:
- receiving checks and U.S. bank notes in an input receptacle of the device;
- the device transporting the checks and U.S. bank notes from the input receptacle past an image scanner to an output receptacle;
- the device obtaining an image of each check and U.S. bank note transported past the image scanner;
- the device determining the denominations of transported U.S. bank notes;
- the device determining information from checks transported past the image scanner including determining account numbers, bank numbers, and/or check numbers of checks transported past the image scanner; and
- storing the information determined from checks transported past the image scanner in a memory including storing the determined account numbers, bank numbers, and/or check numbers of checks transported past the image scanner.

85. The method of claim 84 wherein the output receptacle comprises a plurality of output receptacles and further comprising identifying the bank which issued each check processed and sorting the checks into the output receptacles based on the identity of the bank which issued each check.

86. The method of claim 84 wherein the checks and U.S. bank notes are rectangular and wherein the act of transporting comprises transporting the checks and U.S. bank notes in a wide-edge leading manner.

87. The method of claim 84 further comprising automatically determining, at a rate of at least 1000 U.S. bank notes per minute, the denominations of the U.S. bank notes from the obtained images of the U.S. bank notes transported past the image scanner.

88. The method of claim 84 further comprising automatically determining the denominations of the U.S. bank notes at a rate of at least 800 U.S. bank notes per minute.

89. The method of claim 84 further comprising automatically determining the denominations of the U.S. bank notes and totaling a value for all of the U.S. bank notes in a batch of U.S. bank notes processed by the device including U.S. bank notes of a plurality of denominations.

90. The method of claim 84 further comprising determining a check number and an account number from each check transported past the image scanner.

91. The method of claim 84 wherein the act of obtaining comprising obtaining an image of front and back surfaces of each check and U.S. bank note.

92. The method of claim 84 wherein the act of obtaining comprising obtaining an image of an entire surface of each check and U.S. bank note.

93. A check and U.S. bank note processing device configured to process both checks and U.S. bank notes wherein the checks and U.S. bank notes are rectangular, the device comprising:
   an input receptacle configured to receive checks and U.S. bank notes;
   an output receptacle;
   a transport mechanism configured to transport the checks and U.S. bank notes from the input receptacle past an image scanner in a wide-edge leading manner;
   the image scanner being configured to obtain an image of each check and U.S. bank note transported past the image scanner;
   the device being configured to determine the denominations of transported U.S. bank notes;
   the device being configured to obtain alphanumeric information from checks transported past the image scanner;
   the device being configured to obtain alphanumeric representations of account numbers, bank numbers, and/or check numbers of checks transported past the image scanner; and
   a memory configured to store the alphanumeric information obtained from checks transported past the image scanner including the obtained alphanumeric representations of the account numbers, bank numbers, and/or check numbers of checks transported past the image scanner.

94. The device of claim 93 wherein the output receptacle comprises exactly two output receptacles and wherein the device is configured to identify the bank which issued each check processed and to sort checks into the two output receptacles based on the identity of the bank which issued each check.

95. The device of claim 93 configured to automatically determine, a rate of at least 800 U.S. bank notes per minute, the denominations of the U.S. bank notes from the obtained images of the U.S. bank notes transported past the image scanner.

96. The device of claim 93 wherein the device is configured to automatically determine the denominations of the U.S. bank notes at a rate of at least 1000 U.S. bank notes per minute.

97. The device of claim 93 wherein the device is configured to obtain a check number and bank number from the image of each check transported past the image scanner.

98. The device of claim 93 wherein the image scanner is configured to obtain an image of front and back surfaces of each check and U.S. bank note.

99. The device of claim 93 wherein the image scanner is configured to obtains an image of an entire surface of each check and U.S. bank note.

100. The device of claim 93 wherein the image scanner and transport mechanism are enclosed in a device housing and wherein the device housing has a width of about 13½ inches.

101. The device of claim 93 configured to count the number of bank notes belonging to each of a plurality of denominations and store the count information in a memory.

102. The device of claim 93 configured to determine an aggregate total of bank notes scanned and store the aggregate total in a memory.

103. The device of claim 93, wherein the output receptacle is configured to receive and securely store at least a portion of the U.S. bank notes transported by the transport mechanism.

104. The device of claim 103, wherein the U.S. bank notes and checks have a wide edge and a narrow edge, and wherein the transport mechanism is configured to transport the U.S. bank notes and checks with a wide edge of each U.S. bank and check note being generally perpendicular to the direction of transport by the transport mechanism.

105. The device of claim 104, wherein the U.S. bank notes are transported, the images are obtained, and the denominations are determined at a rate of at least 800 U.S. bank notes per minute.

106. The device of claim 93, further comprising a secure housing defining an outer insecure area and an inner secure area, wherein the input receptacle is at least partially located in the outer insecure area, and wherein the image scanner, transport mechanism, and output receptacle are located in the inner secure area such that a U.S. bank note after being transported is generally inaccessible to an operator of the device.

107. A method of processing checks and U.S. bank notes using a check and U.S. bank note processing device configured to process both checks and U.S. bank notes, the method comprising the acts of:
   receiving checks and U.S. bank notes in an input receptacle of the device;
   the device transporting the checks and U.S. bank notes from the input receptacle past an image scanner to an output receptacle;
   the device obtaining an image of each check and U.S. bank note transported past the image scanner;
   the device determining the denominations of transported U.S. bank notes;
   the device capturing alphanumeric information from checks transported past the image scanner including capturing alphanumeric representations of account numbers, bank numbers, and/or check numbers of checks transported past the image scanner; and
   storing the alphanumeric information captured from checks including storing the captured alphanumeric representations of the account numbers, bank numbers, and/or check numbers of checks transported past the image scanner.

108. The method of claim 107 wherein the checks and U.S. bank notes are rectangular and wherein the act of transporting comprises transporting the checks and U.S. bank notes in a wide-edge leading manner.

109. The method of claim 108 further comprising automatically determining at a rate of at least 1000 U.S. bank notes per minute the denominations of the U.S. bank notes.

110. The method of claim 107 wherein the output receptacle comprises a plurality of output receptacles; and
   further comprising identifying the bank which issued each check processed; and
   sorting the checks into the output receptacles based on the identity of the bank which issued each check.

111. The method of claim 107 further comprising automatically determining at a rate of at least 800 U.S. bank notes per minute the denominations of the U.S. bank notes from the obtained images of the U.S. bank notes transported past the image scanner.

112. The method of claim 111 wherein the checks and U.S. bank notes are rectangular and wherein the act of transporting comprises transporting the checks and U.S. bank notes in a wide-edge leading manner.

113. The method of claim 107 further comprising counting the number of bank notes belonging to each of a plurality of denominations and storing the count information in a memory.

114. The method of claim 107 further comprising determining an aggregate total of bank notes transported and storing the aggregate total in a memory.

115. A method of processing checks and U.S. bank notes using a check and U.S. bank note processing device configured to process both checks and U.S. bank notes, the method comprising the acts of:
receiving checks in the device;
the device transporting the checks past an image scanner;
receiving U.S. bank notes in the device;
the device transporting the U.S. bank notes past the image scanner;
the device obtaining an image of each check and U.S. bank note transported past the image scanner;
the device determining the denominations of transported U.S. bank notes;
the device capturing information including bank numbers and account numbers from checks transported past the image scanner; and
storing the information captured from checks transported past the image scanner in a memory.

116. The method of claim 115 wherein the checks and U.S. bank notes are rectangular and wherein the act of transporting comprises transporting the checks and U.S. bank notes in a wide-edge leading manner.

117. The method of claim 116 further comprising automatically determining, at a rate of at least 1000 U.S. bank notes per minute, the denominations of the U.S. bank notes.

118. The method of claim 115 wherein the output receptacle comprises a plurality of output receptacles; and
further comprising identifying the bank which issued each check processed; and
sorting the checks into the output receptacles based on the identity of the bank which issued each check.

119. The method of claim 115 further comprising automatically determining, at a rate of at least 800 U.S. bank notes per minute, the denominations of the U.S. bank notes from the obtained images of the U.S. bank notes transported past the image scanner.

120. The method of claim 119 wherein the checks and U.S. bank notes are rectangular and wherein the act of transporting comprises transporting the checks and U.S. bank notes in a wide-edge leading manner.

121. The method of claim 115 further comprising counting the number of bank notes belonging to each of a plurality of denominations and storing the count information in a memory.

122. The method of claim 115 further comprising determining an aggregate total of bank notes transported and storing the aggregate total in a memory.

123. The method of claim 115 wherein the act of receiving checks in the device comprises receiving checks in an input receptacle of the device and wherein the act of receiving U.S. bank notes in the device comprises receiving U.S. bank notes in the input receptacle of the device.

124. A method of processing checks and U.S. bank notes using a check and U.S. bank note processing device configured to process both checks and U.S. bank notes, the method comprising the acts of:
receiving checks in the device;
the device transporting the checks past an image scanner;
receiving U.S. bank notes in the device;
the device transporting the U.S. bank notes past the image scanner;
the device obtaining an image of each check and U.S. bank note transported past the image scanner;
the device determining the denominations of transported U.S. bank notes;
the device capturing alphanumeric information including bank numbers and account numbers from checks transported past the image scanner; and
storing the alphanumeric information including bank numbers and account numbers captured from checks transported past the image scanner in a memory.

125. The method of claim 124 wherein the checks and U.S. bank notes are rectangular and wherein the act of transporting comprises transporting the checks and U.S. bank notes in a wide-edge leading manner.

126. The method of claim 124 wherein the output receptacle comprises a plurality of output receptacles; and
further comprising identifying the bank which issued each check processed; and
sorting the checks into the output receptacles based on the identity of the bank which issued each check.

127. The method of claim 124 comprising the device determining the denominations of U.S. bank notes transported past the image scanner from the obtained images of the U.S. bank notes.

128. The method of claim 127 further comprising automatically determining, at a rate of at least 800 U.S. bank notes per minute, the denominations of the U.S. bank notes from the obtained images of the U.S. bank notes transported past the image scanner.

129. The method of claim 128 wherein the checks and U.S. bank notes are rectangular and wherein the act of transporting comprises transporting the checks and U.S. bank notes in a wide-edge leading manner.

130. The method of claim 124 comprising the device determining the denominations of U.S. bank notes transported past the image scanner from the obtained images of the U.S. bank notes.

131. The method of claim 124 further comprising automatically determining at a rate of at least 800 U.S. bank notes per minute the denominations of the U.S. bank notes.

132. The method of claim 131 wherein the checks and U.S. bank notes are rectangular and wherein the act of transporting comprises transporting the checks and U.S. bank notes in a wide-edge leading manner.

133. The method of claim 124 further comprising counting the number of bank notes belonging to each of a plurality of denominations and storing the count information in a memory.

134. The method of claim 124 further comprising determining an aggregate total of bank notes transported and storing the aggregate total in a memory.

135. The method of claim 124 wherein the act of receiving checks in the device comprises receiving checks in an input receptacle of the device and wherein the act of receiving U.S. bank notes in the device comprises receiving U.S. bank notes in the input receptacle of the device.

136. A method of processing checks and U.S. bank notes using a check and U.S. bank note processing device configured to process both checks and U.S. bank notes, the method comprising the acts of:
receiving checks in the device;
the device transporting the checks past an image scanner;

receiving U.S. bank notes in the device;

the device transporting the U.S. bank notes past an image scanner;

the device obtaining an image of each check and U.S. bank note transported past the image scanner;

the device determining the denominations of transported U.S. bank notes;

the device determining information from checks transported past the image scanner including determining account numbers, bank numbers, and/or check numbers of checks transported past the image scanner; and storing the information determined from checks transported past the image scanner in a memory including storing the determined account numbers, bank numbers, and/or check numbers of checks transported past the image scanner.

137. The method of claim 136 wherein the checks and U.S. bank notes are rectangular and wherein the act of transporting comprises transporting the checks and U.S. bank notes in a wide-edge leading manner.

138. The method of claim 137 comprising the device determining, a rate of at least 800 U.S. bank notes per minute, the denominations of U.S. bank notes transported past the image scanner from the obtained images of the U.S. bank notes.

139. The method of claim 136 wherein the checks and U.S. bank notes are rectangular and wherein the act of transporting comprises transporting the checks and U.S. bank notes in a wide-edge leading manner and further comprising automatically determining the denominations of the U.S. bank notes at a rate of at least 1000 U.S. bank notes per minute.

140. The method of claim 136 wherein the act of obtaining comprising obtaining an image of front and back surfaces of each check and U.S. bank note.

141. The method of claim 136 wherein the act of obtaining comprising obtaining an image of an entire surface of each check and U.S. bank note.

142. The method of claim 136 further comprising counting the number of bank notes belonging to each of a plurality of denominations and storing the count information in a memory.

143. The method of claim 136 further comprising determining an aggregate total of bank notes transported and storing the aggregate total in a memory.

144. The method of claim 136 wherein the act of receiving checks in the device comprises receiving checks in an input receptacle of the device and wherein the act of receiving U.S. bank notes in the device comprises receiving U.S. bank notes in the input receptacle of the device.

145. A method of processing checks and U.S. bank notes using a check and U.S. bank note processing device configured to process both checks and U.S. bank notes, the method comprising the acts of:

receiving checks in the device;

the device transporting the checks past an image scanner;

receiving U.S. bank notes in the device;

the device transporting the U.S. bank notes past the image scanner;

the device obtaining an image of each check and U.S. bank note transported past the image scanner;

the device determining the denominations of transported U.S. bank notes;

the device capturing alphanumeric information from checks transported past the image scanner including capturing alphanumeric representations of account numbers, bank numbers, and/or check numbers of checks transported past the image scanner; and storing the alphanumeric information captured from checks including storing the captured alphanumeric representations of the account numbers, bank numbers, and/or check numbers of checks transported past the image scanner.

146. The method of claim 145 wherein the checks and U.S. bank notes are rectangular and wherein the act of transporting comprises transporting the checks and U.S. bank notes in a wide-edge leading manner.

147. The method of claim 145 wherein the output receptacle comprises a plurality of output receptacles; and further comprising identifying the bank which issued each check processed; and sorting the checks into the output receptacles based on the identity of the bank which issued each check.

148. The method of claim 145 further comprising automatically determining, at a rate of at least 800 U.S. bank notes per minute, the denominations of the U.S. bank notes from the obtained images of the U.S. bank notes transported past the image scanner.

149. The method of claim 145 further comprising counting the number of bank notes belonging to each of a plurality of denominations and storing the count information in a memory.

150. The method of claim 145 further comprising determining an aggregate total of bank notes transported and storing the aggregate total in a memory.

151. The method of claim 145 wherein the act of receiving checks in the device comprises receiving checks in an input receptacle of the device and wherein the act of receiving U.S. bank notes in the device comprises receiving U.S. bank notes in the input receptacle of the device.

* * * * *